(12) United States Patent
Katoh et al.

(10) Patent No.: US 7,173,657 B2
(45) Date of Patent: Feb. 6, 2007

(54) SYSTEM AND METHOD FOR ANALYZING, OPTIMIZING AND/OR DESIGNING SPECTRAL SENSITIVITY CURVES FOR AN IMAGING DEVICE

(75) Inventors: Naoya Katoh, Chiba (JP); Noboru Ohta, Rochester, NY (US); Shuxue Quan, Rochester, NY (US); Mitchell Rosen, Rochester, NY (US)

(73) Assignees: Rochester Institute of Technology, Rochester, NY (US); Sony Corporation, Tokyo (JP)

(*) Notice: Subject to any disclaimer, the term of this patent is extended or adjusted under 35 U.S.C. 154(b) by 762 days.

(21) Appl. No.: 09/814,634

(22) Filed: Mar. 22, 2001

(65) Prior Publication Data

US 2002/0018128 A1 Feb. 14, 2002

Related U.S. Application Data

(60) Provisional application No. 60/191,800, filed on Mar. 24, 2000.

(51) Int. Cl.
- H04N 5/335 (2006.01)
- H04N 5/228 (2006.01)
- G06K 9/00 (2006.01)
- G03F 3/08 (2006.01)

(52) U.S. Cl. .............. 348/273; 348/22.1; 382/167; 358/518

(58) Field of Classification Search ............ 348/223.1, 348/272, 273, 279, 280, 222.1; 382/162, 382/167, 191; 358/448, 518
See application file for complete search history.

(56) References Cited

U.S. PATENT DOCUMENTS

| | | | | |
|---|---|---|---|---|
| 5,457,007 A | * | 10/1995 | Asami | 430/363 |
| 5,579,132 A | * | 11/1996 | Takahashi et al. | 358/527 |
| 5,609,978 A | * | 3/1997 | Giorgianni et al. | 430/30 |
| 5,857,063 A | * | 1/1999 | Poe et al. | 358/1.9 |
| 6,023,525 A | * | 2/2000 | Cass | 382/162 |
| 6,075,563 A | * | 6/2000 | Hung | 348/223.1 |
| 6,184,925 B1 | * | 2/2001 | Abe et al. | 348/223.1 |
| 6,331,899 B1 | * | 12/2001 | Samadani | 358/1.9 |
| 6,459,449 B1 | * | 10/2002 | Juen | 348/223.1 |

OTHER PUBLICATIONS

Imai, F.H., Berns, R.S., Spectral Estimation Using Trichromatic Digital Cameras, Munsell Color Science Laboratory, Rocheste Institute of Technology.*

Imai, F.H., Berns, R.S., Digital Camera filter design for colormetric and spectral accuracy,Munsell Color Science Laboratory, Rochester Institute of Technology.*

(Continued)

*Primary Examiner*—Vivek Srivastava
*Assistant Examiner*—Justin Misleh
(74) *Attorney, Agent, or Firm*—Nixon Peabody LLP

(57) ABSTRACT

A method and system for analyzing a color rendering capability of at least one color imaging device with multiple color channels obtaining includes obtaining spectral sensitivity curves for two or more of the multiple color channels in the color imaging device and determining an image quality value for the color imaging device from the spectral sensitivity curves for the two or more of the multiple color channels in the color imaging device.

20 Claims, 7 Drawing Sheets

OTHER PUBLICATIONS

Imai, F.H., Berns, R.S., Analysis Multispectral Image Capture, Munsell Color Science Lab, Center for Imaging Science, Rochester Institute of Technology.*

Imai, F.H., Berns, R.S., Multi-spectral-based color reproduction research at the Munsell Color Science Lab.*

Neugebauer, H. E. J. "Quality Factor for Filters Whose Spectral Transmittances are Different from Color Mixture Curves, and Its Application to Color Photography", Oct. 1956, Journal of the Optical Society of America, vol. 46, No. 10, pp. 822-824.*

Quan et al. "Optimization of Camera Spectral Sensitivities", 2000, IS&T/SID Eighth Color Imaging Conference, pp. 273-278.*

Vora et al. "Measure of Goodness of a Set of Color-scanning Filters", Jul. 1993, Journal of the Optical Society of America, vol. 10, No. 7, pp. 1499-1508.*

Herzog et al., "Characteristics of Novel Three and Six Channel Color Moire Free Sensors," *SPIE*, vol. 3648, pp. 48-59 (1999).

Sharma et al., "Figures of Merit for Color Scanners," *IEEE Transactions On Image Processing*, vol. 6, No. 7, pp. 990-1001 (1997).

Green et al., "Colour Error Reduction in Video Systems," *IEEE Transactions on Broadcasting*, vol. 36, No. 1, pp. 99-107 (1990).

* cited by examiner

SYSTEM AND METHOD FOR ANALYZING, OPTIMIZING AND/OR DESIGNING SPECTRAL SENSITIVITY CURVES FOR AN IMAGING DEVICE

This application claims the benefit of U.S. Provisional Patent Application Ser. No. 60/191,800 filed on Mar. 24, 2000 which is herein incorporated by reference.

FIELD OF THE INVENTION

The invention relates generally to imaging and, more particularly, to a method and system for evaluating, optimizing and/or designing one or more spectral sensitivity curves for an imaging device.

BACKGROUND OF THE INVENTION

The practice of capturing color images with digital imaging devices or systems, such as a digital camera or color scanner, is widely spreading. Currently, these digital devices comprise a charge-coupled device or complementary metaloxide-semiconductor (CCD/CMOS) sensor array with a set of filters before it. Ideally, these digital imaging devices capture color images in a substantially accurate and aesthetically pleasing manner.

There are many criteria which are utilized in the design and production of color imaging devices. An important consideration is the ability of the device to deliver color signals which can be used to create high quality color reproductions. To quantify the color quality capability of such devices, it is important to determine how the device's response to color stimuli corresponds to that of a human. Through psychophysical experiments, the Commission Internationale de l'Eclairage (CIE) has generated a standard set of color matching functions for the standard observer, representing the average human visual response to color. As the human eye has three types of cones, each with a different spectral sensitivity signature, there are three standard function specified by the CIE. Accordingly, most color imaging devices are set up with three channels and the spectral sensitivities in these imaging devices are initially designed to attempt to mimic the human visual system.

The spectral sensitivity functions for color imaging device channels should satisfy the Luther condition, that is the channel spectral sensitivities need not be exact duplicates of the CIE color-matching functions described above, but need to be a nonsingular transformation of them. In practice, it is not always possible to manufacture filters for imaging devices that satisfy the Luther condition, often due to the physical limitations of fabricating process. Measurement noise also plays an important role and will degrade the color accuracy even when spectral sensitivity curves fulfill the Luther condition.

Accordingly, a measure of goodness or quality factor for evaluating, optimizing, and/or designing spectral sensitivity curves for color imaging devices is desirable. Unfortunately, developing methods and/or systems for obtaining a measure of goodness or a quality factor has been challenging.

One quality factor, known as the Q-factor, for evaluating and designing spectral sensitivity functions is disclosed in H. E. J. Neugebauer, "Quality factor for filters whose spectral transmittances are different from color mixture curves, and its application to color photography," J. Opt. Soc. Am. Vol. 46, No. 10, pg. 821–824 (1956), which is herein incorporated by reference. A major disadvantage of the Q-factor is that it is designed to evaluate only single spectral sensitivities. Thus, it is easily possible to design an imaging device where all channels associate with high Q-factors, and still the system delivers color signals which cannot be used in creating high quality color reproductions. The trivial example of such a system is a three-channel device where all three channels are made with small deviations from the same spectral sensitivity signature. Although all three show high Q-factor, the result is a nearly monochrome image.

Another quality factor, known as the µ-factor, for evaluating and designing spectral sensitivity functions is disclosed in P. L. Vora and H. J. Trussell, "Measure of goodness of a set of color-scanning filters", J. Opt. Soc. Am. A, Vol. 10, No. 7, pg. 1499–1503 (1993), which is herein incorporated by reference. The µ-factor is a quality factor which evaluates an arbitrary number of device channel sensitivity functions as an ensemble. More specifically, the µ-factor describes the difference between the orthonormal subspaces of the CIE color matching functions and the spectral sensitivity space. Generally, a µ-factor approximately equal to one is an indication of an imaging device expected to deliver high quality color reproduction. Unfortunately, some color imaging devices with a poor µ-factor can still generate a good image reproduction. Vora and Trussell have thus introduced a metric which does not have a straight forward correlation with expected image quality. Another problem with the µ-factor is that it does not penalize systems that by virtue of channel sensitivity choices tend to amplify system noise. Such noise is unavoidable in real systems and a system designer needs to carefully control it so as to avoid swamping the eventual color reproduction.

CIELAB color space is a non-linear transfromation of the CIE color matching functions used as an approximation to a perceptually uniform color space. A figure of merit for color scanners, based on locally-linearized CIELAB space, having an incorporated model for measurement of noise is present in G. Sharma et al. "Figure of merit for color scanners," IEEE Trans. Image Processing, Vol. 6, No. 7, pg. 990–1001 (1997) which is herein incorporated by reference. The new figure has a high degree of perceptual relevance and also accounts for noise performance of sets of channel sensitivities. The noise aspect of Sharma's metric is, however completely independent of the input stimulus and thus is limited in its usefulness.

SUMMARY OF THE INVENTION

A method for determining a color rendering capability of at least one color imaging device with multiple color channels in accordance with one embodiment of the present invention includes a few steps. Spectral sensitivity curves for two or more of the multiple color channels in the color imaging device are obtained. An image quality value for the color imaging device is determined from the spectral sensitivity curves for the two or more of the multiple color channels in the color imaging device. The color rendering capability of the color imaging device can be evaluated based on the determined image quality value.

A method for designing a spectral sensitivity curve for one or more color channels of a color imaging device in accordance with another embodiment of the present invention includes selecting an image quality value and then determining a spectral sensitivity curve for at least one of the color channels of the color imaging device so that the spectral sensitivity curves for each of the color channels in the color imaging device results in the image quality value.

A method for determining the tolerances for one or more color channels in a color imaging device in accordance with another embodiment of the present invention includes a few steps. A spectral sensitivity curve for at least one of the multiple color channels in the color imaging device and an image quality value are obtained. Next, a first pair of upper and lower peak wavelength tolerances from the obtained spectral sensitivity for the at least one of the multiple color channels and the obtained image quality value. Additionally, a second pair of upper and lower tolerances on the width from the obtained spectral sensitivity curve for at least one of the multiple color channels and the obtained image quality value are determined.

An imaging device analyzing system in accordance with another embodiment of the present invention includes a source for spectral sensitivity curves for two or more of the multiple color channels in a color imaging device, an image quality processing system, and an evaluation system. The image quality processing system determines an image quality value for the color imaging device from the spectral sensitivity curves for the two or more of the multiple color channels in the color imaging device.

An imaging device designing system in accordance with another embodiment of the present invention includes a selection system and a design processing system. The selection system obtains an image quality value. The design processing system determines a spectral sensitivity curve for at least one of the color channels of the color imaging device so that the spectral sensitivity curves for each of the color channels in the color imaging device results in the image quality value.

A system for determining the tolerances for one or more color channels in a color imaging device in accordance with another embodiment of the present invention includes a source and a design processing system. The source provides a spectral sensitivity curve for at least one of the multiple color channels in the color imaging device. The design processing system determines a first pair of upper and lower tolerances for the obtained spectral sensitivity for the at least one of the multiple color channels and determines a second pair of upper and lower tolerances on the full width half maximum for the obtained spectral sensitivity curve for at least one of the multiple color channels.

With the present invention, an objective evaluation of the quality of color images captured by the evaluated imaging device is now provided using an analysis of the spectral sensitivity curves of channels in the imaging device. The resulting evaluation also provides information on how much room for improvement there is for the evaluated imaging device. The image quality of different imaging devices can now be compared.

Additionally, with the present invention spectral sensitivity curves for an imaging device can be designed or optimized. As a result, an imaging device with a desired level of image quality can be produced. Additionally, with the present invention determinations of image quality versus the cost of obtaining that level of image quality can be made.

Further, with the present invention tolerances for spectral sensitivity curves for an imaging device can be determined. These determined tolerances provide an evaluation of the tolerance range of the imaging device. Additionally, these determined tolerances can be used to select other sets of spectral sensitivity curves that might also be used with the same resulting image quality.

DETAILED DESCRIPTION

A system 10 and method for evaluating, optimizing and/or designing one or more spectral sensitivity curves for an imaging device in accordance with one embodiment of the present invention is illustrated in FIGS. 1, 3A, 3B, 4A, 4B, and 5. The method in accordance with one embodiment includes determining an image quality value for the color imaging device from spectral sensitivity curves for two or more of the multiple color channels in the color imaging device and then evaluating the color rendering capability of the color imaging device based on the determined image quality value. Among other features, the present invention can provide an objective evaluation of an imaging device, one or more spectral sensitivity curve or curves for an optimized set of spectral sensitivity curves for an imaging device.

Figure 1:
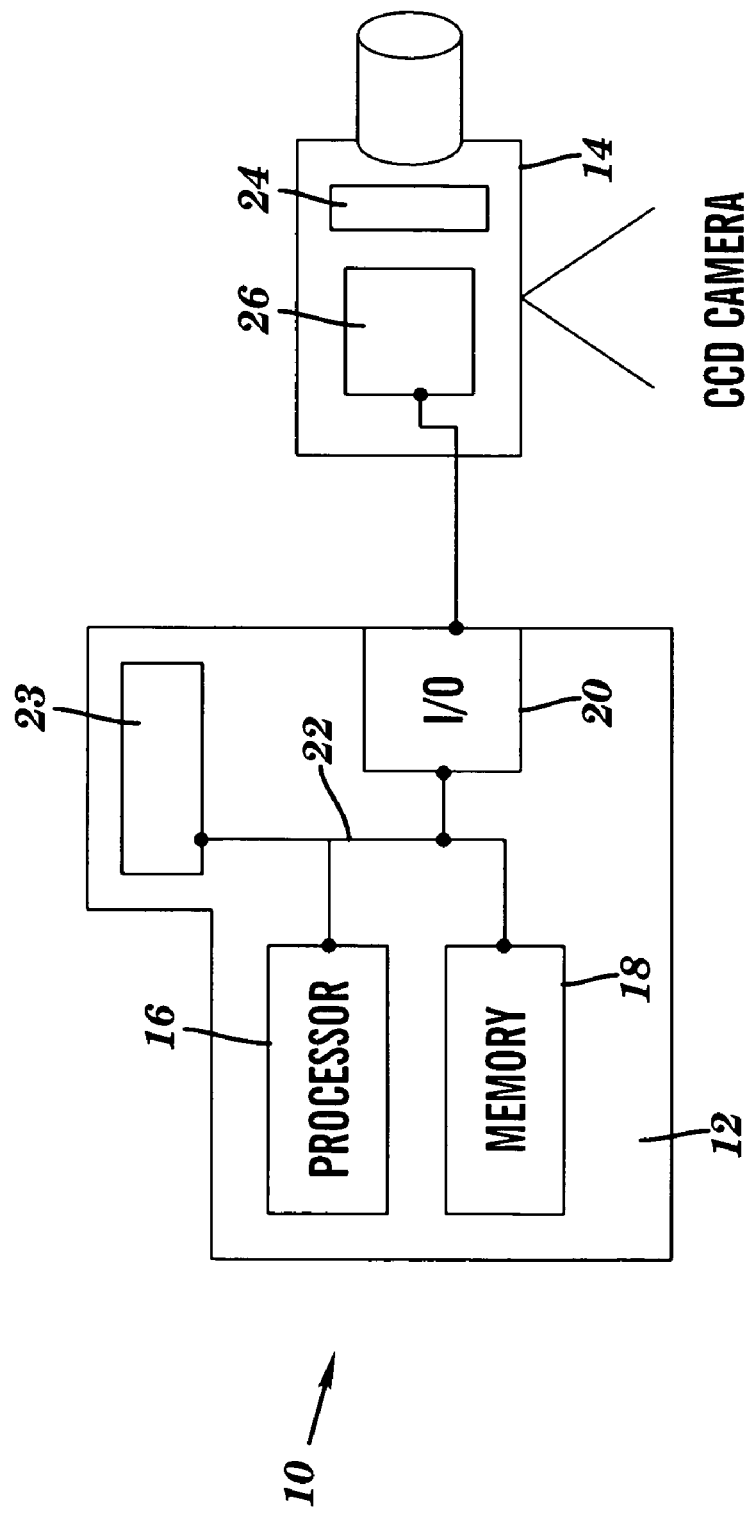
FIG. 1 is a block diagram of a system for evaluating, optimizing and/or designing one or more spectral sensitivity curves for an imaging device in accordance with one embodiment of the present invention.

Referring to FIG. 1, in this particular embodiment the system 10 includes a spectral sensitivity ("SS") processing system 12 and an optional CCD camera 14, although system 10 may have other components, other numbers of the components, and other combinations of the components. The SS processing system 12 is operatively coupled to the camera 14. A variety of communication systems and/or methods can be used to operatively couple and communicate between the SS processing system 12 and the camera 14, including a direct connection, a local area network, a wide area network, the world wide web, modems and phone lines, or wireless communication technology each having com munications protocols. Although one of configuration for the system 10 is shown, other configurations are possible and envisioned.

SS processing system 12 includes at least one processor 16, at least one memory 18, at least one input/output interface 20, and a user input device 23 which are coupled together by a bus system 22 or other link, although the SS processing system 12 may comprise other components, other numbers of the components, and other combinations of the components. The processor 16 executes a program of stored instructions for at least a portion of the method for evaluating, optimizing and/or designing one or more spectral sensitivity curves for an imaging device in accordance with one embodiment of the present invention as described herein and set forth in FIGS. 3–5. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor 16, can be used to store the programmed instructions described herein as well as other information. Although in his particular embodiment, the method in accordance with one embodiment of the invention is stored as programmed instructions in the SS processing system 12 for executing by the processor 16, some or all of the programmed instructions could be stored and executed elsewhere. The input/output interface 20 is used to operatively couple and communicate between the SS processing system 12 and the camera 14. The user input device 23 enables an operator to generate and transmit signals or commands to the processor 16, such as an image quality value, a set of tolerances for spectral sensitivity curves, or one or more selected spectral sensitivity curves for analysis. A variety of different types of user input devices can be used, such as a keyboard or computer mouse.

Figure 2:
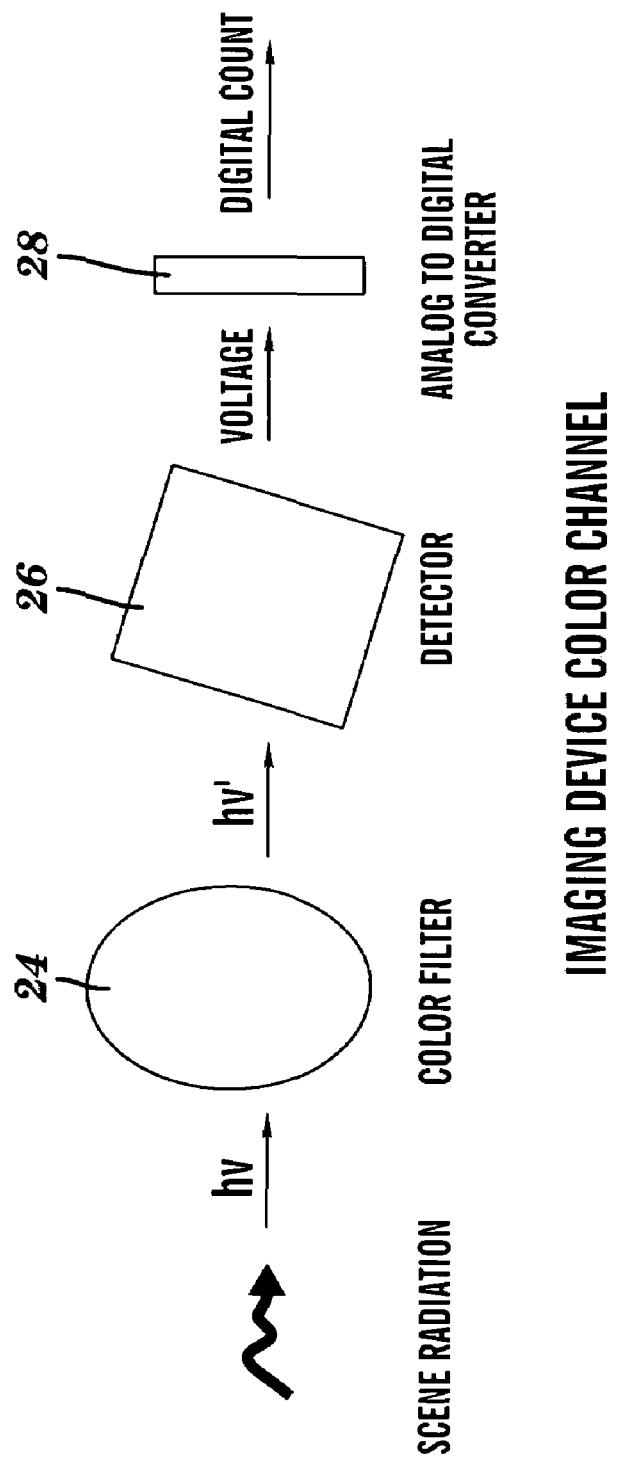
FIG. 2 is a block diagram of a color channel in an imaging device.

Referring to FIG. 2, a block diagram of a color channel in an imaging device, such as camera 14, is illustrated. In this particular embodiment, the color channel in the imaging device includes a filter 24, a detector 26, and an analog-to-digital converter 28, although the color channel in the imaging device can comprise other components and other combinations of components. Each component of an imaging device color channel has a certain response to its expected input. The color filter 24 has a spectral transmission wherein photons at different wavelengths from scene radiation hv have different probabilities of being passed through to the detector 26. Such transmission properties can be precisely determined. Likewise, the detector 26 has a spectral sensitivity wherein for any photon from scene radiation hv' which passes through filter 24 is incident upon the detector 26. Based upon its wavelength, there is a precisely determinable probability that that photon will cause a change in voltage response in the detector 26. The measured voltage in detector 26 is passed to analog-to-digital converter 28 which converts the analog voltage to a digital value. The spectral sensitivity of the imaging device 14 color channel is derived from the series combination of the filter transmission and the detector spectral sensitivity.

Figure 3A:
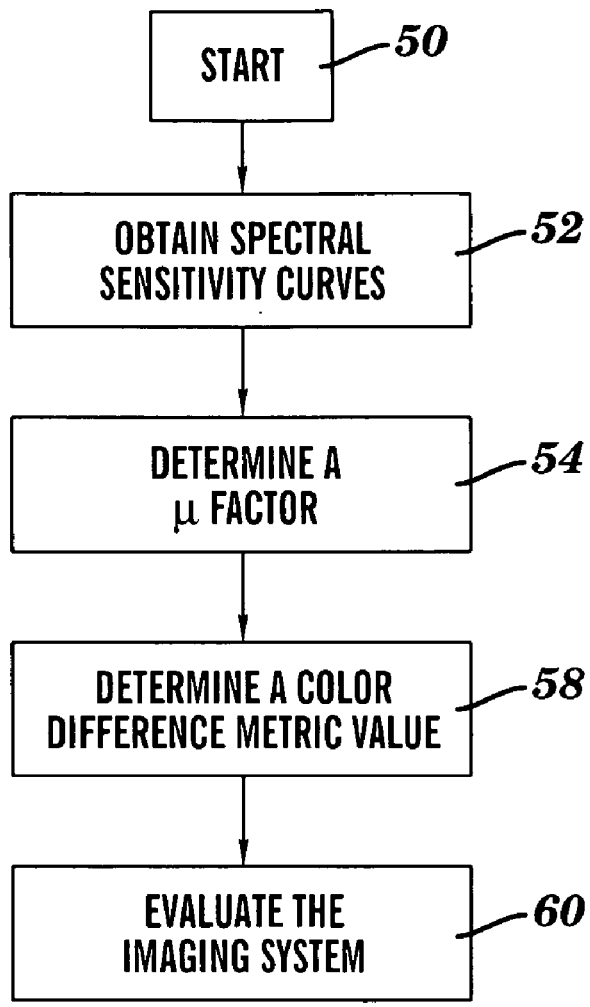
FIG. 3A is a flow chart of a method for determining a color rendering capability of at least one color imaging device with multiple color channels in accordance with one embodiment of the present invention.

Referring to FIG. 3A, a flow chart for analyzing a color rendering capability of at least one color imaging device with multiple color channels in accordance with one embodiment of the present invention is illustrated. In step 50, this method starts.

Next, in step 52 spectral sensitivity curves or functions for two or more of the multiple color channels in the color imaging device are obtained. Spectral sensitivity of a color imaging device or system is defined as the product of the spectral sensitivity of the imaging detector and the transmittance of the filter. A useful simplified model assumes the spectral sensitivity to be a smooth single-peaked curve in visible range with nonnegative values, although real channel spectral sensitivities may be more complex. In this particular embodiment, the spectral sensitivity curves are retrieved from memory 18 from a prior measurement of an imaging device, although the spectral sensitivity curves can be obtained in a variety of other manners, such as, from another memory storage device, by generating the spectral sensitivity curves hypothetically or by operator input via user input device 23.

By way of example only, the spectral sensitivity curves can be generated hypothetically by SS processing system 12. More specifically, the spectral sensitivities for the simplified model can be simulated by a combination of smooth cubic spline functions. The cubic spline function for instance with peak position at $\lambda=\lambda_0$ is written as:

$$C(\lambda) = \begin{cases} \dfrac{w^3 + 3w^2(w-|\lambda-\lambda_0|) + 3w(w-|\lambda-\lambda_0|)^2 - 3(w-|\lambda-\lambda_0|)^3}{6w^3} & |\lambda-\lambda_0| \leq w \\ \dfrac{(2w-|\lambda-\lambda_0|)^3}{6w^3} & w \leq |\lambda-\lambda_0| \leq 2w \\ 0 & |\lambda-\lambda_0| \geq 2w \end{cases}$$

where 2w is the width of the cubic spline function at one-fourth peak height (the corresponding width at half peak height is approximately $\sqrt{2}w$).

If we wish to describe a more complicated potential spectral sensitivity curve, one which may be non-symmetrical about its peak wavelength, then we can consider $w_1$ and $w_2$ which represent the left half and right half widths, respectively. Now our cubic spline function becomes $$C(\lambda) = \begin{cases} \dfrac{w^3 + 3w^2(w - |\lambda - P_\lambda|) + 3w(w - |\lambda - P_\lambda|)^2 - 3(w - |\lambda - P_\lambda|)^3}{6w^3} & 0 \leq \lambda - P_\lambda \leq w_2 \\ \dfrac{w^3 + 3w^2(w - |\lambda - P_\lambda|) + 3w(w - |\lambda - P_\lambda|)^2 - 3(w - |\lambda - P_\lambda|)^3}{6w^3} & -w_1 \leq \lambda - P_\lambda \leq 0 \\ \dfrac{(2w - |\lambda - P_\lambda|)^3}{6w^3} & w_2 \leq \lambda - P_\lambda \leq 2w_2 \\ \dfrac{(2w - |\lambda - P_\lambda|)^3}{6w^3} & -2w_1 \leq \lambda - P_\lambda \leq -w_1 \\ 0 & \text{otherwise} \end{cases}$$

For convenience we introduce w which is related to $w_1$ and $w_2$ in the following ways:

$$w_2 - w_1 = 2\Delta w \text{ so}$$

$$w_1 = w - \Delta w, w_2 = w + \Delta w.$$

and $$\Delta w = \frac{w_2 - w_1}{2}$$

Next, in step 54 the obtained spectral sensitivity curves from step 52 are used by the SS processing system 12 to determine a μ-factor. In this particular embodiment, the μ-factor is calculated by summing the q-factors of the orthonormalized vectors of the obtained spectral sensitivity curves and dividing the summation by three, although other manners for determining a μ-factor can be used. Since the process of determining a μ-factor and q-factors are known, they will not be described in detail here.

Next, in step 58 a color difference metric value, in this case a delta E ("ΔE") value, for the color imaging device is determined in SS processing system 12 from the μ-factor, although other combinations of the μ-factor and/or other quality factors could also be used to determine the color difference metric value. In this particular embodiment, a relationship between μ-factor and ΔE stored in memory 18 is used by processor 16 to determine the color difference metric value. One example of such a derived relationship between μ-factor and ΔE is set forth below:

| derived relationship between μ-factor and ΔE ||| 
| μ-factor | Min Expected ΔE | Max Expected ΔE |
| --- | --- | --- |
| 0.9 | 2.2 | 4.8 |
| 0.91 | 2.0 | 4.7 |

-continued

| derived relationship between μ-factor and ΔE ||| 
| μ-factor | Min Expected ΔE | Max Expected ΔE |
| --- | --- | --- |
| 0.92 | 1.9 | 4.4 |
| 0.93 | 1.8 | 4.0 |
| 0.94 | 1.8 | 3.8 |
| 0.95 | 1.6 | 3.5 |
| 0.96 | 1.5 | 3.2 |
| 0.97 | 1.3 | 3 |
| 0.98 | 1.2 | 2.5 |
| 0.99 | 1.1 | 2 |

Based on this relationship, the color difference metric value in this particular embodiment is obtained by averaging the minimum and maximum expected ΔE value expected for the determined μ-factor. For example, a μ-factor of 0.98 would result in color difference metric value of 1.85.

Next, in step 60 the color rendering capability of the color imaging device is evaluated based on the determined image quality value. In this particular embodiment, image quality value is compared against a standard to provide an evaluation, e.g. a standard might state that an image quality value of zero is ideal, an image quality value of 0 to 2.0 is acceptable, and an image quality value above 2.0 is unacceptable, although other types of evaluations could be used. By way of example only, the image quality values of two different imaging devices could also be compared against each other to identify the imaging device which would produce color images with better quality.

Although in this particular embodiment a color difference metric value is determined, other types of image quality values could also be determined, such as a color quality and noise sensitivity metric value. An image quality value is a number which correlates how well an image fits associated quality criteria from the view point of a typical human observer. A color quality metric value is an image quality value based on the criteria of how well the channel sensitivities of a device correlate with the human visual system. A color difference metric value is an image quality value which correlates with the magnitude of change in color a typical human observer would detect between two images.

A color quality and noise sensitivity metric value an image quality value based on color criteria and an image quality value based on quantifying how the amplification of noise in a system affects perceived quality to a human observer.

Figure 3B:
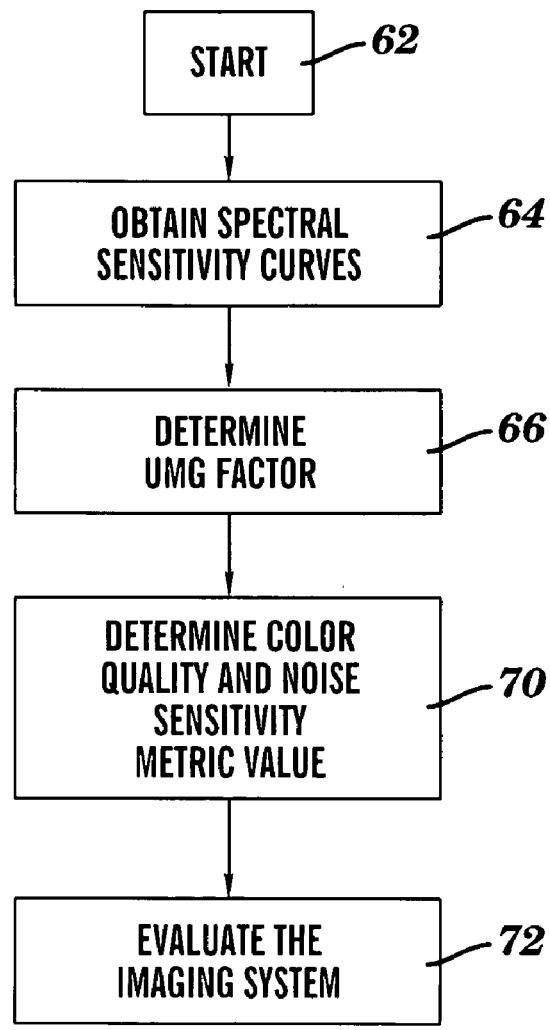
FIG. 3B is a flow chart of a method for determining a color rendering capability of at least one color imaging device with multiple color channels in accordance with another embodiment of the present invention.

Referring to FIG. 3B, a flow chart for evaluating a color rendering capability of at least one color imaging device with multiple color channels in accordance with one embodiment of the present invention is illustrated. In step 62, this method starts.

Next, in step 64 spectral sensitivity curves or functions for two or more of the multiple color channels in the color imaging device are obtained. Since the process in step 64 is identical to that described earlier in step 52, it will not described again here.

Next, in step 66 the obtained spectral sensitivity curves from step 52 are used by the SS processing system 12 to determine a Universal Measure of Goodness (UMG) factor. UMG takes into account the total noise of the system, both shot noise which is signal dependent and dark noise which is signal independent, and an expected average color difference. Total noise is measured through the sum of the shot noise covariance and the dark current noise covariance, while the expectation of the noise is still zero. For a standard set of object spectra, $\tau$ is the information content which would be delivered by the system described by the spectral sensitivity curves. Thus, $\tau$ is a function of the total noise and the average $\Delta E$. For the same standard set of object spectra, $\alpha$ is the information content which a perfectly noise-free colorimetric system would deliver. UMG is the ratio of $\tau$ to $\alpha$.

Next, in step 70 a color quality and noise sensitivity metric value for the color imaging device is determined in SS processing system 12 from the UMG factor, although other combinations of the UMG factor and/or other quality factors could also be used to determine the color quality and noise sensitivity metric value. In this particular embodiment, a relationship between the UMG factor and E stored in memory 18 is used by processor 16 to determine the color difference metric value. Since the process in this step is the same as described earlier in step 58 except a color quality and noise sensitivity metric value is being determined here instead of a color difference metric value and a UMG factor is used here instead of a $\mu$-factor, the process will not described again here.

One of the advantages of this method is the use of a noise sensitivity metric because it involves a consideration of image-dependent noise. Image dependent noise is noise dependent on the input signal level, rather than independent, white noise as described in greater detail in Gerald C. Holst, "CCD Arrays Cameras and Displays", SPIE Optical Engineering Press 1998 which is herein incorporated by reference. By incorporating this practical noise model into the image quality metric value, this embodiment of the present invention generates an image quality metric value which is more coincident with what occurs in the real world.

Next, in step 72 the color rendering capability of the color imaging device is evaluated based on the determined color quality and noise sensitivity metric value. Since the process in step 68 is identical to that described earlier in step 56, except that the evaluation is based using a color quality and noise sensitivity metric value instead of a color difference metric value, it will not described again here.

Figure 4A:
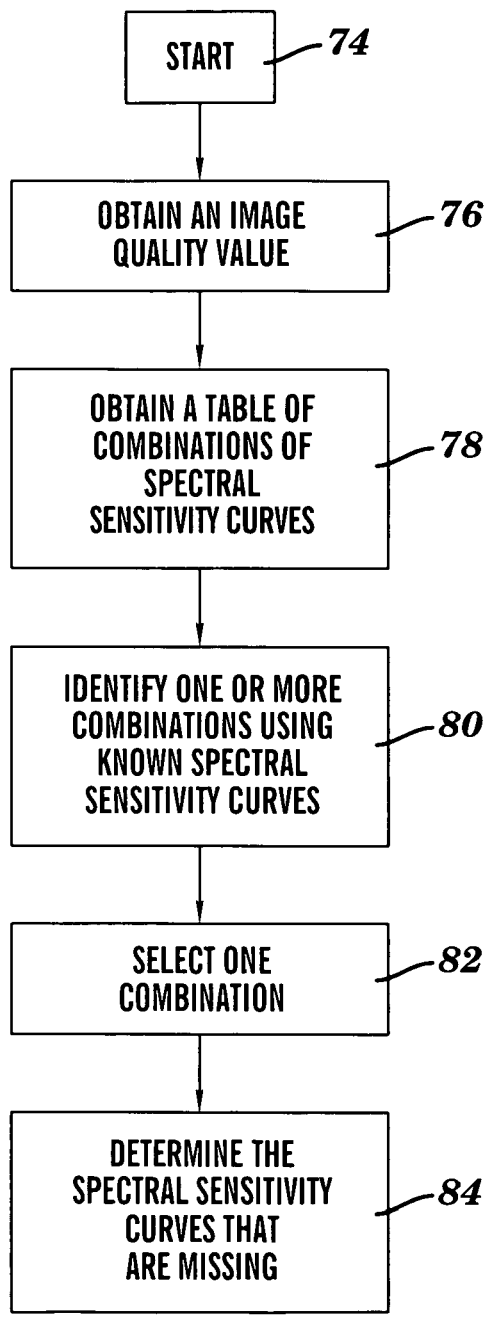
FIG. 4A is a flow chart of a method for designing a spectral sensitivity curve for one or more color channels of a color imaging device in accordance with another embodiment of the present invention.

Referring to FIG. 4A is a flow chart of a method for designing a spectral sensitivity curve for one or more color channels of a color imaging device in accordance with another embodiment of the present invention is illustrated. In step 74, this method starts. Next, in step 76, an image quality value is obtained. way of example only, user input device 23 can be used to select or input the image quality value or the value could be retrieved from a memory device. Again, depending upon the embodiment, a variety of different types of image quality metric values could be used, such as a color difference metric value or a color quality and noise sensitivity metric value.

Next, in step 78 the SS processing system 12 uses the obtained image quality value to obtain or retrieve one or more tables, sets, or enumerations of combinations of spectral sensitivity curves from memory 18. The one or more tables sets, or enumerations of combinations of spectral sensitivity curves can be obtained in a variety of different manners, such as based on the image quality value itself or on a portion of the image quality value, such as a $\mu$-factor on which the image quality value is at least partially based or on other factors. Two illustrative examples of such tables set forth below. In this particular embodiment, the tables are stored in memory 18, although the tables could be stored elsewhere. The tables are accessed by processor 16 to determine the spectral sensitivity curve(s) which are unknown needed or desired for the particular application.

Next, in step 80 the known spectral sensitivity curves are used to identify a combination or combinations of spectral sensitivity curves in the obtained table that could be used for the particular application.

Next, in step 82 one of the identified combinations of spectral sensitivity curves is selected. A variety of factors could be used by SS processing system 12 to determine how this selection is made, such as which combination of spectral sensitivity curves would have the best color rendering capability or by an operator making a selection using user input device 23.

Next, in step 84 the missing and desired spectral sensitivity curve or curves are determined from the selected combination. The selected combination will contain the needed information and/or data on the missing and desired spectral sensitivity curve or curves.

By way of example only, one example of this method is set forth below. If, for example, one chooses to design a third channel for a three-channel system where an image quality value is selected that is based at least partly on a $\mu$-factor with a desired value of 0.98, then Table I would be selected. Next, if for this example, the spectral sensitivities of the first two channels in a three-channel system are already given where channel 1 has a peak sensitivity at 600 nm, a full width half maximum of 100 nm ($w_r$=50, described above) and a skewness of 5 nm ($w_r$=5, described above) and channel 2 has a peak sensitivity at 540 nm, a full width half maximum of 140 nm ($w_G$=70) and a skewness of 5 nm ($w_G=5$), then consulting the table, one possible solution would be found on the following line:

| Sensitivity | | | | | | Green | Center Peaks in | | | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 70 | 40 | 5 | 5 | 5 | 540 | 597 | 448 | 3 | 2 |

As shown here for the aformentioned channels 1 and 2, there is a satisfactory third channel with peak wavelength sensitivity of 448 nm, a full width half maximum of 80 nm and a skewness of 5 nm which would be determined to be the spectral sensitivity curve for this example. Although in this particular embodiment, the spectral sensitivity curve(s) is determined using tables, the selected image quality value, and the known spectral sensitivity curves, other methods for determining the spectral sensitivity curve may also be used.

Figure 4B:
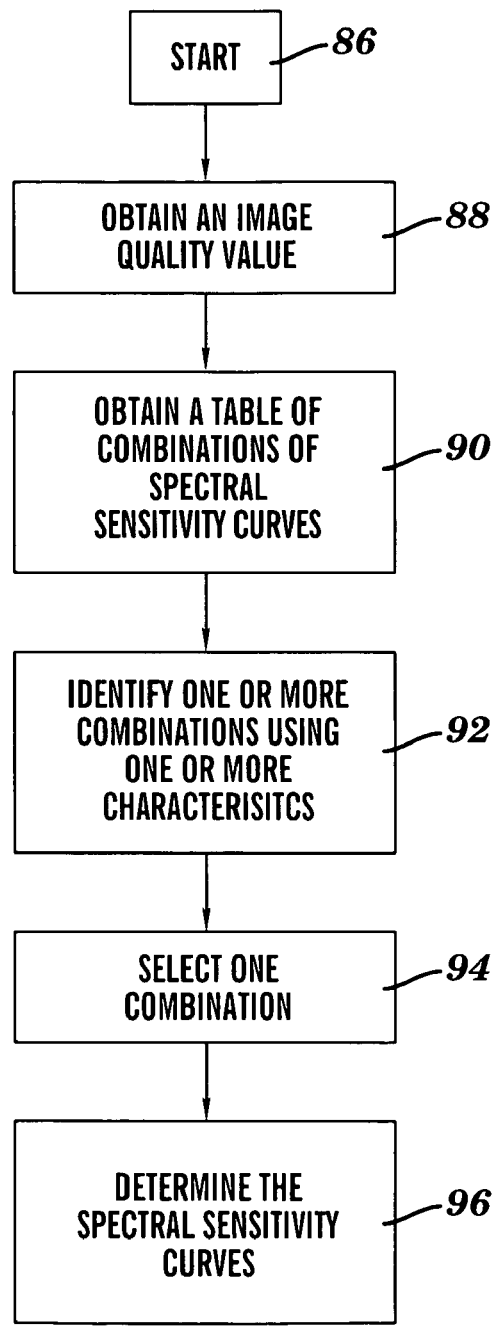
FIG. 4B is a flow chart of a method for designing a spectral sensitivity curve for one or more color channels of a color imaging device in accordance with yet another embodiment of the present invention.

Referring to FIG. 4B is a flow chart of a method for designing a spectral sensitivity curve for one or more color channels of a color imaging device in accordance with another embodiment of the present invention is illustrated. In step 86, this method starts. Next, in step 88, an image quality value is obtained. Since the process in step 88 is identical to that described earlier in step 76, it will not described again here.

Next, in step 90 the SS processing system 12 uses the obtained image quality value to obtain or retrieve one or more tables, sets, or enumerations of combinations of spectral sensitivity curves from memory 18. Since the process in step 90 is identical to that described earlier in step 78, it will not described again here.

One example of this particular embodiment is discussed below. If, for example, one chooses to design three channels for a three-channel system where the image quality metric value is based on a μ-factor with a desired value of 0.98, then Table I would be selected in this example. For that table, every channel sensitivity combination described in that table is associated with a μ-factor of 0.98. One could search for a characteristic such as a green curve which is easily manufactured. For example, say a channel with a peak sensitivity at 540 nm, a full width half maximum of 140 nm ($W_G=70$) and a skewness of 5 nm ($W_G=5$) is easily made. Surveying Table I shows a possible second curve could have a peak sensitivity at 604 nm, a full width half maximum of 100 nm ($w_R=50$) and a skewness of −5 nm ($w_R=-5$). If the second curve with its negative skewness is considered difficult to manufacturer, the table can be further consulted by SS processing system 12 until a combination which meets all manufacturing criteria is met. For example, the following combination, also found in Table I, may be considered a good manufacturing candidate: the same first curve along with a second curve with peak sensitivity at 597 nm, a full width half maximum of 100 nm ($w_R=50$) and a skewness of 5 nm ($w_R=5$) and a third channel sensitivity with peak sensitivity at 448 nm, a full width half maximum of 80 nm ($w_B=40$) and a skewness of 5 nm ($w_B=5$)

| Sensitivity | | | | | | Green | Center Peaks in | | | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 70 | 30 | −5 | 5 | 0 | 540 | 604 | 450 | 2 | 1 |
| 50 | 70 | 40 | 5 | 5 | 5 | 540 | 597 | 448 | 3 | 2 |

Next, in step 92 one or more characteristics are used by SS processing system 12 to identify a combination or combinations of spectral sensitivity curves in the obtained table that could be used for the particular application. A variety of different characteristics, numbers of characteristics (one or more than one, and a variety of different combinations can be used as needed or desired for the particular application. The characteristics can be obtained in a variety of different manners, such as from memory 18 or via operator input using user input device 23.

Next, in step 94 one of the identified combinations of spectral sensitivity curves is selected. A variety of factors could be used by SS processing system 12 to determine how this selection is made, such as which combination of spectral sensitivity curves would have the best color rendering capability or by an operator making a selection using user input device 23.

Next, in step 96 the desired spectral sensitivity curves are obtained from the selected combination. The selected combination will contain the needed information and/or data on these spectral sensitivity curves.

Accordingly, with this method once an image quality value is selected, then one or more spectral sensitivity curves can be determined.

In yet another embodiment, as discussed earlier the μ-factor for an image quality value can be used to select a set or table of spectral sensitivity curves. Next, to select a combination of spectral sensitivity curves an optimization approach can be used by SS processing system 12 to select one of the combinations of spectral sensitivity curves. For example, three or more spectral sensitivity curves could be optimized by maximizing the image quality metric within one or more constraints. By way of example only, these constraints can be:

(1) Non-negativity

The transmittance of spectral sensitivity at each wavelength is non-negative.

(2) Smoothness

The second derivative of the physical sensitivity can be used as a measure of curvature and therefore as a measure of smoothness of the sensitivity.

$|S(\lambda_{i-1})-2S(\lambda_i)+S(\lambda_{i+1})|=\Delta_i$; where $2 \leq i \leq 30$ $\Delta \leq \Delta_{max}$ (3) Boundedness In general, the transmittance at each wavelength cannot exceed one, or a constant that is less than one.

(4) Single Peak

The transmittance of the filter has one global maximum, and without local maximum.

Although four constraints are discussed above, a variety of different types of constraints and combinations of them can be used depending upon the particular application and its requirements.

Figure 5:
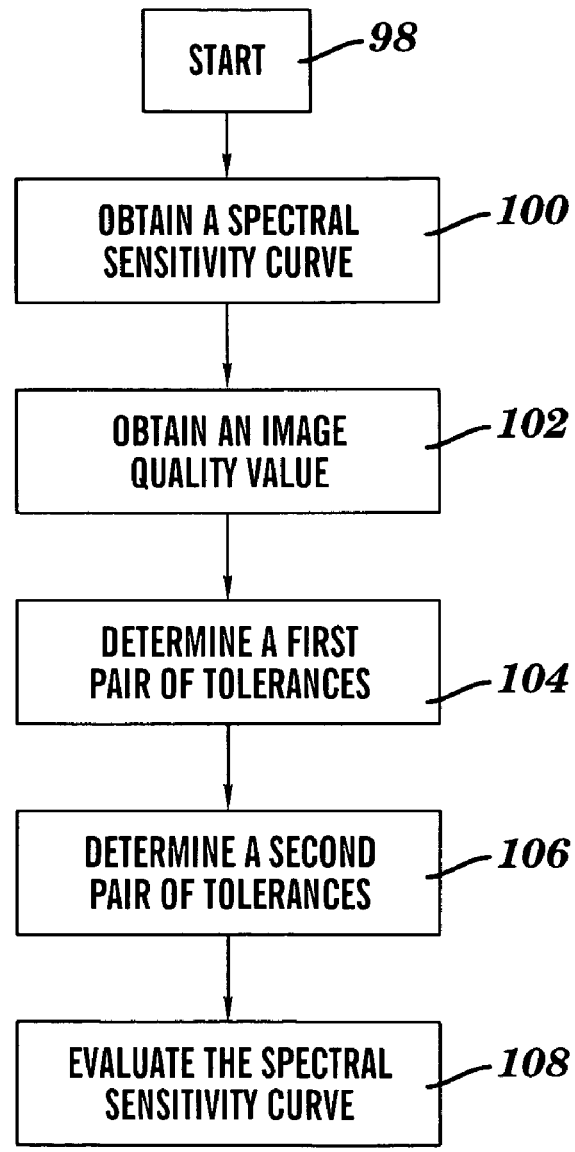
FIG. 5 is a flow chart of a method for determining the tolerances for one or more color channels in a color imaging device in accordance with another embodiment of the present invention.

In FIG. 5 a flow chart of a method for determining the tolerances for one or more color channels in a color imaging device in accordance with another embodiment of the present invention is illustrated. In step 98, this method starts. Next, in step 100 a spectral sensitivity curve for at least one of the multiple color channels in the color imaging device is obtained in a manner as described in greater detail earlier. Meanwhile in step 102 an image quality value is obtained. Since methods and systems for obtaining spectral sensitivity curve(s) and/or image quality values are discussed earlier, they will not be described here again.

Next, in step 104 a first pair of upper and lower tolerances on the peak wavelength is determined for the obtained spectral sensitivity curves for one of the multiple color channels. These tolerances may be obtained by processor 16 through reference to the tables stored in memory 18, such as the tables which are set forth below as examples. The table used is selected based on the obtained image quality value as described in greater detail earlier. The tables are useful in determining desirable channel spectral sensitivities for three-channel imaging devices. These tables provide manufacturing guidance on the choice of curves. The μ-factor used in deriving the tables is a color quality metric. The tables describe tolerances on the specification of the "red" and "blue" channels in a three-channel system. The tolerances are in terms of peak wavelength error which maintain the μ-factor at or above the desired level. The first table maintains a μ-factor of at least 0.98, the second maintains at least a μ-factor of 0.95.

Next, in step 106 a second pair of upper and lower tolerances on the full width half maximum is determined from the obtained spectral sensitivity curve for one of the multiple color channels. These tolerances may also be obtained through reference to the tables, such as the exemplary tables incorporated below in the same manner as described above in step 104.

Next, in step 108 the spectral sensitivity curve or curves are evaluated based on the determined first and second pair of tolerances. For example, the first and second pair of tolerances may provide an indication on the ease or difficulty in reproducing an imaging device with the same color rendering capability. If the tolerances are small, then it will be difficult to obtain imaging devices with the same color rendering capability.

EXAMPLES OF TWO TABLES

TABLE I

Peak wavelength tolerances based on single-peak symmetric or asymmetric channel sensitivities for three channel cameras with μ-factor of .98 or larger

| Sensitivity | | | | | | Green Center Peaks in | | | | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 50 | 30 | −5 | −5 | 0 | 540 | 604 | 450 | 2 | 1 |
| 50 | 50 | 30 | −5 | −5 | 5 | 540 | 604 | 446 | 2 | 2 |
| 50 | 50 | 30 | −5 | −5 | 5 | 550 | 602 | 446 | 1 | 1 |
| 50 | 50 | 30 | −5 | 0 | −5 | 540 | 604 | 454 | 1 | 1 |
| 50 | 50 | 30 | −5 | 0 | 0 | 540 | 604 | 450 | 2 | 2 |
| 50 | 50 | 30 | −5 | 0 | 5 | 540 | 603 | 446 | 2 | 2 |
| 50 | 50 | 30 | −5 | 5 | 0 | 540 | 603 | 450 | 2 | 1 |
| 50 | 50 | 30 | −5 | 5 | 5 | 540 | 603 | 446 | 2 | 2 |
| 50 | 50 | 30 | 0 | −5 | 0 | 540 | 601 | 450 | 2 | 1 |
| 50 | 50 | 30 | 0 | −5 | 5 | 540 | 600 | 446 | 2 | 2 |
| 50 | 50 | 30 | 0 | −5 | 5 | 550 | 598 | 446 | 2 | 1 |
| 50 | 50 | 30 | 0 | 0 | −5 | 540 | 600 | 454 | 2 | 1 |
| 50 | 50 | 30 | 0 | 0 | 0 | 540 | 600 | 450 | 2 | 2 |
| 50 | 50 | 30 | 0 | 0 | 5 | 540 | 600 | 446 | 2 | 2 |
| 50 | 50 | 30 | 0 | 5 | 0 | 540 | 599 | 450 | 2 | 1 |
| 50 | 50 | 30 | 0 | 5 | 5 | 540 | 600 | 446 | 2 | 2 |
| 50 | 50 | 30 | 5 | −5 | 0 | 540 | 598 | 450 | 1 | 1 |
| 50 | 50 | 30 | 5 | −5 | 5 | 540 | 597 | 446 | 2 | 1 |
| 50 | 50 | 30 | 5 | −5 | 5 | 550 | 595 | 446 | 1 | 1 |
| 50 | 50 | 30 | 5 | 0 | −5 | 540 | 597 | 454 | 1 | 1 |
| 50 | 50 | 30 | 5 | 0 | 0 | 540 | 597 | 450 | 2 | 2 |
| 50 | 50 | 30 | 5 | 0 | 5 | 540 | 597 | 446 | 2 | 2 |
| 50 | 50 | 30 | 5 | 5 | 0 | 540 | 597 | 450 | 2 | 1 |
| 50 | 50 | 30 | 5 | 5 | 5 | 540 | 596 | 446 | 2 | 2 |
| 50 | 50 | 40 | −5 | −5 | −5 | 540 | 604 | 454 | 3 | 2 |
| 50 | 50 | 40 | −5 | −5 | −5 | 550 | 601 | 454 | 2 | 2 |
| 50 | 50 | 40 | −5 | −5 | 0 | 540 | 603 | 451 | 3 | 2 |
| 50 | 50 | 40 | −5 | −5 | 0 | 550 | 601 | 451 | 3 | 2 |
| 50 | 50 | 40 | −5 | −5 | 5 | 540 | 604 | 447 | 3 | 2 |
| 50 | 50 | 40 | −5 | −5 | 5 | 550 | 601 | 448 | 3 | 2 |
| 50 | 50 | 40 | −5 | 0 | −5 | 540 | 603 | 454 | 3 | 2 |
| 50 | 50 | 40 | −5 | 0 | 0 | 540 | 604 | 451 | 3 | 2 |
| 50 | 50 | 40 | −5 | 0 | 0 | 550 | 600 | 451 | 2 | 1 |

TABLE I-continued

Peak wavelength tolerances based on single-peak symmetric or asymmetric channel sensitivities for three channel cameras with μ-factor of .98 or larger

| Sensitivity | | | | | | Green | Center Peaks in | | | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 50 | 40 | −5 | 0 | 5 | 540 | 603 | 447 | 3 | 2 |
| 50 | 50 | 40 | −5 | 0 | 5 | 550 | 600 | 448 | 2 | 2 |
| 50 | 50 | 40 | −5 | 5 | −5 | 530 | 604 | 454 | 2 | 1 |
| 50 | 50 | 40 | −5 | 5 | −5 | 540 | 603 | 454 | 3 | 2 |
| 50 | 50 | 40 | −5 | 5 | 0 | 530 | 604 | 451 | 2 | 2 |
| 50 | 50 | 40 | −5 | 5 | 0 | 540 | 603 | 451 | 3 | 2 |
| 50 | 50 | 40 | −5 | 5 | 5 | 530 | 605 | 447 | 2 | 2 |
| 50 | 50 | 40 | −5 | 5 | 5 | 540 | 602 | 447 | 3 | 2 |
| 50 | 50 | 40 | 0 | −5 | −5 | 540 | 600 | 454 | 3 | 2 |
| 50 | 50 | 40 | 0 | −5 | −5 | 550 | 598 | 454 | 3 | 2 |
| 50 | 50 | 40 | 0 | −5 | 0 | 540 | 601 | 451 | 3 | 2 |
| 50 | 50 | 40 | 0 | −5 | 0 | 550 | 597 | 450 | 3 | 2 |
| 50 | 50 | 40 | 0 | −5 | 5 | 540 | 600 | 447 | 3 | 2 |
| 50 | 50 | 40 | 0 | −5 | 5 | 550 | 598 | 448 | 3 | 2 |
| 50 | 50 | 40 | 0 | 0 | −5 | 540 | 600 | 454 | 3 | 2 |
| 50 | 50 | 40 | 0 | 0 | 0 | 540 | 600 | 451 | 3 | 2 |
| 50 | 50 | 40 | 0 | 0 | 0 | 550 | 597 | 451 | 2 | 1 |
| 50 | 50 | 40 | 0 | 0 | 5 | 540 | 600 | 447 | 3 | 2 |
| 50 | 50 | 40 | 0 | 0 | 5 | 550 | 597 | 448 | 2 | 2 |
| 50 | 50 | 40 | 0 | 5 | −5 | 530 | 601 | 454 | 2 | 1 |
| 50 | 50 | 40 | 0 | 5 | −5 | 540 | 599 | 454 | 3 | 2 |
| 50 | 50 | 40 | 0 | 5 | 0 | 530 | 602 | 451 | 2 | 2 |
| 50 | 50 | 40 | 0 | 5 | 0 | 540 | 600 | 451 | 3 | 2 |
| 50 | 50 | 40 | 0 | 5 | 5 | 530 | 601 | 447 | 2 | 2 |
| 50 | 50 | 40 | 0 | 5 | 5 | 540 | 600 | 447 | 3 | 2 |
| 50 | 50 | 40 | 5 | −5 | −5 | 540 | 598 | 454 | 2 | 2 |
| 50 | 50 | 40 | 5 | −5 | −5 | 550 | 595 | 454 | 2 | 2 |
| 50 | 50 | 40 | 5 | −5 | 0 | 540 | 597 | 451 | 3 | 2 |
| 50 | 50 | 40 | 5 | −5 | 0 | 550 | 595 | 451 | 3 | 2 |
| 50 | 50 | 40 | 5 | −5 | 5 | 540 | 597 | 447 | 3 | 2 |
| 50 | 50 | 40 | 5 | −5 | 5 | 550 | 594 | 448 | 3 | 2 |
| 50 | 50 | 40 | 5 | 0 | −5 | 540 | 597 | 454 | 3 | 2 |
| 50 | 50 | 40 | 5 | 0 | 0 | 540 | 597 | 451 | 3 | 2 |
| 50 | 50 | 40 | 5 | 0 | 0 | 550 | 593 | 451 | 2 | 1 |
| 50 | 50 | 40 | 5 | 0 | 5 | 540 | 597 | 447 | 3 | 2 |
| 50 | 50 | 40 | 5 | 0 | 5 | 550 | 594 | 448 | 2 | 2 |
| 50 | 50 | 40 | 5 | 5 | −5 | 530 | 598 | 454 | 1 | 1 |
| 50 | 50 | 40 | 5 | 5 | −5 | 540 | 596 | 454 | 3 | 2 |
| 50 | 50 | 40 | 5 | 5 | 0 | 530 | 598 | 451 | 2 | 2 |
| 50 | 50 | 40 | 5 | 5 | 0 | 540 | 596 | 451 | 3 | 2 |
| 50 | 50 | 40 | 5 | 5 | 5 | 530 | 598 | 447 | 2 | 2 |
| 50 | 50 | 40 | 5 | 5 | 5 | 540 | 596 | 447 | 3 | 2 |
| 50 | 50 | 40 | −5 | 0 | 5 | 540 | 604 | 448 | 1 | 1 |
| 50 | 50 | 50 | 0 | 0 | 5 | 540 | 600 | 449 | 1 | 1 |
| 50 | 60 | 30 | −5 | −5 | −5 | 550 | 601 | 454 | 2 | 2 |
| 50 | 60 | 30 | −5 | −5 | 0 | 540 | 603 | 450 | 2 | 1 |
| 50 | 60 | 30 | −5 | −5 | 0 | 550 | 601 | 450 | 2 | 2 |
| 50 | 60 | 30 | −5 | −5 | 5 | 540 | 604 | 446 | 2 | 2 |
| 50 | 60 | 30 | −5 | −5 | 5 | 550 | 601 | 446 | 3 | 2 |
| 50 | 60 | 30 | −5 | −5 | 5 | 560 | 597 | 446 | 1 | 1 |
| 50 | 60 | 30 | −5 | 0 | −5 | 540 | 603 | 454 | 2 | 1 |
| 50 | 60 | 30 | −5 | 0 | −5 | 550 | 601 | 454 | 2 | 1 |
| 50 | 60 | 30 | −5 | 0 | 0 | 540 | 603 | 450 | 2 | 2 |
| 50 | 60 | 30 | −5 | 0 | 0 | 550 | 601 | 450 | 2 | 2 |
| 50 | 60 | 30 | −5 | 0 | 5 | 540 | 603 | 446 | 2 | 2 |
| 50 | 60 | 30 | −5 | 0 | 5 | 550 | 600 | 446 | 3 | 2 |
| 50 | 60 | 30 | −5 | 5 | −5 | 540 | 603 | 454 | 2 | 2 |
| 50 | 60 | 30 | −5 | 5 | 0 | 540 | 603 | 450 | 2 | 2 |
| 50 | 60 | 30 | −5 | 5 | 0 | 550 | 601 | 450 | 2 | 1 |
| 50 | 60 | 30 | −5 | 5 | 5 | 540 | 602 | 446 | 2 | 2 |
| 50 | 60 | 30 | −5 | 5 | 5 | 550 | 600 | 446 | 2 | 2 |
| 50 | 60 | 30 | 0 | −5 | −5 | 550 | 598 | 454 | 2 | 2 |
| 50 | 60 | 30 | 0 | −5 | 0 | 540 | 601 | 450 | 2 | 1 |
| 50 | 60 | 30 | 0 | −5 | 0 | 550 | 598 | 450 | 3 | 2 |
| 50 | 60 | 30 | 0 | −5 | 0 | 560 | 594 | 450 | 1 | 1 |
| 50 | 60 | 30 | 0 | −5 | 5 | 540 | 600 | 446 | 2 | 2 |
| 50 | 60 | 30 | 0 | −5 | 5 | 550 | 598 | 446 | 3 | 2 |
| 50 | 60 | 30 | 0 | −5 | 5 | 560 | 594 | 446 | 1 | 1 |
| 50 | 60 | 30 | 0 | 0 | −5 | 540 | 600 | 454 | 2 | 1 |
| 50 | 60 | 30 | 0 | 0 | −5 | 550 | 597 | 454 | 2 | 2 |
| 50 | 60 | 30 | 0 | 0 | 0 | 540 | 600 | 450 | 2 | 2 |
| 50 | 60 | 30 | 0 | 0 | 0 | 550 | 597 | 450 | 2 | 2 |

TABLE I-continued

Peak wavelength tolerances based on single-peak symmetric or asymmetric channel sensitivities for three channel cameras with μ-factor of .98 or larger

| Sensitivity | | | | | | Green Center Peaks in | | | | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 60 | 30 | 0 | 0 | 5 | 540 | 600 | 446 | 2 | 2 |
| 50 | 60 | 30 | 0 | 0 | 5 | 550 | 598 | 446 | 2 | 2 |
| 50 | 60 | 30 | 0 | 5 | −5 | 540 | 600 | 454 | 2 | 2 |
| 50 | 60 | 30 | 0 | 5 | −5 | 550 | 597 | 454 | 1 | 0 |
| 50 | 60 | 30 | 0 | 5 | 0 | 540 | 600 | 450 | 2 | 2 |
| 50 | 60 | 30 | 0 | 5 | 0 | 550 | 597 | 450 | 2 | 2 |
| 50 | 60 | 30 | 0 | 5 | 5 | 540 | 600 | 446 | 3 | 2 |
| 50 | 60 | 30 | 0 | 5 | 5 | 550 | 597 | 446 | 2 | 2 |
| 50 | 60 | 30 | 5 | −5 | −5 | 550 | 595 | 454 | 2 | 2 |
| 50 | 60 | 30 | 5 | −5 | 0 | 540 | 597 | 450 | 2 | 1 |
| 50 | 60 | 30 | 5 | −5 | 0 | 550 | 595 | 450 | 2 | 2 |
| 50 | 60 | 30 | 5 | −5 | 0 | 560 | 591 | 450 | 2 | 1 |
| 50 | 60 | 30 | 5 | −5 | 5 | 540 | 597 | 446 | 2 | 2 |
| 50 | 60 | 30 | 5 | −5 | 5 | 550 | 595 | 446 | 3 | 2 |
| 50 | 60 | 30 | 5 | −5 | 5 | 560 | 591 | 446 | 2 | 1 |
| 50 | 60 | 30 | 5 | 0 | −5 | 540 | 597 | 454 | 2 | 1 |
| 50 | 60 | 30 | 5 | 0 | −5 | 550 | 595 | 454 | 2 | 1 |
| 50 | 60 | 30 | 5 | 0 | 0 | 540 | 597 | 450 | 2 | 2 |
| 50 | 60 | 30 | 5 | 0 | 0 | 550 | 595 | 450 | 2 | 2 |
| 50 | 60 | 30 | 5 | 0 | 5 | 540 | 597 | 446 | 2 | 2 |
| 50 | 60 | 30 | 5 | 0 | 5 | 550 | 594 | 446 | 3 | 2 |
| 50 | 60 | 30 | 5 | 5 | −5 | 540 | 597 | 454 | 2 | 2 |
| 50 | 60 | 30 | 5 | 5 | 0 | 540 | 597 | 450 | 2 | 2 |
| 50 | 60 | 30 | 5 | 5 | 0 | 550 | 594 | 450 | 2 | 1 |
| 50 | 60 | 30 | 5 | 5 | 5 | 540 | 596 | 446 | 2 | 2 |
| 50 | 60 | 30 | 5 | 5 | 5 | 550 | 594 | 446 | 2 | 2 |
| 50 | 60 | 40 | −5 | −5 | −5 | 540 | 604 | 454 | 3 | 2 |
| 50 | 60 | 40 | −5 | −5 | −5 | 550 | 602 | 454 | 3 | 2 |
| 50 | 60 | 40 | −5 | −5 | −5 | 560 | 597 | 454 | 2 | 2 |
| 50 | 60 | 40 | −5 | −5 | 0 | 540 | 603 | 451 | 3 | 2 |
| 50 | 60 | 40 | −5 | −5 | 0 | 550 | 601 | 451 | 3 | 3 |
| 50 | 60 | 40 | −5 | −5 | 0 | 560 | 598 | 451 | 3 | 2 |
| 50 | 60 | 40 | −5 | −5 | 5 | 540 | 604 | 448 | 3 | 2 |
| 50 | 60 | 40 | −5 | −5 | 5 | 550 | 601 | 448 | 3 | 3 |
| 50 | 60 | 40 | −5 | −5 | 5 | 560 | 597 | 448 | 3 | 2 |
| 50 | 60 | 40 | −5 | −5 | 5 | 570 | 594 | 447 | 1 | 1 |
| 50 | 60 | 40 | −5 | 0 | −5 | 540 | 603 | 454 | 3 | 2 |
| 50 | 60 | 40 | −5 | 0 | −5 | 550 | 601 | 454 | 3 | 2 |
| 50 | 60 | 40 | −5 | 0 | −5 | 560 | 597 | 455 | 2 | 1 |
| 50 | 60 | 40 | −5 | 0 | 0 | 540 | 603 | 451 | 3 | 3 |
| 50 | 60 | 40 | −5 | 0 | 0 | 550 | 601 | 451 | 3 | 2 |
| 50 | 60 | 40 | −5 | 0 | 0 | 560 | 597 | 451 | 2 | 2 |
| 50 | 60 | 40 | −5 | 0 | 5 | 530 | 605 | 448 | 1 | 1 |
| 50 | 60 | 40 | −5 | 0 | 5 | 540 | 603 | 448 | 3 | 3 |
| 50 | 60 | 40 | −5 | 0 | 5 | 550 | 601 | 448 | 3 | 3 |
| 50 | 60 | 40 | −5 | 0 | 5 | 560 | 597 | 447 | 2 | 2 |
| 50 | 60 | 40 | −5 | 5 | −5 | 530 | 605 | 455 | 1 | 1 |
| 50 | 60 | 40 | −5 | 5 | −5 | 540 | 603 | 454 | 3 | 2 |
| 50 | 60 | 40 | −5 | 5 | −5 | 550 | 600 | 454 | 3 | 2 |
| 50 | 60 | 40 | −5 | 5 | 0 | 530 | 604 | 451 | 2 | 2 |
| 50 | 60 | 40 | −5 | 5 | 0 | 540 | 603 | 451 | 3 | 3 |
| 50 | 60 | 40 | −5 | 5 | 0 | 550 | 601 | 451 | 3 | 2 |
| 50 | 60 | 40 | −5 | 5 | 5 | 530 | 604 | 448 | 2 | 2 |
| 50 | 60 | 40 | −5 | 5 | 5 | 540 | 603 | 448 | 3 | 3 |
| 50 | 60 | 40 | −5 | 5 | 5 | 550 | 600 | 447 | 3 | 2 |
| 50 | 60 | 40 | 0 | −5 | −5 | 540 | 600 | 454 | 3 | 2 |
| 50 | 60 | 40 | 0 | −5 | −5 | 550 | 598 | 454 | 3 | 2 |
| 50 | 60 | 40 | 0 | −5 | −5 | 560 | 594 | 454 | 3 | 2 |
| 50 | 60 | 40 | 0 | −5 | −5 | 570 | 591 | 454 | 1 | 2 |
| 50 | 60 | 40 | 0 | −5 | 0 | 540 | 600 | 451 | 3 | 2 |
| 50 | 60 | 40 | 0 | −5 | 0 | 550 | 598 | 451 | 3 | 3 |
| 50 | 60 | 40 | 0 | −5 | 0 | 560 | 595 | 451 | 3 | 2 |
| 50 | 60 | 40 | 0 | −5 | 0 | 570 | 590 | 450 | 2 | 2 |
| 50 | 60 | 40 | 0 | −5 | 5 | 540 | 600 | 448 | 3 | 2 |
| 50 | 60 | 40 | 0 | −5 | 5 | 550 | 598 | 448 | 3 | 3 |
| 50 | 60 | 40 | 0 | −5 | 5 | 560 | 594 | 447 | 3 | 2 |
| 50 | 60 | 40 | 0 | −5 | 5 | 570 | 591 | 447 | 2 | 2 |
| 50 | 60 | 40 | 0 | 0 | −5 | 540 | 600 | 454 | 3 | 2 |
| 50 | 60 | 40 | 0 | 0 | −5 | 550 | 598 | 454 | 3 | 2 |
| 50 | 60 | 40 | 0 | 0 | −5 | 560 | 594 | 454 | 2 | 2 |
| 50 | 60 | 40 | 0 | 0 | 0 | 540 | 600 | 451 | 3 | 3 |
| 50 | 60 | 40 | 0 | 0 | 0 | 550 | 597 | 451 | 3 | 3 |

TABLE I-continued

Peak wavelength tolerances based on single-peak symmetric or asymmetric channel sensitivities for three channel cameras with μ-factor of .98 or larger

| Sensitivity | | | | | | Green | Center Peaks in | | | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 60 | 40 | 0 | 0 | 0 | 560 | 594 | 451 | 2 | 2 |
| 50 | 60 | 40 | 0 | 0 | 5 | 530 | 601 | 448 | 1 | 1 |
| 50 | 60 | 40 | 0 | 0 | 5 | 540 | 600 | 448 | 3 | 3 |
| 50 | 60 | 40 | 0 | 0 | 5 | 550 | 597 | 448 | 3 | 3 |
| 50 | 60 | 40 | 0 | 0 | 5 | 560 | 594 | 448 | 2 | 2 |
| 50 | 60 | 40 | 0 | 5 | −5 | 530 | 601 | 455 | 2 | 1 |
| 50 | 60 | 40 | 0 | 5 | −5 | 540 | 600 | 454 | 3 | 2 |
| 50 | 60 | 40 | 0 | 5 | −5 | 550 | 597 | 454 | 3 | 2 |
| 50 | 60 | 40 | 0 | 5 | 0 | 530 | 601 | 451 | 2 | 2 |
| 50 | 60 | 40 | 0 | 5 | 0 | 540 | 600 | 451 | 3 | 3 |
| 50 | 60 | 40 | 0 | 5 | 0 | 550 | 597 | 451 | 3 | 2 |
| 50 | 60 | 40 | 0 | 5 | 5 | 530 | 601 | 448 | 2 | 2 |
| 50 | 60 | 40 | 0 | 5 | 5 | 540 | 599 | 448 | 3 | 3 |
| 50 | 60 | 40 | 0 | 5 | 5 | 550 | 598 | 447 | 3 | 2 |
| 50 | 60 | 40 | 5 | −5 | −5 | 540 | 597 | 454 | 3 | 2 |
| 50 | 60 | 40 | 5 | −5 | −5 | 550 | 595 | 454 | 3 | 2 |
| 50 | 60 | 40 | 5 | −5 | −5 | 560 | 590 | 454 | 2 | 2 |
| 50 | 60 | 40 | 5 | −5 | −5 | 570 | 587 | 454 | 1 | 1 |
| 50 | 60 | 40 | 5 | −5 | 0 | 540 | 597 | 451 | 3 | 2 |
| 50 | 60 | 40 | 5 | −5 | 0 | 550 | 595 | 451 | 3 | 3 |
| 50 | 60 | 40 | 5 | −5 | 0 | 560 | 591 | 451 | 3 | 2 |
| 50 | 60 | 40 | 5 | −5 | 0 | 570 | 587 | 450 | 2 | 2 |
| 50 | 60 | 40 | 5 | −5 | 5 | 540 | 597 | 448 | 3 | 2 |
| 50 | 60 | 40 | 5 | −5 | 5 | 550 | 594 | 448 | 3 | 3 |
| 50 | 60 | 40 | 5 | −5 | 5 | 560 | 591 | 447 | 3 | 2 |
| 50 | 60 | 40 | 5 | −5 | 5 | 570 | 588 | 447 | 2 | 2 |
| 50 | 60 | 40 | 5 | 0 | −5 | 540 | 597 | 454 | 3 | 2 |
| 50 | 60 | 40 | 5 | 0 | −5 | 550 | 594 | 454 | 3 | 2 |
| 50 | 60 | 40 | 5 | 0 | −5 | 560 | 591 | 454 | 2 | 2 |
| 50 | 60 | 40 | 5 | 0 | 0 | 540 | 597 | 451 | 3 | 2 |
| 50 | 60 | 40 | 5 | 0 | 0 | 550 | 594 | 451 | 3 | 2 |
| 50 | 60 | 40 | 5 | 0 | 0 | 560 | 591 | 451 | 2 | 2 |
| 50 | 60 | 40 | 5 | 0 | 5 | 530 | 598 | 448 | 1 | 1 |
| 50 | 60 | 40 | 5 | 0 | 5 | 540 | 597 | 448 | 3 | 3 |
| 50 | 60 | 40 | 5 | 0 | 5 | 550 | 595 | 448 | 3 | 3 |
| 50 | 60 | 40 | 5 | 0 | 5 | 560 | 591 | 447 | 2 | 2 |
| 50 | 60 | 40 | 5 | 5 | −5 | 530 | 598 | 454 | 1 | 1 |
| 50 | 60 | 40 | 5 | 5 | −5 | 540 | 596 | 454 | 3 | 2 |
| 50 | 60 | 40 | 5 | 5 | −5 | 550 | 594 | 454 | 3 | 2 |
| 50 | 60 | 40 | 5 | 5 | 0 | 530 | 598 | 451 | 2 | 2 |
| 50 | 60 | 40 | 5 | 5 | 0 | 540 | 596 | 451 | 3 | 3 |
| 50 | 60 | 40 | 5 | 5 | 0 | 550 | 594 | 451 | 3 | 2 |
| 50 | 60 | 40 | 5 | 5 | 5 | 530 | 598 | 447 | 2 | 2 |
| 50 | 60 | 40 | 5 | 5 | 5 | 540 | 597 | 448 | 3 | 3 |
| 50 | 60 | 40 | 5 | 5 | 5 | 550 | 594 | 447 | 3 | 2 |
| 50 | 60 | 50 | −5 | −5 | −5 | 550 | 601 | 454 | 1 | 1 |
| 50 | 60 | 50 | −5 | −5 | 0 | 550 | 601 | 452 | 2 | 2 |
| 50 | 60 | 50 | −5 | −5 | 5 | 540 | 604 | 450 | 1 | 2 |
| 50 | 60 | 50 | −5 | −5 | 5 | 550 | 601 | 449 | 2 | 2 |
| 50 | 60 | 50 | −5 | 0 | 0 | 540 | 603 | 452 | 2 | 2 |
| 50 | 60 | 50 | −5 | 0 | 0 | 550 | 601 | 452 | 1 | 1 |
| 50 | 60 | 50 | −5 | 0 | 5 | 540 | 603 | 449 | 2 | 2 |
| 50 | 60 | 50 | −5 | 0 | 5 | 550 | 600 | 449 | 2 | 2 |
| 50 | 60 | 50 | −5 | 5 | −5 | 540 | 603 | 454 | 1 | 1 |
| 50 | 60 | 50 | −5 | 5 | 0 | 540 | 603 | 452 | 2 | 2 |
| 50 | 60 | 50 | −5 | 5 | 5 | 540 | 603 | 449 | 2 | 2 |
| 50 | 60 | 50 | 0 | −5 | −5 | 550 | 598 | 454 | 1 | 1 |
| 50 | 60 | 50 | 0 | −5 | 0 | 550 | 598 | 452 | 2 | 2 |
| 50 | 60 | 50 | 0 | −5 | 5 | 540 | 600 | 450 | 2 | 2 |
| 50 | 60 | 50 | 0 | −5 | 5 | 550 | 598 | 449 | 2 | 2 |
| 50 | 60 | 50 | 0 | 0 | −5 | 540 | 600 | 454 | 1 | 1 |
| 50 | 60 | 50 | 0 | 0 | 0 | 540 | 600 | 452 | 2 | 2 |
| 50 | 60 | 50 | 0 | 0 | 0 | 550 | 597 | 451 | 2 | 1 |
| 50 | 60 | 50 | 0 | 0 | 5 | 540 | 600 | 449 | 2 | 2 |
| 50 | 60 | 50 | 0 | 0 | 5 | 550 | 597 | 448 | 2 | 2 |
| 50 | 60 | 50 | 0 | 5 | −5 | 540 | 600 | 454 | 1 | 1 |
| 50 | 60 | 50 | 0 | 5 | 0 | 540 | 600 | 452 | 2 | 2 |
| 50 | 60 | 50 | 0 | 5 | 5 | 540 | 600 | 449 | 2 | 2 |
| 50 | 60 | 50 | 5 | −5 | −5 | 550 | 595 | 454 | 1 | 1 |
| 50 | 60 | 50 | 5 | −5 | 0 | 550 | 595 | 452 | 2 | 2 |
| 50 | 60 | 50 | 5 | −5 | 5 | 540 | 597 | 449 | 1 | 1 |
| 50 | 60 | 50 | 5 | −5 | 5 | 550 | 595 | 449 | 2 | 2 |

TABLE I-continued

Peak wavelength tolerances based on single-peak symmetric or asymmetric channel sensitivities for three channel cameras with μ-factor of .98 or larger

| Sensitivity | | | | | | Green Center Peaks in | | | | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 60 | 50 | 5 | 0 | 0 | 540 | 597 | 452 | 2 | 1 |
| 50 | 60 | 50 | 5 | 0 | 0 | 550 | 594 | 451 | 1 | 1 |
| 50 | 60 | 50 | 5 | 0 | 5 | 540 | 597 | 449 | 2 | 2 |
| 50 | 60 | 50 | 5 | 0 | 5 | 550 | 594 | 449 | 2 | 1 |
| 50 | 60 | 50 | 5 | 5 | −5 | 540 | 597 | 454 | 1 | 1 |
| 50 | 60 | 50 | 5 | 5 | 0 | 540 | 597 | 452 | 2 | 2 |
| 50 | 60 | 50 | 5 | 5 | 5 | 540 | 597 | 449 | 2 | 2 |
| 50 | 70 | 30 | −5 | −5 | −5 | 550 | 602 | 454 | 1 | 1 |
| 50 | 70 | 30 | −5 | −5 | −5 | 560 | 601 | 454 | 2 | 1 |
| 50 | 70 | 30 | −5 | −5 | −5 | 570 | 600 | 454 | 1 | 1 |
| 50 | 70 | 30 | −5 | −5 | 0 | 550 | 602 | 450 | 2 | 2 |
| 50 | 70 | 30 | −5 | −5 | 0 | 560 | 601 | 450 | 2 | 2 |
| 50 | 70 | 30 | −5 | −5 | 0 | 570 | 600 | 450 | 2 | 2 |
| 50 | 70 | 30 | −5 | −5 | 5 | 550 | 602 | 446 | 2 | 2 |
| 50 | 70 | 30 | −5 | −5 | 5 | 560 | 601 | 446 | 2 | 2 |
| 50 | 70 | 30 | −5 | −5 | 5 | 570 | 600 | 446 | 2 | 2 |
| 50 | 70 | 30 | −5 | 0 | −5 | 550 | 603 | 454 | 2 | 1 |
| 50 | 70 | 30 | −5 | 0 | −5 | 560 | 601 | 454 | 2 | 1 |
| 50 | 70 | 30 | −5 | 0 | 0 | 550 | 602 | 450 | 2 | 2 |
| 50 | 70 | 30 | −5 | 0 | 0 | 560 | 601 | 450 | 2 | 2 |
| 50 | 70 | 30 | −5 | 0 | 5 | 540 | 604 | 446 | 1 | 1 |
| 50 | 70 | 30 | −5 | 0 | 5 | 550 | 603 | 446 | 2 | 2 |
| 50 | 70 | 30 | −5 | 0 | 5 | 560 | 601 | 446 | 2 | 2 |
| 50 | 70 | 30 | −5 | 0 | 5 | 570 | 600 | 446 | 0 | 0 |
| 50 | 70 | 30 | −5 | 5 | −5 | 550 | 603 | 454 | 2 | 2 |
| 50 | 70 | 30 | −5 | 5 | 0 | 540 | 604 | 450 | 2 | 1 |
| 50 | 70 | 30 | −5 | 5 | 0 | 550 | 603 | 450 | 2 | 2 |
| 50 | 70 | 30 | −5 | 5 | 0 | 560 | 602 | 450 | 2 | 1 |
| 50 | 70 | 30 | −5 | 5 | 5 | 540 | 604 | 446 | 2 | 2 |
| 50 | 70 | 30 | −5 | 5 | 5 | 550 | 603 | 446 | 2 | 2 |
| 50 | 70 | 30 | −5 | 5 | 5 | 560 | 601 | 446 | 2 | 2 |
| 50 | 70 | 30 | 0 | −5 | −5 | 550 | 599 | 454 | 2 | 1 |
| 50 | 70 | 30 | 0 | −5 | −5 | 560 | 597 | 454 | 2 | 2 |
| 50 | 70 | 30 | 0 | −5 | −5 | 570 | 596 | 454 | 2 | 1 |
| 50 | 70 | 30 | 0 | −5 | 0 | 550 | 599 | 450 | 2 | 2 |
| 50 | 70 | 30 | 0 | −5 | 0 | 560 | 597 | 450 | 2 | 2 |
| 50 | 70 | 30 | 0 | −5 | 0 | 570 | 597 | 450 | 2 | 2 |
| 50 | 70 | 30 | 0 | −5 | 0 | 580 | 598 | 450 | 1 | 1 |
| 50 | 70 | 30 | 0 | −5 | 5 | 550 | 599 | 446 | 2 | 2 |
| 50 | 70 | 30 | 0 | −5 | 5 | 560 | 597 | 446 | 2 | 2 |
| 50 | 70 | 30 | 0 | −5 | 5 | 570 | 597 | 446 | 2 | 2 |
| 50 | 70 | 30 | 0 | −5 | 5 | 580 | 598 | 447 | 1 | 1 |
| 50 | 70 | 30 | 0 | 0 | −5 | 550 | 599 | 454 | 2 | 2 |
| 50 | 70 | 30 | 0 | 0 | −5 | 560 | 598 | 454 | 2 | 2 |
| 50 | 70 | 30 | 0 | 0 | 0 | 550 | 599 | 450 | 2 | 2 |
| 50 | 70 | 30 | 0 | 0 | 0 | 560 | 598 | 450 | 2 | 2 |
| 50 | 70 | 30 | 0 | 0 | 0 | 570 | 597 | 450 | 1 | 1 |
| 50 | 70 | 30 | 0 | 0 | 5 | 540 | 601 | 446 | 1 | 1 |
| 50 | 70 | 30 | 0 | 0 | 5 | 550 | 599 | 446 | 2 | 2 |
| 50 | 70 | 30 | 0 | 0 | 5 | 560 | 598 | 446 | 2 | 2 |
| 50 | 70 | 30 | 0 | 0 | 5 | 570 | 598 | 446 | 2 | 1 |
| 50 | 70 | 30 | 0 | 5 | −5 | 550 | 599 | 454 | 2 | 2 |
| 50 | 70 | 30 | 0 | 5 | −5 | 560 | 599 | 454 | 1 | 1 |
| 50 | 70 | 30 | 0 | 5 | 0 | 540 | 601 | 450 | 2 | 1 |
| 50 | 70 | 30 | 0 | 5 | 0 | 550 | 599 | 450 | 2 | 2 |
| 50 | 70 | 30 | 0 | 5 | 0 | 560 | 599 | 450 | 2 | 2 |
| 50 | 70 | 30 | 0 | 5 | 5 | 540 | 601 | 446 | 2 | 2 |
| 50 | 70 | 30 | 0 | 5 | 5 | 550 | 599 | 446 | 2 | 2 |
| 50 | 70 | 30 | 0 | 5 | 5 | 560 | 598 | 446 | 2 | 2 |
| 50 | 70 | 30 | 5 | −5 | −5 | 550 | 596 | 454 | 1 | 1 |
| 50 | 70 | 30 | 5 | −5 | −5 | 560 | 595 | 454 | 2 | 2 |
| 50 | 70 | 30 | 5 | −5 | −5 | 570 | 594 | 454 | 1 | 1 |
| 50 | 70 | 30 | 5 | −5 | 0 | 550 | 596 | 450 | 2 | 2 |
| 50 | 70 | 30 | 5 | −5 | 0 | 560 | 594 | 450 | 2 | 2 |
| 50 | 70 | 30 | 5 | −5 | 0 | 570 | 593 | 450 | 2 | 2 |
| 50 | 70 | 30 | 5 | −5 | 0 | 580 | 595 | 450 | 1 | 1 |
| 50 | 70 | 30 | 5 | −5 | 5 | 550 | 596 | 446 | 2 | 2 |
| 50 | 70 | 30 | 5 | −5 | 5 | 560 | 595 | 446 | 2 | 2 |
| 50 | 70 | 30 | 5 | −5 | 5 | 570 | 594 | 446 | 2 | 2 |
| 50 | 70 | 30 | 5 | −5 | 5 | 580 | 595 | 446 | 1 | 1 |
| 50 | 70 | 30 | 5 | 0 | −5 | 550 | 596 | 454 | 2 | 2 |
| 50 | 70 | 30 | 5 | 0 | −5 | 560 | 595 | 454 | 2 | 2 |

TABLE I-continued

Peak wavelength tolerances based on single-peak symmetric or asymmetric channel sensitivities for three channel cameras with µ-factor of .98 or larger

| Sensitivity | | | | | | Green Center Peaks in | | | | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 70 | 30 | 5 | 0 | 0 | 550 | 596 | 450 | 2 | 2 |
| 50 | 70 | 30 | 5 | 0 | 0 | 560 | 595 | 450 | 2 | 2 |
| 50 | 70 | 30 | 5 | 0 | 0 | 570 | 594 | 450 | 1 | 1 |
| 50 | 70 | 30 | 5 | 0 | 5 | 540 | 597 | 446 | 1 | 1 |
| 50 | 70 | 30 | 5 | 0 | 5 | 550 | 596 | 446 | 2 | 2 |
| 50 | 70 | 30 | 5 | 0 | 5 | 560 | 595 | 446 | 2 | 2 |
| 50 | 70 | 30 | 5 | 0 | 5 | 570 | 594 | 446 | 2 | 2 |
| 50 | 70 | 30 | 5 | 5 | −5 | 550 | 597 | 454 | 2 | 2 |
| 50 | 70 | 30 | 5 | 5 | −5 | 560 | 595 | 454 | 1 | 1 |
| 50 | 70 | 30 | 5 | 5 | 0 | 540 | 598 | 450 | 2 | 1 |
| 50 | 70 | 30 | 5 | 5 | 0 | 550 | 596 | 450 | 2 | 2 |
| 50 | 70 | 30 | 5 | 5 | 0 | 560 | 595 | 450 | 2 | 2 |
| 50 | 70 | 30 | 5 | 5 | 5 | 540 | 597 | 446 | 2 | 2 |
| 50 | 70 | 30 | 5 | 5 | 5 | 550 | 597 | 446 | 2 | 2 |
| 50 | 70 | 30 | 5 | 5 | 5 | 560 | 595 | 446 | 2 | 2 |
| 50 | 70 | 40 | −5 | −5 | −5 | 540 | 604 | 455 | 2 | 2 |
| 50 | 70 | 40 | −5 | −5 | −5 | 550 | 603 | 455 | 3 | 2 |
| 50 | 70 | 40 | −5 | −5 | −5 | 560 | 601 | 454 | 3 | 2 |
| 50 | 70 | 40 | −5 | −5 | −5 | 570 | 600 | 454 | 2 | 2 |
| 50 | 70 | 40 | −5 | −5 | −5 | 580 | 601 | 454 | 1 | 1 |
| 50 | 70 | 40 | −5 | −5 | 0 | 540 | 604 | 452 | 2 | 2 |
| 50 | 70 | 40 | −5 | −5 | 0 | 550 | 602 | 451 | 3 | 2 |
| 50 | 70 | 40 | −5 | −5 | 0 | 560 | 601 | 451 | 3 | 2 |
| 50 | 70 | 40 | −5 | −5 | 0 | 570 | 601 | 451 | 2 | 2 |
| 50 | 70 | 40 | −5 | −5 | 0 | 580 | 602 | 451 | 2 | 2 |
| 50 | 70 | 40 | −5 | −5 | 5 | 540 | 604 | 448 | 3 | 2 |
| 50 | 70 | 40 | −5 | −5 | 5 | 550 | 602 | 448 | 3 | 3 |
| 50 | 70 | 40 | −5 | −5 | 5 | 560 | 601 | 448 | 3 | 3 |
| 50 | 70 | 40 | −5 | −5 | 5 | 570 | 600 | 447 | 2 | 2 |
| 50 | 70 | 40 | −5 | −5 | 5 | 580 | 602 | 447 | 2 | 2 |
| 50 | 70 | 40 | −5 | 0 | −5 | 540 | 604 | 455 | 2 | 2 |
| 50 | 70 | 40 | −5 | 0 | −5 | 550 | 603 | 454 | 3 | 2 |
| 50 | 70 | 40 | −5 | 0 | −5 | 560 | 602 | 454 | 2 | 2 |
| 50 | 70 | 40 | −5 | 0 | −5 | 570 | 601 | 454 | 2 | 2 |
| 50 | 70 | 40 | −5 | 0 | 0 | 540 | 604 | 452 | 3 | 2 |
| 50 | 70 | 40 | −5 | 0 | 0 | 550 | 602 | 451 | 3 | 3 |
| 50 | 70 | 40 | −5 | 0 | 0 | 560 | 601 | 451 | 3 | 2 |
| 50 | 70 | 40 | −5 | 0 | 0 | 570 | 601 | 451 | 2 | 2 |
| 50 | 70 | 40 | −5 | 0 | 5 | 540 | 603 | 448 | 3 | 2 |
| 50 | 70 | 40 | −5 | 0 | 5 | 550 | 602 | 448 | 3 | 3 |
| 50 | 70 | 40 | −5 | 0 | 5 | 560 | 601 | 448 | 3 | 3 |
| 50 | 70 | 40 | −5 | 0 | 5 | 570 | 602 | 448 | 2 | 2 |
| 50 | 70 | 40 | −5 | 5 | −5 | 540 | 604 | 454 | 2 | 2 |
| 50 | 70 | 40 | −5 | 5 | −5 | 550 | 603 | 454 | 3 | 2 |
| 50 | 70 | 40 | −5 | 5 | −5 | 560 | 602 | 454 | 2 | 2 |
| 50 | 70 | 40 | −5 | 5 | 0 | 540 | 604 | 451 | 3 | 2 |
| 50 | 70 | 40 | −5 | 5 | 0 | 550 | 603 | 451 | 3 | 3 |
| 50 | 70 | 40 | −5 | 5 | 0 | 560 | 602 | 451 | 2 | 2 |
| 50 | 70 | 40 | −5 | 5 | 5 | 530 | 605 | 448 | 1 | 1 |
| 50 | 70 | 40 | −5 | 5 | 5 | 540 | 604 | 448 | 3 | 2 |
| 50 | 70 | 40 | −5 | 5 | 5 | 550 | 602 | 448 | 3 | 3 |
| 50 | 70 | 40 | −5 | 5 | 5 | 560 | 602 | 447 | 2 | 2 |
| 50 | 70 | 40 | 0 | −5 | −5 | 540 | 600 | 455 | 2 | 2 |
| 50 | 70 | 40 | 0 | −5 | −5 | 550 | 599 | 455 | 3 | 2 |
| 50 | 70 | 40 | 0 | −5 | −5 | 560 | 597 | 454 | 3 | 2 |
| 50 | 70 | 40 | 0 | −5 | −5 | 570 | 597 | 454 | 2 | 2 |
| 50 | 70 | 40 | 0 | −5 | −5 | 580 | 598 | 454 | 2 | 2 |
| 50 | 70 | 40 | 0 | −5 | 0 | 540 | 600 | 452 | 3 | 2 |
| 50 | 70 | 40 | 0 | −5 | 0 | 550 | 599 | 451 | 3 | 3 |
| 50 | 70 | 40 | 0 | −5 | 0 | 560 | 598 | 451 | 3 | 3 |
| 50 | 70 | 40 | 0 | −5 | 0 | 570 | 597 | 451 | 3 | 2 |
| 50 | 70 | 40 | 0 | −5 | 0 | 580 | 599 | 450 | 2 | 2 |
| 50 | 70 | 40 | 0 | −5 | 5 | 540 | 600 | 448 | 3 | 2 |
| 50 | 70 | 40 | 0 | −5 | 5 | 550 | 599 | 448 | 3 | 3 |
| 50 | 70 | 40 | 0 | −5 | 5 | 560 | 598 | 448 | 3 | 3 |
| 50 | 70 | 40 | 0 | −5 | 5 | 570 | 597 | 448 | 3 | 3 |
| 50 | 70 | 40 | 0 | −5 | 5 | 580 | 598 | 448 | 2 | 2 |
| 50 | 70 | 40 | 0 | 0 | −5 | 540 | 601 | 454 | 2 | 2 |
| 50 | 70 | 40 | 0 | 0 | −5 | 550 | 599 | 454 | 3 | 2 |
| 50 | 70 | 40 | 0 | 0 | −5 | 560 | 598 | 454 | 3 | 2 |
| 50 | 70 | 40 | 0 | 0 | −5 | 570 | 598 | 454 | 2 | 2 |
| 50 | 70 | 40 | 0 | 0 | 0 | 540 | 600 | 451 | 3 | 2 |

TABLE I-continued

Peak wavelength tolerances based on single-peak symmetric or asymmetric channel sensitivities for three channel cameras with μ-factor of .98 or larger

| Sensitivity | | | | | | Green Center Peaks in | | | | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 70 | 40 | 0 | 0 | 0 | 550 | 600 | 451 | 3 | 3 |
| 50 | 70 | 40 | 0 | 0 | 0 | 560 | 598 | 451 | 3 | 3 |
| 50 | 70 | 40 | 0 | 0 | 0 | 570 | 598 | 451 | 2 | 2 |
| 50 | 70 | 40 | 0 | 0 | 5 | 540 | 601 | 448 | 3 | 2 |
| 50 | 70 | 40 | 0 | 0 | 5 | 550 | 599 | 448 | 3 | 3 |
| 50 | 70 | 40 | 0 | 0 | 5 | 560 | 598 | 448 | 3 | 3 |
| 50 | 70 | 40 | 0 | 0 | 5 | 570 | 597 | 447 | 2 | 2 |
| 50 | 70 | 40 | 0 | 5 | −5 | 540 | 600 | 454 | 3 | 2 |
| 50 | 70 | 40 | 0 | 5 | −5 | 550 | 599 | 454 | 3 | 2 |
| 50 | 70 | 40 | 0 | 5 | −5 | 560 | 599 | 454 | 2 | 2 |
| 50 | 70 | 40 | 0 | 5 | 0 | 540 | 601 | 451 | 3 | 2 |
| 50 | 70 | 40 | 0 | 5 | 0 | 550 | 600 | 451 | 3 | 3 |
| 50 | 70 | 40 | 0 | 5 | 0 | 560 | 598 | 451 | 3 | 2 |
| 50 | 70 | 40 | 0 | 5 | 0 | 570 | 599 | 451 | 1 | 1 |
| 50 | 70 | 40 | 0 | 5 | 5 | 530 | 602 | 449 | 1 | 1 |
| 50 | 70 | 40 | 0 | 5 | 5 | 540 | 601 | 448 | 3 | 2 |
| 50 | 70 | 40 | 0 | 5 | 5 | 550 | 600 | 448 | 3 | 3 |
| 50 | 70 | 40 | 0 | 5 | 5 | 560 | 598 | 447 | 3 | 2 |
| 50 | 70 | 40 | 0 | 5 | 5 | 570 | 598 | 448 | 2 | 2 |
| 50 | 70 | 40 | 5 | −5 | −5 | 540 | 598 | 455 | 2 | 2 |
| 50 | 70 | 40 | 5 | −5 | −5 | 550 | 596 | 455 | 3 | 2 |
| 50 | 70 | 40 | 5 | −5 | −5 | 560 | 595 | 454 | 3 | 2 |
| 50 | 70 | 40 | 5 | −5 | −5 | 570 | 594 | 454 | 2 | 2 |
| 50 | 70 | 40 | 5 | −5 | −5 | 580 | 595 | 454 | 2 | 2 |
| 50 | 70 | 40 | 5 | −5 | 0 | 540 | 597 | 452 | 2 | 2 |
| 50 | 70 | 40 | 5 | −5 | 0 | 550 | 596 | 451 | 3 | 2 |
| 50 | 70 | 40 | 5 | −5 | 0 | 560 | 595 | 451 | 3 | 3 |
| 50 | 70 | 40 | 5 | −5 | 0 | 570 | 594 | 451 | 3 | 2 |
| 50 | 70 | 40 | 5 | −5 | 0 | 580 | 595 | 450 | 2 | 2 |
| 50 | 70 | 40 | 5 | −5 | 5 | 540 | 598 | 448 | 3 | 2 |
| 50 | 70 | 40 | 5 | −5 | 5 | 550 | 596 | 448 | 3 | 3 |
| 50 | 70 | 40 | 5 | −5 | 5 | 560 | 594 | 448 | 3 | 3 |
| 50 | 70 | 40 | 5 | −5 | 5 | 570 | 594 | 448 | 3 | 2 |
| 50 | 70 | 40 | 5 | −5 | 5 | 580 | 595 | 448 | 2 | 2 |
| 50 | 70 | 40 | 5 | 0 | −5 | 540 | 597 | 455 | 2 | 2 |
| 50 | 70 | 40 | 5 | 0 | −5 | 550 | 597 | 454 | 3 | 2 |
| 50 | 70 | 40 | 5 | 0 | −5 | 560 | 595 | 454 | 3 | 2 |
| 50 | 70 | 40 | 5 | 0 | −5 | 570 | 594 | 454 | 2 | 2 |
| 50 | 70 | 40 | 5 | 0 | 0 | 540 | 598 | 452 | 3 | 2 |
| 50 | 70 | 40 | 5 | 0 | 0 | 550 | 596 | 451 | 3 | 3 |
| 50 | 70 | 40 | 5 | 0 | 0 | 560 | 595 | 451 | 3 | 2 |
| 50 | 70 | 40 | 5 | 0 | 0 | 570 | 594 | 451 | 2 | 2 |
| 50 | 70 | 40 | 5 | 0 | 5 | 540 | 597 | 448 | 3 | 2 |
| 50 | 70 | 40 | 5 | 0 | 5 | 550 | 596 | 448 | 3 | 3 |
| 50 | 70 | 40 | 5 | 0 | 5 | 560 | 595 | 448 | 3 | 3 |
| 50 | 70 | 40 | 5 | 0 | 5 | 570 | 595 | 447 | 2 | 2 |
| 50 | 70 | 40 | 5 | 0 | 5 | 580 | 596 | 448 | 0 | 1 |
| 50 | 70 | 40 | 5 | 5 | −5 | 540 | 598 | 454 | 2 | 2 |
| 50 | 70 | 40 | 5 | 5 | −5 | 550 | 597 | 454 | 3 | 2 |
| 50 | 70 | 40 | 5 | 5 | −5 | 560 | 595 | 454 | 2 | 2 |
| 50 | 70 | 40 | 5 | 5 | 0 | 540 | 597 | 451 | 3 | 2 |
| 50 | 70 | 40 | 5 | 5 | 0 | 550 | 596 | 451 | 3 | 3 |
| 50 | 70 | 40 | 5 | 5 | 0 | 560 | 596 | 451 | 2 | 2 |
| 50 | 70 | 40 | 5 | 5 | 0 | 570 | 595 | 451 | 1 | 1 |
| 50 | 70 | 40 | 5 | 5 | 5 | 530 | 599 | 449 | 1 | 1 |
| 50 | 70 | 40 | 5 | 5 | 5 | 540 | 597 | 448 | 3 | 2 |
| 50 | 70 | 40 | 5 | 5 | 5 | 550 | 596 | 448 | 3 | 3 |
| 50 | 70 | 40 | 5 | 5 | 5 | 560 | 596 | 447 | 3 | 2 |
| 50 | 70 | 40 | 5 | 5 | 5 | 570 | 595 | 448 | 2 | 2 |
| 50 | 70 | 50 | −5 | −5 | 0 | 550 | 602 | 452 | 2 | 2 |
| 50 | 70 | 50 | −5 | −5 | 0 | 560 | 600 | 452 | 2 | 2 |
| 50 | 70 | 50 | −5 | −5 | 5 | 550 | 602 | 449 | 2 | 2 |
| 50 | 70 | 50 | −5 | −5 | 5 | 560 | 600 | 449 | 2 | 2 |
| 50 | 70 | 50 | −5 | 0 | −5 | 550 | 603 | 455 | 1 | 1 |
| 50 | 70 | 50 | −5 | 0 | 0 | 550 | 602 | 452 | 2 | 2 |
| 50 | 70 | 50 | −5 | 0 | 0 | 560 | 601 | 451 | 1 | 1 |
| 50 | 70 | 50 | −5 | 0 | 5 | 540 | 604 | 450 | 0 | 0 |
| 50 | 70 | 50 | −5 | 0 | 5 | 550 | 602 | 449 | 2 | 2 |
| 50 | 70 | 50 | −5 | 0 | 5 | 560 | 601 | 449 | 1 | 2 |
| 50 | 70 | 50 | −5 | 5 | −5 | 550 | 603 | 455 | 1 | 1 |
| 50 | 70 | 50 | −5 | 5 | 0 | 550 | 602 | 452 | 2 | 2 |
| 50 | 70 | 50 | −5 | 5 | 5 | 540 | 604 | 450 | 1 | 2 |

TABLE I-continued

Peak wavelength tolerances based on single-peak symmetric or asymmetric channel sensitivities for three channel cameras with μ-factor of .98 or larger

| Sensitivity | | | | | | Green | Center Peaks in | | | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 70 | 50 | −5 | 5 | 5 | 550 | 603 | 449 | 2 | 2 |
| 50 | 70 | 50 | 0 | −5 | −5 | 550 | 599 | 454 | 1 | 1 |
| 50 | 70 | 50 | 0 | −5 | −5 | 560 | 597 | 455 | 1 | 1 |
| 50 | 70 | 50 | 0 | −5 | 0 | 550 | 599 | 452 | 2 | 2 |
| 50 | 70 | 50 | 0 | −5 | 0 | 560 | 597 | 452 | 2 | 2 |
| 50 | 70 | 50 | 0 | −5 | 0 | 570 | 596 | 451 | 2 | 1 |
| 50 | 70 | 50 | 0 | −5 | 5 | 550 | 599 | 449 | 2 | 2 |
| 50 | 70 | 50 | 0 | −5 | 5 | 560 | 597 | 449 | 2 | 2 |
| 50 | 70 | 50 | 0 | −5 | 5 | 570 | 597 | 449 | 1 | 2 |
| 50 | 70 | 50 | 0 | 0 | −5 | 550 | 599 | 455 | 1 | 1 |
| 50 | 70 | 50 | 0 | 0 | −5 | 560 | 598 | 454 | 1 | 1 |
| 50 | 70 | 50 | 0 | 0 | 0 | 550 | 599 | 452 | 2 | 2 |
| 50 | 70 | 50 | 0 | 0 | 0 | 560 | 598 | 452 | 1 | 2 |
| 50 | 70 | 50 | 0 | 0 | 5 | 540 | 601 | 450 | 1 | 2 |
| 50 | 70 | 50 | 0 | 0 | 5 | 550 | 599 | 449 | 2 | 2 |
| 50 | 70 | 50 | 0 | 0 | 5 | 560 | 598 | 449 | 2 | 2 |
| 50 | 70 | 50 | 0 | 5 | −5 | 550 | 599 | 454 | 2 | 1 |
| 50 | 70 | 50 | 0 | 5 | 0 | 540 | 600 | 452 | 1 | 1 |
| 50 | 70 | 50 | 0 | 5 | 0 | 550 | 599 | 451 | 2 | 2 |
| 50 | 70 | 50 | 0 | 5 | 5 | 540 | 600 | 450 | 2 | 2 |
| 50 | 70 | 50 | 0 | 5 | 5 | 550 | 599 | 449 | 2 | 2 |
| 50 | 70 | 50 | 0 | −5 | −5 | 560 | 594 | 454 | 1 | 1 |
| 50 | 70 | 50 | 5 | −5 | 0 | 550 | 596 | 452 | 2 | 2 |
| 50 | 70 | 50 | 5 | −5 | 0 | 560 | 594 | 452 | 2 | 2 |
| 50 | 70 | 50 | 5 | −5 | 5 | 550 | 595 | 449 | 2 | 2 |
| 50 | 70 | 50 | 5 | −5 | 5 | 560 | 594 | 449 | 2 | 2 |
| 50 | 70 | 50 | 5 | −5 | 5 | 570 | 593 | 449 | 1 | 1 |
| 50 | 70 | 50 | 5 | 0 | −5 | 550 | 596 | 455 | 1 | 1 |
| 50 | 70 | 50 | 5 | 0 | 0 | 550 | 596 | 452 | 2 | 2 |
| 50 | 70 | 50 | 5 | 0 | 0 | 560 | 595 | 451 | 1 | 1 |
| 50 | 70 | 50 | 5 | 0 | 5 | 550 | 596 | 449 | 2 | 2 |
| 50 | 70 | 50 | 5 | 0 | 5 | 560 | 594 | 448 | 2 | 2 |
| 50 | 70 | 50 | 5 | 5 | −5 | 550 | 596 | 454 | 1 | 1 |
| 50 | 70 | 50 | 5 | 5 | 0 | 550 | 596 | 452 | 2 | 2 |
| 50 | 70 | 50 | 5 | 5 | 5 | 540 | 597 | 449 | 1 | 1 |
| 50 | 70 | 50 | 5 | 5 | 5 | 550 | 597 | 449 | 2 | 2 |
| 60 | 50 | 30 | −5 | −5 | −5 | 540 | 600 | 454 | 2 | 1 |
| 60 | 50 | 30 | −5 | −5 | −5 | 550 | 595 | 454 | 2 | 1 |
| 60 | 50 | 30 | −5 | −5 | 0 | 540 | 599 | 450 | 2 | 2 |
| 60 | 50 | 30 | −5 | −5 | 0 | 550 | 594 | 450 | 3 | 2 |
| 60 | 50 | 30 | −5 | −5 | 5 | 540 | 599 | 446 | 3 | 2 |
| 60 | 50 | 30 | −5 | −5 | 5 | 550 | 594 | 446 | 3 | 2 |
| 60 | 50 | 30 | −5 | 0 | −5 | 540 | 598 | 454 | 2 | 2 |
| 60 | 50 | 30 | −5 | 0 | 0 | 540 | 598 | 450 | 3 | 2 |
| 60 | 50 | 30 | −5 | 0 | 5 | 540 | 598 | 446 | 3 | 2 |
| 60 | 50 | 30 | −5 | 5 | −5 | 540 | 598 | 454 | 2 | 1 |
| 60 | 50 | 30 | −5 | 5 | 0 | 540 | 597 | 450 | 3 | 2 |
| 60 | 50 | 30 | −5 | 5 | 5 | 540 | 597 | 446 | 3 | 2 |
| 60 | 50 | 30 | 0 | −5 | −5 | 540 | 597 | 454 | 1 | 0 |
| 60 | 50 | 30 | 0 | −5 | −5 | 550 | 591 | 454 | 2 | 1 |
| 60 | 50 | 30 | 0 | −5 | 0 | 540 | 597 | 450 | 2 | 2 |
| 60 | 50 | 30 | 0 | −5 | 0 | 550 | 591 | 450 | 3 | 2 |
| 60 | 50 | 30 | 0 | −5 | 5 | 540 | 596 | 446 | 3 | 2 |
| 60 | 50 | 30 | 0 | −5 | 5 | 550 | 591 | 446 | 3 | 2 |
| 60 | 50 | 30 | 0 | 0 | −5 | 540 | 595 | 454 | 2 | 2 |
| 60 | 50 | 30 | 0 | 0 | 0 | 540 | 595 | 450 | 3 | 2 |
| 60 | 50 | 30 | 0 | 0 | 5 | 540 | 595 | 450 | 3 | 2 |
| 60 | 50 | 30 | 0 | 0 | 5 | 550 | 589 | 446 | 1 | 1 |
| 60 | 50 | 30 | 0 | 5 | −5 | 540 | 594 | 454 | 2 | 1 |
| 60 | 50 | 30 | 0 | 5 | 0 | 540 | 594 | 450 | 3 | 2 |
| 60 | 50 | 30 | 0 | 5 | 5 | 540 | 594 | 446 | 3 | 2 |
| 60 | 50 | 30 | 5 | −5 | −5 | 550 | 587 | 454 | 2 | 1 |
| 60 | 50 | 30 | 5 | −5 | 0 | 540 | 594 | 450 | 2 | 1 |
| 60 | 50 | 30 | 5 | −5 | 0 | 550 | 587 | 450 | 3 | 2 |
| 60 | 50 | 30 | 5 | −5 | 5 | 540 | 593 | 446 | 2 | 2 |
| 60 | 50 | 30 | 5 | −5 | 5 | 550 | 586 | 446 | 3 | 2 |
| 60 | 50 | 30 | 5 | 0 | −5 | 540 | 593 | 454 | 2 | 1 |
| 60 | 50 | 30 | 5 | 0 | 0 | 540 | 592 | 450 | 3 | 2 |
| 60 | 50 | 30 | 5 | 0 | 5 | 540 | 592 | 446 | 3 | 2 |
| 60 | 50 | 30 | 5 | 0 | 5 | 550 | 584 | 446 | 1 | 1 |
| 60 | 50 | 30 | 5 | 5 | −5 | 540 | 591 | 454 | 1 | 1 |
| 60 | 50 | 30 | 5 | 5 | 0 | 540 | 591 | 450 | 2 | 2 |

TABLE I-continued

Peak wavelength tolerances based on single-peak symmetric or asymmetric channel sensitivities for three channel cameras with μ-factor of .98 or larger

| Sensitivity | | | | | | Green | Center Peaks in | | | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 50 | 30 | 5 | 5 | 5 | 540 | 591 | 446 | 3 | 2 |
| 60 | 50 | 40 | −5 | −5 | −5 | 540 | 599 | 454 | 3 | 2 |
| 60 | 50 | 40 | −5 | −5 | −5 | 550 | 594 | 454 | 3 | 2 |
| 60 | 50 | 40 | −5 | −5 | 0 | 540 | 599 | 451 | 3 | 2 |
| 60 | 50 | 40 | −5 | −5 | 0 | 550 | 594 | 451 | 4 | 2 |
| 60 | 50 | 40 | −5 | −5 | 5 | 540 | 599 | 448 | 3 | 3 |
| 60 | 50 | 40 | −5 | −5 | 5 | 550 | 593 | 447 | 4 | 2 |
| 60 | 50 | 40 | −5 | 0 | −5 | 540 | 598 | 454 | 3 | 2 |
| 60 | 50 | 40 | −5 | 0 | −5 | 550 | 592 | 454 | 3 | 2 |
| 60 | 50 | 40 | −5 | 0 | 0 | 540 | 598 | 451 | 4 | 3 |
| 60 | 50 | 40 | −5 | 0 | 0 | 550 | 592 | 451 | 3 | 2 |
| 60 | 50 | 40 | −5 | 0 | 5 | 540 | 598 | 448 | 4 | 3 |
| 60 | 50 | 40 | −5 | 0 | 5 | 550 | 593 | 448 | 3 | 2 |
| 60 | 50 | 40 | −5 | 5 | −5 | 530 | 601 | 454 | 2 | 2 |
| 60 | 50 | 40 | −5 | 5 | −5 | 540 | 597 | 454 | 3 | 2 |
| 60 | 50 | 40 | −5 | 5 | 0 | 530 | 601 | 451 | 2 | 2 |
| 60 | 50 | 40 | −5 | 5 | 0 | 540 | 597 | 451 | 3 | 2 |
| 60 | 50 | 40 | −5 | 5 | 5 | 530 | 601 | 447 | 3 | 2 |
| 60 | 50 | 40 | −5 | 5 | 5 | 540 | 596 | 448 | 4 | 3 |
| 60 | 50 | 40 | 0 | −5 | −5 | 540 | 597 | 454 | 3 | 2 |
| 60 | 50 | 40 | 0 | −5 | −5 | 550 | 590 | 454 | 4 | 2 |
| 60 | 50 | 40 | 0 | −5 | 0 | 540 | 596 | 451 | 3 | 2 |
| 60 | 50 | 40 | 0 | −5 | 0 | 550 | 590 | 451 | 4 | 2 |
| 60 | 50 | 40 | 0 | −5 | 5 | 540 | 596 | 447 | 3 | 2 |
| 60 | 50 | 40 | 0 | −5 | 5 | 550 | 589 | 447 | 4 | 2 |
| 60 | 50 | 40 | 0 | 0 | −5 | 540 | 595 | 454 | 3 | 2 |
| 60 | 50 | 40 | 0 | 0 | −5 | 550 | 588 | 454 | 3 | 2 |
| 60 | 50 | 40 | 0 | 0 | 0 | 540 | 595 | 451 | 4 | 2 |
| 60 | 50 | 40 | 0 | 0 | 0 | 550 | 588 | 451 | 3 | 2 |
| 60 | 50 | 40 | 0 | 0 | 5 | 540 | 595 | 448 | 4 | 3 |
| 60 | 50 | 40 | 0 | 0 | 5 | 550 | 588 | 448 | 3 | 2 |
| 60 | 50 | 40 | 0 | 5 | −5 | 530 | 598 | 455 | 1 | 1 |
| 60 | 50 | 40 | 0 | 5 | −5 | 540 | 594 | 454 | 3 | 2 |
| 60 | 50 | 40 | 0 | 5 | 0 | 530 | 598 | 451 | 2 | 2 |
| 60 | 50 | 40 | 0 | 5 | 0 | 540 | 594 | 451 | 3 | 2 |
| 60 | 50 | 40 | 0 | 5 | 5 | 530 | 598 | 447 | 3 | 2 |
| 60 | 50 | 40 | 0 | 5 | 5 | 540 | 593 | 448 | 4 | 2 |
| 60 | 50 | 40 | 5 | −5 | −5 | 540 | 594 | 454 | 3 | 2 |
| 60 | 50 | 40 | 5 | −5 | −5 | 550 | 585 | 454 | 4 | 2 |
| 60 | 50 | 40 | 5 | −5 | 0 | 540 | 593 | 451 | 3 | 2 |
| 60 | 50 | 40 | 5 | −5 | 0 | 550 | 585 | 451 | 4 | 2 |
| 60 | 50 | 40 | 5 | −5 | 5 | 540 | 593 | 447 | 3 | 2 |
| 60 | 50 | 40 | 5 | −5 | 5 | 550 | 580 | 447 | 4 | 2 |
| 60 | 50 | 40 | 5 | 0 | −5 | 540 | 592 | 454 | 3 | 2 |
| 60 | 50 | 40 | 5 | 0 | −5 | 550 | 583 | 454 | 3 | 2 |
| 60 | 50 | 40 | 5 | 0 | 0 | 540 | 592 | 451 | 3 | 2 |
| 60 | 50 | 40 | 5 | 0 | 0 | 550 | 580 | 451 | 4 | 2 |
| 60 | 50 | 40 | 5 | 0 | 5 | 540 | 592 | 448 | 4 | 3 |
| 60 | 50 | 40 | 5 | 0 | 5 | 550 | 579 | 448 | 4 | 2 |
| 60 | 50 | 40 | 5 | 5 | −5 | 540 | 591 | 454 | 3 | 2 |
| 60 | 50 | 40 | 5 | 5 | 0 | 530 | 595 | 451 | 2 | 1 |
| 60 | 50 | 40 | 5 | 5 | 0 | 540 | 591 | 451 | 3 | 2 |
| 60 | 50 | 40 | 5 | 5 | 5 | 530 | 595 | 448 | 2 | 2 |
| 60 | 50 | 40 | 5 | 5 | 5 | 540 | 590 | 447 | 4 | 2 |
| 60 | 50 | 50 | −5 | −5 | 5 | 540 | 599 | 449 | 2 | 1 |
| 60 | 50 | 50 | −5 | 0 | −5 | 540 | 599 | 454 | 1 | 1 |
| 60 | 50 | 50 | −5 | 0 | 0 | 540 | 598 | 452 | 2 | 2 |
| 60 | 50 | 50 | −5 | 0 | 5 | 540 | 598 | 449 | 2 | 2 |
| 60 | 50 | 50 | −5 | 5 | 5 | 540 | 597 | 449 | 2 | 1 |
| 60 | 50 | 50 | 0 | −5 | 5 | 540 | 597 | 449 | 1 | 1 |
| 60 | 50 | 50 | 0 | 0 | 0 | 540 | 595 | 451 | 2 | 1 |
| 60 | 50 | 50 | 0 | 0 | 5 | 540 | 596 | 449 | 2 | 2 |
| 60 | 50 | 50 | 0 | 5 | 5 | 540 | 594 | 449 | 2 | 1 |
| 60 | 50 | 50 | 5 | 0 | 5 | 540 | 593 | 449 | 2 | 1 |
| 60 | 60 | 30 | −5 | −5 | −5 | 550 | 595 | 454 | 3 | 2 |
| 60 | 60 | 30 | −5 | −5 | −5 | 560 | 587 | 454 | 2 | 1 |
| 60 | 60 | 30 | −5 | −5 | 0 | 540 | 599 | 450 | 2 | 2 |
| 60 | 60 | 30 | −5 | −5 | 0 | 550 | 595 | 450 | 3 | 2 |
| 60 | 60 | 30 | −5 | −5 | 0 | 560 | 587 | 450 | 3 | 2 |
| 60 | 60 | 30 | −5 | −5 | 0 | 570 | 576 | 450 | 1 | 1 |
| 60 | 60 | 30 | −5 | −5 | 5 | 540 | 599 | 446 | 2 | 2 |
| 60 | 60 | 30 | −5 | −5 | 5 | 550 | 594 | 446 | 3 | 2 |

TABLE I-continued

Peak wavelength tolerances based on single-peak symmetric or asymmetric channel sensitivities for three channel cameras with μ-factor of .98 or larger

| Sensitivity | | | | | | Green | Center Peaks in | | | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 60 | 30 | −5 | −5 | 5 | 560 | 587 | 446 | 3 | 2 |
| 60 | 60 | 30 | −5 | −5 | 5 | 570 | 576 | 446 | 2 | 1 |
| 60 | 60 | 30 | −5 | 0 | −5 | 540 | 598 | 454 | 2 | 2 |
| 60 | 60 | 30 | −5 | 0 | −5 | 550 | 593 | 454 | 3 | 2 |
| 60 | 60 | 30 | −5 | 0 | 0 | 540 | 599 | 450 | 3 | 2 |
| 60 | 60 | 30 | −5 | 0 | 0 | 550 | 593 | 450 | 3 | 2 |
| 60 | 60 | 30 | −5 | 0 | 0 | 560 | 586 | 450 | 2 | 1 |
| 60 | 60 | 30 | −5 | 0 | 5 | 540 | 598 | 446 | 3 | 2 |
| 60 | 60 | 30 | −5 | 0 | 5 | 550 | 594 | 446 | 3 | 2 |
| 60 | 60 | 30 | −5 | 0 | 5 | 560 | 586 | 446 | 2 | 2 |
| 60 | 60 | 30 | −5 | 5 | −5 | 540 | 598 | 454 | 2 | 2 |
| 60 | 60 | 30 | −5 | 5 | −5 | 550 | 592 | 454 | 3 | 2 |
| 60 | 60 | 30 | −5 | 5 | 0 | 540 | 598 | 450 | 3 | 2 |
| 60 | 60 | 30 | −5 | 5 | 0 | 550 | 592 | 450 | 3 | 2 |
| 60 | 60 | 30 | −5 | 5 | 5 | 540 | 598 | 446 | 3 | 2 |
| 60 | 60 | 30 | −5 | 5 | 5 | 550 | 593 | 446 | 3 | 2 |
| 60 | 60 | 30 | 0 | −5 | −5 | 550 | 592 | 454 | 3 | 2 |
| 60 | 60 | 30 | 0 | −5 | −5 | 560 | 584 | 454 | 2 | 2 |
| 60 | 60 | 30 | 0 | −5 | 0 | 540 | 597 | 450 | 2 | 1 |
| 60 | 60 | 30 | 0 | −5 | 0 | 550 | 592 | 450 | 3 | 2 |
| 60 | 60 | 30 | 0 | −5 | 0 | 560 | 584 | 450 | 3 | 2 |
| 60 | 60 | 30 | 0 | −5 | 5 | 540 | 597 | 446 | 2 | 2 |
| 60 | 60 | 30 | 0 | −5 | 5 | 550 | 592 | 446 | 3 | 2 |
| 60 | 60 | 30 | 0 | −5 | 5 | 560 | 584 | 446 | 3 | 2 |
| 60 | 60 | 30 | 0 | 0 | −5 | 540 | 596 | 454 | 2 | 1 |
| 60 | 60 | 30 | 0 | 0 | −5 | 550 | 591 | 454 | 3 | 2 |
| 60 | 60 | 30 | 0 | 0 | −5 | 560 | 582 | 454 | 2 | 1 |
| 60 | 60 | 30 | 0 | 0 | 0 | 540 | 596 | 450 | 3 | 2 |
| 60 | 60 | 30 | 0 | 0 | 0 | 550 | 591 | 450 | 3 | 2 |
| 60 | 60 | 30 | 0 | 0 | 0 | 560 | 582 | 450 | 3 | 2 |
| 60 | 60 | 30 | 0 | 0 | 0 | 570 | 573 | 450 | 1 | 1 |
| 60 | 60 | 30 | 0 | 0 | 5 | 540 | 596 | 446 | 3 | 2 |
| 60 | 60 | 30 | 0 | 0 | 5 | 550 | 590 | 446 | 3 | 2 |
| 60 | 60 | 30 | 0 | 0 | 5 | 560 | 582 | 446 | 3 | 2 |
| 60 | 60 | 30 | 0 | 0 | 5 | 570 | 573 | 446 | 1 | 1 |
| 60 | 60 | 30 | 0 | 5 | −5 | 540 | 595 | 454 | 2 | 2 |
| 60 | 60 | 30 | 0 | 5 | −5 | 550 | 590 | 454 | 2 | 2 |
| 60 | 60 | 30 | 0 | 5 | 0 | 540 | 595 | 450 | 3 | 2 |
| 60 | 60 | 30 | 0 | 5 | 0 | 550 | 590 | 450 | 3 | 2 |
| 60 | 60 | 30 | 0 | 5 | 5 | 540 | 594 | 446 | 3 | 2 |
| 60 | 60 | 30 | 0 | 5 | 5 | 550 | 589 | 446 | 3 | 2 |
| 60 | 60 | 30 | 5 | −5 | −5 | 550 | 589 | 454 | 3 | 2 |
| 60 | 60 | 30 | 5 | −5 | −5 | 560 | 582 | 454 | 2 | 1 |
| 60 | 60 | 30 | 5 | −5 | 0 | 540 | 594 | 450 | 1 | 1 |
| 60 | 60 | 30 | 5 | −5 | 0 | 550 | 589 | 450 | 3 | 2 |
| 60 | 60 | 30 | 5 | −5 | 0 | 560 | 582 | 450 | 3 | 2 |
| 60 | 60 | 30 | 5 | −5 | 5 | 540 | 594 | 446 | 2 | 1 |
| 60 | 60 | 30 | 5 | −5 | 5 | 550 | 589 | 446 | 3 | 2 |
| 60 | 60 | 30 | 5 | −5 | 5 | 560 | 582 | 446 | 3 | 2 |
| 60 | 60 | 30 | 5 | 0 | −5 | 540 | 594 | 454 | 2 | 1 |
| 60 | 60 | 30 | 5 | 0 | −5 | 550 | 588 | 454 | 3 | 2 |
| 60 | 60 | 30 | 5 | 0 | 0 | 540 | 593 | 450 | 2 | 2 |
| 60 | 60 | 30 | 5 | 0 | 0 | 550 | 588 | 450 | 3 | 2 |
| 60 | 60 | 30 | 5 | 0 | 0 | 560 | 580 | 450 | 2 | 1 |
| 60 | 60 | 30 | 5 | 0 | 5 | 540 | 594 | 446 | 2 | 2 |
| 60 | 60 | 30 | 5 | 0 | 5 | 550 | 588 | 446 | 3 | 2 |
| 60 | 60 | 30 | 5 | 0 | 5 | 560 | 579 | 446 | 3 | 2 |
| 60 | 60 | 30 | 5 | 5 | −5 | 540 | 592 | 454 | 2 | 1 |
| 60 | 60 | 30 | 5 | 5 | −5 | 550 | 587 | 454 | 2 | 1 |
| 60 | 60 | 30 | 5 | 5 | 0 | 540 | 592 | 450 | 3 | 2 |
| 60 | 60 | 30 | 5 | 5 | 0 | 550 | 587 | 450 | 3 | 2 |
| 60 | 60 | 30 | 5 | 5 | 5 | 540 | 593 | 446 | 3 | 2 |
| 60 | 60 | 30 | 5 | 5 | 5 | 550 | 587 | 446 | 3 | 2 |
| 60 | 60 | 30 | 5 | 5 | 5 | 560 | 578 | 446 | 1 | 1 |
| 60 | 60 | 40 | −5 | −5 | −5 | 540 | 599 | 455 | 3 | 2 |
| 60 | 60 | 40 | −5 | −5 | −5 | 550 | 594 | 454 | 4 | 3 |
| 60 | 60 | 40 | −5 | −5 | −5 | 560 | 587 | 454 | 3 | 2 |
| 60 | 60 | 40 | −5 | −5 | −5 | 570 | 578 | 454 | 2 | 2 |
| 60 | 60 | 40 | −5 | −5 | 0 | 540 | 599 | 451 | 3 | 2 |
| 60 | 60 | 40 | −5 | −5 | 0 | 550 | 594 | 451 | 4 | 3 |
| 60 | 60 | 40 | −5 | −5 | 0 | 560 | 587 | 451 | 4 | 2 |
| 60 | 60 | 40 | −5 | −5 | 0 | 570 | 579 | 450 | 3 | 2 |

TABLE I-continued

Peak wavelength tolerances based on single-peak symmetric or asymmetric channel sensitivities for three channel cameras with μ-factor of .98 or larger

| Sensitivity | | | | | | Green | Center Peaks in | | | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 60 | 40 | −5 | −5 | 5 | 540 | 599 | 448 | 3 | 3 |
| 60 | 60 | 40 | −5 | −5 | 5 | 550 | 594 | 448 | 4 | 3 |
| 60 | 60 | 40 | −5 | −5 | 5 | 560 | 586 | 448 | 4 | 3 |
| 60 | 60 | 40 | −5 | −5 | 5 | 570 | 580 | 448 | 3 | 2 |
| 60 | 60 | 40 | −5 | 0 | −5 | 540 | 598 | 454 | 3 | 2 |
| 60 | 60 | 40 | −5 | 0 | −5 | 550 | 594 | 454 | 3 | 3 |
| 60 | 60 | 40 | −5 | 0 | −5 | 560 | 587 | 454 | 3 | 2 |
| 60 | 60 | 40 | −5 | 0 | 0 | 540 | 599 | 451 | 3 | 3 |
| 60 | 60 | 40 | −5 | 0 | 0 | 550 | 593 | 451 | 4 | 3 |
| 60 | 60 | 40 | −5 | 0 | 0 | 560 | 587 | 451 | 3 | 2 |
| 60 | 60 | 40 | −5 | 0 | 5 | 540 | 598 | 448 | 4 | 3 |
| 60 | 60 | 40 | −5 | 0 | 5 | 550 | 593 | 448 | 4 | 3 |
| 60 | 60 | 40 | −5 | 0 | 5 | 560 | 587 | 447 | 3 | 2 |
| 60 | 60 | 40 | −5 | 5 | −5 | 540 | 597 | 454 | 3 | 2 |
| 60 | 60 | 40 | −5 | 5 | −5 | 550 | 593 | 454 | 3 | 2 |
| 60 | 60 | 40 | −5 | 5 | 0 | 530 | 601 | 451 | 2 | 2 |
| 60 | 60 | 40 | −5 | 5 | 0 | 540 | 597 | 451 | 3 | 3 |
| 60 | 60 | 40 | −5 | 5 | 0 | 550 | 593 | 450 | 3 | 3 |
| 60 | 60 | 40 | −5 | 5 | 0 | 560 | 588 | 451 | 2 | 1 |
| 60 | 60 | 40 | −5 | 5 | 5 | 530 | 601 | 448 | 2 | 2 |
| 60 | 60 | 40 | −5 | 5 | 5 | 540 | 598 | 448 | 4 | 3 |
| 60 | 60 | 40 | −5 | 5 | 5 | 550 | 592 | 448 | 4 | 3 |
| 60 | 60 | 40 | −5 | 5 | 5 | 560 | 588 | 448 | 2 | 2 |
| 60 | 60 | 40 | 0 | −5 | −5 | 540 | 596 | 454 | 3 | 2 |
| 60 | 60 | 40 | 0 | −5 | −5 | 550 | 591 | 454 | 4 | 3 |
| 60 | 60 | 40 | 0 | −5 | −5 | 560 | 583 | 454 | 4 | 2 |
| 60 | 60 | 40 | 0 | −5 | −5 | 570 | 578 | 454 | 2 | 2 |
| 60 | 60 | 40 | 0 | −5 | 0 | 540 | 596 | 451 | 3 | 2 |
| 60 | 60 | 40 | 0 | −5 | 0 | 550 | 591 | 451 | 4 | 3 |
| 60 | 60 | 40 | 0 | −5 | 0 | 560 | 583 | 451 | 4 | 3 |
| 60 | 60 | 40 | 0 | −5 | 0 | 570 | 579 | 451 | 2 | 2 |
| 60 | 60 | 40 | 0 | −5 | 5 | 540 | 596 | 448 | 3 | 2 |
| 60 | 60 | 40 | 0 | −5 | 5 | 550 | 591 | 448 | 4 | 3 |
| 60 | 60 | 40 | 0 | −5 | 5 | 560 | 583 | 448 | 4 | 3 |
| 60 | 60 | 40 | 0 | −5 | 5 | 570 | 580 | 448 | 2 | 2 |
| 60 | 60 | 40 | 0 | 0 | −5 | 540 | 596 | 454 | 3 | 2 |
| 60 | 60 | 40 | 0 | 0 | −5 | 550 | 590 | 454 | 4 | 3 |
| 60 | 60 | 40 | 0 | 0 | −5 | 560 | 581 | 454 | 3 | 2 |
| 60 | 60 | 40 | 0 | 0 | −5 | 570 | 575 | 454 | 2 | 2 |
| 60 | 60 | 40 | 0 | 0 | 0 | 540 | 595 | 451 | 3 | 2 |
| 60 | 60 | 40 | 0 | 0 | 0 | 550 | 590 | 451 | 4 | 3 |
| 60 | 60 | 40 | 0 | 0 | 0 | 560 | 582 | 451 | 4 | 2 |
| 60 | 60 | 40 | 0 | 0 | 0 | 570 | 576 | 451 | 2 | 2 |
| 60 | 60 | 40 | 0 | 0 | 5 | 540 | 595 | 448 | 3 | 3 |
| 60 | 60 | 40 | 0 | 0 | 5 | 550 | 590 | 448 | 4 | 3 |
| 60 | 60 | 40 | 0 | 0 | 5 | 560 | 581 | 447 | 4 | 2 |
| 60 | 60 | 40 | 0 | 0 | 5 | 570 | 577 | 448 | 2 | 2 |
| 60 | 60 | 40 | 0 | 5 | −5 | 540 | 595 | 454 | 3 | 2 |
| 60 | 60 | 40 | 0 | 5 | −5 | 550 | 589 | 454 | 3 | 2 |
| 60 | 60 | 40 | 0 | 5 | −5 | 560 | 583 | 454 | 2 | 2 |
| 60 | 60 | 40 | 0 | 5 | 0 | 530 | 598 | 451 | 2 | 1 |
| 60 | 60 | 40 | 0 | 5 | 0 | 540 | 595 | 451 | 3 | 3 |
| 60 | 60 | 40 | 0 | 5 | 0 | 550 | 590 | 451 | 4 | 3 |
| 60 | 60 | 40 | 0 | 5 | 0 | 560 | 583 | 451 | 3 | 2 |
| 60 | 60 | 40 | 0 | 5 | 5 | 530 | 598 | 448 | 2 | 2 |
| 60 | 60 | 40 | 0 | 5 | 5 | 540 | 594 | 448 | 4 | 3 |
| 60 | 60 | 40 | 0 | 5 | 5 | 550 | 589 | 448 | 4 | 3 |
| 60 | 60 | 40 | 0 | 5 | 5 | 560 | 583 | 448 | 3 | 2 |
| 60 | 60 | 40 | 5 | −5 | −5 | 540 | 594 | 454 | 3 | 2 |
| 60 | 60 | 40 | 5 | −5 | −5 | 550 | 588 | 454 | 3 | 2 |
| 60 | 60 | 40 | 5 | −5 | −5 | 560 | 581 | 454 | 3 | 2 |
| 60 | 60 | 40 | 5 | −5 | 0 | 540 | 593 | 451 | 3 | 2 |
| 60 | 60 | 40 | 5 | −5 | 0 | 550 | 589 | 451 | 4 | 3 |
| 60 | 60 | 40 | 5 | −5 | 0 | 560 | 582 | 451 | 4 | 2 |
| 60 | 60 | 40 | 5 | −5 | 5 | 540 | 594 | 447 | 3 | 2 |
| 60 | 60 | 40 | 5 | −5 | 5 | 550 | 588 | 448 | 4 | 3 |
| 60 | 60 | 40 | 5 | −5 | 5 | 560 | 581 | 448 | 4 | 2 |
| 60 | 60 | 40 | 5 | −5 | 5 | 570 | 580 | 447 | 2 | 1 |
| 60 | 60 | 40 | 5 | 0 | −5 | 540 | 593 | 454 | 3 | 2 |
| 60 | 60 | 40 | 5 | 0 | −5 | 550 | 588 | 454 | 3 | 2 |
| 60 | 60 | 40 | 5 | 0 | −5 | 560 | 580 | 454 | 3 | 2 |
| 60 | 60 | 40 | 5 | 0 | 0 | 540 | 593 | 451 | 3 | 2 |

TABLE I-continued

Peak wavelength tolerances based on single-peak symmetric or asymmetric channel sensitivities for three channel cameras with μ-factor of .98 or larger

| Sensitivity | | | | | | Green | Center Peaks in | | | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 60 | 40 | 5 | 0 | 0 | 550 | 587 | 451 | 4 | 3 |
| 60 | 60 | 40 | 5 | 0 | 0 | 560 | 580 | 451 | 3 | 2 |
| 60 | 60 | 40 | 5 | 0 | 0 | 570 | 576 | 451 | 1 | 1 |
| 60 | 60 | 40 | 5 | 0 | 5 | 540 | 593 | 448 | 3 | 3 |
| 60 | 60 | 40 | 5 | 0 | 5 | 550 | 588 | 448 | 4 | 3 |
| 60 | 60 | 40 | 5 | 0 | 5 | 560 | 579 | 447 | 4 | 2 |
| 60 | 60 | 40 | 5 | 0 | 5 | 570 | 577 | 447 | 2 | 1 |
| 60 | 60 | 40 | 5 | 5 | −5 | 540 | 592 | 454 | 3 | 2 |
| 60 | 60 | 40 | 5 | 5 | −5 | 550 | 587 | 454 | 3 | 2 |
| 60 | 60 | 40 | 5 | 5 | −5 | 560 | 578 | 454 | 3 | 2 |
| 60 | 60 | 40 | 5 | 5 | 0 | 530 | 595 | 452 | 1 | 1 |
| 60 | 60 | 40 | 5 | 5 | 0 | 540 | 592 | 451 | 3 | 2 |
| 60 | 60 | 40 | 5 | 5 | 0 | 550 | 586 | 451 | 4 | 2 |
| 60 | 60 | 40 | 5 | 5 | 0 | 560 | 577 | 451 | 3 | 2 |
| 60 | 60 | 40 | 5 | 5 | 0 | 570 | 573 | 451 | 1 | 1 |
| 60 | 60 | 40 | 5 | 5 | 5 | 530 | 596 | 448 | 2 | 2 |
| 60 | 60 | 40 | 5 | 5 | 5 | 540 | 592 | 448 | 3 | 3 |
| 60 | 60 | 40 | 5 | 5 | 5 | 550 | 587 | 448 | 4 | 3 |
| 60 | 60 | 40 | 5 | 5 | 5 | 560 | 577 | 448 | 3 | 2 |
| 60 | 60 | 40 | 5 | 5 | 5 | 570 | 573 | 448 | 1 | 1 |
| 60 | 60 | 50 | −5 | −5 | −5 | 550 | 594 | 454 | 3 | 2 |
| 60 | 60 | 50 | −5 | −5 | 0 | 540 | 599 | 452 | 2 | 1 |
| 60 | 60 | 50 | −5 | −5 | 0 | 550 | 594 | 452 | 3 | 2 |
| 60 | 60 | 50 | −5 | −5 | 0 | 560 | 587 | 452 | 1 | 1 |
| 60 | 60 | 50 | −5 | −5 | 5 | 540 | 599 | 450 | 2 | 2 |
| 60 | 60 | 50 | −5 | −5 | 5 | 550 | 594 | 449 | 3 | 2 |
| 60 | 60 | 50 | −5 | −5 | 5 | 560 | 587 | 449 | 2 | 1 |
| 60 | 60 | 50 | −5 | 0 | −5 | 540 | 598 | 455 | 2 | 1 |
| 60 | 60 | 50 | −5 | 0 | −5 | 550 | 593 | 454 | 2 | 2 |
| 60 | 60 | 50 | −5 | 0 | 0 | 540 | 598 | 452 | 2 | 2 |
| 60 | 60 | 50 | −5 | 0 | 0 | 550 | 593 | 452 | 3 | 2 |
| 60 | 60 | 50 | −5 | 0 | 5 | 540 | 598 | 450 | 3 | 2 |
| 60 | 60 | 50 | −5 | 0 | 5 | 550 | 593 | 448 | 3 | 2 |
| 60 | 60 | 50 | −5 | 5 | −5 | 540 | 598 | 454 | 2 | 2 |
| 60 | 60 | 50 | −5 | 5 | −5 | 550 | 592 | 454 | 2 | 1 |
| 60 | 60 | 50 | −5 | 5 | 0 | 540 | 597 | 451 | 2 | 2 |
| 60 | 60 | 50 | −5 | 5 | 0 | 550 | 592 | 451 | 2 | 2 |
| 60 | 60 | 50 | −5 | 5 | 5 | 540 | 598 | 449 | 3 | 2 |
| 60 | 60 | 50 | −5 | 5 | 5 | 550 | 593 | 449 | 2 | 2 |
| 60 | 60 | 50 | 0 | −5 | −5 | 550 | 591 | 454 | 2 | 2 |
| 60 | 60 | 50 | 0 | −5 | 0 | 540 | 596 | 452 | 1 | 1 |
| 60 | 60 | 50 | 0 | −5 | 0 | 550 | 591 | 452 | 3 | 2 |
| 60 | 60 | 50 | 0 | −5 | 0 | 560 | 583 | 451 | 2 | 1 |
| 60 | 60 | 50 | 0 | −5 | 5 | 540 | 596 | 450 | 2 | 2 |
| 60 | 60 | 50 | 0 | −5 | 5 | 550 | 591 | 449 | 3 | 2 |
| 60 | 60 | 50 | 0 | −5 | 5 | 560 | 583 | 448 | 2 | 2 |
| 60 | 60 | 50 | 0 | 0 | −5 | 540 | 595 | 454 | 1 | 1 |
| 60 | 60 | 50 | 0 | 0 | −5 | 550 | 591 | 454 | 2 | 2 |
| 60 | 60 | 50 | 0 | 0 | 0 | 540 | 596 | 452 | 2 | 2 |
| 60 | 60 | 50 | 0 | 0 | 0 | 550 | 590 | 451 | 3 | 2 |
| 60 | 60 | 50 | 0 | 0 | 5 | 540 | 595 | 449 | 2 | 2 |
| 60 | 60 | 50 | 0 | 0 | 5 | 550 | 591 | 448 | 3 | 2 |
| 60 | 60 | 50 | 0 | 0 | 5 | 560 | 582 | 448 | 1 | 0 |
| 60 | 60 | 50 | 0 | 5 | −5 | 540 | 595 | 454 | 2 | 1 |
| 60 | 60 | 50 | 0 | 5 | −5 | 550 | 590 | 454 | 1 | 1 |
| 60 | 60 | 50 | 0 | 5 | 0 | 540 | 595 | 452 | 2 | 2 |
| 60 | 60 | 50 | 0 | 5 | 0 | 550 | 590 | 452 | 2 | 2 |
| 60 | 60 | 50 | 0 | 5 | 5 | 540 | 595 | 449 | 2 | 2 |
| 60 | 60 | 50 | 0 | 5 | 5 | 550 | 589 | 449 | 2 | 2 |
| 60 | 60 | 50 | 5 | −5 | −5 | 550 | 589 | 454 | 2 | 2 |
| 60 | 60 | 50 | 5 | −5 | 0 | 550 | 589 | 451 | 2 | 2 |
| 60 | 60 | 50 | 5 | −5 | 5 | 540 | 594 | 450 | 1 | 1 |
| 60 | 60 | 50 | 5 | −5 | 5 | 550 | 589 | 449 | 3 | 2 |
| 60 | 60 | 50 | 5 | −5 | 5 | 560 | 582 | 449 | 1 | 1 |
| 60 | 60 | 50 | 5 | 0 | −5 | 550 | 588 | 454 | 2 | 1 |
| 60 | 60 | 50 | 5 | 0 | 0 | 540 | 593 | 452 | 1 | 1 |
| 60 | 60 | 50 | 5 | 0 | 0 | 550 | 588 | 452 | 2 | 2 |
| 60 | 60 | 50 | 5 | 0 | 5 | 540 | 593 | 450 | 2 | 2 |
| 60 | 60 | 50 | 5 | 0 | 5 | 550 | 588 | 449 | 3 | 2 |
| 60 | 60 | 50 | 5 | 5 | 0 | 540 | 592 | 451 | 2 | 1 |
| 60 | 60 | 50 | 5 | 5 | 0 | 550 | 586 | 452 | 1 | 0 |
| 60 | 60 | 50 | 5 | 5 | 5 | 540 | 592 | 449 | 2 | 2 |

TABLE I-continued

Peak wavelength tolerances based on single-peak symmetric or asymmetric channel sensitivities for three channel cameras with μ-factor of .98 or larger

| Sensitivity | | | | | | Green | Center Peaks in | | | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 60 | 50 | 5 | 5 | 5 | 550 | 587 | 449 | 2 | 1 |
| 60 | 70 | 30 | −5 | −5 | −5 | 550 | 597 | 454 | 1 | 1 |
| 60 | 70 | 30 | −5 | −5 | −5 | 560 | 594 | 454 | 2 | 2 |
| 60 | 70 | 30 | −5 | −5 | −5 | 570 | 593 | 454 | 2 | 2 |
| 60 | 70 | 30 | −5 | −5 | −5 | 580 | 595 | 454 | 2 | 2 |
| 60 | 70 | 30 | −5 | −5 | 0 | 550 | 598 | 450 | 2 | 2 |
| 60 | 70 | 30 | −5 | −5 | 0 | 560 | 594 | 450 | 3 | 2 |
| 60 | 70 | 30 | −5 | −5 | 0 | 570 | 593 | 450 | 2 | 2 |
| 60 | 70 | 30 | −5 | −5 | 0 | 580 | 595 | 450 | 2 | 2 |
| 60 | 70 | 30 | −5 | −5 | 0 | 590 | 600 | 450 | 1 | 1 |
| 60 | 70 | 30 | −5 | −5 | 5 | 550 | 597 | 446 | 2 | 2 |
| 60 | 70 | 30 | −5 | −5 | 5 | 560 | 595 | 446 | 3 | 2 |
| 60 | 70 | 30 | −5 | −5 | 5 | 570 | 593 | 446 | 2 | 2 |
| 60 | 70 | 30 | −5 | −5 | 5 | 580 | 595 | 446 | 2 | 2 |
| 60 | 70 | 30 | −5 | −5 | 5 | 590 | 600 | 446 | 1 | 1 |
| 60 | 70 | 30 | −5 | 0 | −5 | 550 | 597 | 454 | 2 | 2 |
| 60 | 70 | 30 | −5 | 0 | −5 | 560 | 595 | 454 | 2 | 2 |
| 60 | 70 | 30 | −5 | 0 | −5 | 570 | 594 | 454 | 2 | 2 |
| 60 | 70 | 30 | −5 | 0 | 0 | 550 | 597 | 450 | 3 | 2 |
| 60 | 70 | 30 | −5 | 0 | 0 | 560 | 594 | 450 | 3 | 2 |
| 60 | 70 | 30 | −5 | 0 | 0 | 570 | 594 | 450 | 2 | 2 |
| 60 | 70 | 30 | −5 | 0 | 0 | 580 | 596 | 450 | 1 | 1 |
| 60 | 70 | 30 | −5 | 0 | 5 | 550 | 597 | 446 | 3 | 2 |
| 60 | 70 | 30 | −5 | 0 | 5 | 560 | 595 | 446 | 3 | 2 |
| 60 | 70 | 30 | −5 | 0 | 5 | 570 | 594 | 446 | 2 | 2 |
| 60 | 70 | 30 | −5 | 0 | 5 | 580 | 597 | 446 | 1 | 1 |
| 60 | 70 | 30 | −5 | 5 | −5 | 550 | 597 | 454 | 2 | 2 |
| 60 | 70 | 30 | −5 | 5 | −5 | 560 | 595 | 454 | 2 | 2 |
| 60 | 70 | 30 | −5 | 5 | 0 | 540 | 600 | 450 | 1 | 1 |
| 60 | 70 | 30 | −5 | 5 | 0 | 550 | 597 | 450 | 3 | 2 |
| 60 | 70 | 30 | −5 | 5 | 0 | 560 | 596 | 450 | 2 | 2 |
| 60 | 70 | 30 | −5 | 5 | 0 | 570 | 596 | 450 | 2 | 1 |
| 60 | 70 | 30 | −5 | 5 | 5 | 540 | 600 | 446 | 1 | 1 |
| 60 | 70 | 30 | −5 | 5 | 5 | 550 | 597 | 446 | 3 | 2 |
| 60 | 70 | 30 | −5 | 5 | 5 | 560 | 596 | 446 | 3 | 2 |
| 60 | 70 | 30 | −5 | 5 | 5 | 570 | 596 | 446 | 2 | 2 |
| 60 | 70 | 30 | 0 | −5 | −5 | 560 | 592 | 454 | 2 | 1 |
| 60 | 70 | 30 | 0 | −5 | −5 | 570 | 591 | 454 | 2 | 2 |
| 60 | 70 | 30 | 0 | −5 | −5 | 580 | 592 | 454 | 2 | 2 |
| 60 | 70 | 30 | 0 | −5 | −5 | 590 | 597 | 454 | 1 | 1 |
| 60 | 70 | 30 | 0 | −5 | 0 | 550 | 595 | 450 | 2 | 1 |
| 60 | 70 | 30 | 0 | −5 | 0 | 560 | 593 | 450 | 2 | 2 |
| 60 | 70 | 30 | 0 | −5 | 0 | 570 | 591 | 450 | 2 | 2 |
| 60 | 70 | 30 | 0 | −5 | 0 | 580 | 592 | 450 | 2 | 2 |
| 60 | 70 | 30 | 0 | −5 | 0 | 590 | 597 | 450 | 1 | 2 |
| 60 | 70 | 30 | 0 | −5 | 5 | 550 | 595 | 446 | 2 | 2 |
| 60 | 70 | 30 | 0 | −5 | 5 | 560 | 592 | 446 | 3 | 2 |
| 60 | 70 | 30 | 0 | −5 | 5 | 570 | 591 | 446 | 2 | 2 |
| 60 | 70 | 30 | 0 | −5 | 5 | 580 | 592 | 446 | 2 | 2 |
| 60 | 70 | 30 | 0 | −5 | 5 | 590 | 597 | 446 | 1 | 2 |
| 60 | 70 | 30 | 0 | 0 | −5 | 550 | 595 | 454 | 2 | 1 |
| 60 | 70 | 30 | 0 | 0 | −5 | 560 | 592 | 454 | 2 | 2 |
| 60 | 70 | 30 | 0 | 0 | −5 | 570 | 591 | 454 | 2 | 2 |
| 60 | 70 | 30 | 0 | 0 | −5 | 580 | 593 | 454 | 1 | 2 |
| 60 | 70 | 30 | 0 | 0 | 0 | 550 | 595 | 450 | 2 | 2 |
| 60 | 70 | 30 | 0 | 0 | 0 | 560 | 592 | 450 | 3 | 2 |
| 60 | 70 | 30 | 0 | 0 | 0 | 570 | 591 | 450 | 2 | 2 |
| 60 | 70 | 30 | 0 | 0 | 0 | 580 | 594 | 450 | 2 | 2 |
| 60 | 70 | 30 | 0 | 0 | 5 | 550 | 595 | 446 | 3 | 2 |
| 60 | 70 | 30 | 0 | 0 | 5 | 560 | 592 | 446 | 3 | 2 |
| 60 | 70 | 30 | 0 | 0 | 5 | 570 | 591 | 446 | 2 | 2 |
| 60 | 70 | 30 | 0 | 0 | 5 | 580 | 593 | 446 | 2 | 2 |
| 60 | 70 | 30 | 0 | 5 | −5 | 550 | 594 | 454 | 2 | 2 |
| 60 | 70 | 30 | 0 | 5 | −5 | 560 | 592 | 454 | 2 | 2 |
| 60 | 70 | 30 | 0 | 5 | −5 | 570 | 592 | 454 | 2 | 2 |
| 60 | 70 | 30 | 0 | 5 | 0 | 550 | 594 | 450 | 3 | 2 |
| 60 | 70 | 30 | 0 | 5 | 0 | 560 | 592 | 450 | 3 | 2 |
| 60 | 70 | 30 | 0 | 5 | 0 | 570 | 592 | 450 | 2 | 2 |
| 60 | 70 | 30 | 0 | 5 | 5 | 540 | 597 | 446 | 1 | 1 |
| 60 | 70 | 30 | 0 | 5 | 5 | 550 | 595 | 446 | 3 | 2 |
| 60 | 70 | 30 | 0 | 5 | 5 | 560 | 592 | 446 | 3 | 2 |
| 60 | 70 | 30 | 0 | 5 | 5 | 570 | 592 | 446 | 2 | 2 |

TABLE I-continued

Peak wavelength tolerances based on single-peak symmetric or asymmetric channel sensitivities for three channel cameras with μ-factor of .98 or larger

| Sensitivity | | | | | | Green Center Peaks in | | | | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 70 | 30 | 5 | −5 | −5 | 560 | 590 | 454 | 1 | 1 |
| 60 | 70 | 30 | 5 | −5 | 0 | 550 | 593 | 450 | 2 | 1 |
| 60 | 70 | 30 | 5 | −5 | 0 | 560 | 590 | 450 | 2 | 2 |
| 60 | 70 | 30 | 5 | −5 | 0 | 570 | 588 | 450 | 2 | 1 |
| 60 | 70 | 30 | 5 | −5 | 0 | 580 | 590 | 450 | 1 | 1 |
| 60 | 70 | 30 | 5 | −5 | 0 | 590 | 594 | 450 | 1 | 1 |
| 60 | 70 | 30 | 5 | −5 | 5 | 550 | 593 | 446 | 2 | 1 |
| 60 | 70 | 30 | 5 | −5 | 5 | 560 | 590 | 446 | 2 | 2 |
| 60 | 70 | 30 | 5 | −5 | 5 | 570 | 589 | 446 | 2 | 2 |
| 60 | 70 | 30 | 5 | −5 | 5 | 580 | 590 | 446 | 1 | 1 |
| 60 | 70 | 30 | 5 | −5 | 5 | 590 | 594 | 446 | 1 | 1 |
| 60 | 70 | 30 | 5 | 0 | −5 | 560 | 589 | 454 | 2 | 1 |
| 60 | 70 | 30 | 5 | 0 | −5 | 570 | 588 | 454 | 2 | 1 |
| 60 | 70 | 30 | 5 | 0 | −5 | 580 | 591 | 454 | 1 | 1 |
| 60 | 70 | 30 | 5 | 0 | 0 | 550 | 592 | 450 | 2 | 2 |
| 60 | 70 | 30 | 5 | 0 | 0 | 560 | 590 | 450 | 2 | 2 |
| 60 | 70 | 30 | 5 | 0 | 0 | 570 | 589 | 450 | 2 | 2 |
| 60 | 70 | 30 | 5 | 0 | 0 | 580 | 590 | 450 | 2 | 2 |
| 60 | 70 | 30 | 5 | 0 | 5 | 550 | 593 | 446 | 2 | 2 |
| 60 | 70 | 30 | 5 | 0 | 5 | 560 | 590 | 446 | 2 | 2 |
| 60 | 70 | 30 | 5 | 0 | 5 | 570 | 589 | 446 | 2 | 2 |
| 60 | 70 | 30 | 5 | 0 | 5 | 580 | 590 | 446 | 2 | 2 |
| 60 | 70 | 30 | 5 | 5 | −5 | 550 | 592 | 454 | 2 | 1 |
| 60 | 70 | 30 | 5 | 5 | −5 | 560 | 589 | 454 | 2 | 2 |
| 60 | 70 | 30 | 5 | 5 | −5 | 570 | 589 | 454 | 2 | 1 |
| 60 | 70 | 30 | 5 | 5 | 0 | 550 | 593 | 450 | 2 | 2 |
| 60 | 70 | 30 | 5 | 5 | 0 | 560 | 590 | 450 | 2 | 2 |
| 60 | 70 | 30 | 5 | 5 | 0 | 570 | 589 | 450 | 2 | 2 |
| 60 | 70 | 30 | 5 | 5 | 5 | 550 | 592 | 446 | 3 | 2 |
| 60 | 70 | 30 | 5 | 5 | 5 | 560 | 590 | 446 | 2 | 2 |
| 60 | 70 | 30 | 5 | 5 | 5 | 570 | 589 | 446 | 2 | 2 |
| 60 | 70 | 30 | 5 | 5 | 5 | 580 | 592 | 446 | 1 | 1 |
| 60 | 70 | 40 | −5 | −5 | −5 | 540 | 600 | 455 | 2 | 2 |
| 60 | 70 | 40 | −5 | −5 | −5 | 550 | 598 | 455 | 3 | 2 |
| 60 | 70 | 40 | −5 | −5 | −5 | 560 | 595 | 454 | 3 | 2 |
| 60 | 70 | 40 | −5 | −5 | −5 | 570 | 594 | 454 | 3 | 2 |
| 60 | 70 | 40 | −5 | −5 | −5 | 580 | 595 | 454 | 2 | 2 |
| 60 | 70 | 40 | −5 | −5 | −5 | 590 | 600 | 454 | 1 | 2 |
| 60 | 70 | 40 | −5 | −5 | 0 | 540 | 600 | 452 | 3 | 2 |
| 60 | 70 | 40 | −5 | −5 | 0 | 550 | 597 | 451 | 3 | 2 |
| 60 | 70 | 40 | −5 | −5 | 0 | 560 | 595 | 451 | 3 | 3 |
| 60 | 70 | 40 | −5 | −5 | 0 | 570 | 593 | 451 | 3 | 3 |
| 60 | 70 | 40 | −5 | −5 | 0 | 580 | 595 | 451 | 2 | 3 |
| 60 | 70 | 40 | −5 | −5 | 0 | 590 | 600 | 451 | 2 | 2 |
| 60 | 70 | 40 | −5 | −5 | 5 | 540 | 599 | 448 | 3 | 2 |
| 60 | 70 | 40 | −5 | −5 | 5 | 550 | 598 | 448 | 3 | 3 |
| 60 | 70 | 40 | −5 | −5 | 5 | 560 | 595 | 448 | 3 | 3 |
| 60 | 70 | 40 | −5 | −5 | 5 | 570 | 594 | 448 | 3 | 3 |
| 60 | 70 | 40 | −5 | −5 | 5 | 580 | 595 | 448 | 2 | 3 |
| 60 | 70 | 40 | −5 | −5 | 5 | 590 | 600 | 447 | 2 | 2 |
| 60 | 70 | 40 | −5 | 0 | −5 | 540 | 599 | 455 | 2 | 2 |
| 60 | 70 | 40 | −5 | 0 | −5 | 550 | 597 | 455 | 3 | 2 |
| 60 | 70 | 40 | −5 | 0 | −5 | 560 | 595 | 454 | 3 | 3 |
| 60 | 70 | 40 | −5 | 0 | −5 | 570 | 594 | 454 | 3 | 2 |
| 60 | 70 | 40 | −5 | 0 | −5 | 580 | 596 | 454 | 2 | 2 |
| 60 | 70 | 40 | −5 | 0 | 0 | 540 | 599 | 452 | 3 | 2 |
| 60 | 70 | 40 | −5 | 0 | 0 | 550 | 597 | 451 | 3 | 3 |
| 60 | 70 | 40 | −5 | 0 | 0 | 560 | 595 | 451 | 3 | 3 |
| 60 | 70 | 40 | −5 | 0 | 0 | 570 | 594 | 451 | 3 | 3 |
| 60 | 70 | 40 | −5 | 0 | 0 | 580 | 597 | 451 | 2 | 2 |
| 60 | 70 | 40 | −5 | 0 | 5 | 540 | 600 | 448 | 3 | 2 |
| 60 | 70 | 40 | −5 | 0 | 5 | 550 | 598 | 448 | 3 | 3 |
| 60 | 70 | 40 | −5 | 0 | 5 | 560 | 595 | 448 | 3 | 3 |
| 60 | 70 | 40 | −5 | 0 | 5 | 570 | 595 | 448 | 3 | 3 |
| 60 | 70 | 40 | −5 | 0 | 5 | 580 | 597 | 447 | 2 | 2 |
| 60 | 70 | 40 | −5 | 5 | −5 | 540 | 600 | 454 | 3 | 2 |
| 60 | 70 | 40 | −5 | 5 | −5 | 550 | 597 | 454 | 3 | 3 |
| 60 | 70 | 40 | −5 | 5 | −5 | 560 | 596 | 454 | 3 | 2 |
| 60 | 70 | 40 | −5 | 5 | −5 | 570 | 596 | 454 | 2 | 2 |
| 60 | 70 | 40 | −5 | 5 | 0 | 540 | 600 | 451 | 3 | 2 |
| 60 | 70 | 40 | −5 | 5 | 0 | 550 | 597 | 451 | 3 | 3 |
| 60 | 70 | 40 | −5 | 5 | 0 | 560 | 596 | 451 | 3 | 3 |

TABLE I-continued

Peak wavelength tolerances based on single-peak symmetric or asymmetric channel sensitivities for three channel cameras with µ-factor of .98 or larger

| Sensitivity | | | | | | Green Center Peaks in | | | | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 70 | 40 | −5 | 5 | 0 | 570 | 596 | 451 | 2 | 2 |
| 60 | 70 | 40 | −5 | 5 | 5 | 540 | 600 | 448 | 3 | 2 |
| 60 | 70 | 40 | −5 | 5 | 5 | 550 | 598 | 448 | 3 | 3 |
| 60 | 70 | 40 | −5 | 5 | 5 | 560 | 596 | 448 | 3 | 3 |
| 60 | 70 | 40 | −5 | 5 | 5 | 570 | 596 | 447 | 2 | 2 |
| 60 | 70 | 40 | 0 | −5 | −5 | 540 | 597 | 455 | 2 | 1 |
| 60 | 70 | 40 | 0 | −5 | −5 | 550 | 595 | 455 | 3 | 2 |
| 60 | 70 | 40 | 0 | −5 | −5 | 560 | 592 | 455 | 3 | 2 |
| 60 | 70 | 40 | 0 | −5 | −5 | 570 | 591 | 454 | 3 | 2 |
| 60 | 70 | 40 | 0 | −5 | −5 | 580 | 592 | 454 | 2 | 2 |
| 60 | 70 | 40 | 0 | −5 | −5 | 590 | 596 | 454 | 2 | 2 |
| 60 | 70 | 40 | 0 | −5 | 0 | 540 | 597 | 451 | 2 | 2 |
| 60 | 70 | 40 | 0 | −5 | 0 | 550 | 595 | 451 | 3 | 2 |
| 60 | 70 | 40 | 0 | −5 | 0 | 560 | 593 | 451 | 3 | 2 |
| 60 | 70 | 40 | 0 | −5 | 0 | 570 | 591 | 451 | 3 | 3 |
| 60 | 70 | 40 | 0 | −5 | 0 | 580 | 593 | 451 | 2 | 3 |
| 60 | 70 | 40 | 0 | −5 | 0 | 590 | 597 | 451 | 2 | 2 |
| 60 | 70 | 40 | 0 | −5 | 5 | 540 | 597 | 448 | 3 | 2 |
| 60 | 70 | 40 | 0 | −5 | 5 | 550 | 594 | 448 | 3 | 2 |
| 60 | 70 | 40 | 0 | −5 | 5 | 560 | 592 | 448 | 3 | 3 |
| 60 | 70 | 40 | 0 | −5 | 5 | 570 | 591 | 448 | 3 | 3 |
| 60 | 70 | 40 | 0 | −5 | 5 | 580 | 593 | 448 | 2 | 3 |
| 60 | 70 | 40 | 0 | −5 | 5 | 590 | 597 | 448 | 2 | 3 |
| 60 | 70 | 40 | 0 | 0 | −5 | 540 | 597 | 455 | 2 | 2 |
| 60 | 70 | 40 | 0 | 0 | −5 | 550 | 595 | 455 | 3 | 2 |
| 60 | 70 | 40 | 0 | 0 | −5 | 560 | 592 | 454 | 3 | 2 |
| 60 | 70 | 40 | 0 | 0 | −5 | 570 | 592 | 454 | 3 | 2 |
| 60 | 70 | 40 | 0 | 0 | −5 | 580 | 594 | 454 | 2 | 2 |
| 60 | 70 | 40 | 0 | 0 | 0 | 540 | 597 | 452 | 3 | 2 |
| 60 | 70 | 40 | 0 | 0 | 0 | 550 | 595 | 451 | 3 | 2 |
| 60 | 70 | 40 | 0 | 0 | 0 | 560 | 593 | 451 | 3 | 3 |
| 60 | 70 | 40 | 0 | 0 | 0 | 570 | 592 | 451 | 3 | 3 |
| 60 | 70 | 40 | 0 | 0 | 0 | 580 | 594 | 451 | 2 | 2 |
| 60 | 70 | 40 | 0 | 0 | 0 | 590 | 598 | 451 | 1 | 1 |
| 60 | 70 | 40 | 0 | 0 | 5 | 540 | 597 | 448 | 3 | 2 |
| 60 | 70 | 40 | 0 | 0 | 5 | 550 | 594 | 448 | 3 | 3 |
| 60 | 70 | 40 | 0 | 0 | 5 | 560 | 593 | 448 | 3 | 3 |
| 60 | 70 | 40 | 0 | 0 | 5 | 570 | 591 | 448 | 3 | 3 |
| 60 | 70 | 40 | 0 | 0 | 5 | 580 | 594 | 448 | 2 | 3 |
| 60 | 70 | 40 | 0 | 0 | 5 | 590 | 599 | 448 | 1 | 1 |
| 60 | 70 | 40 | 0 | 5 | −5 | 540 | 597 | 455 | 3 | 2 |
| 60 | 70 | 40 | 0 | 5 | −5 | 550 | 595 | 454 | 3 | 2 |
| 60 | 70 | 40 | 0 | 5 | −5 | 560 | 592 | 454 | 3 | 3 |
| 60 | 70 | 40 | 0 | 5 | −5 | 570 | 593 | 454 | 2 | 2 |
| 60 | 70 | 40 | 0 | 5 | 0 | 540 | 597 | 451 | 3 | 2 |
| 60 | 70 | 40 | 0 | 5 | 0 | 550 | 595 | 451 | 3 | 3 |
| 60 | 70 | 40 | 0 | 5 | 0 | 560 | 593 | 451 | 3 | 3 |
| 60 | 70 | 40 | 0 | 5 | 0 | 570 | 593 | 451 | 2 | 2 |
| 60 | 70 | 40 | 0 | 5 | 0 | 580 | 595 | 451 | 1 | 1 |
| 60 | 70 | 40 | 0 | 5 | 5 | 540 | 597 | 448 | 3 | 2 |
| 60 | 70 | 40 | 0 | 5 | 5 | 550 | 594 | 448 | 3 | 3 |
| 60 | 70 | 40 | 0 | 5 | 5 | 560 | 593 | 448 | 3 | 3 |
| 60 | 70 | 40 | 0 | 5 | 5 | 570 | 592 | 448 | 3 | 3 |
| 60 | 70 | 40 | 0 | 5 | 5 | 580 | 595 | 448 | 1 | 2 |
| 60 | 70 | 40 | 5 | −5 | −5 | 540 | 595 | 455 | 1 | 1 |
| 60 | 70 | 40 | 5 | −5 | −5 | 550 | 593 | 454 | 3 | 2 |
| 60 | 70 | 40 | 5 | −5 | −5 | 560 | 590 | 454 | 3 | 2 |
| 60 | 70 | 40 | 5 | −5 | −5 | 570 | 589 | 454 | 2 | 2 |
| 60 | 70 | 40 | 5 | −5 | −5 | 580 | 590 | 454 | 2 | 2 |
| 60 | 70 | 40 | 5 | −5 | −5 | 590 | 594 | 454 | 1 | 2 |
| 60 | 70 | 40 | 5 | −5 | 0 | 540 | 595 | 452 | 2 | 2 |
| 60 | 70 | 40 | 5 | −5 | 0 | 550 | 592 | 451 | 3 | 2 |
| 60 | 70 | 40 | 5 | −5 | 0 | 560 | 590 | 451 | 3 | 2 |
| 60 | 70 | 40 | 5 | −5 | 0 | 570 | 588 | 451 | 3 | 2 |
| 60 | 70 | 40 | 5 | −5 | 0 | 580 | 590 | 451 | 2 | 2 |
| 60 | 70 | 40 | 5 | −5 | 0 | 590 | 594 | 451 | 1 | 2 |
| 60 | 70 | 40 | 5 | −5 | 5 | 540 | 594 | 449 | 3 | 2 |
| 60 | 70 | 40 | 5 | −5 | 5 | 550 | 593 | 448 | 3 | 2 |
| 60 | 70 | 40 | 5 | −5 | 5 | 560 | 590 | 448 | 3 | 2 |
| 60 | 70 | 40 | 5 | −5 | 5 | 570 | 589 | 447 | 3 | 2 |
| 60 | 70 | 40 | 5 | −5 | 5 | 580 | 590 | 447 | 2 | 2 |
| 60 | 70 | 40 | 5 | −5 | 5 | 590 | 594 | 448 | 2 | 2 |

TABLE I-continued

Peak wavelength tolerances based on single-peak symmetric or asymmetric channel sensitivities for three channel cameras with μ-factor of .98 or larger

| Sensitivity | | | | | | Green Center Peaks in | | | | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 70 | 40 | 5 | 0 | −5 | 540 | 595 | 454 | 2 | 2 |
| 60 | 70 | 40 | 5 | 0 | −5 | 550 | 592 | 454 | 3 | 2 |
| 60 | 70 | 40 | 5 | 0 | −5 | 560 | 590 | 454 | 3 | 2 |
| 60 | 70 | 40 | 5 | 0 | −5 | 570 | 589 | 454 | 2 | 2 |
| 60 | 70 | 40 | 5 | 0 | −5 | 580 | 591 | 454 | 2 | 2 |
| 60 | 70 | 40 | 5 | 0 | −5 | 590 | 595 | 454 | 1 | 2 |
| 60 | 70 | 40 | 5 | 0 | 0 | 540 | 595 | 451 | 2 | 2 |
| 60 | 70 | 40 | 5 | 0 | 0 | 550 | 592 | 451 | 3 | 2 |
| 60 | 70 | 40 | 5 | 0 | 0 | 560 | 590 | 451 | 3 | 2 |
| 60 | 70 | 40 | 5 | 0 | 0 | 570 | 589 | 451 | 3 | 2 |
| 60 | 70 | 40 | 5 | 0 | 0 | 580 | 591 | 451 | 2 | 2 |
| 60 | 70 | 40 | 5 | 0 | 0 | 590 | 595 | 451 | 1 | 2 |
| 60 | 70 | 40 | 5 | 0 | 5 | 540 | 595 | 448 | 3 | 2 |
| 60 | 70 | 40 | 5 | 0 | 5 | 550 | 592 | 448 | 3 | 2 |
| 60 | 70 | 40 | 5 | 0 | 5 | 560 | 590 | 448 | 3 | 3 |
| 60 | 70 | 40 | 5 | 0 | 5 | 570 | 589 | 448 | 3 | 3 |
| 60 | 70 | 40 | 5 | 0 | 5 | 580 | 591 | 448 | 2 | 2 |
| 60 | 70 | 40 | 5 | 0 | 5 | 590 | 596 | 448 | 1 | 2 |
| 60 | 70 | 40 | 5 | 5 | −5 | 540 | 595 | 455 | 2 | 2 |
| 60 | 70 | 40 | 5 | 5 | −5 | 550 | 592 | 454 | 3 | 2 |
| 60 | 70 | 40 | 5 | 5 | −5 | 560 | 590 | 454 | 3 | 2 |
| 60 | 70 | 40 | 5 | 5 | −5 | 570 | 589 | 454 | 2 | 2 |
| 60 | 70 | 40 | 5 | 5 | −5 | 580 | 592 | 454 | 2 | 2 |
| 60 | 70 | 40 | 5 | 5 | 0 | 540 | 595 | 451 | 3 | 2 |
| 60 | 70 | 40 | 5 | 5 | 0 | 550 | 593 | 451 | 3 | 2 |
| 60 | 70 | 40 | 5 | 5 | 0 | 560 | 590 | 451 | 3 | 2 |
| 60 | 70 | 40 | 5 | 5 | 0 | 570 | 590 | 451 | 2 | 2 |
| 60 | 70 | 40 | 5 | 5 | 0 | 580 | 592 | 450 | 2 | 2 |
| 60 | 70 | 40 | 5 | 5 | 5 | 540 | 595 | 448 | 3 | 2 |
| 60 | 70 | 40 | 5 | 5 | 5 | 550 | 592 | 448 | 3 | 3 |
| 60 | 70 | 40 | 5 | 5 | 5 | 560 | 590 | 448 | 3 | 3 |
| 60 | 70 | 40 | 5 | 5 | 5 | 570 | 590 | 448 | 3 | 2 |
| 60 | 70 | 40 | 5 | 5 | 5 | 580 | 592 | 448 | 2 | 2 |
| 60 | 70 | 50 | −5 | −5 | −5 | 560 | 594 | 454 | 2 | 2 |
| 60 | 70 | 50 | −5 | −5 | −5 | 570 | 592 | 455 | 2 | 2 |
| 60 | 70 | 50 | −5 | −5 | −5 | 580 | 595 | 454 | 1 | 2 |
| 60 | 70 | 50 | −5 | −5 | 0 | 550 | 597 | 452 | 2 | 2 |
| 60 | 70 | 50 | −5 | −5 | 0 | 560 | 594 | 452 | 2 | 2 |
| 60 | 70 | 50 | −5 | −5 | 0 | 570 | 593 | 452 | 2 | 2 |
| 60 | 70 | 50 | −5 | −5 | 0 | 580 | 594 | 452 | 2 | 2 |
| 60 | 70 | 50 | −5 | −5 | 5 | 550 | 597 | 450 | 2 | 2 |
| 60 | 70 | 50 | −5 | −5 | 5 | 560 | 593 | 450 | 2 | 2 |
| 60 | 70 | 50 | −5 | −5 | 5 | 570 | 592 | 449 | 2 | 2 |
| 60 | 70 | 50 | −5 | −5 | 5 | 580 | 594 | 449 | 2 | 2 |
| 60 | 70 | 50 | −5 | 0 | −5 | 550 | 597 | 454 | 2 | 2 |
| 60 | 70 | 50 | −5 | 0 | −5 | 560 | 594 | 454 | 2 | 2 |
| 60 | 70 | 50 | −5 | 0 | −5 | 570 | 594 | 454 | 2 | 2 |
| 60 | 70 | 50 | −5 | 0 | 0 | 550 | 596 | 452 | 2 | 2 |
| 60 | 70 | 50 | −5 | 0 | 0 | 560 | 594 | 452 | 2 | 2 |
| 60 | 70 | 50 | −5 | 0 | 0 | 570 | 594 | 451 | 2 | 2 |
| 60 | 70 | 50 | −5 | 0 | 5 | 550 | 597 | 450 | 2 | 2 |
| 60 | 70 | 50 | −5 | 0 | 5 | 560 | 595 | 449 | 2 | 2 |
| 60 | 70 | 50 | −5 | 0 | 5 | 570 | 593 | 449 | 2 | 2 |
| 60 | 70 | 50 | −5 | 5 | −5 | 550 | 597 | 455 | 2 | 2 |
| 60 | 70 | 50 | −5 | 5 | −5 | 560 | 595 | 454 | 2 | 2 |
| 60 | 70 | 50 | −5 | 5 | 0 | 550 | 597 | 452 | 2 | 2 |
| 60 | 70 | 50 | −5 | 5 | 0 | 560 | 595 | 452 | 2 | 2 |
| 60 | 70 | 50 | −5 | 5 | 5 | 540 | 599 | 450 | 1 | 1 |
| 60 | 70 | 50 | −5 | 5 | 5 | 550 | 597 | 449 | 2 | 2 |
| 60 | 70 | 50 | −5 | 5 | 5 | 560 | 595 | 449 | 2 | 2 |
| 60 | 70 | 50 | 0 | −5 | −5 | 560 | 591 | 455 | 2 | 1 |
| 60 | 70 | 50 | 0 | −5 | −5 | 570 | 590 | 454 | 1 | 1 |
| 60 | 70 | 50 | 0 | −5 | −5 | 580 | 591 | 454 | 1 | 2 |
| 60 | 70 | 50 | 0 | −5 | −5 | 590 | 596 | 454 | 1 | 1 |
| 60 | 70 | 50 | 0 | −5 | 0 | 550 | 594 | 453 | 2 | 1 |
| 60 | 70 | 50 | 0 | −5 | 0 | 560 | 591 | 452 | 2 | 2 |
| 60 | 70 | 50 | 0 | −5 | 0 | 570 | 590 | 452 | 2 | 2 |
| 60 | 70 | 50 | 0 | −5 | 0 | 580 | 592 | 451 | 2 | 2 |
| 60 | 70 | 50 | 0 | −5 | 0 | 590 | 596 | 452 | 1 | 2 |
| 60 | 70 | 50 | 0 | −5 | 5 | 550 | 594 | 450 | 2 | 2 |
| 60 | 70 | 50 | 0 | −5 | 5 | 560 | 591 | 449 | 2 | 2 |
| 60 | 70 | 50 | 0 | −5 | 5 | 570 | 590 | 449 | 2 | 2 |

TABLE I-continued

Peak wavelength tolerances based on single-peak symmetric or asymmetric channel sensitivities for three channel cameras with μ-factor of .98 or larger

| Sensitivity | | | | | | Green Center Peaks in | | | | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 70 | 50 | 0 | −5 | 5 | 580 | 592 | 449 | 2 | 2 |
| 60 | 70 | 50 | 0 | −5 | 5 | 590 | 596 | 449 | 1 | 2 |
| 60 | 70 | 50 | 0 | 0 | −5 | 550 | 594 | 455 | 1 | 1 |
| 60 | 70 | 50 | 0 | 0 | −5 | 560 | 591 | 454 | 2 | 2 |
| 60 | 70 | 50 | 0 | 0 | −5 | 570 | 590 | 454 | 2 | 2 |
| 60 | 70 | 50 | 0 | 0 | −5 | 580 | 593 | 454 | 1 | 1 |
| 60 | 70 | 50 | 0 | 0 | 0 | 550 | 594 | 452 | 2 | 2 |
| 60 | 70 | 50 | 0 | 0 | 0 | 560 | 592 | 451 | 2 | 2 |
| 60 | 70 | 50 | 0 | 0 | 0 | 570 | 591 | 452 | 2 | 2 |
| 60 | 70 | 50 | 0 | 0 | 0 | 580 | 593 | 452 | 1 | 2 |
| 60 | 70 | 50 | 0 | 0 | 5 | 550 | 594 | 449 | 2 | 2 |
| 60 | 70 | 50 | 0 | 0 | 5 | 560 | 591 | 449 | 2 | 2 |
| 60 | 70 | 50 | 0 | 0 | 5 | 570 | 591 | 448 | 2 | 2 |
| 60 | 70 | 50 | 0 | 0 | 5 | 580 | 593 | 449 | 1 | 2 |
| 60 | 70 | 50 | 0 | 5 | −5 | 550 | 594 | 454 | 2 | 2 |
| 60 | 70 | 50 | 0 | 5 | −5 | 560 | 592 | 454 | 2 | 2 |
| 60 | 70 | 50 | 0 | 5 | −5 | 570 | 592 | 454 | 1 | 1 |
| 60 | 70 | 50 | 0 | 5 | 0 | 550 | 594 | 451 | 2 | 2 |
| 60 | 70 | 50 | 0 | 5 | 0 | 560 | 592 | 451 | 2 | 2 |
| 60 | 70 | 50 | 0 | 5 | 0 | 570 | 591 | 451 | 1 | 2 |
| 60 | 70 | 50 | 0 | 5 | 5 | 550 | 594 | 449 | 2 | 2 |
| 60 | 70 | 50 | 0 | 5 | 5 | 560 | 592 | 448 | 2 | 2 |
| 60 | 70 | 50 | 0 | 5 | 5 | 570 | 592 | 449 | 2 | 2 |
| 60 | 70 | 50 | 5 | −5 | 5 | 550 | 592 | 449 | 1 | 1 |
| 60 | 70 | 50 | 5 | −5 | 5 | 560 | 589 | 449 | 2 | 2 |
| 60 | 70 | 50 | 5 | 0 | 0 | 550 | 592 | 452 | 1 | 1 |
| 60 | 70 | 50 | 5 | 0 | 0 | 560 | 589 | 451 | 2 | 1 |
| 60 | 70 | 50 | 5 | 0 | 0 | 570 | 589 | 451 | 1 | 1 |
| 60 | 70 | 50 | 5 | 0 | 0 | 580 | 590 | 451 | 1 | 1 |
| 60 | 70 | 50 | 5 | 0 | 5 | 550 | 591 | 450 | 2 | 2 |
| 60 | 70 | 50 | 5 | 0 | 5 | 560 | 589 | 449 | 2 | 2 |
| 60 | 70 | 50 | 5 | 0 | 5 | 570 | 588 | 449 | 2 | 2 |
| 60 | 70 | 50 | 5 | 0 | 5 | 580 | 590 | 448 | 1 | 1 |
| 60 | 70 | 50 | 5 | 5 | −5 | 560 | 590 | 454 | 1 | 1 |
| 60 | 70 | 50 | 5 | 5 | 0 | 550 | 592 | 451 | 1 | 1 |
| 60 | 70 | 50 | 5 | 5 | 0 | 560 | 590 | 452 | 2 | 2 |
| 60 | 70 | 50 | 5 | 5 | 0 | 570 | 588 | 451 | 2 | 1 |
| 60 | 70 | 50 | 5 | 5 | 5 | 550 | 591 | 449 | 2 | 2 |
| 60 | 70 | 50 | 5 | 5 | 5 | 560 | 589 | 449 | 2 | 2 |
| 60 | 70 | 50 | 5 | 5 | 5 | 570 | 589 | 448 | 1 | 1 |
| 70 | 50 | 30 | −5 | −5 | 0 | 540 | 592 | 450 | 2 | 2 |
| 70 | 50 | 30 | −5 | −5 | 0 | 550 | 587 | 450 | 2 | 1 |
| 70 | 50 | 30 | −5 | −5 | 5 | 540 | 592 | 446 | 3 | 2 |
| 70 | 50 | 30 | −5 | −5 | 5 | 550 | 587 | 446 | 2 | 1 |
| 70 | 50 | 30 | −5 | 0 | −5 | 540 | 590 | 454 | 2 | 1 |
| 70 | 50 | 30 | −5 | 0 | 0 | 540 | 590 | 450 | 3 | 2 |
| 70 | 50 | 30 | −5 | 0 | 5 | 540 | 590 | 446 | 3 | 2 |
| 70 | 50 | 30 | −5 | 5 | −5 | 540 | 589 | 454 | 1 | 1 |
| 70 | 50 | 30 | −5 | 5 | 0 | 540 | 589 | 450 | 3 | 2 |
| 70 | 50 | 30 | −5 | 5 | 5 | 540 | 589 | 446 | 3 | 2 |
| 70 | 50 | 30 | 0 | −5 | 0 | 540 | 589 | 450 | 2 | 1 |
| 70 | 50 | 30 | 0 | −5 | 0 | 550 | 581 | 450 | 3 | 1 |
| 70 | 50 | 30 | 0 | −5 | 5 | 540 | 588 | 446 | 3 | 1 |
| 70 | 50 | 30 | 0 | −5 | 5 | 550 | 581 | 446 | 3 | 2 |
| 70 | 50 | 30 | 0 | 0 | −5 | 540 | 587 | 454 | 2 | 1 |
| 70 | 50 | 30 | 0 | 0 | 0 | 540 | 586 | 450 | 3 | 2 |
| 70 | 50 | 30 | 0 | 0 | 5 | 540 | 585 | 446 | 3 | 2 |
| 70 | 50 | 30 | 0 | 5 | 0 | 540 | 585 | 450 | 3 | 2 |
| 70 | 50 | 30 | 0 | 5 | 5 | 540 | 585 | 446 | 3 | 2 |
| 70 | 50 | 30 | 5 | −5 | −5 | 550 | 575 | 454 | 2 | 1 |
| 70 | 50 | 30 | 5 | −5 | 0 | 550 | 575 | 450 | 3 | 2 |
| 70 | 50 | 30 | 5 | −5 | 5 | 540 | 586 | 446 | 2 | 1 |
| 70 | 50 | 30 | 5 | −5 | 5 | 550 | 576 | 446 | 3 | 2 |
| 70 | 50 | 30 | 5 | 0 | 0 | 540 | 581 | 450 | 3 | 2 |
| 70 | 50 | 30 | 5 | 0 | 5 | 540 | 581 | 446 | 3 | 2 |
| 70 | 50 | 30 | 5 | 5 | 0 | 540 | 580 | 450 | 3 | 1 |
| 70 | 50 | 30 | 5 | 5 | 5 | 540 | 579 | 446 | 3 | 2 |
| 70 | 50 | 40 | −5 | −5 | −5 | 540 | 591 | 454 | 3 | 2 |
| 70 | 50 | 40 | −5 | −5 | −5 | 550 | 586 | 454 | 3 | 2 |
| 70 | 50 | 40 | −5 | −5 | 0 | 540 | 591 | 451 | 4 | 2 |
| 70 | 50 | 40 | −5 | −5 | 0 | 550 | 586 | 451 | 4 | 2 |
| 70 | 50 | 40 | −5 | −5 | 5 | 540 | 591 | 447 | 4 | 2 |

TABLE I-continued

Peak wavelength tolerances based on single-peak symmetric or asymmetric channel sensitivities for three channel cameras with μ-factor of .98 or larger

| Sensitivity | | | | | | Green | Center Peaks in | | | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 70 | 50 | 40 | −5 | −5 | 5 | 550 | 587 | 448 | 4 | 2 |
| 70 | 50 | 40 | −5 | 0 | −5 | 540 | 590 | 454 | 4 | 2 |
| 70 | 50 | 40 | −5 | 0 | 0 | 540 | 589 | 451 | 4 | 2 |
| 70 | 50 | 40 | −5 | 0 | 5 | 540 | 589 | 448 | 4 | 3 |
| 70 | 50 | 40 | −5 | 5 | −5 | 540 | 589 | 454 | 3 | 2 |
| 70 | 50 | 40 | −5 | 5 | 0 | 530 | 594 | 451 | 2 | 1 |
| 70 | 50 | 40 | −5 | 5 | 0 | 540 | 589 | 451 | 4 | 2 |
| 70 | 50 | 40 | −5 | 5 | 5 | 530 | 594 | 448 | 3 | 2 |
| 70 | 50 | 40 | −5 | 5 | 5 | 540 | 588 | 447 | 4 | 2 |
| 70 | 50 | 40 | 0 | −5 | −5 | 540 | 588 | 454 | 3 | 2 |
| 70 | 50 | 40 | 0 | −5 | −5 | 550 | 582 | 454 | 4 | 2 |
| 70 | 50 | 40 | 0 | −5 | 0 | 540 | 587 | 451 | 4 | 2 |
| 70 | 50 | 40 | 0 | −5 | 0 | 550 | 582 | 451 | 4 | 2 |
| 70 | 50 | 40 | 0 | −5 | 5 | 540 | 587 | 447 | 4 | 2 |
| 70 | 50 | 40 | 0 | −5 | 5 | 550 | 581 | 447 | 4 | 2 |
| 70 | 50 | 40 | 0 | 0 | −5 | 540 | 585 | 454 | 4 | 2 |
| 70 | 50 | 40 | 0 | 0 | 0 | 540 | 585 | 451 | 4 | 2 |
| 70 | 50 | 40 | 0 | 0 | 5 | 540 | 584 | 448 | 4 | 2 |
| 70 | 50 | 40 | 0 | 0 | 5 | 550 | 582 | 447 | 2 | 1 |
| 70 | 50 | 40 | 0 | 5 | −5 | 540 | 585 | 454 | 4 | 2 |
| 70 | 50 | 40 | 0 | 5 | 0 | 540 | 584 | 451 | 4 | 2 |
| 70 | 50 | 40 | 0 | 5 | 5 | 530 | 592 | 447 | 2 | 1 |
| 70 | 50 | 40 | 0 | 5 | 5 | 540 | 584 | 447 | 4 | 2 |
| 70 | 50 | 40 | 5 | −5 | −5 | 540 | 585 | 454 | 3 | 2 |
| 70 | 50 | 40 | 5 | −5 | −5 | 550 | 576 | 454 | 4 | 2 |
| 70 | 50 | 40 | 5 | −5 | 0 | 540 | 584 | 451 | 4 | 2 |
| 70 | 50 | 40 | 5 | −5 | 0 | 550 | 577 | 451 | 4 | 2 |
| 70 | 50 | 40 | 5 | −5 | 5 | 540 | 583 | 448 | 4 | 2 |
| 70 | 50 | 40 | 5 | −5 | 5 | 550 | 578 | 447 | 4 | 2 |
| 70 | 50 | 40 | 5 | 0 | −5 | 540 | 579 | 454 | 4 | 2 |
| 70 | 50 | 40 | 5 | 0 | 0 | 540 | 579 | 451 | 5 | 2 |
| 70 | 50 | 40 | 5 | 0 | 0 | 550 | 577 | 451 | 2 | 1 |
| 70 | 50 | 40 | 5 | 0 | 5 | 540 | 578 | 447 | 5 | 2 |
| 70 | 50 | 40 | 5 | 0 | 5 | 550 | 577 | 448 | 3 | 2 |
| 70 | 50 | 40 | 5 | 5 | −5 | 540 | 579 | 454 | 4 | 2 |
| 70 | 50 | 40 | 5 | 5 | 0 | 540 | 579 | 451 | 4 | 2 |
| 70 | 50 | 40 | 5 | 5 | 5 | 540 | 578 | 447 | 4 | 2 |
| 70 | 50 | 50 | −5 | 0 | 0 | 540 | 590 | 451 | 2 | 1 |
| 70 | 50 | 50 | −5 | 0 | 5 | 540 | 590 | 448 | 2 | 2 |
| 70 | 50 | 50 | 0 | 0 | 5 | 540 | 586 | 449 | 2 | 1 |
| 70 | 60 | 30 | −5 | −5 | −5 | 550 | 578 | 454 | 4 | 2 |
| 70 | 60 | 30 | −5 | −5 | 0 | 540 | 591 | 450 | 1 | 1 |
| 70 | 60 | 30 | −5 | −5 | 0 | 550 | 579 | 450 | 4 | 2 |
| 70 | 60 | 30 | −5 | −5 | 5 | 540 | 591 | 446 | 2 | 1 |
| 70 | 60 | 30 | −5 | −5 | 5 | 550 | 578 | 446 | 4 | 2 |
| 70 | 60 | 30 | −5 | 0 | −5 | 540 | 589 | 454 | 2 | 1 |
| 70 | 60 | 30 | −5 | 0 | −5 | 550 | 580 | 454 | 3 | 2 |
| 70 | 60 | 30 | −5 | 0 | 0 | 540 | 589 | 450 | 3 | 2 |
| 70 | 60 | 30 | −5 | 0 | 0 | 550 | 580 | 450 | 4 | 2 |
| 70 | 60 | 30 | −5 | 0 | 5 | 540 | 589 | 446 | 3 | 2 |
| 70 | 60 | 30 | −5 | 0 | 5 | 550 | 581 | 446 | 4 | 2 |
| 70 | 60 | 30 | −5 | 5 | −5 | 540 | 587 | 454 | 3 | 2 |
| 70 | 60 | 30 | −5 | 5 | 0 | 540 | 588 | 450 | 3 | 2 |
| 70 | 60 | 30 | −5 | 5 | 0 | 550 | 583 | 450 | 2 | 1 |
| 70 | 60 | 30 | −5 | 5 | 5 | 540 | 587 | 446 | 3 | 2 |
| 70 | 60 | 30 | −5 | 5 | 5 | 550 | 583 | 446 | 3 | 2 |
| 70 | 60 | 30 | 0 | −5 | −5 | 550 | 572 | 454 | 4 | 2 |
| 70 | 60 | 30 | 0 | −5 | 0 | 550 | 574 | 450 | 4 | 2 |
| 70 | 60 | 30 | 0 | −5 | 5 | 550 | 574 | 446 | 4 | 2 |
| 70 | 60 | 30 | 0 | 0 | −5 | 550 | 574 | 454 | 3 | 2 |
| 70 | 60 | 30 | 0 | 0 | 0 | 540 | 587 | 450 | 2 | 1 |
| 70 | 60 | 30 | 0 | 0 | 0 | 550 | 575 | 450 | 4 | 2 |
| 70 | 60 | 30 | 0 | 0 | 5 | 540 | 587 | 446 | 3 | 2 |
| 70 | 60 | 30 | 0 | 0 | 5 | 550 | 576 | 446 | 4 | 2 |
| 70 | 60 | 30 | 0 | 5 | −5 | 540 | 585 | 454 | 2 | 1 |
| 70 | 60 | 30 | 0 | 5 | −5 | 550 | 576 | 454 | 2 | 1 |
| 70 | 60 | 30 | 0 | 5 | 0 | 540 | 584 | 450 | 3 | 2 |
| 70 | 60 | 30 | 0 | 5 | 0 | 550 | 577 | 450 | 3 | 2 |
| 70 | 60 | 30 | 0 | 5 | 5 | 540 | 584 | 446 | 3 | 2 |
| 70 | 60 | 30 | 0 | 5 | 5 | 550 | 578 | 446 | 3 | 2 |
| 70 | 60 | 30 | 5 | −5 | −5 | 550 | 568 | 454 | 4 | 1 |
| 70 | 60 | 30 | 5 | −5 | 0 | 550 | 569 | 450 | 4 | 2 |

TABLE I-continued

Peak wavelength tolerances based on single-peak symmetric or asymmetric channel sensitivities for three channel cameras with μ-factor of .98 or larger

| Sensitivity | | | | | | Green | Center Peaks in | | | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 70 | 60 | 30 | 5 | −5 | 5 | 550 | 570 | 446 | 4 | 2 |
| 70 | 60 | 30 | 5 | 0 | −5 | 550 | 569 | 454 | 3 | 2 |
| 70 | 60 | 30 | 5 | 0 | 0 | 540 | 546 | 450 | 1 | 1 |
| 70 | 60 | 30 | 5 | 0 | 0 | 550 | 570 | 450 | 4 | 2 |
| 70 | 60 | 30 | 5 | 0 | 5 | 540 | 546 | 446 | 1 | 1 |
| 70 | 60 | 30 | 5 | 0 | 5 | 550 | 571 | 446 | 4 | 2 |
| 70 | 60 | 30 | 5 | 5 | 0 | 540 | 583 | 450 | 1 | 1 |
| 70 | 60 | 30 | 5 | 5 | 0 | 550 | 572 | 450 | 2 | 1 |
| 70 | 60 | 30 | 5 | 5 | 5 | 540 | 582 | 446 | 2 | 1 |
| 70 | 60 | 30 | 5 | 5 | 5 | 550 | 572 | 446 | 3 | 2 |
| 70 | 60 | 40 | −5 | −5 | −5 | 540 | 590 | 454 | 3 | 2 |
| 70 | 60 | 40 | −5 | −5 | −5 | 550 | 580 | 454 | 4 | 3 |
| 70 | 60 | 40 | −5 | −5 | 0 | 540 | 590 | 451 | 4 | 2 |
| 70 | 60 | 40 | −5 | −5 | 0 | 550 | 579 | 451 | 5 | 3 |
| 70 | 60 | 40 | −5 | −5 | 5 | 540 | 590 | 448 | 4 | 2 |
| 70 | 60 | 40 | −5 | −5 | 5 | 550 | 580 | 448 | 5 | 3 |
| 70 | 60 | 40 | −5 | 0 | −5 | 540 | 589 | 454 | 4 | 2 |
| 70 | 60 | 40 | −5 | 0 | −5 | 550 | 581 | 454 | 4 | 3 |
| 70 | 60 | 40 | −5 | 0 | 0 | 540 | 588 | 451 | 4 | 2 |
| 70 | 60 | 40 | −5 | 0 | 0 | 550 | 581 | 451 | 4 | 3 |
| 70 | 60 | 40 | −5 | 0 | 5 | 540 | 588 | 448 | 4 | 3 |
| 70 | 60 | 40 | −5 | 0 | 5 | 550 | 581 | 448 | 4 | 3 |
| 70 | 60 | 40 | −5 | 5 | −5 | 540 | 587 | 454 | 4 | 2 |
| 70 | 60 | 40 | −5 | 5 | −5 | 550 | 583 | 454 | 3 | 2 |
| 70 | 60 | 40 | −5 | 5 | 0 | 540 | 587 | 451 | 4 | 2 |
| 70 | 60 | 40 | −5 | 5 | 0 | 550 | 583 | 451 | 3 | 2 |
| 70 | 60 | 40 | −5 | 5 | 5 | 530 | 594 | 448 | 1 | 1 |
| 70 | 60 | 40 | −5 | 5 | 5 | 540 | 587 | 448 | 4 | 3 |
| 70 | 60 | 40 | −5 | 5 | 5 | 550 | 584 | 447 | 3 | 2 |
| 70 | 60 | 40 | 0 | −5 | −5 | 540 | 589 | 455 | 3 | 2 |
| 70 | 60 | 40 | 0 | −5 | −5 | 550 | 576 | 454 | 5 | 3 |
| 70 | 60 | 40 | 0 | −5 | 0 | 540 | 588 | 451 | 3 | 2 |
| 70 | 60 | 40 | 0 | −5 | 0 | 550 | 576 | 451 | 5 | 3 |
| 70 | 60 | 40 | 0 | −5 | 5 | 540 | 587 | 448 | 4 | 2 |
| 70 | 60 | 40 | 0 | −5 | 5 | 550 | 576 | 448 | 5 | 3 |
| 70 | 60 | 40 | 0 | 0 | −5 | 540 | 586 | 454 | 4 | 2 |
| 70 | 60 | 40 | 0 | 0 | −5 | 550 | 577 | 454 | 4 | 2 |
| 70 | 60 | 40 | 0 | 0 | 0 | 540 | 585 | 451 | 4 | 2 |
| 70 | 60 | 40 | 0 | 0 | 0 | 550 | 576 | 451 | 4 | 3 |
| 70 | 60 | 40 | 0 | 0 | 5 | 540 | 584 | 448 | 4 | 2 |
| 70 | 60 | 40 | 0 | 0 | 5 | 550 | 578 | 448 | 4 | 3 |
| 70 | 60 | 40 | 0 | 5 | −5 | 540 | 583 | 454 | 4 | 2 |
| 70 | 60 | 40 | 0 | 5 | −5 | 550 | 579 | 454 | 3 | 2 |
| 70 | 60 | 40 | 0 | 5 | 0 | 540 | 582 | 451 | 4 | 2 |
| 70 | 60 | 40 | 0 | 5 | 0 | 550 | 579 | 451 | 4 | 2 |
| 70 | 60 | 40 | 0 | 5 | 5 | 540 | 582 | 448 | 4 | 2 |
| 70 | 60 | 40 | 0 | 5 | 5 | 550 | 579 | 447 | 4 | 2 |
| 70 | 60 | 40 | 5 | −5 | −5 | 540 | 586 | 454 | 2 | 2 |
| 70 | 60 | 40 | 5 | −5 | −5 | 540 | 542 | 455 | 1 | 1 |
| 70 | 60 | 40 | 5 | −5 | −5 | 550 | 571 | 454 | 4 | 2 |
| 70 | 60 | 40 | 5 | −5 | 0 | 540 | 586 | 451 | 3 | 2 |
| 70 | 60 | 40 | 5 | −5 | 0 | 540 | 543 | 451 | 1 | 2 |
| 70 | 60 | 40 | 5 | −5 | 0 | 550 | 572 | 451 | 4 | 3 |
| 70 | 60 | 40 | 5 | −5 | 5 | 540 | 585 | 448 | 3 | 2 |
| 70 | 60 | 40 | 5 | −5 | 5 | 540 | 544 | 448 | 1 | 2 |
| 70 | 60 | 40 | 5 | −5 | 5 | 550 | 574 | 448 | 5 | 3 |
| 70 | 60 | 40 | 5 | 0 | −5 | 540 | 547 | 454 | 2 | 2 |
| 70 | 60 | 40 | 5 | 0 | −5 | 540 | 584 | 455 | 3 | 2 |
| 70 | 60 | 40 | 5 | 0 | −5 | 550 | 572 | 454 | 4 | 2 |
| 70 | 60 | 40 | 5 | 0 | 0 | 540 | 547 | 451 | 2 | 2 |
| 70 | 60 | 40 | 5 | 0 | 0 | 540 | 583 | 451 | 4 | 2 |
| 70 | 60 | 40 | 5 | 0 | 0 | 550 | 573 | 451 | 4 | 2 |
| 70 | 60 | 40 | 5 | 0 | 5 | 540 | 548 | 447 | 2 | 2 |
| 70 | 60 | 40 | 5 | 0 | 5 | 540 | 582 | 448 | 4 | 2 |
| 70 | 60 | 40 | 5 | 0 | 5 | 550 | 574 | 448 | 4 | 3 |
| 70 | 60 | 40 | 5 | 5 | −5 | 540 | 580 | 454 | 4 | 2 |
| 70 | 60 | 40 | 5 | 5 | −5 | 540 | 553 | 454 | 2 | 2 |
| 70 | 60 | 40 | 5 | 5 | −5 | 550 | 574 | 454 | 3 | 2 |
| 70 | 60 | 40 | 5 | 5 | 0 | 540 | 572 | 451 | 4 | 2 |
| 70 | 60 | 40 | 5 | 5 | 0 | 550 | 575 | 451 | 4 | 2 |
| 70 | 60 | 40 | 5 | 5 | 5 | 540 | 572 | 448 | 5 | 2 |
| 70 | 60 | 40 | 5 | 5 | 5 | 550 | 575 | 447 | 4 | 2 |

TABLE I-continued

Peak wavelength tolerances based on single-peak symmetric or asymmetric channel sensitivities for three channel cameras with μ-factor of .98 or larger

| Sensitivity | | | | | | Green | Center Peaks in | | | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 70 | 60 | 50 | −5 | −5 | −5 | 550 | 579 | 454 | 3 | 2 |
| 70 | 60 | 50 | −5 | −5 | 0 | 550 | 578 | 452 | 4 | 2 |
| 70 | 60 | 50 | −5 | −5 | 5 | 540 | 591 | 450 | 2 | 1 |
| 70 | 60 | 50 | −5 | −5 | 5 | 550 | 578 | 449 | 4 | 2 |
| 70 | 60 | 50 | −5 | 0 | −5 | 550 | 579 | 454 | 3 | 2 |
| 70 | 60 | 50 | −5 | 0 | 0 | 540 | 589 | 452 | 2 | 1 |
| 70 | 60 | 50 | −5 | 0 | 0 | 550 | 580 | 451 | 3 | 2 |
| 70 | 60 | 50 | −5 | 0 | 5 | 540 | 589 | 449 | 3 | 2 |
| 70 | 60 | 50 | −5 | 0 | 5 | 550 | 580 | 449 | 3 | 2 |
| 70 | 60 | 50 | −5 | 5 | −5 | 540 | 588 | 455 | 1 | 1 |
| 70 | 60 | 50 | −5 | 5 | 0 | 540 | 588 | 452 | 2 | 2 |
| 70 | 60 | 50 | −5 | 5 | 5 | 540 | 587 | 449 | 3 | 2 |
| 70 | 60 | 50 | 0 | −5 | −5 | 550 | 571 | 454 | 4 | 2 |
| 70 | 60 | 50 | 0 | −5 | 0 | 550 | 572 | 452 | 4 | 2 |
| 70 | 60 | 50 | 0 | −5 | 5 | 550 | 572 | 449 | 4 | 2 |
| 70 | 60 | 50 | 0 | 0 | −5 | 550 | 572 | 454 | 3 | 2 |
| 70 | 60 | 50 | 0 | 0 | 0 | 550 | 574 | 451 | 3 | 2 |
| 70 | 60 | 50 | 0 | 0 | 5 | 540 | 586 | 449 | 2 | 1 |
| 70 | 60 | 50 | 0 | 0 | 5 | 550 | 573 | 449 | 3 | 2 |
| 70 | 60 | 50 | 0 | 5 | 5 | 540 | 584 | 449 | 2 | 1 |
| 70 | 60 | 50 | 5 | −5 | −5 | 550 | 564 | 455 | 3 | 2 |
| 70 | 60 | 50 | 5 | −5 | 0 | 550 | 566 | 452 | 4 | 2 |
| 70 | 60 | 50 | 5 | −5 | 5 | 550 | 568 | 449 | 4 | 2 |
| 70 | 60 | 50 | 5 | 0 | −5 | 550 | 565 | 454 | 2 | 1 |
| 70 | 60 | 50 | 5 | 0 | 0 | 550 | 567 | 451 | 3 | 2 |
| 70 | 60 | 50 | 5 | 0 | 5 | 550 | 568 | 449 | 3 | 2 |
| 70 | 70 | 30 | −5 | −5 | 0 | 560 | 580 | 450 | 2 | 1 |
| 70 | 70 | 30 | −5 | −5 | 0 | 570 | 574 | 450 | 1 | 1 |
| 70 | 70 | 30 | −5 | −5 | 5 | 560 | 580 | 446 | 3 | 2 |
| 70 | 70 | 30 | −5 | −5 | 5 | 570 | 575 | 446 | 2 | 1 |
| 70 | 70 | 30 | −5 | 0 | −5 | 560 | 580 | 454 | 3 | 2 |
| 70 | 70 | 30 | −5 | 0 | 0 | 550 | 587 | 450 | 2 | 1 |
| 70 | 70 | 30 | −5 | 0 | 0 | 560 | 580 | 450 | 3 | 2 |
| 70 | 70 | 30 | −5 | 0 | 0 | 570 | 581 | 450 | 1 | 1 |
| 70 | 70 | 30 | −5 | 0 | 5 | 550 | 587 | 446 | 2 | 2 |
| 70 | 70 | 30 | −5 | 0 | 5 | 560 | 581 | 446 | 3 | 2 |
| 70 | 70 | 30 | −5 | 0 | 5 | 570 | 581 | 446 | 2 | 2 |
| 70 | 70 | 30 | −5 | 5 | −5 | 550 | 586 | 454 | 2 | 1 |
| 70 | 70 | 30 | −5 | 5 | −5 | 560 | 583 | 454 | 2 | 2 |
| 70 | 70 | 30 | −5 | 5 | 0 | 550 | 587 | 450 | 3 | 2 |
| 70 | 70 | 30 | −5 | 5 | 0 | 560 | 584 | 450 | 2 | 2 |
| 70 | 70 | 30 | −5 | 5 | 5 | 550 | 586 | 446 | 3 | 2 |
| 70 | 70 | 30 | −5 | 5 | 5 | 560 | 584 | 446 | 3 | 2 |
| 70 | 70 | 30 | 0 | 0 | 0 | 560 | 578 | 450 | 1 | 1 |
| 70 | 70 | 30 | 0 | 0 | 0 | 570 | 572 | 450 | 1 | 1 |
| 70 | 70 | 30 | 0 | 0 | 5 | 560 | 578 | 446 | 2 | 1 |
| 70 | 70 | 30 | 0 | 0 | 5 | 570 | 573 | 446 | 1 | 1 |
| 70 | 70 | 30 | 0 | 5 | −5 | 560 | 577 | 454 | 2 | 2 |
| 70 | 70 | 30 | 0 | 5 | 0 | 550 | 584 | 450 | 2 | 1 |
| 70 | 70 | 30 | 0 | 5 | 0 | 560 | 578 | 450 | 3 | 2 |
| 70 | 70 | 30 | 0 | 5 | 5 | 550 | 584 | 446 | 2 | 1 |
| 70 | 70 | 30 | 0 | 5 | 5 | 560 | 578 | 446 | 3 | 2 |
| 70 | 70 | 40 | −5 | −5 | −5 | 550 | 587 | 455 | 3 | 2 |
| 70 | 70 | 40 | −5 | −5 | −5 | 560 | 579 | 454 | 3 | 2 |
| 70 | 70 | 40 | −5 | −5 | −5 | 570 | 577 | 454 | 2 | 2 |
| 70 | 70 | 40 | −5 | −5 | 0 | 540 | 593 | 452 | 1 | 1 |
| 70 | 70 | 40 | −5 | −5 | 0 | 550 | 587 | 452 | 3 | 2 |
| 70 | 70 | 40 | −5 | −5 | 0 | 560 | 579 | 451 | 4 | 2 |
| 70 | 70 | 40 | −5 | −5 | 0 | 570 | 578 | 451 | 2 | 2 |
| 70 | 70 | 40 | −5 | −5 | 5 | 540 | 593 | 448 | 2 | 1 |
| 70 | 70 | 40 | −5 | −5 | 5 | 550 | 586 | 448 | 3 | 2 |
| 70 | 70 | 40 | −5 | −5 | 5 | 560 | 579 | 448 | 4 | 2 |
| 70 | 70 | 40 | −5 | −5 | 5 | 570 | 577 | 448 | 2 | 2 |
| 70 | 70 | 40 | −5 | 0 | −5 | 550 | 586 | 454 | 3 | 2 |
| 70 | 70 | 40 | −5 | 0 | −5 | 560 | 581 | 454 | 3 | 2 |
| 70 | 70 | 40 | −5 | 0 | −5 | 570 | 582 | 454 | 2 | 2 |
| 70 | 70 | 40 | −5 | 0 | 0 | 540 | 592 | 452 | 2 | 2 |
| 70 | 70 | 40 | −5 | 0 | 0 | 550 | 587 | 451 | 3 | 2 |
| 70 | 70 | 40 | −5 | 0 | 0 | 560 | 582 | 451 | 3 | 2 |
| 70 | 70 | 40 | −5 | 0 | 0 | 570 | 582 | 451 | 2 | 2 |
| 70 | 70 | 40 | −5 | 0 | 5 | 540 | 592 | 448 | 3 | 2 |
| 70 | 70 | 40 | −5 | 0 | 5 | 550 | 587 | 448 | 4 | 2 |

TABLE I-continued

Peak wavelength tolerances based on single-peak symmetric or asymmetric channel sensitivities for three channel cameras with μ-factor of .98 or larger

| Sensitivity | | | | | | Green | Center Peaks in | | | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 70 | 70 | 40 | −5 | 0 | 5 | 560 | 582 | 448 | 4 | 3 |
| 70 | 70 | 40 | −5 | 0 | 5 | 570 | 582 | 447 | 2 | 2 |
| 70 | 70 | 40 | −5 | 5 | −5 | 540 | 592 | 455 | 2 | 1 |
| 70 | 70 | 40 | −5 | 5 | −5 | 550 | 587 | 454 | 3 | 2 |
| 70 | 70 | 40 | −5 | 5 | −5 | 560 | 584 | 454 | 3 | 2 |
| 70 | 70 | 40 | −5 | 5 | 0 | 540 | 592 | 451 | 3 | 2 |
| 70 | 70 | 40 | −5 | 5 | 0 | 550 | 587 | 451 | 3 | 2 |
| 70 | 70 | 40 | −5 | 5 | 0 | 560 | 584 | 451 | 3 | 3 |
| 70 | 70 | 40 | −5 | 5 | 5 | 540 | 592 | 448 | 3 | 2 |
| 70 | 70 | 40 | −5 | 5 | 5 | 550 | 587 | 448 | 4 | 3 |
| 70 | 70 | 40 | −5 | 5 | 5 | 560 | 585 | 448 | 3 | 3 |
| 70 | 70 | 40 | 0 | −5 | −5 | 550 | 586 | 455 | 2 | 1 |
| 70 | 70 | 40 | 0 | −5 | −5 | 560 | 580 | 455 | 2 | 1 |
| 70 | 70 | 40 | 0 | −5 | 0 | 550 | 586 | 451 | 3 | 2 |
| 70 | 70 | 40 | 0 | −5 | 0 | 560 | 580 | 451 | 3 | 2 |
| 70 | 70 | 40 | 0 | −5 | 5 | 550 | 586 | 448 | 3 | 2 |
| 70 | 70 | 40 | 0 | −5 | 5 | 560 | 581 | 448 | 3 | 2 |
| 70 | 70 | 40 | 0 | 0 | −5 | 550 | 585 | 455 | 3 | 2 |
| 70 | 70 | 40 | 0 | 0 | −5 | 560 | 578 | 454 | 3 | 2 |
| 70 | 70 | 40 | 0 | 0 | −5 | 570 | 575 | 454 | 2 | 2 |
| 70 | 70 | 40 | 0 | 0 | 0 | 550 | 585 | 451 | 3 | 2 |
| 70 | 70 | 40 | 0 | 0 | 0 | 560 | 576 | 451 | 3 | 2 |
| 70 | 70 | 40 | 0 | 0 | 0 | 570 | 575 | 451 | 2 | 2 |
| 70 | 70 | 40 | 0 | 0 | 5 | 540 | 590 | 449 | 2 | 1 |
| 70 | 70 | 40 | 0 | 0 | 5 | 550 | 585 | 448 | 3 | 2 |
| 70 | 70 | 40 | 0 | 0 | 5 | 560 | 577 | 448 | 4 | 2 |
| 70 | 70 | 40 | 0 | 0 | 5 | 570 | 577 | 448 | 2 | 2 |
| 70 | 70 | 40 | 0 | 5 | −5 | 550 | 585 | 454 | 3 | 2 |
| 70 | 70 | 40 | 0 | 5 | −5 | 560 | 579 | 454 | 3 | 2 |
| 70 | 70 | 40 | 0 | 5 | −5 | 570 | 580 | 455 | 1 | 1 |
| 70 | 70 | 40 | 0 | 5 | 0 | 540 | 590 | 451 | 1 | 1 |
| 70 | 70 | 40 | 0 | 5 | 0 | 550 | 584 | 451 | 3 | 2 |
| 70 | 70 | 40 | 0 | 5 | 0 | 560 | 580 | 451 | 3 | 2 |
| 70 | 70 | 40 | 0 | 5 | 0 | 570 | 581 | 451 | 1 | 2 |
| 70 | 70 | 40 | 0 | 5 | 5 | 540 | 590 | 448 | 2 | 2 |
| 70 | 70 | 40 | 0 | 5 | 5 | 550 | 584 | 448 | 3 | 2 |
| 70 | 70 | 40 | 0 | 5 | 5 | 560 | 580 | 448 | 3 | 2 |
| 70 | 70 | 40 | 0 | 5 | 5 | 570 | 580 | 447 | 2 | 2 |
| 70 | 70 | 40 | 5 | −5 | 0 | 550 | 585 | 452 | 1 | 1 |
| 70 | 70 | 40 | 5 | −5 | 5 | 550 | 585 | 448 | 2 | 2 |
| 70 | 70 | 40 | 5 | 0 | 0 | 550 | 584 | 451 | 2 | 1 |
| 70 | 70 | 40 | 5 | 0 | 0 | 560 | 580 | 452 | 0 | 0 |
| 70 | 70 | 40 | 5 | 0 | 5 | 550 | 584 | 448 | 3 | 2 |
| 70 | 70 | 40 | 5 | 0 | 5 | 560 | 579 | 448 | 2 | 2 |
| 70 | 70 | 40 | 5 | 5 | −5 | 550 | 583 | 455 | 2 | 1 |
| 70 | 70 | 40 | 5 | 5 | −5 | 560 | 575 | 454 | 3 | 2 |
| 70 | 70 | 40 | 5 | 5 | −5 | 570 | 573 | 454 | 1 | 1 |
| 70 | 70 | 40 | 5 | 5 | 0 | 550 | 583 | 451 | 3 | 2 |
| 70 | 70 | 40 | 5 | 5 | 0 | 560 | 575 | 451 | 3 | 2 |
| 70 | 70 | 40 | 5 | 5 | 0 | 570 | 574 | 451 | 1 | 2 |
| 70 | 70 | 40 | 5 | 5 | 5 | 550 | 583 | 447 | 3 | 2 |
| 70 | 70 | 40 | 5 | 5 | 5 | 560 | 575 | 448 | 3 | 2 |
| 70 | 70 | 40 | 5 | 5 | 5 | 570 | 574 | 447 | 1 | 2 |
| 70 | 70 | 50 | −5 | −5 | 5 | 560 | 578 | 450 | 2 | 2 |
| 70 | 70 | 50 | −5 | −5 | 5 | 570 | 573 | 449 | 1 | 1 |
| 70 | 70 | 50 | −5 | 0 | −5 | 560 | 580 | 454 | 2 | 2 |
| 70 | 70 | 50 | −5 | 0 | 0 | 560 | 579 | 452 | 2 | 2 |
| 70 | 70 | 50 | −5 | 0 | 5 | 550 | 586 | 450 | 2 | 2 |
| 70 | 70 | 50 | −5 | 0 | 5 | 560 | 580 | 449 | 3 | 2 |
| 70 | 70 | 50 | −5 | 5 | −5 | 550 | 586 | 454 | 1 | 1 |
| 70 | 70 | 50 | −5 | 5 | −5 | 560 | 583 | 454 | 2 | 2 |
| 70 | 70 | 50 | −5 | 5 | 0 | 550 | 586 | 452 | 2 | 2 |
| 70 | 70 | 50 | −5 | 5 | 0 | 560 | 583 | 451 | 2 | 2 |
| 70 | 70 | 50 | −5 | 5 | 5 | 550 | 586 | 449 | 2 | 2 |
| 70 | 70 | 50 | −5 | 5 | 5 | 560 | 583 | 449 | 2 | 2 |
| 70 | 70 | 50 | 0 | 5 | −5 | 560 | 576 | 454 | 1 | 1 |
| 70 | 70 | 50 | 0 | 5 | 0 | 560 | 577 | 452 | 2 | 2 |
| 70 | 70 | 50 | 0 | 5 | 5 | 560 | 577 | 449 | 2 | 2 |

TABLE II

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 50 | 30 | −5 | −5 | −5 | 530 | 604 | 454 | 3 | 2 |
| 50 | 50 | 30 | −5 | −5 | −5 | 540 | 604 | 454 | 4 | 3 |
| 50 | 50 | 30 | −5 | −5 | −5 | 550 | 601 | 454 | 4 | 3 |
| 50 | 50 | 30 | −5 | −5 | −5 | 560 | 595 | 454 | 3 | 2 |
| 50 | 50 | 30 | −5 | −5 | 0 | 530 | 604 | 450 | 3 | 2 |
| 50 | 50 | 30 | −5 | −5 | 0 | 540 | 603 | 450 | 4 | 3 |
| 50 | 50 | 30 | −5 | −5 | 0 | 550 | 600 | 450 | 4 | 3 |
| 50 | 50 | 30 | −5 | −5 | 0 | 560 | 595 | 450 | 3 | 2 |
| 50 | 50 | 30 | −5 | −5 | 5 | 530 | 604 | 446 | 3 | 2 |
| 50 | 50 | 30 | −5 | −5 | 5 | 540 | 603 | 446 | 4 | 3 |
| 50 | 50 | 30 | −5 | −5 | 5 | 550 | 600 | 446 | 4 | 3 |
| 50 | 50 | 30 | −5 | −5 | 5 | 560 | 595 | 446 | 3 | 2 |
| 50 | 50 | 30 | −5 | 0 | −5 | 530 | 604 | 454 | 3 | 3 |
| 50 | 50 | 30 | −5 | 0 | −5 | 540 | 603 | 454 | 4 | 3 |
| 50 | 50 | 30 | −5 | 0 | −5 | 550 | 600 | 454 | 4 | 3 |
| 50 | 50 | 30 | −5 | 0 | 0 | 530 | 605 | 450 | 3 | 3 |
| 50 | 50 | 30 | −5 | 0 | 0 | 540 | 603 | 450 | 4 | 3 |
| 50 | 50 | 30 | −5 | 0 | 0 | 550 | 600 | 450 | 4 | 3 |
| 50 | 50 | 30 | −5 | 0 | 5 | 530 | 604 | 446 | 3 | 3 |
| 50 | 50 | 30 | −5 | 0 | 5 | 540 | 602 | 446 | 4 | 3 |
| 50 | 50 | 30 | −5 | 0 | 5 | 550 | 600 | 446 | 4 | 3 |
| 50 | 50 | 30 | −5 | 0 | 5 | 560 | 595 | 446 | 1 | 1 |
| 50 | 50 | 30 | −5 | 5 | −5 | 530 | 604 | 454 | 4 | 3 |
| 50 | 50 | 30 | −5 | 5 | −5 | 540 | 602 | 454 | 4 | 3 |
| 50 | 50 | 30 | −5 | 5 | −5 | 550 | 600 | 454 | 3 | 2 |
| 50 | 50 | 30 | −5 | 5 | 0 | 530 | 604 | 450 | 4 | 3 |
| 50 | 50 | 30 | −5 | 5 | 0 | 540 | 603 | 450 | 4 | 3 |
| 50 | 50 | 30 | −5 | 5 | 0 | 550 | 599 | 450 | 3 | 2 |
| 50 | 50 | 30 | −5 | 5 | 5 | 530 | 604 | 446 | 4 | 3 |
| 50 | 50 | 30 | −5 | 5 | 5 | 540 | 602 | 446 | 4 | 3 |
| 50 | 50 | 30 | −5 | 5 | 5 | 550 | 599 | 446 | 3 | 2 |
| 50 | 50 | 30 | 0 | −5 | −5 | 530 | 601 | 454 | 3 | 2 |
| 50 | 50 | 30 | 0 | −5 | −5 | 540 | 600 | 454 | 4 | 3 |
| 50 | 50 | 30 | 0 | −5 | −5 | 550 | 597 | 454 | 4 | 3 |
| 50 | 50 | 30 | 0 | −5 | −5 | 560 | 590 | 454 | 3 | 2 |
| 50 | 50 | 30 | 0 | −5 | −5 | 570 | 575 | 454 | 2 | 2 |
| 50 | 50 | 30 | 0 | −5 | 0 | 530 | 601 | 450 | 3 | 2 |
| 50 | 50 | 30 | 0 | −5 | 0 | 540 | 600 | 450 | 4 | 3 |
| 50 | 50 | 30 | 0 | −5 | 0 | 550 | 597 | 450 | 4 | 3 |
| 50 | 50 | 30 | 0 | −5 | 0 | 560 | 590 | 450 | 4 | 2 |
| 50 | 50 | 30 | 0 | −5 | 0 | 570 | 575 | 450 | 2 | 2 |
| 50 | 50 | 30 | 0 | −5 | 5 | 530 | 601 | 446 | 3 | 2 |
| 50 | 50 | 30 | 0 | −5 | 5 | 540 | 600 | 446 | 4 | 3 |
| 50 | 50 | 30 | 0 | −5 | 5 | 550 | 597 | 446 | 4 | 3 |
| 50 | 50 | 30 | 0 | −5 | 5 | 560 | 590 | 446 | 4 | 2 |
| 50 | 50 | 30 | 0 | −5 | 5 | 570 | 576 | 446 | 2 | 2 |
| 50 | 50 | 30 | 0 | 0 | −5 | 530 | 601 | 454 | 3 | 3 |
| 50 | 50 | 30 | 0 | 0 | −5 | 540 | 599 | 454 | 4 | 3 |
| 50 | 50 | 30 | 0 | 0 | −5 | 550 | 596 | 454 | 4 | 3 |
| 50 | 50 | 30 | 0 | 0 | −5 | 560 | 589 | 454 | 1 | 1 |
| 50 | 50 | 30 | 0 | 0 | 0 | 530 | 601 | 450 | 3 | 3 |
| 50 | 50 | 30 | 0 | 0 | 0 | 540 | 600 | 450 | 4 | 3 |
| 50 | 50 | 30 | 0 | 0 | 0 | 550 | 596 | 450 | 4 | 3 |
| 50 | 50 | 30 | 0 | 0 | 0 | 560 | 590 | 450 | 2 | 2 |
| 50 | 50 | 30 | 0 | 0 | 5 | 530 | 601 | 446 | 3 | 3 |
| 50 | 50 | 30 | 0 | 0 | 5 | 540 | 600 | 446 | 4 | 3 |
| 50 | 50 | 30 | 0 | 0 | 5 | 550 | 596 | 446 | 4 | 3 |
| 50 | 50 | 30 | 0 | 0 | 5 | 560 | 589 | 446 | 3 | 2 |
| 50 | 50 | 30 | 0 | 5 | −5 | 530 | 601 | 454 | 4 | 3 |
| 50 | 50 | 30 | 0 | 5 | −5 | 540 | 599 | 454 | 4 | 3 |
| 50 | 50 | 30 | 0 | 5 | −5 | 550 | 595 | 454 | 3 | 2 |
| 50 | 50 | 30 | 0 | 5 | 0 | 530 | 601 | 450 | 4 | 3 |
| 50 | 50 | 30 | 0 | 5 | 0 | 540 | 599 | 450 | 4 | 3 |
| 50 | 50 | 30 | 0 | 5 | 0 | 550 | 596 | 450 | 4 | 2 |
| 50 | 50 | 30 | 0 | 5 | 5 | 530 | 601 | 446 | 4 | 3 |
| 50 | 50 | 30 | 0 | 5 | 5 | 540 | 599 | 446 | 4 | 3 |
| 50 | 50 | 30 | 0 | 5 | 5 | 550 | 595 | 446 | 4 | 2 |
| 50 | 50 | 30 | 5 | −5 | −5 | 530 | 598 | 454 | 3 | 2 |
| 50 | 50 | 30 | 5 | −5 | −5 | 540 | 596 | 454 | 4 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 50 | 30 | 5 | −5 | −5 | 550 | 594 | 454 | 4 | 3 |
| 50 | 50 | 30 | 5 | −5 | −5 | 560 | 585 | 454 | 4 | 2 |
| 50 | 50 | 30 | 5 | −5 | −5 | 570 | 576 | 454 | 2 | 2 |
| 50 | 50 | 30 | 5 | −5 | 0 | 530 | 597 | 450 | 3 | 2 |
| 50 | 50 | 30 | 5 | −5 | 0 | 540 | 597 | 450 | 4 | 3 |
| 50 | 50 | 30 | 5 | −5 | 0 | 550 | 593 | 450 | 4 | 3 |
| 50 | 50 | 30 | 5 | −5 | 0 | 560 | 585 | 450 | 4 | 2 |
| 50 | 50 | 30 | 5 | −5 | 0 | 570 | 576 | 450 | 2 | 2 |
| 50 | 50 | 30 | 5 | −5 | 5 | 530 | 598 | 446 | 3 | 2 |
| 50 | 50 | 30 | 5 | −5 | 5 | 540 | 597 | 446 | 4 | 3 |
| 50 | 50 | 30 | 5 | −5 | 5 | 550 | 593 | 446 | 4 | 3 |
| 50 | 50 | 30 | 5 | −5 | 5 | 560 | 584 | 446 | 4 | 2 |
| 50 | 50 | 30 | 5 | −5 | 5 | 570 | 577 | 446 | 2 | 2 |
| 50 | 50 | 30 | 5 | 0 | −5 | 530 | 598 | 454 | 3 | 3 |
| 50 | 50 | 30 | 5 | 0 | −5 | 540 | 597 | 454 | 4 | 3 |
| 50 | 50 | 30 | 5 | 0 | −5 | 550 | 593 | 454 | 4 | 3 |
| 50 | 50 | 30 | 5 | 0 | −5 | 560 | 583 | 454 | 3 | 2 |
| 50 | 50 | 30 | 5 | 0 | −5 | 570 | 572 | 454 | 1 | 1 |
| 50 | 50 | 30 | 5 | 0 | 0 | 530 | 597 | 450 | 3 | 3 |
| 50 | 50 | 30 | 5 | 0 | 0 | 540 | 596 | 450 | 4 | 3 |
| 50 | 50 | 30 | 5 | 0 | 0 | 550 | 592 | 450 | 4 | 3 |
| 50 | 50 | 30 | 5 | 0 | 0 | 560 | 583 | 450 | 3 | 2 |
| 50 | 50 | 30 | 5 | 0 | 0 | 570 | 573 | 450 | 1 | 2 |
| 50 | 50 | 30 | 5 | 0 | 5 | 530 | 597 | 446 | 3 | 3 |
| 50 | 50 | 30 | 5 | 0 | 5 | 540 | 596 | 446 | 4 | 3 |
| 50 | 50 | 30 | 5 | 0 | 5 | 550 | 592 | 446 | 4 | 3 |
| 50 | 50 | 30 | 5 | 0 | 5 | 560 | 583 | 446 | 3 | 2 |
| 50 | 50 | 30 | 5 | 0 | 5 | 570 | 574 | 446 | 1 | 1 |
| 50 | 50 | 30 | 5 | 5 | −5 | 530 | 598 | 454 | 3 | 3 |
| 50 | 50 | 30 | 5 | 5 | −5 | 540 | 595 | 454 | 4 | 3 |
| 50 | 50 | 30 | 5 | 5 | −5 | 550 | 592 | 454 | 3 | 2 |
| 50 | 50 | 30 | 5 | 5 | 0 | 530 | 597 | 450 | 3 | 3 |
| 50 | 50 | 30 | 5 | 5 | 0 | 540 | 596 | 450 | 4 | 3 |
| 50 | 50 | 30 | 5 | 5 | 0 | 550 | 592 | 450 | 4 | 2 |
| 50 | 50 | 30 | 5 | 5 | 5 | 530 | 597 | 446 | 4 | 3 |
| 50 | 50 | 30 | 5 | 5 | 5 | 540 | 596 | 446 | 4 | 3 |
| 50 | 50 | 30 | 5 | 5 | 5 | 550 | 592 | 446 | 4 | 2 |
| 50 | 50 | 40 | −5 | −5 | −5 | 530 | 604 | 455 | 3 | 3 |
| 50 | 50 | 40 | −5 | −5 | −5 | 540 | 603 | 454 | 4 | 3 |
| 50 | 50 | 40 | −5 | −5 | −5 | 550 | 601 | 454 | 4 | 3 |
| 50 | 50 | 40 | −5 | −5 | −5 | 560 | 595 | 454 | 4 | 3 |
| 50 | 50 | 40 | −5 | −5 | 0 | 530 | 604 | 451 | 3 | 3 |
| 50 | 50 | 40 | −5 | −5 | 0 | 540 | 603 | 451 | 4 | 3 |
| 50 | 50 | 40 | −5 | −5 | 0 | 550 | 600 | 451 | 4 | 3 |
| 50 | 50 | 40 | −5 | −5 | 0 | 560 | 595 | 451 | 4 | 3 |
| 50 | 50 | 40 | −5 | −5 | 5 | 530 | 604 | 448 | 3 | 3 |
| 50 | 50 | 40 | −5 | −5 | 5 | 540 | 603 | 447 | 4 | 3 |
| 50 | 50 | 40 | −5 | −5 | 5 | 550 | 600 | 448 | 4 | 3 |
| 50 | 50 | 40 | −5 | −5 | 5 | 560 | 595 | 447 | 4 | 3 |
| 50 | 50 | 40 | −5 | 0 | −5 | 530 | 604 | 454 | 4 | 3 |
| 50 | 50 | 40 | −5 | 0 | −5 | 540 | 603 | 454 | 4 | 3 |
| 50 | 50 | 40 | −5 | 0 | −5 | 550 | 600 | 454 | 4 | 3 |
| 50 | 50 | 40 | −5 | 0 | −5 | 560 | 594 | 454 | 3 | 2 |
| 50 | 50 | 40 | −5 | 0 | 0 | 530 | 604 | 451 | 4 | 3 |
| 50 | 50 | 40 | −5 | 0 | 0 | 540 | 603 | 451 | 4 | 3 |
| 50 | 50 | 40 | −5 | 0 | 0 | 550 | 600 | 451 | 4 | 3 |
| 50 | 50 | 40 | −5 | 0 | 0 | 560 | 594 | 451 | 3 | 2 |
| 50 | 50 | 40 | −5 | 0 | 5 | 530 | 604 | 447 | 4 | 3 |
| 50 | 50 | 40 | −5 | 0 | 5 | 540 | 602 | 447 | 4 | 3 |
| 50 | 50 | 40 | −5 | 0 | 5 | 550 | 599 | 448 | 4 | 3 |
| 50 | 50 | 40 | −5 | 0 | 5 | 560 | 595 | 448 | 3 | 2 |
| 50 | 50 | 40 | −5 | 5 | −5 | 520 | 605 | 454 | 2 | 1 |
| 50 | 50 | 40 | −5 | 5 | −5 | 530 | 604 | 454 | 4 | 3 |
| 50 | 50 | 40 | −5 | 5 | −5 | 540 | 602 | 454 | 4 | 3 |
| 50 | 50 | 40 | −5 | 5 | −5 | 550 | 599 | 454 | 4 | 3 |
| 50 | 50 | 40 | −5 | 5 | 0 | 520 | 604 | 451 | 2 | 2 |
| 50 | 50 | 40 | −5 | 5 | 0 | 530 | 604 | 451 | 4 | 3 |
| 50 | 50 | 40 | −5 | 5 | 0 | 540 | 603 | 451 | 4 | 3 |
| 50 | 50 | 40 | −5 | 5 | 0 | 550 | 599 | 451 | 4 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 50 | 40 | −5 | 5 | 5 | 520 | 604 | 448 | 2 | 2 |
| 50 | 50 | 40 | −5 | 5 | 5 | 530 | 604 | 448 | 4 | 3 |
| 50 | 50 | 40 | −5 | 5 | 5 | 540 | 602 | 447 | 4 | 3 |
| 50 | 50 | 40 | −5 | 5 | 5 | 550 | 600 | 448 | 4 | 3 |
| 50 | 50 | 40 | 0 | −5 | −5 | 530 | 601 | 455 | 3 | 3 |
| 50 | 50 | 40 | 0 | −5 | −5 | 540 | 600 | 454 | 4 | 3 |
| 50 | 50 | 40 | 0 | −5 | −5 | 550 | 597 | 454 | 4 | 3 |
| 50 | 50 | 40 | 0 | −5 | −5 | 560 | 590 | 454 | 4 | 3 |
| 50 | 50 | 40 | 0 | −5 | −5 | 570 | 578 | 454 | 2 | 2 |
| 50 | 50 | 40 | 0 | −5 | 0 | 530 | 601 | 451 | 3 | 3 |
| 50 | 50 | 40 | 0 | −5 | 0 | 540 | 600 | 451 | 4 | 3 |
| 50 | 50 | 40 | 0 | −5 | 0 | 550 | 597 | 451 | 4 | 3 |
| 50 | 50 | 40 | 0 | −5 | 0 | 560 | 589 | 451 | 4 | 3 |
| 50 | 50 | 40 | 0 | −5 | 0 | 570 | 578 | 450 | 3 | 2 |
| 50 | 50 | 40 | 0 | −5 | 5 | 530 | 601 | 448 | 3 | 3 |
| 50 | 50 | 40 | 0 | −5 | 5 | 540 | 599 | 447 | 4 | 3 |
| 50 | 50 | 40 | 0 | −5 | 5 | 550 | 597 | 447 | 4 | 3 |
| 50 | 50 | 40 | 0 | −5 | 5 | 560 | 589 | 447 | 4 | 3 |
| 50 | 50 | 40 | 0 | −5 | 5 | 570 | 579 | 448 | 3 | 2 |
| 50 | 50 | 40 | 0 | 0 | −5 | 530 | 601 | 454 | 4 | 3 |
| 50 | 50 | 40 | 0 | 0 | −5 | 540 | 599 | 454 | 4 | 3 |
| 50 | 50 | 40 | 0 | 0 | −5 | 550 | 596 | 454 | 4 | 3 |
| 50 | 50 | 40 | 0 | 0 | −5 | 560 | 589 | 454 | 3 | 2 |
| 50 | 50 | 40 | 0 | 0 | 0 | 530 | 601 | 451 | 4 | 3 |
| 50 | 50 | 40 | 0 | 0 | 0 | 540 | 599 | 451 | 4 | 3 |
| 50 | 50 | 40 | 0 | 0 | 0 | 550 | 596 | 451 | 4 | 3 |
| 50 | 50 | 40 | 0 | 0 | 0 | 560 | 589 | 451 | 4 | 2 |
| 50 | 50 | 40 | 0 | 0 | 5 | 530 | 600 | 447 | 4 | 3 |
| 50 | 50 | 40 | 0 | 0 | 5 | 540 | 600 | 447 | 4 | 3 |
| 50 | 50 | 40 | 0 | 0 | 5 | 550 | 596 | 448 | 4 | 3 |
| 50 | 50 | 40 | 0 | 0 | 5 | 560 | 589 | 447 | 4 | 2 |
| 50 | 50 | 40 | 0 | 5 | −5 | 520 | 601 | 454 | 2 | 2 |
| 50 | 50 | 40 | 0 | 5 | −5 | 530 | 600 | 454 | 4 | 3 |
| 50 | 50 | 40 | 0 | 5 | −5 | 540 | 599 | 454 | 4 | 3 |
| 50 | 50 | 40 | 0 | 5 | −5 | 550 | 596 | 454 | 4 | 3 |
| 50 | 50 | 40 | 0 | 5 | 0 | 520 | 601 | 451 | 2 | 2 |
| 50 | 50 | 40 | 0 | 5 | 0 | 530 | 601 | 451 | 4 | 3 |
| 50 | 50 | 40 | 0 | 5 | 0 | 540 | 599 | 451 | 4 | 3 |
| 50 | 50 | 40 | 0 | 5 | 0 | 550 | 595 | 451 | 4 | 3 |
| 50 | 50 | 40 | 0 | 5 | 5 | 520 | 601 | 448 | 3 | 2 |
| 50 | 50 | 40 | 0 | 5 | 5 | 530 | 601 | 448 | 4 | 3 |
| 50 | 50 | 40 | 0 | 5 | 5 | 540 | 598 | 447 | 4 | 3 |
| 50 | 50 | 40 | 0 | 5 | 5 | 550 | 595 | 448 | 4 | 3 |
| 50 | 50 | 40 | 5 | −5 | −5 | 530 | 597 | 455 | 3 | 3 |
| 50 | 50 | 40 | 5 | −5 | −5 | 540 | 596 | 454 | 4 | 3 |
| 50 | 50 | 40 | 5 | −5 | −5 | 550 | 593 | 454 | 4 | 3 |
| 50 | 50 | 40 | 5 | −5 | −5 | 560 | 584 | 454 | 4 | 3 |
| 50 | 50 | 40 | 5 | −5 | −5 | 570 | 578 | 454 | 2 | 2 |
| 50 | 50 | 40 | 5 | −5 | 0 | 530 | 598 | 451 | 3 | 3 |
| 50 | 50 | 40 | 5 | −5 | 0 | 540 | 597 | 451 | 4 | 3 |
| 50 | 50 | 40 | 5 | −5 | 0 | 550 | 593 | 451 | 4 | 3 |
| 50 | 50 | 40 | 5 | −5 | 0 | 560 | 584 | 451 | 4 | 3 |
| 50 | 50 | 40 | 5 | −5 | 0 | 570 | 578 | 451 | 3 | 2 |
| 50 | 50 | 40 | 5 | −5 | 5 | 530 | 597 | 448 | 3 | 3 |
| 50 | 50 | 40 | 5 | −5 | 5 | 540 | 596 | 447 | 4 | 3 |
| 50 | 50 | 40 | 5 | −5 | 5 | 550 | 593 | 448 | 4 | 3 |
| 50 | 50 | 40 | 5 | −5 | 5 | 560 | 584 | 448 | 5 | 3 |
| 50 | 50 | 40 | 5 | −5 | 5 | 570 | 579 | 448 | 3 | 2 |
| 50 | 50 | 40 | 5 | 0 | −5 | 530 | 597 | 454 | 4 | 3 |
| 50 | 50 | 40 | 5 | 0 | −5 | 540 | 596 | 454 | 4 | 3 |
| 50 | 50 | 40 | 5 | 0 | −5 | 550 | 592 | 454 | 4 | 3 |
| 50 | 50 | 40 | 5 | 0 | −5 | 560 | 581 | 454 | 4 | 2 |
| 50 | 50 | 40 | 5 | 0 | −5 | 570 | 575 | 454 | 2 | 2 |
| 50 | 50 | 40 | 5 | 0 | 0 | 530 | 597 | 451 | 4 | 3 |
| 50 | 50 | 40 | 5 | 0 | 0 | 540 | 596 | 451 | 4 | 3 |
| 50 | 50 | 40 | 5 | 0 | 0 | 550 | 592 | 451 | 4 | 3 |
| 50 | 50 | 40 | 5 | 0 | 0 | 560 | 581 | 451 | 4 | 2 |
| 50 | 50 | 40 | 5 | 0 | 0 | 570 | 575 | 451 | 2 | 2 |
| 50 | 50 | 40 | 5 | 0 | 5 | 530 | 597 | 447 | 4 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 50 | 40 | 5 | 0 | 5 | 540 | 596 | 447 | 4 | 3 |
| 50 | 50 | 40 | 5 | 0 | 5 | 550 | 592 | 448 | 4 | 3 |
| 50 | 50 | 40 | 5 | 0 | 5 | 560 | 581 | 448 | 4 | 2 |
| 50 | 50 | 40 | 5 | 0 | 5 | 570 | 576 | 447 | 2 | 2 |
| 50 | 50 | 40 | 5 | 5 | −5 | 520 | 598 | 455 | 2 | 1 |
| 50 | 50 | 40 | 5 | 5 | −5 | 530 | 598 | 454 | 4 | 3 |
| 50 | 50 | 40 | 5 | 5 | −5 | 540 | 595 | 454 | 4 | 3 |
| 50 | 50 | 40 | 5 | 5 | −5 | 550 | 591 | 454 | 4 | 3 |
| 50 | 50 | 40 | 5 | 5 | 0 | 520 | 598 | 451 | 2 | 2 |
| 50 | 50 | 40 | 5 | 5 | 0 | 530 | 597 | 451 | 4 | 3 |
| 50 | 50 | 40 | 5 | 5 | 0 | 540 | 595 | 451 | 4 | 3 |
| 50 | 50 | 40 | 5 | 5 | 0 | 550 | 591 | 451 | 4 | 3 |
| 50 | 50 | 40 | 5 | 5 | 5 | 520 | 598 | 448 | 2 | 2 |
| 50 | 50 | 40 | 5 | 5 | 5 | 530 | 597 | 448 | 4 | 3 |
| 50 | 50 | 40 | 5 | 5 | 5 | 540 | 596 | 447 | 4 | 3 |
| 50 | 50 | 40 | 5 | 5 | 5 | 550 | 592 | 448 | 4 | 3 |
| 50 | 50 | 40 | 5 | 5 | 5 | 560 | 583 | 448 | 2 | 1 |
| 50 | 50 | 50 | −5 | −5 | −5 | 530 | 604 | 455 | 3 | 2 |
| 50 | 50 | 50 | −5 | −5 | −5 | 540 | 603 | 454 | 4 | 3 |
| 50 | 50 | 50 | −5 | −5 | −5 | 550 | 601 | 454 | 4 | 3 |
| 50 | 50 | 50 | −5 | −5 | −5 | 560 | 596 | 454 | 3 | 2 |
| 50 | 50 | 50 | −5 | −5 | 0 | 530 | 605 | 452 | 3 | 3 |
| 50 | 50 | 50 | −5 | −5 | 0 | 540 | 604 | 452 | 4 | 4 |
| 50 | 50 | 50 | −5 | −5 | 0 | 550 | 601 | 451 | 4 | 3 |
| 50 | 50 | 50 | −5 | −5 | 0 | 560 | 596 | 451 | 3 | 2 |
| 50 | 50 | 50 | −5 | −5 | 5 | 530 | 604 | 450 | 3 | 3 |
| 50 | 50 | 50 | −5 | −5 | 5 | 540 | 604 | 449 | 4 | 4 |
| 50 | 50 | 50 | −5 | −5 | 5 | 550 | 601 | 449 | 4 | 3 |
| 50 | 50 | 50 | −5 | −5 | 5 | 560 | 596 | 448 | 3 | 2 |
| 50 | 50 | 50 | −5 | 0 | −5 | 530 | 604 | 455 | 3 | 3 |
| 50 | 50 | 50 | −5 | 0 | −5 | 540 | 603 | 454 | 4 | 3 |
| 50 | 50 | 50 | −5 | 0 | −5 | 550 | 600 | 453 | 4 | 3 |
| 50 | 50 | 50 | −5 | 0 | 0 | 530 | 604 | 452 | 3 | 3 |
| 50 | 50 | 50 | −5 | 0 | 0 | 540 | 603 | 451 | 4 | 4 |
| 50 | 50 | 50 | −5 | 0 | 0 | 550 | 600 | 451 | 4 | 3 |
| 50 | 50 | 50 | −5 | 0 | 5 | 530 | 604 | 449 | 3 | 3 |
| 50 | 50 | 50 | −5 | 0 | 5 | 540 | 603 | 448 | 4 | 3 |
| 50 | 50 | 50 | −5 | 0 | 5 | 550 | 600 | 449 | 4 | 3 |
| 50 | 50 | 50 | −5 | 5 | −5 | 530 | 604 | 454 | 4 | 3 |
| 50 | 50 | 50 | −5 | 5 | −5 | 540 | 602 | 454 | 4 | 3 |
| 50 | 50 | 50 | −5 | 5 | −5 | 550 | 599 | 454 | 3 | 3 |
| 50 | 50 | 50 | −5 | 5 | 0 | 530 | 604 | 452 | 4 | 3 |
| 50 | 50 | 50 | −5 | 5 | 0 | 540 | 602 | 451 | 4 | 3 |
| 50 | 50 | 50 | −5 | 5 | 0 | 550 | 599 | 451 | 3 | 3 |
| 50 | 50 | 50 | −5 | 5 | 5 | 530 | 604 | 449 | 4 | 3 |
| 50 | 50 | 50 | −5 | 5 | 5 | 540 | 602 | 449 | 4 | 3 |
| 50 | 50 | 50 | −5 | 5 | 5 | 550 | 599 | 449 | 3 | 3 |
| 50 | 50 | 50 | 0 | −5 | −5 | 530 | 601 | 455 | 3 | 2 |
| 50 | 50 | 50 | 0 | −5 | −5 | 540 | 600 | 454 | 4 | 3 |
| 50 | 50 | 50 | 0 | −5 | −5 | 550 | 597 | 454 | 4 | 3 |
| 50 | 50 | 50 | 0 | −5 | −5 | 560 | 591 | 453 | 3 | 2 |
| 50 | 50 | 50 | 0 | −5 | −5 | 570 | 573 | 454 | 1 | 2 |
| 50 | 50 | 50 | 0 | −5 | 0 | 530 | 601 | 452 | 3 | 3 |
| 50 | 50 | 50 | 0 | −5 | 0 | 540 | 600 | 452 | 4 | 3 |
| 50 | 50 | 50 | 0 | −5 | 0 | 550 | 597 | 451 | 4 | 3 |
| 50 | 50 | 50 | 0 | −5 | 0 | 560 | 590 | 451 | 3 | 2 |
| 50 | 50 | 50 | 0 | −5 | 0 | 570 | 574 | 451 | 1 | 2 |
| 50 | 50 | 50 | 0 | −5 | 5 | 530 | 601 | 450 | 3 | 3 |
| 50 | 50 | 50 | 0 | −5 | 5 | 540 | 600 | 449 | 4 | 3 |
| 50 | 50 | 50 | 0 | −5 | 5 | 550 | 597 | 449 | 4 | 3 |
| 50 | 50 | 50 | 0 | −5 | 5 | 560 | 591 | 449 | 3 | 3 |
| 50 | 50 | 50 | 0 | −5 | 5 | 570 | 574 | 449 | 1 | 2 |
| 50 | 50 | 50 | 0 | 0 | −5 | 530 | 601 | 455 | 3 | 3 |
| 50 | 50 | 50 | 0 | 0 | −5 | 540 | 600 | 454 | 4 | 3 |
| 50 | 50 | 50 | 0 | 0 | −5 | 550 | 597 | 454 | 4 | 3 |
| 50 | 50 | 50 | 0 | 0 | 0 | 530 | 601 | 452 | 3 | 3 |
| 50 | 50 | 50 | 0 | 0 | 0 | 540 | 599 | 451 | 4 | 3 |
| 50 | 50 | 50 | 0 | 0 | 0 | 550 | 596 | 451 | 4 | 3 |
| 50 | 50 | 50 | 0 | 0 | 5 | 530 | 601 | 449 | 3 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 50 | 50 | 0 | 0 | 5 | 540 | 599 | 448 | 4 | 3 |
| 50 | 50 | 50 | 0 | 0 | 5 | 550 | 596 | 449 | 4 | 3 |
| 50 | 50 | 50 | 0 | 5 | −5 | 530 | 601 | 454 | 3 | 3 |
| 50 | 50 | 50 | 0 | 5 | −5 | 540 | 600 | 454 | 4 | 3 |
| 50 | 50 | 50 | 0 | 5 | −5 | 550 | 596 | 454 | 3 | 3 |
| 50 | 50 | 50 | 0 | 5 | 0 | 530 | 601 | 452 | 4 | 3 |
| 50 | 50 | 50 | 0 | 5 | 0 | 540 | 599 | 451 | 4 | 3 |
| 50 | 50 | 50 | 0 | 5 | 0 | 550 | 596 | 451 | 3 | 3 |
| 50 | 50 | 50 | 0 | 5 | 5 | 530 | 601 | 449 | 4 | 3 |
| 50 | 50 | 50 | 0 | 5 | 5 | 540 | 599 | 449 | 4 | 3 |
| 50 | 50 | 50 | 0 | 5 | 5 | 550 | 596 | 449 | 3 | 3 |
| 50 | 50 | 50 | 5 | −5 | −5 | 530 | 598 | 455 | 2 | 2 |
| 50 | 50 | 50 | 5 | −5 | −5 | 540 | 597 | 454 | 4 | 3 |
| 50 | 50 | 50 | 5 | −5 | −5 | 550 | 594 | 454 | 4 | 3 |
| 50 | 50 | 50 | 5 | −5 | −5 | 560 | 586 | 454 | 3 | 3 |
| 50 | 50 | 50 | 5 | −5 | −5 | 570 | 574 | 454 | 2 | 2 |
| 50 | 50 | 50 | 5 | −5 | 0 | 530 | 598 | 452 | 3 | 2 |
| 50 | 50 | 50 | 5 | −5 | 0 | 540 | 596 | 451 | 4 | 3 |
| 50 | 50 | 50 | 5 | −5 | 0 | 550 | 593 | 451 | 4 | 3 |
| 50 | 50 | 50 | 5 | −5 | 0 | 560 | 585 | 451 | 4 | 3 |
| 50 | 50 | 50 | 5 | −5 | 0 | 570 | 575 | 451 | 2 | 2 |
| 50 | 50 | 50 | 5 | −5 | 5 | 530 | 598 | 450 | 3 | 3 |
| 50 | 50 | 50 | 5 | −5 | 5 | 540 | 596 | 449 | 4 | 3 |
| 50 | 50 | 50 | 5 | −5 | 5 | 550 | 594 | 449 | 4 | 3 |
| 50 | 50 | 50 | 5 | −5 | 5 | 560 | 585 | 448 | 4 | 3 |
| 50 | 50 | 50 | 5 | −5 | 5 | 570 | 575 | 449 | 2 | 2 |
| 50 | 50 | 50 | 5 | 0 | −5 | 530 | 598 | 455 | 3 | 3 |
| 50 | 50 | 50 | 5 | 0 | −5 | 540 | 596 | 454 | 4 | 3 |
| 50 | 50 | 50 | 5 | 0 | −5 | 550 | 593 | 453 | 4 | 3 |
| 50 | 50 | 50 | 5 | 0 | 0 | 530 | 598 | 452 | 3 | 3 |
| 50 | 50 | 50 | 5 | 0 | 0 | 540 | 596 | 451 | 4 | 3 |
| 50 | 50 | 50 | 5 | 0 | 0 | 550 | 593 | 451 | 4 | 3 |
| 50 | 50 | 50 | 5 | 0 | 0 | 560 | 584 | 451 | 2 | 1 |
| 50 | 50 | 50 | 5 | 0 | 5 | 530 | 597 | 449 | 3 | 3 |
| 50 | 50 | 50 | 5 | 0 | 5 | 540 | 596 | 449 | 4 | 3 |
| 50 | 50 | 50 | 5 | 0 | 5 | 550 | 593 | 449 | 4 | 3 |
| 50 | 50 | 50 | 5 | 0 | 5 | 560 | 584 | 448 | 2 | 2 |
| 50 | 50 | 50 | 5 | 5 | −5 | 530 | 597 | 454 | 3 | 3 |
| 50 | 50 | 50 | 5 | 5 | −5 | 540 | 596 | 453 | 4 | 3 |
| 50 | 50 | 50 | 5 | 5 | −5 | 550 | 592 | 454 | 3 | 3 |
| 50 | 50 | 50 | 5 | 5 | 0 | 530 | 598 | 452 | 3 | 3 |
| 50 | 50 | 50 | 5 | 5 | 0 | 540 | 596 | 451 | 4 | 3 |
| 50 | 50 | 50 | 5 | 5 | 0 | 550 | 592 | 451 | 3 | 3 |
| 50 | 50 | 50 | 5 | 5 | 5 | 530 | 598 | 449 | 4 | 3 |
| 50 | 50 | 50 | 5 | 5 | 5 | 540 | 596 | 449 | 4 | 3 |
| 50 | 50 | 50 | 5 | 5 | 5 | 550 | 592 | 449 | 3 | 3 |
| 50 | 60 | 30 | −5 | −5 | −5 | 530 | 604 | 454 | 3 | 2 |
| 50 | 60 | 30 | −5 | −5 | −5 | 540 | 604 | 454 | 4 | 3 |
| 50 | 60 | 30 | −5 | −5 | −5 | 550 | 601 | 454 | 4 | 3 |
| 50 | 60 | 30 | −5 | −5 | −5 | 560 | 598 | 454 | 4 | 3 |
| 50 | 60 | 30 | −5 | −5 | −5 | 570 | 595 | 454 | 3 | 3 |
| 50 | 60 | 30 | −5 | −5 | −5 | 580 | 596 | 454 | 2 | 2 |
| 50 | 60 | 30 | −5 | −5 | 0 | 530 | 605 | 450 | 3 | 2 |
| 50 | 60 | 30 | −5 | −5 | 0 | 540 | 603 | 450 | 4 | 3 |
| 50 | 60 | 30 | −5 | −5 | 0 | 550 | 601 | 450 | 4 | 3 |
| 50 | 60 | 30 | −5 | −5 | 0 | 560 | 598 | 450 | 4 | 3 |
| 50 | 60 | 30 | −5 | −5 | 0 | 570 | 596 | 450 | 3 | 3 |
| 50 | 60 | 30 | −5 | −5 | 0 | 580 | 595 | 450 | 2 | 2 |
| 50 | 60 | 30 | −5 | −5 | 0 | 590 | 600 | 450 | 0 | 0 |
| 50 | 60 | 30 | −5 | −5 | 5 | 530 | 605 | 446 | 3 | 2 |
| 50 | 60 | 30 | −5 | −5 | 5 | 540 | 603 | 446 | 4 | 3 |
| 50 | 60 | 30 | −5 | −5 | 5 | 550 | 602 | 446 | 4 | 3 |
| 50 | 60 | 30 | −5 | −5 | 5 | 560 | 598 | 446 | 4 | 3 |
| 50 | 60 | 30 | −5 | −5 | 5 | 570 | 596 | 446 | 3 | 3 |
| 50 | 60 | 30 | −5 | −5 | 5 | 580 | 595 | 446 | 2 | 2 |
| 50 | 60 | 30 | −5 | −5 | 5 | 590 | 600 | 446 | 1 | 1 |
| 50 | 60 | 30 | −5 | 0 | −5 | 530 | 604 | 454 | 3 | 3 |
| 50 | 60 | 30 | −5 | 0 | −5 | 540 | 603 | 454 | 4 | 3 |
| 50 | 60 | 30 | −5 | 0 | −5 | 550 | 601 | 454 | 4 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 60 | 30 | −5 | 0 | −5 | 560 | 598 | 454 | 3 | 3 |
| 50 | 60 | 30 | −5 | 0 | −5 | 570 | 596 | 454 | 3 | 2 |
| 50 | 60 | 30 | −5 | 0 | 0 | 530 | 605 | 450 | 3 | 3 |
| 50 | 60 | 30 | −5 | 0 | 0 | 540 | 603 | 450 | 4 | 3 |
| 50 | 60 | 30 | −5 | 0 | 0 | 550 | 601 | 450 | 4 | 3 |
| 50 | 60 | 30 | −5 | 0 | 0 | 560 | 598 | 450 | 4 | 3 |
| 50 | 60 | 30 | −5 | 0 | 0 | 570 | 596 | 450 | 3 | 2 |
| 50 | 60 | 30 | −5 | 0 | 5 | 530 | 605 | 446 | 3 | 3 |
| 50 | 60 | 30 | −5 | 0 | 5 | 540 | 603 | 446 | 4 | 3 |
| 50 | 60 | 30 | −5 | 0 | 5 | 550 | 601 | 446 | 4 | 3 |
| 50 | 60 | 30 | −5 | 0 | 5 | 560 | 598 | 446 | 4 | 3 |
| 50 | 60 | 30 | −5 | 0 | 5 | 570 | 596 | 446 | 3 | 2 |
| 50 | 60 | 30 | −5 | 5 | −5 | 530 | 604 | 454 | 3 | 3 |
| 50 | 60 | 30 | −5 | 5 | −5 | 540 | 603 | 454 | 4 | 3 |
| 50 | 60 | 30 | −5 | 5 | −5 | 550 | 601 | 454 | 4 | 3 |
| 50 | 60 | 30 | −5 | 5 | −5 | 560 | 599 | 454 | 3 | 2 |
| 50 | 60 | 30 | −5 | 5 | 0 | 530 | 604 | 450 | 4 | 3 |
| 50 | 60 | 30 | −5 | 5 | 0 | 540 | 603 | 450 | 4 | 3 |
| 50 | 60 | 30 | −5 | 5 | 0 | 550 | 600 | 450 | 4 | 3 |
| 50 | 60 | 30 | −5 | 5 | 0 | 560 | 598 | 450 | 3 | 3 |
| 50 | 60 | 30 | −5 | 5 | 5 | 520 | 605 | 446 | 1 | 1 |
| 50 | 60 | 30 | −5 | 5 | 5 | 530 | 604 | 446 | 4 | 3 |
| 50 | 60 | 30 | −5 | 5 | 5 | 540 | 603 | 446 | 4 | 3 |
| 50 | 60 | 30 | −5 | 5 | 5 | 550 | 601 | 446 | 4 | 3 |
| 50 | 60 | 30 | −5 | 5 | 5 | 560 | 598 | 446 | 3 | 3 |
| 50 | 60 | 30 | −5 | 5 | 5 | 570 | 596 | 446 | 0 | 0 |
| 50 | 60 | 30 | 0 | −5 | −5 | 530 | 601 | 454 | 3 | 2 |
| 50 | 60 | 30 | 0 | −5 | −5 | 540 | 600 | 454 | 4 | 3 |
| 50 | 60 | 30 | 0 | −5 | −5 | 550 | 598 | 454 | 4 | 3 |
| 50 | 60 | 30 | 0 | −5 | −5 | 560 | 594 | 454 | 4 | 3 |
| 50 | 60 | 30 | 0 | −5 | −5 | 570 | 592 | 454 | 3 | 3 |
| 50 | 60 | 30 | 0 | −5 | −5 | 580 | 592 | 454 | 2 | 2 |
| 50 | 60 | 30 | 0 | −5 | −5 | 590 | 596 | 454 | 2 | 2 |
| 50 | 60 | 30 | 0 | −5 | 0 | 530 | 601 | 450 | 3 | 2 |
| 50 | 60 | 30 | 0 | −5 | 0 | 540 | 600 | 450 | 4 | 3 |
| 50 | 60 | 30 | 0 | −5 | 0 | 550 | 598 | 450 | 4 | 3 |
| 50 | 60 | 30 | 0 | −5 | 0 | 560 | 595 | 450 | 4 | 3 |
| 50 | 60 | 30 | 0 | −5 | 0 | 570 | 592 | 450 | 3 | 3 |
| 50 | 60 | 30 | 0 | −5 | 0 | 580 | 592 | 450 | 3 | 3 |
| 50 | 60 | 30 | 0 | −5 | 0 | 590 | 596 | 450 | 2 | 2 |
| 50 | 60 | 30 | 0 | −5 | 5 | 530 | 601 | 446 | 3 | 2 |
| 50 | 60 | 30 | 0 | −5 | 5 | 540 | 600 | 446 | 4 | 3 |
| 50 | 60 | 30 | 0 | −5 | 5 | 550 | 598 | 446 | 4 | 3 |
| 50 | 60 | 30 | 0 | −5 | 5 | 560 | 595 | 446 | 4 | 3 |
| 50 | 60 | 30 | 0 | −5 | 5 | 570 | 592 | 446 | 3 | 3 |
| 50 | 60 | 30 | 0 | −5 | 5 | 580 | 592 | 446 | 3 | 3 |
| 50 | 60 | 30 | 0 | −5 | 5 | 590 | 596 | 446 | 2 | 2 |
| 50 | 60 | 30 | 0 | 0 | −5 | 530 | 601 | 454 | 3 | 3 |
| 50 | 60 | 30 | 0 | 0 | −5 | 540 | 600 | 454 | 4 | 3 |
| 50 | 60 | 30 | 0 | 0 | −5 | 550 | 597 | 454 | 4 | 3 |
| 50 | 60 | 30 | 0 | 0 | −5 | 560 | 594 | 454 | 4 | 3 |
| 50 | 60 | 30 | 0 | 0 | −5 | 570 | 593 | 454 | 3 | 2 |
| 50 | 60 | 30 | 0 | 0 | −5 | 580 | 593 | 454 | 2 | 2 |
| 50 | 60 | 30 | 0 | 0 | 0 | 530 | 601 | 450 | 3 | 3 |
| 50 | 60 | 30 | 0 | 0 | 0 | 540 | 599 | 450 | 4 | 3 |
| 50 | 60 | 30 | 0 | 0 | 0 | 550 | 598 | 450 | 4 | 3 |
| 50 | 60 | 30 | 0 | 0 | 0 | 560 | 595 | 450 | 4 | 3 |
| 50 | 60 | 30 | 0 | 0 | 0 | 570 | 592 | 450 | 3 | 3 |
| 50 | 60 | 30 | 0 | 0 | 0 | 580 | 593 | 450 | 2 | 2 |
| 50 | 60 | 30 | 0 | 0 | 5 | 530 | 601 | 446 | 3 | 3 |
| 50 | 60 | 30 | 0 | 0 | 5 | 540 | 600 | 446 | 4 | 3 |
| 50 | 60 | 30 | 0 | 0 | 5 | 550 | 598 | 446 | 4 | 3 |
| 50 | 60 | 30 | 0 | 0 | 5 | 560 | 595 | 446 | 4 | 3 |
| 50 | 60 | 30 | 0 | 0 | 5 | 570 | 592 | 446 | 3 | 3 |
| 50 | 60 | 30 | 0 | 0 | 5 | 580 | 593 | 446 | 2 | 2 |
| 50 | 60 | 30 | 0 | 5 | −5 | 530 | 601 | 454 | 3 | 3 |
| 50 | 60 | 30 | 0 | 5 | −5 | 540 | 600 | 454 | 4 | 3 |
| 50 | 60 | 30 | 0 | 5 | −5 | 550 | 598 | 454 | 4 | 3 |
| 50 | 60 | 30 | 0 | 5 | −5 | 560 | 594 | 454 | 3 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 60 | 30 | 0 | 5 | −5 | 570 | 593 | 454 | 2 | 2 |
| 50 | 60 | 30 | 0 | 5 | 0 | 530 | 601 | 450 | 4 | 3 |
| 50 | 60 | 30 | 0 | 5 | 0 | 540 | 599 | 450 | 4 | 3 |
| 50 | 60 | 30 | 0 | 5 | 0 | 550 | 598 | 450 | 4 | 3 |
| 50 | 60 | 30 | 0 | 5 | 0 | 560 | 595 | 450 | 3 | 3 |
| 50 | 60 | 30 | 0 | 5 | 0 | 570 | 593 | 450 | 2 | 2 |
| 50 | 60 | 30 | 0 | 5 | 5 | 520 | 602 | 446 | 1 | 1 |
| 50 | 60 | 30 | 0 | 5 | 5 | 530 | 601 | 446 | 4 | 3 |
| 50 | 60 | 30 | 0 | 5 | 5 | 540 | 600 | 446 | 4 | 3 |
| 50 | 60 | 30 | 0 | 5 | 5 | 550 | 597 | 446 | 4 | 3 |
| 50 | 60 | 30 | 0 | 5 | 5 | 560 | 595 | 446 | 3 | 3 |
| 50 | 60 | 30 | 0 | 5 | 5 | 570 | 593 | 446 | 2 | 2 |
| 50 | 60 | 30 | 5 | −5 | −5 | 530 | 598 | 454 | 3 | 2 |
| 50 | 60 | 30 | 5 | −5 | −5 | 540 | 596 | 454 | 4 | 3 |
| 50 | 60 | 30 | 5 | −5 | −5 | 550 | 595 | 454 | 4 | 3 |
| 50 | 60 | 30 | 5 | −5 | −5 | 560 | 592 | 454 | 4 | 3 |
| 50 | 60 | 30 | 5 | −5 | −5 | 570 | 589 | 454 | 3 | 3 |
| 50 | 60 | 30 | 5 | −5 | −5 | 580 | 589 | 454 | 2 | 3 |
| 50 | 60 | 30 | 5 | −5 | −5 | 590 | 593 | 454 | 1 | 2 |
| 50 | 60 | 30 | 5 | −5 | 0 | 530 | 598 | 450 | 3 | 2 |
| 50 | 60 | 30 | 5 | −5 | 0 | 540 | 597 | 450 | 4 | 3 |
| 50 | 60 | 30 | 5 | −5 | 0 | 550 | 594 | 450 | 4 | 3 |
| 50 | 60 | 30 | 5 | −5 | 0 | 560 | 591 | 450 | 4 | 3 |
| 50 | 60 | 30 | 5 | −5 | 0 | 570 | 589 | 450 | 3 | 3 |
| 50 | 60 | 30 | 5 | −5 | 0 | 580 | 590 | 450 | 2 | 3 |
| 50 | 60 | 30 | 5 | −5 | 0 | 590 | 594 | 450 | 1 | 2 |
| 50 | 60 | 30 | 5 | −5 | 5 | 530 | 598 | 446 | 3 | 2 |
| 50 | 60 | 30 | 5 | −5 | 5 | 540 | 597 | 446 | 4 | 3 |
| 50 | 60 | 30 | 5 | −5 | 5 | 550 | 594 | 446 | 4 | 3 |
| 50 | 60 | 30 | 5 | −5 | 5 | 560 | 591 | 446 | 4 | 3 |
| 50 | 60 | 30 | 5 | −5 | 5 | 570 | 589 | 446 | 3 | 3 |
| 50 | 60 | 30 | 5 | −5 | 5 | 580 | 590 | 446 | 3 | 3 |
| 50 | 60 | 30 | 5 | −5 | 5 | 590 | 594 | 446 | 1 | 2 |
| 50 | 60 | 30 | 5 | 0 | −5 | 530 | 598 | 454 | 3 | 3 |
| 50 | 60 | 30 | 5 | 0 | −5 | 540 | 596 | 454 | 4 | 3 |
| 50 | 60 | 30 | 5 | 0 | −5 | 550 | 595 | 454 | 4 | 3 |
| 50 | 60 | 30 | 5 | 0 | −5 | 560 | 591 | 454 | 4 | 3 |
| 50 | 60 | 30 | 5 | 0 | −5 | 570 | 589 | 454 | 3 | 2 |
| 50 | 60 | 30 | 5 | 0 | −5 | 580 | 590 | 454 | 2 | 2 |
| 50 | 60 | 30 | 5 | 0 | 0 | 530 | 597 | 450 | 3 | 3 |
| 50 | 60 | 30 | 5 | 0 | 0 | 540 | 597 | 450 | 4 | 3 |
| 50 | 60 | 30 | 5 | 0 | 0 | 550 | 594 | 450 | 4 | 3 |
| 50 | 60 | 30 | 5 | 0 | 0 | 560 | 591 | 450 | 4 | 3 |
| 50 | 60 | 30 | 5 | 0 | 0 | 570 | 590 | 450 | 3 | 2 |
| 50 | 60 | 30 | 5 | 0 | 0 | 580 | 590 | 450 | 2 | 2 |
| 50 | 60 | 30 | 5 | 0 | 5 | 530 | 597 | 446 | 3 | 3 |
| 50 | 60 | 30 | 5 | 0 | 5 | 540 | 597 | 446 | 4 | 3 |
| 50 | 60 | 30 | 5 | 0 | 5 | 550 | 594 | 446 | 4 | 3 |
| 50 | 60 | 30 | 5 | 0 | 5 | 560 | 591 | 446 | 4 | 3 |
| 50 | 60 | 30 | 5 | 0 | 5 | 570 | 589 | 446 | 3 | 3 |
| 50 | 60 | 30 | 5 | 0 | 5 | 580 | 590 | 446 | 2 | 2 |
| 50 | 60 | 30 | 5 | 5 | −5 | 530 | 598 | 454 | 3 | 3 |
| 50 | 60 | 30 | 5 | 5 | −5 | 540 | 596 | 454 | 4 | 3 |
| 50 | 60 | 30 | 5 | 5 | −5 | 550 | 594 | 454 | 4 | 3 |
| 50 | 60 | 30 | 5 | 5 | −5 | 560 | 592 | 454 | 3 | 3 |
| 50 | 60 | 30 | 5 | 5 | −5 | 570 | 589 | 454 | 2 | 2 |
| 50 | 60 | 30 | 5 | 5 | 0 | 530 | 598 | 450 | 4 | 3 |
| 50 | 60 | 30 | 5 | 5 | 0 | 540 | 597 | 450 | 4 | 3 |
| 50 | 60 | 30 | 5 | 5 | 0 | 550 | 594 | 450 | 4 | 3 |
| 50 | 60 | 30 | 5 | 5 | 0 | 560 | 591 | 450 | 3 | 3 |
| 50 | 60 | 30 | 5 | 5 | 0 | 570 | 589 | 450 | 2 | 2 |
| 50 | 60 | 30 | 5 | 5 | 5 | 520 | 599 | 446 | 1 | 1 |
| 50 | 60 | 30 | 5 | 5 | 5 | 530 | 598 | 446 | 4 | 3 |
| 50 | 60 | 30 | 5 | 5 | 5 | 540 | 597 | 446 | 4 | 3 |
| 50 | 60 | 30 | 5 | 5 | 5 | 550 | 595 | 446 | 4 | 3 |
| 50 | 60 | 30 | 5 | 5 | 5 | 560 | 591 | 446 | 3 | 3 |
| 50 | 60 | 30 | 5 | 5 | 5 | 570 | 589 | 446 | 2 | 2 |
| 50 | 60 | 40 | −5 | −5 | −5 | 530 | 605 | 455 | 3 | 3 |
| 50 | 60 | 40 | −5 | −5 | −5 | 540 | 604 | 455 | 4 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 60 | 40 | −5 | −5 | −5 | 550 | 601 | 454 | 4 | 3 |
| 50 | 60 | 40 | −5 | −5 | −5 | 560 | 599 | 454 | 4 | 3 |
| 50 | 60 | 40 | −5 | −5 | −5 | 570 | 596 | 454 | 3 | 3 |
| 50 | 60 | 40 | −5 | −5 | −5 | 580 | 596 | 454 | 2 | 3 |
| 50 | 60 | 40 | −5 | −5 | −5 | 590 | 600 | 454 | 1 | 2 |
| 50 | 60 | 40 | −5 | −5 | 0 | 530 | 604 | 452 | 4 | 3 |
| 50 | 60 | 40 | −5 | −5 | 0 | 540 | 603 | 451 | 4 | 3 |
| 50 | 60 | 40 | −5 | −5 | 0 | 550 | 601 | 451 | 4 | 3 |
| 50 | 60 | 40 | −5 | −5 | 0 | 560 | 598 | 451 | 4 | 3 |
| 50 | 60 | 40 | −5 | −5 | 0 | 570 | 596 | 451 | 3 | 3 |
| 50 | 60 | 40 | −5 | −5 | 0 | 580 | 596 | 450 | 3 | 3 |
| 50 | 60 | 40 | −5 | −5 | 0 | 590 | 600 | 451 | 1 | 2 |
| 50 | 60 | 40 | −5 | −5 | 5 | 530 | 604 | 449 | 4 | 3 |
| 50 | 60 | 40 | −5 | −5 | 5 | 540 | 603 | 448 | 4 | 3 |
| 50 | 60 | 40 | −5 | −5 | 5 | 550 | 602 | 448 | 4 | 3 |
| 50 | 60 | 40 | −5 | −5 | 5 | 560 | 598 | 448 | 4 | 3 |
| 50 | 60 | 40 | −5 | −5 | 5 | 570 | 596 | 447 | 3 | 3 |
| 50 | 60 | 40 | −5 | −5 | 5 | 580 | 596 | 448 | 3 | 3 |
| 50 | 60 | 40 | −5 | −5 | 5 | 590 | 600 | 448 | 2 | 2 |
| 50 | 60 | 40 | −5 | 0 | −5 | 530 | 604 | 455 | 4 | 3 |
| 50 | 60 | 40 | −5 | 0 | −5 | 540 | 603 | 454 | 4 | 3 |
| 50 | 60 | 40 | −5 | 0 | −5 | 550 | 601 | 454 | 4 | 3 |
| 50 | 60 | 40 | −5 | 0 | −5 | 560 | 599 | 454 | 4 | 3 |
| 50 | 60 | 40 | −5 | 0 | −5 | 570 | 596 | 454 | 3 | 3 |
| 50 | 60 | 40 | −5 | 0 | −5 | 580 | 597 | 455 | 1 | 1 |
| 50 | 60 | 40 | −5 | 0 | 0 | 520 | 605 | 452 | 2 | 1 |
| 50 | 60 | 40 | −5 | 0 | 0 | 530 | 604 | 452 | 4 | 3 |
| 50 | 60 | 40 | −5 | 0 | 0 | 540 | 603 | 451 | 4 | 3 |
| 50 | 60 | 40 | −5 | 0 | 0 | 550 | 601 | 451 | 4 | 3 |
| 50 | 60 | 40 | −5 | 0 | 0 | 560 | 598 | 450 | 4 | 3 |
| 50 | 60 | 40 | −5 | 0 | 0 | 570 | 596 | 451 | 3 | 3 |
| 50 | 60 | 40 | −5 | 0 | 0 | 580 | 597 | 451 | 1 | 2 |
| 50 | 60 | 40 | −5 | 0 | 5 | 520 | 604 | 449 | 2 | 2 |
| 50 | 60 | 40 | −5 | 0 | 5 | 530 | 604 | 448 | 4 | 3 |
| 50 | 60 | 40 | −5 | 0 | 5 | 540 | 603 | 448 | 4 | 4 |
| 50 | 60 | 40 | −5 | 0 | 5 | 550 | 601 | 447 | 4 | 3 |
| 50 | 60 | 40 | −5 | 0 | 5 | 560 | 598 | 448 | 4 | 3 |
| 50 | 60 | 40 | −5 | 0 | 5 | 570 | 597 | 448 | 3 | 3 |
| 50 | 60 | 40 | −5 | 0 | 5 | 580 | 598 | 447 | 2 | 2 |
| 50 | 60 | 40 | −5 | 5 | −5 | 520 | 605 | 455 | 2 | 2 |
| 50 | 60 | 40 | −5 | 5 | −5 | 530 | 604 | 454 | 4 | 3 |
| 50 | 60 | 40 | −5 | 5 | −5 | 540 | 603 | 454 | 4 | 3 |
| 50 | 60 | 40 | −5 | 5 | −5 | 550 | 601 | 454 | 4 | 3 |
| 50 | 60 | 40 | −5 | 5 | −5 | 560 | 599 | 454 | 3 | 3 |
| 50 | 60 | 40 | −5 | 5 | −5 | 570 | 597 | 454 | 2 | 2 |
| 50 | 60 | 40 | −5 | 5 | 0 | 520 | 605 | 452 | 3 | 2 |
| 50 | 60 | 40 | −5 | 5 | 0 | 530 | 604 | 451 | 4 | 3 |
| 50 | 60 | 40 | −5 | 5 | 0 | 540 | 603 | 451 | 4 | 3 |
| 50 | 60 | 40 | −5 | 5 | 0 | 550 | 601 | 451 | 4 | 3 |
| 50 | 60 | 40 | −5 | 5 | 0 | 560 | 599 | 451 | 3 | 3 |
| 50 | 60 | 40 | −5 | 5 | 0 | 570 | 597 | 451 | 2 | 2 |
| 50 | 60 | 40 | −5 | 5 | 5 | 520 | 605 | 449 | 3 | 3 |
| 50 | 60 | 40 | −5 | 5 | 5 | 530 | 604 | 448 | 4 | 3 |
| 50 | 60 | 40 | −5 | 5 | 5 | 540 | 603 | 448 | 4 | 4 |
| 50 | 60 | 40 | −5 | 5 | 5 | 550 | 602 | 447 | 4 | 3 |
| 50 | 60 | 40 | −5 | 5 | 5 | 560 | 599 | 447 | 3 | 3 |
| 50 | 60 | 40 | −5 | 5 | 5 | 570 | 598 | 448 | 2 | 2 |
| 50 | 60 | 40 | 0 | −5 | −5 | 530 | 601 | 455 | 3 | 3 |
| 50 | 60 | 40 | 0 | −5 | −5 | 540 | 600 | 455 | 4 | 3 |
| 50 | 60 | 40 | 0 | −5 | −5 | 550 | 598 | 454 | 4 | 3 |
| 50 | 60 | 40 | 0 | −5 | −5 | 560 | 595 | 454 | 4 | 3 |
| 50 | 60 | 40 | 0 | −5 | −5 | 570 | 592 | 454 | 3 | 3 |
| 50 | 60 | 40 | 0 | −5 | −5 | 580 | 593 | 454 | 3 | 3 |
| 50 | 60 | 40 | 0 | −5 | −5 | 590 | 597 | 454 | 2 | 3 |
| 50 | 60 | 40 | 0 | −5 | 0 | 530 | 601 | 452 | 4 | 3 |
| 50 | 60 | 40 | 0 | −5 | 0 | 540 | 600 | 451 | 4 | 3 |
| 50 | 60 | 40 | 0 | −5 | 0 | 550 | 598 | 451 | 4 | 4 |
| 50 | 60 | 40 | 0 | −5 | 0 | 560 | 595 | 451 | 4 | 3 |
| 50 | 60 | 40 | 0 | −5 | 0 | 570 | 592 | 451 | 3 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 60 | 40 | 0 | −5 | 0 | 580 | 593 | 451 | 3 | 3 |
| 50 | 60 | 40 | 0 | −5 | 0 | 590 | 597 | 451 | 2 | 3 |
| 50 | 60 | 40 | 0 | −5 | 5 | 530 | 601 | 449 | 4 | 3 |
| 50 | 60 | 40 | 0 | −5 | 5 | 540 | 599 | 448 | 4 | 3 |
| 50 | 60 | 40 | 0 | −5 | 5 | 550 | 598 | 448 | 4 | 4 |
| 50 | 60 | 40 | 0 | −5 | 5 | 560 | 595 | 447 | 4 | 3 |
| 50 | 60 | 40 | 0 | −5 | 5 | 570 | 593 | 448 | 4 | 3 |
| 50 | 60 | 40 | 0 | −5 | 5 | 580 | 593 | 447 | 3 | 3 |
| 50 | 60 | 40 | 0 | −5 | 5 | 590 | 597 | 447 | 2 | 3 |
| 50 | 60 | 40 | 0 | 0 | −5 | 530 | 601 | 455 | 4 | 3 |
| 50 | 60 | 40 | 0 | 0 | −5 | 540 | 600 | 454 | 4 | 3 |
| 50 | 60 | 40 | 0 | 0 | −5 | 550 | 597 | 454 | 4 | 3 |
| 50 | 60 | 40 | 0 | 0 | −5 | 560 | 595 | 454 | 4 | 3 |
| 50 | 60 | 40 | 0 | 0 | −5 | 570 | 593 | 454 | 3 | 3 |
| 50 | 60 | 40 | 0 | 0 | −5 | 580 | 594 | 454 | 2 | 2 |
| 50 | 60 | 40 | 0 | 0 | 0 | 520 | 601 | 452 | 2 | 2 |
| 50 | 60 | 40 | 0 | 0 | 0 | 530 | 601 | 452 | 4 | 3 |
| 50 | 60 | 40 | 0 | 0 | 0 | 540 | 599 | 451 | 4 | 3 |
| 50 | 60 | 40 | 0 | 0 | 0 | 550 | 597 | 451 | 4 | 3 |
| 50 | 60 | 40 | 0 | 0 | 0 | 560 | 595 | 451 | 4 | 3 |
| 50 | 60 | 40 | 0 | 0 | 0 | 570 | 593 | 451 | 3 | 3 |
| 50 | 60 | 40 | 0 | 0 | 0 | 580 | 594 | 450 | 2 | 2 |
| 50 | 60 | 40 | 0 | 0 | 5 | 520 | 602 | 449 | 2 | 2 |
| 50 | 60 | 40 | 0 | 0 | 5 | 530 | 601 | 448 | 4 | 3 |
| 50 | 60 | 40 | 0 | 0 | 5 | 540 | 599 | 448 | 4 | 3 |
| 50 | 60 | 40 | 0 | 0 | 5 | 550 | 598 | 448 | 4 | 3 |
| 50 | 60 | 40 | 0 | 0 | 5 | 560 | 595 | 448 | 4 | 3 |
| 50 | 60 | 40 | 0 | 0 | 5 | 570 | 593 | 447 | 3 | 3 |
| 50 | 60 | 40 | 0 | 0 | 5 | 580 | 594 | 448 | 2 | 3 |
| 50 | 60 | 40 | 0 | 5 | −5 | 520 | 602 | 455 | 2 | 2 |
| 50 | 60 | 40 | 0 | 5 | −5 | 530 | 601 | 454 | 4 | 3 |
| 50 | 60 | 40 | 0 | 5 | −5 | 540 | 600 | 454 | 4 | 3 |
| 50 | 60 | 40 | 0 | 5 | −5 | 550 | 598 | 454 | 4 | 3 |
| 50 | 60 | 40 | 0 | 5 | −5 | 560 | 595 | 454 | 4 | 3 |
| 50 | 60 | 40 | 0 | 5 | −5 | 570 | 593 | 454 | 2 | 2 |
| 50 | 60 | 40 | 0 | 5 | 0 | 520 | 601 | 452 | 3 | 2 |
| 50 | 60 | 40 | 0 | 5 | 0 | 530 | 601 | 451 | 4 | 3 |
| 50 | 60 | 40 | 0 | 5 | 0 | 540 | 599 | 451 | 4 | 3 |
| 50 | 60 | 40 | 0 | 5 | 0 | 550 | 598 | 451 | 4 | 3 |
| 50 | 60 | 40 | 0 | 5 | 0 | 560 | 596 | 451 | 4 | 3 |
| 50 | 60 | 40 | 0 | 5 | 0 | 570 | 594 | 451 | 2 | 2 |
| 50 | 60 | 40 | 0 | 5 | 5 | 520 | 602 | 449 | 3 | 3 |
| 50 | 60 | 40 | 0 | 5 | 5 | 530 | 601 | 448 | 4 | 3 |
| 50 | 60 | 40 | 0 | 5 | 5 | 540 | 599 | 448 | 4 | 4 |
| 50 | 60 | 40 | 0 | 5 | 5 | 550 | 598 | 447 | 4 | 3 |
| 50 | 60 | 40 | 0 | 5 | 5 | 560 | 595 | 447 | 4 | 3 |
| 50 | 60 | 40 | 0 | 5 | 5 | 570 | 594 | 448 | 3 | 3 |
| 50 | 60 | 40 | 5 | −5 | −5 | 530 | 598 | 455 | 3 | 3 |
| 50 | 60 | 40 | 5 | −5 | −5 | 540 | 596 | 455 | 4 | 3 |
| 50 | 60 | 40 | 5 | −5 | −5 | 550 | 595 | 454 | 4 | 3 |
| 50 | 60 | 40 | 5 | −5 | −5 | 560 | 592 | 454 | 4 | 3 |
| 50 | 60 | 40 | 5 | −5 | −5 | 570 | 589 | 454 | 3 | 3 |
| 50 | 60 | 40 | 5 | −5 | −5 | 580 | 590 | 454 | 3 | 3 |
| 50 | 60 | 40 | 5 | −5 | −5 | 590 | 594 | 454 | 1 | 2 |
| 50 | 60 | 40 | 5 | −5 | 0 | 530 | 598 | 452 | 3 | 3 |
| 50 | 60 | 40 | 5 | −5 | 0 | 540 | 596 | 451 | 4 | 3 |
| 50 | 60 | 40 | 5 | −5 | 0 | 550 | 594 | 451 | 4 | 3 |
| 50 | 60 | 40 | 5 | −5 | 0 | 560 | 592 | 451 | 4 | 3 |
| 50 | 60 | 40 | 5 | −5 | 0 | 570 | 590 | 451 | 3 | 3 |
| 50 | 60 | 40 | 5 | −5 | 0 | 580 | 590 | 451 | 3 | 3 |
| 50 | 60 | 40 | 5 | −5 | 0 | 590 | 594 | 451 | 1 | 3 |
| 50 | 60 | 40 | 5 | −5 | 5 | 530 | 598 | 449 | 4 | 3 |
| 50 | 60 | 40 | 5 | −5 | 5 | 540 | 597 | 448 | 4 | 3 |
| 50 | 60 | 40 | 5 | −5 | 5 | 550 | 594 | 448 | 4 | 3 |
| 50 | 60 | 40 | 5 | −5 | 5 | 560 | 592 | 447 | 4 | 3 |
| 50 | 60 | 40 | 5 | −5 | 5 | 570 | 590 | 448 | 4 | 3 |
| 50 | 60 | 40 | 5 | −5 | 5 | 580 | 590 | 447 | 3 | 3 |
| 50 | 60 | 40 | 5 | −5 | 5 | 590 | 594 | 447 | 2 | 3 |
| 50 | 60 | 40 | 5 | 0 | −5 | 530 | 598 | 455 | 4 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 60 | 40 | 5 | 0 | −5 | 540 | 596 | 454 | 4 | 3 |
| 50 | 60 | 40 | 5 | 0 | −5 | 550 | 595 | 454 | 4 | 3 |
| 50 | 60 | 40 | 5 | 0 | −5 | 560 | 592 | 454 | 4 | 3 |
| 50 | 60 | 40 | 5 | 0 | −5 | 570 | 590 | 454 | 3 | 3 |
| 50 | 60 | 40 | 5 | 0 | −5 | 580 | 590 | 454 | 2 | 3 |
| 50 | 60 | 40 | 5 | 0 | 0 | 520 | 598 | 452 | 2 | 1 |
| 50 | 60 | 40 | 5 | 0 | 0 | 530 | 597 | 452 | 4 | 3 |
| 50 | 60 | 40 | 5 | 0 | 0 | 540 | 597 | 451 | 4 | 3 |
| 50 | 60 | 40 | 5 | 0 | 0 | 550 | 595 | 451 | 4 | 3 |
| 50 | 60 | 40 | 5 | 0 | 0 | 560 | 592 | 451 | 4 | 3 |
| 50 | 60 | 40 | 5 | 0 | 0 | 570 | 590 | 451 | 3 | 3 |
| 50 | 60 | 40 | 5 | 0 | 0 | 580 | 591 | 451 | 2 | 3 |
| 50 | 60 | 40 | 5 | 0 | 5 | 520 | 598 | 449 | 2 | 2 |
| 50 | 60 | 40 | 5 | 0 | 5 | 530 | 598 | 448 | 4 | 3 |
| 50 | 60 | 40 | 5 | 0 | 5 | 540 | 597 | 448 | 4 | 3 |
| 50 | 60 | 40 | 5 | 0 | 5 | 550 | 594 | 447 | 4 | 3 |
| 50 | 60 | 40 | 5 | 0 | 5 | 560 | 591 | 448 | 4 | 3 |
| 50 | 60 | 40 | 5 | 0 | 5 | 570 | 590 | 447 | 3 | 3 |
| 50 | 60 | 40 | 5 | 0 | 5 | 580 | 591 | 447 | 2 | 3 |
| 50 | 60 | 40 | 5 | 5 | −5 | 520 | 598 | 455 | 3 | 2 |
| 50 | 60 | 40 | 5 | 5 | −5 | 530 | 598 | 454 | 4 | 3 |
| 50 | 60 | 40 | 5 | 5 | −5 | 540 | 596 | 454 | 4 | 3 |
| 50 | 60 | 40 | 5 | 5 | −5 | 550 | 594 | 454 | 4 | 3 |
| 50 | 60 | 40 | 5 | 5 | −5 | 560 | 592 | 454 | 4 | 3 |
| 50 | 60 | 40 | 5 | 5 | −5 | 570 | 590 | 454 | 3 | 2 |
| 50 | 60 | 40 | 5 | 5 | 0 | 520 | 599 | 452 | 3 | 2 |
| 50 | 60 | 40 | 5 | 5 | 0 | 530 | 598 | 451 | 4 | 3 |
| 50 | 60 | 40 | 5 | 5 | 0 | 540 | 597 | 451 | 4 | 3 |
| 50 | 60 | 40 | 5 | 5 | 0 | 550 | 594 | 451 | 4 | 3 |
| 50 | 60 | 40 | 5 | 5 | 0 | 560 | 592 | 451 | 4 | 3 |
| 50 | 60 | 40 | 5 | 5 | 0 | 570 | 590 | 451 | 3 | 3 |
| 50 | 60 | 40 | 5 | 5 | 5 | 520 | 598 | 449 | 3 | 3 |
| 50 | 60 | 40 | 5 | 5 | 5 | 530 | 597 | 448 | 4 | 3 |
| 50 | 60 | 40 | 5 | 5 | 5 | 540 | 597 | 448 | 4 | 4 |
| 50 | 60 | 40 | 5 | 5 | 5 | 550 | 594 | 447 | 4 | 3 |
| 50 | 60 | 40 | 5 | 5 | 5 | 560 | 592 | 447 | 4 | 3 |
| 50 | 60 | 40 | 5 | 5 | 5 | 570 | 591 | 448 | 3 | 3 |
| 50 | 60 | 50 | −5 | −5 | −5 | 530 | 604 | 456 | 3 | 3 |
| 50 | 60 | 50 | −5 | −5 | −5 | 540 | 603 | 454 | 4 | 3 |
| 50 | 60 | 50 | −5 | −5 | −5 | 550 | 601 | 454 | 4 | 4 |
| 50 | 60 | 50 | −5 | −5 | −5 | 560 | 598 | 454 | 4 | 3 |
| 50 | 60 | 50 | −5 | −5 | −5 | 570 | 595 | 454 | 3 | 3 |
| 50 | 60 | 50 | −5 | −5 | −5 | 580 | 595 | 454 | 2 | 3 |
| 50 | 60 | 50 | −5 | −5 | 0 | 530 | 604 | 453 | 3 | 3 |
| 50 | 60 | 50 | −5 | −5 | 0 | 540 | 604 | 452 | 4 | 4 |
| 50 | 60 | 50 | −5 | −5 | 0 | 550 | 601 | 452 | 4 | 4 |
| 50 | 60 | 50 | −5 | −5 | 0 | 560 | 598 | 451 | 4 | 3 |
| 50 | 60 | 50 | −5 | −5 | 0 | 570 | 595 | 451 | 3 | 3 |
| 50 | 60 | 50 | −5 | −5 | 0 | 580 | 595 | 451 | 2 | 3 |
| 50 | 60 | 50 | −5 | −5 | 5 | 530 | 604 | 451 | 3 | 3 |
| 50 | 60 | 50 | −5 | −5 | 5 | 540 | 603 | 450 | 4 | 4 |
| 50 | 60 | 50 | −5 | −5 | 5 | 550 | 601 | 449 | 4 | 4 |
| 50 | 60 | 50 | −5 | −5 | 5 | 560 | 597 | 449 | 4 | 3 |
| 50 | 60 | 50 | −5 | −5 | 5 | 570 | 595 | 449 | 3 | 3 |
| 50 | 60 | 50 | −5 | −5 | 5 | 580 | 595 | 449 | 2 | 3 |
| 50 | 60 | 50 | −5 | 0 | −5 | 530 | 604 | 456 | 3 | 3 |
| 50 | 60 | 50 | −5 | 0 | −5 | 540 | 603 | 454 | 4 | 4 |
| 50 | 60 | 50 | −5 | 0 | −5 | 550 | 600 | 454 | 4 | 4 |
| 50 | 60 | 50 | −5 | 0 | −5 | 560 | 598 | 454 | 3 | 3 |
| 50 | 60 | 50 | −5 | 0 | −5 | 570 | 595 | 454 | 2 | 3 |
| 50 | 60 | 50 | −5 | 0 | 0 | 530 | 604 | 453 | 3 | 3 |
| 50 | 60 | 50 | −5 | 0 | 0 | 540 | 603 | 452 | 4 | 4 |
| 50 | 60 | 50 | −5 | 0 | 0 | 550 | 600 | 451 | 4 | 4 |
| 50 | 60 | 50 | −5 | 0 | 0 | 560 | 597 | 451 | 3 | 3 |
| 50 | 60 | 50 | −5 | 0 | 0 | 570 | 595 | 451 | 2 | 3 |
| 50 | 60 | 50 | −5 | 0 | 5 | 530 | 604 | 450 | 3 | 3 |
| 50 | 60 | 50 | −5 | 0 | 5 | 540 | 603 | 449 | 4 | 4 |
| 50 | 60 | 50 | −5 | 0 | 5 | 550 | 601 | 448 | 4 | 3 |
| 50 | 60 | 50 | −5 | 0 | 5 | 560 | 598 | 448 | 3 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 60 | 50 | −5 | 0 | 5 | 570 | 596 | 448 | 2 | 3 |
| 50 | 60 | 50 | −5 | 5 | −5 | 520 | 605 | 456 | 1 | 1 |
| 50 | 60 | 50 | −5 | 5 | −5 | 530 | 604 | 455 | 3 | 3 |
| 50 | 60 | 50 | −5 | 5 | −5 | 540 | 603 | 454 | 4 | 4 |
| 50 | 60 | 50 | −5 | 5 | −5 | 550 | 601 | 454 | 4 | 3 |
| 50 | 60 | 50 | −5 | 5 | −5 | 560 | 598 | 454 | 3 | 3 |
| 50 | 60 | 50 | −5 | 5 | 0 | 520 | 605 | 455 | 2 | 2 |
| 50 | 60 | 50 | −5 | 5 | 0 | 530 | 604 | 453 | 4 | 3 |
| 50 | 60 | 50 | −5 | 5 | 0 | 540 | 602 | 452 | 4 | 4 |
| 50 | 60 | 50 | −5 | 5 | 0 | 550 | 601 | 451 | 4 | 3 |
| 50 | 60 | 50 | −5 | 5 | 0 | 560 | 598 | 451 | 3 | 3 |
| 50 | 60 | 50 | −5 | 5 | 5 | 520 | 605 | 452 | 2 | 2 |
| 50 | 60 | 50 | −5 | 5 | 5 | 530 | 604 | 450 | 4 | 3 |
| 50 | 60 | 50 | −5 | 5 | 5 | 540 | 603 | 449 | 4 | 4 |
| 50 | 60 | 50 | −5 | 5 | 5 | 550 | 601 | 449 | 4 | 3 |
| 50 | 60 | 50 | −5 | 5 | 5 | 560 | 598 | 448 | 3 | 3 |
| 50 | 60 | 50 | 0 | −5 | −5 | 530 | 601 | 456 | 3 | 3 |
| 50 | 60 | 50 | 0 | −5 | −5 | 540 | 600 | 454 | 4 | 3 |
| 50 | 60 | 50 | 0 | −5 | −5 | 550 | 597 | 454 | 4 | 4 |
| 50 | 60 | 50 | 0 | −5 | −5 | 560 | 595 | 454 | 4 | 3 |
| 50 | 60 | 50 | 0 | −5 | −5 | 570 | 591 | 454 | 3 | 3 |
| 50 | 60 | 50 | 0 | −5 | −5 | 580 | 592 | 454 | 2 | 3 |
| 50 | 60 | 50 | 0 | −5 | −5 | 590 | 596 | 454 | 1 | 2 |
| 50 | 60 | 50 | 0 | −5 | 0 | 530 | 601 | 453 | 3 | 3 |
| 50 | 60 | 50 | 0 | −5 | 0 | 540 | 600 | 452 | 4 | 4 |
| 50 | 60 | 50 | 0 | −5 | 0 | 550 | 597 | 452 | 4 | 4 |
| 50 | 60 | 50 | 0 | −5 | 0 | 560 | 595 | 451 | 4 | 3 |
| 50 | 60 | 50 | 0 | −5 | 0 | 570 | 592 | 451 | 3 | 3 |
| 50 | 60 | 50 | 0 | −5 | 0 | 580 | 592 | 451 | 2 | 3 |
| 50 | 60 | 50 | 0 | −5 | 0 | 590 | 596 | 451 | 2 | 2 |
| 50 | 60 | 50 | 0 | −5 | 5 | 530 | 601 | 451 | 3 | 3 |
| 50 | 60 | 50 | 0 | −5 | 5 | 540 | 600 | 450 | 4 | 4 |
| 50 | 60 | 50 | 0 | −5 | 5 | 550 | 598 | 449 | 4 | 4 |
| 50 | 60 | 50 | 0 | −5 | 5 | 560 | 594 | 449 | 4 | 3 |
| 50 | 60 | 50 | 0 | −5 | 5 | 570 | 592 | 448 | 3 | 3 |
| 50 | 60 | 50 | 0 | −5 | 5 | 580 | 592 | 449 | 2 | 3 |
| 50 | 60 | 50 | 0 | −5 | 5 | 590 | 596 | 449 | 2 | 2 |
| 50 | 60 | 50 | 0 | 0 | −5 | 530 | 601 | 456 | 3 | 3 |
| 50 | 60 | 50 | 0 | 0 | −5 | 540 | 600 | 454 | 4 | 4 |
| 50 | 60 | 50 | 0 | 0 | −5 | 550 | 598 | 454 | 4 | 4 |
| 50 | 60 | 50 | 0 | 0 | −5 | 560 | 595 | 454 | 3 | 3 |
| 50 | 60 | 50 | 0 | 0 | −5 | 570 | 592 | 454 | 3 | 3 |
| 50 | 60 | 50 | 0 | 0 | −5 | 580 | 593 | 454 | 1 | 2 |
| 50 | 60 | 50 | 0 | 0 | 0 | 530 | 601 | 453 | 3 | 3 |
| 50 | 60 | 50 | 0 | 0 | 0 | 540 | 600 | 452 | 4 | 4 |
| 50 | 60 | 50 | 0 | 0 | 0 | 550 | 597 | 451 | 4 | 4 |
| 50 | 60 | 50 | 0 | 0 | 0 | 560 | 594 | 451 | 4 | 3 |
| 50 | 60 | 50 | 0 | 0 | 0 | 570 | 592 | 451 | 3 | 3 |
| 50 | 60 | 50 | 0 | 0 | 0 | 580 | 593 | 451 | 1 | 2 |
| 50 | 60 | 50 | 0 | 0 | 5 | 530 | 601 | 450 | 3 | 3 |
| 50 | 60 | 50 | 0 | 0 | 5 | 540 | 599 | 449 | 4 | 4 |
| 50 | 60 | 50 | 0 | 0 | 5 | 550 | 597 | 448 | 4 | 4 |
| 50 | 60 | 50 | 0 | 0 | 5 | 560 | 594 | 448 | 4 | 3 |
| 50 | 60 | 50 | 0 | 0 | 5 | 570 | 592 | 448 | 3 | 3 |
| 50 | 60 | 50 | 0 | 0 | 5 | 580 | 593 | 449 | 1 | 2 |
| 50 | 60 | 50 | 0 | 5 | −5 | 520 | 601 | 457 | 1 | 1 |
| 50 | 60 | 50 | 0 | 5 | −5 | 530 | 601 | 455 | 3 | 3 |
| 50 | 60 | 50 | 0 | 5 | −5 | 540 | 600 | 454 | 4 | 4 |
| 50 | 60 | 50 | 0 | 5 | −5 | 550 | 597 | 454 | 4 | 3 |
| 50 | 60 | 50 | 0 | 5 | −5 | 560 | 595 | 454 | 3 | 3 |
| 50 | 60 | 50 | 0 | 5 | −5 | 570 | 592 | 454 | 0 | 0 |
| 50 | 60 | 50 | 0 | 5 | 0 | 520 | 602 | 454 | 2 | 2 |
| 50 | 60 | 50 | 0 | 5 | 0 | 530 | 601 | 453 | 4 | 3 |
| 50 | 60 | 50 | 0 | 5 | 0 | 540 | 600 | 452 | 4 | 4 |
| 50 | 60 | 50 | 0 | 5 | 0 | 550 | 597 | 451 | 4 | 3 |
| 50 | 60 | 50 | 0 | 5 | 0 | 560 | 595 | 451 | 3 | 3 |
| 50 | 60 | 50 | 0 | 5 | 0 | 570 | 593 | 451 | 1 | 1 |
| 50 | 60 | 50 | 0 | 5 | 5 | 520 | 601 | 451 | 2 | 2 |
| 50 | 60 | 50 | 0 | 5 | 5 | 530 | 601 | 450 | 4 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 60 | 50 | 0 | 5 | 5 | 540 | 599 | 449 | 4 | 4 |
| 50 | 60 | 50 | 0 | 5 | 5 | 550 | 597 | 449 | 4 | 3 |
| 50 | 60 | 50 | 0 | 5 | 5 | 560 | 595 | 448 | 3 | 3 |
| 50 | 60 | 50 | 0 | 5 | 5 | 570 | 593 | 448 | 1 | 2 |
| 50 | 60 | 50 | 5 | −5 | −5 | 530 | 598 | 456 | 3 | 3 |
| 50 | 60 | 50 | 5 | −5 | −5 | 540 | 597 | 454 | 4 | 3 |
| 50 | 60 | 50 | 5 | −5 | −5 | 550 | 595 | 454 | 4 | 4 |
| 50 | 60 | 50 | 5 | −5 | −5 | 560 | 591 | 454 | 4 | 3 |
| 50 | 60 | 50 | 5 | −5 | −5 | 570 | 589 | 454 | 3 | 3 |
| 50 | 60 | 50 | 5 | −5 | −5 | 580 | 589 | 454 | 2 | 3 |
| 50 | 60 | 50 | 5 | −5 | −5 | 590 | 593 | 454 | 1 | 2 |
| 50 | 60 | 50 | 5 | −5 | 0 | 530 | 598 | 454 | 3 | 3 |
| 50 | 60 | 50 | 5 | −5 | 0 | 540 | 596 | 452 | 4 | 4 |
| 50 | 60 | 50 | 5 | −5 | 0 | 550 | 595 | 452 | 4 | 4 |
| 50 | 60 | 50 | 5 | −5 | 0 | 560 | 591 | 451 | 4 | 3 |
| 50 | 60 | 50 | 5 | −5 | 0 | 570 | 589 | 451 | 3 | 3 |
| 50 | 60 | 50 | 5 | −5 | 0 | 580 | 589 | 451 | 2 | 3 |
| 50 | 60 | 50 | 5 | −5 | 0 | 590 | 593 | 451 | 1 | 2 |
| 50 | 60 | 50 | 5 | −5 | 5 | 530 | 598 | 451 | 3 | 3 |
| 50 | 60 | 50 | 5 | −5 | 5 | 540 | 596 | 450 | 4 | 4 |
| 50 | 60 | 50 | 5 | −5 | 5 | 550 | 594 | 449 | 4 | 4 |
| 50 | 60 | 50 | 5 | −5 | 5 | 560 | 592 | 449 | 4 | 3 |
| 50 | 60 | 50 | 5 | −5 | 5 | 570 | 589 | 448 | 3 | 3 |
| 50 | 60 | 50 | 5 | −5 | 5 | 580 | 589 | 448 | 2 | 3 |
| 50 | 60 | 50 | 5 | −5 | 5 | 590 | 593 | 449 | 1 | 2 |
| 50 | 60 | 50 | 5 | 0 | −5 | 530 | 598 | 456 | 3 | 3 |
| 50 | 60 | 50 | 5 | 0 | −5 | 540 | 596 | 454 | 4 | 4 |
| 50 | 60 | 50 | 5 | 0 | −5 | 550 | 594 | 454 | 4 | 4 |
| 50 | 60 | 50 | 5 | 0 | −5 | 560 | 591 | 454 | 4 | 3 |
| 50 | 60 | 50 | 5 | 0 | −5 | 570 | 589 | 454 | 3 | 3 |
| 50 | 60 | 50 | 5 | 0 | −5 | 580 | 590 | 454 | 2 | 2 |
| 50 | 60 | 50 | 5 | 0 | 0 | 530 | 597 | 453 | 3 | 3 |
| 50 | 60 | 50 | 5 | 0 | 0 | 540 | 596 | 452 | 4 | 4 |
| 50 | 60 | 50 | 5 | 0 | 0 | 550 | 594 | 451 | 4 | 4 |
| 50 | 60 | 50 | 5 | 0 | 0 | 560 | 592 | 451 | 3 | 3 |
| 50 | 60 | 50 | 5 | 0 | 0 | 570 | 589 | 451 | 3 | 3 |
| 50 | 60 | 50 | 5 | 0 | 0 | 580 | 590 | 451 | 2 | 2 |
| 50 | 60 | 50 | 5 | 0 | 5 | 530 | 597 | 450 | 3 | 3 |
| 50 | 60 | 50 | 5 | 0 | 5 | 540 | 596 | 449 | 4 | 4 |
| 50 | 60 | 50 | 5 | 0 | 5 | 550 | 594 | 448 | 4 | 4 |
| 50 | 60 | 50 | 5 | 0 | 5 | 560 | 592 | 448 | 3 | 3 |
| 50 | 60 | 50 | 5 | 0 | 5 | 570 | 589 | 448 | 3 | 3 |
| 50 | 60 | 50 | 5 | 0 | 5 | 580 | 590 | 449 | 2 | 2 |
| 50 | 60 | 50 | 5 | 5 | −5 | 520 | 598 | 456 | 1 | 1 |
| 50 | 60 | 50 | 5 | 5 | −5 | 530 | 597 | 455 | 3 | 3 |
| 50 | 60 | 50 | 5 | 5 | −5 | 540 | 596 | 454 | 4 | 4 |
| 50 | 60 | 50 | 5 | 5 | −5 | 550 | 595 | 454 | 4 | 3 |
| 50 | 60 | 50 | 5 | 5 | −5 | 560 | 591 | 454 | 3 | 3 |
| 50 | 60 | 50 | 5 | 5 | −5 | 570 | 589 | 454 | 2 | 2 |
| 50 | 60 | 50 | 5 | 5 | 0 | 520 | 598 | 454 | 2 | 2 |
| 50 | 60 | 50 | 5 | 5 | 0 | 530 | 598 | 453 | 4 | 3 |
| 50 | 60 | 50 | 5 | 5 | 0 | 540 | 596 | 452 | 4 | 4 |
| 50 | 60 | 50 | 5 | 5 | 0 | 550 | 594 | 451 | 4 | 3 |
| 50 | 60 | 50 | 5 | 5 | 0 | 560 | 591 | 451 | 3 | 3 |
| 50 | 60 | 50 | 5 | 5 | 0 | 570 | 589 | 451 | 2 | 2 |
| 50 | 60 | 50 | 5 | 5 | 5 | 520 | 599 | 452 | 2 | 2 |
| 50 | 60 | 50 | 5 | 5 | 5 | 530 | 598 | 449 | 4 | 3 |
| 50 | 60 | 50 | 5 | 5 | 5 | 540 | 596 | 449 | 4 | 4 |
| 50 | 60 | 50 | 5 | 5 | 5 | 550 | 594 | 449 | 4 | 3 |
| 50 | 60 | 50 | 5 | 5 | 5 | 560 | 591 | 448 | 3 | 3 |
| 50 | 60 | 50 | 5 | 5 | 5 | 570 | 589 | 448 | 2 | 2 |
| 50 | 70 | 30 | −5 | −5 | −5 | 530 | 605 | 454 | 3 | 2 |
| 50 | 70 | 30 | −5 | −5 | −5 | 540 | 604 | 454 | 3 | 3 |
| 50 | 70 | 30 | −5 | −5 | −5 | 550 | 603 | 454 | 4 | 3 |
| 50 | 70 | 30 | −5 | −5 | −5 | 560 | 602 | 454 | 4 | 3 |
| 50 | 70 | 30 | −5 | −5 | −5 | 570 | 602 | 454 | 3 | 3 |
| 50 | 70 | 30 | −5 | −5 | −5 | 580 | 602 | 454 | 3 | 3 |
| 50 | 70 | 30 | −5 | −5 | −5 | 590 | 606 | 454 | 1 | 2 |
| 50 | 70 | 30 | −5 | −5 | 0 | 530 | 604 | 451 | 3 | 2 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 70 | 30 | −5 | −5 | 0 | 540 | 604 | 450 | 4 | 3 |
| 50 | 70 | 30 | −5 | −5 | 0 | 550 | 603 | 450 | 4 | 3 |
| 50 | 70 | 30 | −5 | −5 | 0 | 560 | 602 | 450 | 4 | 3 |
| 50 | 70 | 30 | −5 | −5 | 0 | 570 | 602 | 450 | 3 | 3 |
| 50 | 70 | 30 | −5 | −5 | 0 | 580 | 603 | 450 | 3 | 3 |
| 50 | 70 | 30 | −5 | −5 | 0 | 590 | 606 | 450 | 2 | 2 |
| 50 | 70 | 30 | −5 | −5 | 5 | 530 | 604 | 447 | 3 | 2 |
| 50 | 70 | 30 | −5 | −5 | 5 | 540 | 604 | 446 | 4 | 3 |
| 50 | 70 | 30 | −5 | −5 | 5 | 550 | 603 | 446 | 4 | 3 |
| 50 | 70 | 30 | −5 | −5 | 5 | 560 | 601 | 446 | 4 | 3 |
| 50 | 70 | 30 | −5 | −5 | 5 | 570 | 602 | 446 | 3 | 3 |
| 50 | 70 | 30 | −5 | −5 | 5 | 580 | 603 | 446 | 3 | 3 |
| 50 | 70 | 30 | −5 | −5 | 5 | 590 | 606 | 446 | 2 | 2 |
| 50 | 70 | 30 | −5 | 0 | −5 | 530 | 604 | 455 | 3 | 2 |
| 50 | 70 | 30 | −5 | 0 | −5 | 540 | 604 | 454 | 4 | 3 |
| 50 | 70 | 30 | −5 | 0 | −5 | 550 | 603 | 454 | 4 | 3 |
| 50 | 70 | 30 | −5 | 0 | −5 | 560 | 602 | 454 | 3 | 3 |
| 50 | 70 | 30 | −5 | 0 | −5 | 570 | 602 | 454 | 3 | 3 |
| 50 | 70 | 30 | −5 | 0 | −5 | 580 | 604 | 454 | 2 | 2 |
| 50 | 70 | 30 | −5 | 0 | 0 | 530 | 605 | 450 | 3 | 2 |
| 50 | 70 | 30 | −5 | 0 | 0 | 540 | 604 | 450 | 4 | 3 |
| 50 | 70 | 30 | −5 | 0 | 0 | 550 | 603 | 450 | 4 | 3 |
| 50 | 70 | 30 | −5 | 0 | 0 | 560 | 602 | 450 | 4 | 3 |
| 50 | 70 | 30 | −5 | 0 | 0 | 570 | 602 | 450 | 3 | 3 |
| 50 | 70 | 30 | −5 | 0 | 0 | 580 | 604 | 450 | 2 | 2 |
| 50 | 70 | 30 | −5 | 0 | 5 | 530 | 605 | 446 | 3 | 2 |
| 50 | 70 | 30 | −5 | 0 | 5 | 540 | 605 | 446 | 4 | 3 |
| 50 | 70 | 30 | −5 | 0 | 5 | 550 | 603 | 446 | 4 | 3 |
| 50 | 70 | 30 | −5 | 0 | 5 | 560 | 602 | 446 | 4 | 3 |
| 50 | 70 | 30 | −5 | 0 | 5 | 570 | 602 | 446 | 3 | 3 |
| 50 | 70 | 30 | −5 | 0 | 5 | 580 | 603 | 446 | 2 | 2 |
| 50 | 70 | 30 | −5 | 5 | −5 | 530 | 605 | 454 | 3 | 3 |
| 50 | 70 | 30 | −5 | 5 | −5 | 540 | 604 | 454 | 4 | 3 |
| 50 | 70 | 30 | −5 | 5 | −5 | 550 | 603 | 454 | 4 | 3 |
| 50 | 70 | 30 | −5 | 5 | −5 | 560 | 603 | 454 | 3 | 3 |
| 50 | 70 | 30 | −5 | 5 | −5 | 570 | 603 | 454 | 3 | 3 |
| 50 | 70 | 30 | −5 | 5 | 0 | 530 | 604 | 450 | 3 | 3 |
| 50 | 70 | 30 | −5 | 5 | 0 | 540 | 605 | 450 | 4 | 3 |
| 50 | 70 | 30 | −5 | 5 | 0 | 550 | 603 | 450 | 4 | 3 |
| 50 | 70 | 30 | −5 | 5 | 0 | 560 | 603 | 450 | 3 | 3 |
| 50 | 70 | 30 | −5 | 5 | 0 | 570 | 603 | 450 | 3 | 3 |
| 50 | 70 | 30 | −5 | 5 | 5 | 530 | 605 | 446 | 3 | 3 |
| 50 | 70 | 30 | −5 | 5 | 5 | 540 | 605 | 446 | 4 | 3 |
| 50 | 70 | 30 | −5 | 5 | 5 | 550 | 603 | 446 | 4 | 3 |
| 50 | 70 | 30 | −5 | 5 | 5 | 560 | 603 | 446 | 3 | 3 |
| 50 | 70 | 30 | −5 | 5 | 5 | 570 | 603 | 446 | 3 | 3 |
| 50 | 70 | 30 | 0 | −5 | −5 | 530 | 601 | 454 | 3 | 2 |
| 50 | 70 | 30 | 0 | −5 | −5 | 540 | 600 | 454 | 3 | 3 |
| 50 | 70 | 30 | 0 | −5 | −5 | 550 | 599 | 454 | 4 | 3 |
| 50 | 70 | 30 | 0 | −5 | −5 | 560 | 598 | 454 | 4 | 3 |
| 50 | 70 | 30 | 0 | −5 | −5 | 570 | 598 | 454 | 3 | 3 |
| 50 | 70 | 30 | 0 | −5 | −5 | 580 | 599 | 454 | 3 | 3 |
| 50 | 70 | 30 | 0 | −5 | −5 | 590 | 602 | 454 | 2 | 2 |
| 50 | 70 | 30 | 0 | −5 | 0 | 530 | 602 | 451 | 3 | 2 |
| 50 | 70 | 30 | 0 | −5 | 0 | 540 | 601 | 450 | 4 | 3 |
| 50 | 70 | 30 | 0 | −5 | 0 | 550 | 600 | 450 | 4 | 3 |
| 50 | 70 | 30 | 0 | −5 | 0 | 560 | 599 | 450 | 4 | 3 |
| 50 | 70 | 30 | 0 | −5 | 0 | 570 | 598 | 450 | 3 | 3 |
| 50 | 70 | 30 | 0 | −5 | 0 | 580 | 599 | 450 | 3 | 3 |
| 50 | 70 | 30 | 0 | −5 | 0 | 590 | 602 | 450 | 2 | 2 |
| 50 | 70 | 30 | 0 | −5 | 5 | 530 | 601 | 447 | 3 | 2 |
| 50 | 70 | 30 | 0 | −5 | 5 | 540 | 601 | 446 | 4 | 3 |
| 50 | 70 | 30 | 0 | −5 | 5 | 550 | 600 | 446 | 4 | 3 |
| 50 | 70 | 30 | 0 | −5 | 5 | 560 | 599 | 446 | 4 | 3 |
| 50 | 70 | 30 | 0 | −5 | 5 | 570 | 599 | 446 | 3 | 3 |
| 50 | 70 | 30 | 0 | −5 | 5 | 580 | 600 | 446 | 3 | 3 |
| 50 | 70 | 30 | 0 | −5 | 5 | 590 | 602 | 446 | 2 | 2 |
| 50 | 70 | 30 | 0 | 0 | −5 | 530 | 602 | 454 | 3 | 2 |
| 50 | 70 | 30 | 0 | 0 | −5 | 540 | 600 | 454 | 4 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 70 | 30 | 0 | 0 | −5 | 550 | 599 | 454 | 4 | 3 |
| 50 | 70 | 30 | 0 | 0 | −5 | 560 | 599 | 454 | 4 | 3 |
| 50 | 70 | 30 | 0 | 0 | −5 | 570 | 599 | 454 | 3 | 3 |
| 50 | 70 | 30 | 0 | 0 | −5 | 580 | 600 | 454 | 2 | 3 |
| 50 | 70 | 30 | 0 | 0 | 0 | 530 | 601 | 450 | 3 | 2 |
| 50 | 70 | 30 | 0 | 0 | 0 | 540 | 601 | 450 | 4 | 3 |
| 50 | 70 | 30 | 0 | 0 | 0 | 550 | 600 | 450 | 4 | 3 |
| 50 | 70 | 30 | 0 | 0 | 0 | 560 | 599 | 450 | 4 | 3 |
| 50 | 70 | 30 | 0 | 0 | 0 | 570 | 599 | 450 | 3 | 3 |
| 50 | 70 | 30 | 0 | 0 | 0 | 580 | 600 | 450 | 2 | 3 |
| 50 | 70 | 30 | 0 | 0 | 5 | 530 | 602 | 446 | 3 | 2 |
| 50 | 70 | 30 | 0 | 0 | 5 | 540 | 601 | 446 | 4 | 3 |
| 50 | 70 | 30 | 0 | 0 | 5 | 550 | 600 | 446 | 4 | 3 |
| 50 | 70 | 30 | 0 | 0 | 5 | 560 | 599 | 446 | 4 | 3 |
| 50 | 70 | 30 | 0 | 0 | 5 | 570 | 599 | 446 | 3 | 3 |
| 50 | 70 | 30 | 0 | 0 | 5 | 580 | 600 | 446 | 3 | 3 |
| 50 | 70 | 30 | 0 | 5 | −5 | 530 | 601 | 454 | 3 | 3 |
| 50 | 70 | 30 | 0 | 5 | −5 | 540 | 601 | 454 | 4 | 3 |
| 50 | 70 | 30 | 0 | 5 | −5 | 550 | 600 | 454 | 4 | 3 |
| 50 | 70 | 30 | 0 | 5 | −5 | 560 | 599 | 454 | 3 | 3 |
| 50 | 70 | 30 | 0 | 5 | −5 | 570 | 599 | 454 | 3 | 3 |
| 50 | 70 | 30 | 0 | 5 | −5 | 580 | 601 | 454 | 1 | 1 |
| 50 | 70 | 30 | 0 | 5 | 0 | 530 | 602 | 450 | 3 | 3 |
| 50 | 70 | 30 | 0 | 5 | 0 | 540 | 601 | 450 | 4 | 3 |
| 50 | 70 | 30 | 0 | 5 | 0 | 550 | 600 | 450 | 4 | 3 |
| 50 | 70 | 30 | 0 | 5 | 0 | 560 | 599 | 450 | 3 | 3 |
| 50 | 70 | 30 | 0 | 5 | 0 | 570 | 600 | 450 | 3 | 3 |
| 50 | 70 | 30 | 0 | 5 | 0 | 580 | 601 | 450 | 1 | 2 |
| 50 | 70 | 30 | 0 | 5 | 5 | 530 | 602 | 446 | 3 | 3 |
| 50 | 70 | 30 | 0 | 5 | 5 | 540 | 601 | 446 | 4 | 3 |
| 50 | 70 | 30 | 0 | 5 | 5 | 550 | 600 | 446 | 4 | 3 |
| 50 | 70 | 30 | 0 | 5 | 5 | 560 | 599 | 446 | 3 | 3 |
| 50 | 70 | 30 | 0 | 5 | 5 | 570 | 600 | 446 | 3 | 3 |
| 50 | 70 | 30 | 0 | 5 | 5 | 580 | 602 | 446 | 2 | 2 |
| 50 | 70 | 30 | 5 | −5 | −5 | 530 | 598 | 454 | 3 | 2 |
| 50 | 70 | 30 | 5 | −5 | −5 | 540 | 598 | 454 | 3 | 3 |
| 50 | 70 | 30 | 5 | −5 | −5 | 550 | 597 | 454 | 4 | 3 |
| 50 | 70 | 30 | 5 | −5 | −5 | 560 | 595 | 454 | 4 | 3 |
| 50 | 70 | 30 | 5 | −5 | −5 | 570 | 595 | 454 | 3 | 3 |
| 50 | 70 | 30 | 5 | −5 | −5 | 580 | 596 | 454 | 3 | 3 |
| 50 | 70 | 30 | 5 | −5 | −5 | 590 | 599 | 454 | 2 | 2 |
| 50 | 70 | 30 | 5 | −5 | 0 | 530 | 598 | 451 | 3 | 2 |
| 50 | 70 | 30 | 5 | −5 | 0 | 540 | 597 | 450 | 4 | 3 |
| 50 | 70 | 30 | 5 | −5 | 0 | 550 | 596 | 450 | 4 | 3 |
| 50 | 70 | 30 | 5 | −5 | 0 | 560 | 595 | 450 | 4 | 3 |
| 50 | 70 | 30 | 5 | −5 | 0 | 570 | 595 | 450 | 3 | 3 |
| 50 | 70 | 30 | 5 | −5 | 0 | 580 | 596 | 450 | 3 | 3 |
| 50 | 70 | 30 | 5 | −5 | 0 | 590 | 598 | 450 | 2 | 3 |
| 50 | 70 | 30 | 5 | −5 | 5 | 530 | 598 | 447 | 3 | 2 |
| 50 | 70 | 30 | 5 | −5 | 5 | 540 | 597 | 446 | 4 | 3 |
| 50 | 70 | 30 | 5 | −5 | 5 | 550 | 596 | 446 | 4 | 3 |
| 50 | 70 | 30 | 5 | −5 | 5 | 560 | 595 | 446 | 4 | 3 |
| 50 | 70 | 30 | 5 | −5 | 5 | 570 | 595 | 446 | 3 | 3 |
| 50 | 70 | 30 | 5 | −5 | 5 | 580 | 596 | 446 | 3 | 3 |
| 50 | 70 | 30 | 5 | −5 | 5 | 590 | 599 | 446 | 2 | 2 |
| 50 | 70 | 30 | 5 | 0 | −5 | 530 | 598 | 454 | 3 | 2 |
| 50 | 70 | 30 | 5 | 0 | −5 | 540 | 598 | 454 | 4 | 3 |
| 50 | 70 | 30 | 5 | 0 | −5 | 550 | 597 | 454 | 4 | 3 |
| 50 | 70 | 30 | 5 | 0 | −5 | 560 | 596 | 454 | 3 | 3 |
| 50 | 70 | 30 | 5 | 0 | −5 | 570 | 595 | 454 | 3 | 3 |
| 50 | 70 | 30 | 5 | 0 | −5 | 580 | 597 | 454 | 2 | 3 |
| 50 | 70 | 30 | 5 | 0 | 0 | 530 | 599 | 450 | 3 | 2 |
| 50 | 70 | 30 | 5 | 0 | 0 | 540 | 597 | 450 | 4 | 3 |
| 50 | 70 | 30 | 5 | 0 | 0 | 550 | 596 | 450 | 4 | 3 |
| 50 | 70 | 30 | 5 | 0 | 0 | 560 | 596 | 450 | 3 | 3 |
| 50 | 70 | 30 | 5 | 0 | 0 | 570 | 596 | 450 | 3 | 3 |
| 50 | 70 | 30 | 5 | 0 | 0 | 580 | 596 | 450 | 3 | 3 |
| 50 | 70 | 30 | 5 | 0 | 5 | 530 | 598 | 446 | 3 | 3 |
| 50 | 70 | 30 | 5 | 0 | 5 | 540 | 597 | 446 | 4 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | $HalfAxis_R$ | $HalfAxis_B$ |
| 50 | 70 | 30 | 5 | 0 | 5 | 550 | 596 | 446 | 4 | 3 |
| 50 | 70 | 30 | 5 | 0 | 5 | 560 | 596 | 446 | 4 | 3 |
| 50 | 70 | 30 | 5 | 0 | 5 | 570 | 596 | 446 | 3 | 3 |
| 50 | 70 | 30 | 5 | 0 | 5 | 580 | 597 | 446 | 3 | 3 |
| 50 | 70 | 30 | 5 | 0 | 5 | 590 | 600 | 446 | 0 | 1 |
| 50 | 70 | 30 | 5 | 5 | −5 | 530 | 599 | 454 | 3 | 3 |
| 50 | 70 | 30 | 5 | 5 | −5 | 540 | 598 | 454 | 4 | 3 |
| 50 | 70 | 30 | 5 | 5 | −5 | 550 | 597 | 454 | 4 | 3 |
| 50 | 70 | 30 | 5 | 5 | −5 | 560 | 596 | 454 | 3 | 3 |
| 50 | 70 | 30 | 5 | 5 | −5 | 570 | 596 | 454 | 3 | 3 |
| 50 | 70 | 30 | 5 | 5 | −5 | 580 | 598 | 454 | 2 | 2 |
| 50 | 70 | 30 | 5 | 5 | 0 | 530 | 598 | 450 | 3 | 3 |
| 50 | 70 | 30 | 5 | 5 | 0 | 540 | 597 | 450 | 4 | 3 |
| 50 | 70 | 30 | 5 | 5 | 0 | 550 | 597 | 450 | 4 | 3 |
| 50 | 70 | 30 | 5 | 5 | 0 | 560 | 596 | 450 | 3 | 3 |
| 50 | 70 | 30 | 5 | 5 | 0 | 570 | 596 | 450 | 3 | 3 |
| 50 | 70 | 30 | 5 | 5 | 0 | 580 | 597 | 450 | 2 | 2 |
| 50 | 70 | 30 | 5 | 5 | 5 | 530 | 598 | 446 | 3 | 3 |
| 50 | 70 | 30 | 5 | 5 | 5 | 540 | 597 | 446 | 4 | 3 |
| 50 | 70 | 30 | 5 | 5 | 5 | 550 | 597 | 446 | 4 | 3 |
| 50 | 70 | 30 | 5 | 5 | 5 | 560 | 596 | 446 | 3 | 3 |
| 50 | 70 | 30 | 5 | 5 | 5 | 570 | 596 | 446 | 3 | 3 |
| 50 | 70 | 30 | 5 | 5 | 5 | 580 | 597 | 446 | 2 | 2 |
| 50 | 70 | 40 | −5 | −5 | −5 | 530 | 605 | 456 | 3 | 3 |
| 50 | 70 | 40 | −5 | −5 | −5 | 540 | 604 | 455 | 4 | 3 |
| 50 | 70 | 40 | −5 | −5 | −5 | 550 | 603 | 455 | 4 | 3 |
| 50 | 70 | 40 | −5 | −5 | −5 | 560 | 602 | 454 | 4 | 3 |
| 50 | 70 | 40 | −5 | −5 | −5 | 570 | 601 | 454 | 3 | 3 |
| 50 | 70 | 40 | −5 | −5 | −5 | 580 | 603 | 454 | 3 | 3 |
| 50 | 70 | 40 | −5 | −5 | −5 | 590 | 606 | 454 | 2 | 2 |
| 50 | 70 | 40 | −5 | −5 | 0 | 520 | 605 | 453 | 2 | 2 |
| 50 | 70 | 40 | −5 | −5 | 0 | 530 | 604 | 452 | 3 | 3 |
| 50 | 70 | 40 | −5 | −5 | 0 | 540 | 604 | 451 | 4 | 3 |
| 50 | 70 | 40 | −5 | −5 | 0 | 550 | 603 | 451 | 4 | 3 |
| 50 | 70 | 40 | −5 | −5 | 0 | 560 | 602 | 451 | 4 | 3 |
| 50 | 70 | 40 | −5 | −5 | 0 | 570 | 602 | 451 | 3 | 3 |
| 50 | 70 | 40 | −5 | −5 | 0 | 580 | 603 | 450 | 3 | 3 |
| 50 | 70 | 40 | −5 | −5 | 0 | 590 | 606 | 451 | 2 | 3 |
| 50 | 70 | 40 | −5 | −5 | 5 | 520 | 605 | 450 | 2 | 2 |
| 50 | 70 | 40 | −5 | −5 | 5 | 530 | 604 | 449 | 4 | 3 |
| 50 | 70 | 40 | −5 | −5 | 5 | 540 | 603 | 448 | 4 | 3 |
| 50 | 70 | 40 | −5 | −5 | 5 | 550 | 603 | 448 | 4 | 3 |
| 50 | 70 | 40 | −5 | −5 | 5 | 560 | 602 | 448 | 4 | 3 |
| 50 | 70 | 40 | −5 | −5 | 5 | 570 | 602 | 447 | 3 | 3 |
| 50 | 70 | 40 | −5 | −5 | 5 | 580 | 603 | 448 | 3 | 3 |
| 50 | 70 | 40 | −5 | −5 | 5 | 590 | 606 | 448 | 2 | 3 |
| 50 | 70 | 40 | −5 | 0 | −5 | 520 | 605 | 456 | 2 | 2 |
| 50 | 70 | 40 | −5 | 0 | −5 | 530 | 605 | 455 | 3 | 3 |
| 50 | 70 | 40 | −5 | 0 | −5 | 540 | 604 | 455 | 4 | 3 |
| 50 | 70 | 40 | −5 | 0 | −5 | 550 | 603 | 454 | 4 | 3 |
| 50 | 70 | 40 | −5 | 0 | −5 | 560 | 603 | 454 | 4 | 3 |
| 50 | 70 | 40 | −5 | 0 | −5 | 570 | 602 | 454 | 3 | 3 |
| 50 | 70 | 40 | −5 | 0 | −5 | 580 | 604 | 454 | 2 | 3 |
| 50 | 70 | 40 | −5 | 0 | 0 | 520 | 605 | 453 | 3 | 2 |
| 50 | 70 | 40 | −5 | 0 | 0 | 530 | 604 | 452 | 4 | 3 |
| 50 | 70 | 40 | −5 | 0 | 0 | 540 | 604 | 451 | 4 | 3 |
| 50 | 70 | 40 | −5 | 0 | 0 | 550 | 603 | 451 | 4 | 3 |
| 50 | 70 | 40 | −5 | 0 | 0 | 560 | 603 | 451 | 4 | 3 |
| 50 | 70 | 40 | −5 | 0 | 0 | 570 | 602 | 451 | 3 | 3 |
| 50 | 70 | 40 | −5 | 0 | 0 | 580 | 604 | 451 | 3 | 3 |
| 50 | 70 | 40 | −5 | 0 | 5 | 520 | 605 | 449 | 3 | 2 |
| 50 | 70 | 40 | −5 | 0 | 5 | 530 | 605 | 449 | 4 | 3 |
| 50 | 70 | 40 | −5 | 0 | 5 | 540 | 604 | 448 | 4 | 3 |
| 50 | 70 | 40 | −5 | 0 | 5 | 550 | 603 | 448 | 4 | 3 |
| 50 | 70 | 40 | −5 | 0 | 5 | 560 | 602 | 448 | 4 | 3 |
| 50 | 70 | 40 | −5 | 0 | 5 | 570 | 602 | 448 | 3 | 3 |
| 50 | 70 | 40 | −5 | 0 | 5 | 580 | 604 | 448 | 3 | 3 |
| 50 | 70 | 40 | −5 | 5 | −5 | 520 | 606 | 456 | 2 | 2 |
| 50 | 70 | 40 | −5 | 5 | −5 | 530 | 604 | 455 | 4 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 70 | 40 | −5 | 5 | −5 | 540 | 604 | 455 | 4 | 3 |
| 50 | 70 | 40 | −5 | 5 | −5 | 550 | 604 | 454 | 4 | 3 |
| 50 | 70 | 40 | −5 | 5 | −5 | 560 | 603 | 454 | 4 | 3 |
| 50 | 70 | 40 | −5 | 5 | −5 | 570 | 604 | 454 | 3 | 3 |
| 50 | 70 | 40 | −5 | 5 | 0 | 520 | 605 | 453 | 3 | 3 |
| 50 | 70 | 40 | −5 | 5 | 0 | 530 | 605 | 452 | 4 | 3 |
| 50 | 70 | 40 | −5 | 5 | 0 | 540 | 604 | 451 | 4 | 3 |
| 50 | 70 | 40 | −5 | 5 | 0 | 550 | 604 | 451 | 4 | 3 |
| 50 | 70 | 40 | −5 | 5 | 0 | 560 | 603 | 451 | 4 | 3 |
| 50 | 70 | 40 | −5 | 5 | 0 | 570 | 603 | 451 | 3 | 3 |
| 50 | 70 | 40 | −5 | 5 | 0 | 580 | 605 | 451 | 1 | 2 |
| 50 | 70 | 40 | −5 | 5 | 5 | 520 | 606 | 450 | 3 | 3 |
| 50 | 70 | 40 | −5 | 5 | 5 | 530 | 605 | 448 | 4 | 3 |
| 50 | 70 | 40 | −5 | 5 | 5 | 540 | 605 | 448 | 4 | 3 |
| 50 | 70 | 40 | −5 | 5 | 5 | 550 | 603 | 448 | 4 | 4 |
| 50 | 70 | 40 | −5 | 5 | 5 | 560 | 603 | 447 | 4 | 3 |
| 50 | 70 | 40 | −5 | 5 | 5 | 570 | 603 | 447 | 3 | 3 |
| 50 | 70 | 40 | −5 | 5 | 5 | 580 | 605 | 448 | 2 | 2 |
| 50 | 70 | 40 | 0 | −5 | −5 | 520 | 602 | 457 | 1 | 1 |
| 50 | 70 | 40 | 0 | −5 | −5 | 530 | 601 | 456 | 3 | 3 |
| 50 | 70 | 40 | 0 | −5 | −5 | 540 | 600 | 455 | 4 | 3 |
| 50 | 70 | 40 | 0 | −5 | −5 | 550 | 599 | 455 | 4 | 3 |
| 50 | 70 | 40 | 0 | −5 | −5 | 560 | 598 | 454 | 4 | 3 |
| 50 | 70 | 40 | 0 | −5 | −5 | 570 | 598 | 454 | 3 | 3 |
| 50 | 70 | 40 | 0 | −5 | −5 | 580 | 600 | 454 | 3 | 3 |
| 50 | 70 | 40 | 0 | −5 | −5 | 590 | 602 | 454 | 2 | 3 |
| 50 | 70 | 40 | 0 | −5 | 0 | 520 | 602 | 453 | 2 | 2 |
| 50 | 70 | 40 | 0 | −5 | 0 | 530 | 601 | 452 | 4 | 3 |
| 50 | 70 | 40 | 0 | −5 | 0 | 540 | 601 | 451 | 4 | 3 |
| 50 | 70 | 40 | 0 | −5 | 0 | 550 | 600 | 451 | 4 | 3 |
| 50 | 70 | 40 | 0 | −5 | 0 | 560 | 599 | 451 | 4 | 3 |
| 50 | 70 | 40 | 0 | −5 | 0 | 570 | 598 | 451 | 4 | 3 |
| 50 | 70 | 40 | 0 | −5 | 0 | 580 | 599 | 451 | 3 | 3 |
| 50 | 70 | 40 | 0 | −5 | 0 | 590 | 603 | 450 | 2 | 3 |
| 50 | 70 | 40 | 0 | −5 | 5 | 520 | 601 | 450 | 2 | 2 |
| 50 | 70 | 40 | 0 | −5 | 5 | 530 | 601 | 449 | 4 | 3 |
| 50 | 70 | 40 | 0 | −5 | 5 | 540 | 601 | 448 | 4 | 3 |
| 50 | 70 | 40 | 0 | −5 | 5 | 550 | 600 | 448 | 4 | 3 |
| 50 | 70 | 40 | 0 | −5 | 5 | 560 | 599 | 448 | 4 | 3 |
| 50 | 70 | 40 | 0 | −5 | 5 | 570 | 598 | 448 | 4 | 3 |
| 50 | 70 | 40 | 0 | −5 | 5 | 580 | 599 | 447 | 3 | 3 |
| 50 | 70 | 40 | 0 | −5 | 5 | 590 | 603 | 448 | 2 | 3 |
| 50 | 70 | 40 | 0 | 0 | −5 | 520 | 602 | 457 | 2 | 2 |
| 50 | 70 | 40 | 0 | 0 | −5 | 530 | 601 | 455 | 3 | 3 |
| 50 | 70 | 40 | 0 | 0 | −5 | 540 | 601 | 455 | 4 | 3 |
| 50 | 70 | 40 | 0 | 0 | −5 | 550 | 600 | 454 | 4 | 3 |
| 50 | 70 | 40 | 0 | 0 | −5 | 560 | 599 | 454 | 4 | 3 |
| 50 | 70 | 40 | 0 | 0 | −5 | 570 | 599 | 454 | 3 | 3 |
| 50 | 70 | 40 | 0 | 0 | −5 | 580 | 600 | 454 | 3 | 3 |
| 50 | 70 | 40 | 0 | 0 | 0 | 520 | 602 | 453 | 3 | 2 |
| 50 | 70 | 40 | 0 | 0 | 0 | 530 | 602 | 452 | 4 | 3 |
| 50 | 70 | 40 | 0 | 0 | 0 | 540 | 601 | 451 | 4 | 3 |
| 50 | 70 | 40 | 0 | 0 | 0 | 550 | 600 | 451 | 4 | 3 |
| 50 | 70 | 40 | 0 | 0 | 0 | 560 | 599 | 451 | 4 | 3 |
| 50 | 70 | 40 | 0 | 0 | 0 | 570 | 599 | 451 | 3 | 3 |
| 50 | 70 | 40 | 0 | 0 | 0 | 580 | 601 | 451 | 3 | 3 |
| 50 | 70 | 40 | 0 | 0 | 0 | 590 | 604 | 451 | 1 | 1 |
| 50 | 70 | 40 | 0 | 0 | 5 | 520 | 601 | 450 | 3 | 2 |
| 50 | 70 | 40 | 0 | 0 | 5 | 530 | 601 | 449 | 4 | 3 |
| 50 | 70 | 40 | 0 | 0 | 5 | 540 | 601 | 448 | 4 | 3 |
| 50 | 70 | 40 | 0 | 0 | 5 | 550 | 600 | 448 | 4 | 3 |
| 50 | 70 | 40 | 0 | 0 | 5 | 560 | 599 | 448 | 4 | 3 |
| 50 | 70 | 40 | 0 | 0 | 5 | 570 | 599 | 447 | 3 | 3 |
| 50 | 70 | 40 | 0 | 0 | 5 | 580 | 601 | 447 | 3 | 3 |
| 50 | 70 | 40 | 0 | 0 | 5 | 590 | 604 | 448 | 1 | 2 |
| 50 | 70 | 40 | 0 | 5 | −5 | 520 | 602 | 456 | 3 | 2 |
| 50 | 70 | 40 | 0 | 5 | −5 | 530 | 602 | 455 | 4 | 3 |
| 50 | 70 | 40 | 0 | 5 | −5 | 540 | 601 | 455 | 4 | 3 |
| 50 | 70 | 40 | 0 | 5 | −5 | 550 | 600 | 454 | 4 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 70 | 40 | 0 | 5 | −5 | 560 | 600 | 454 | 4 | 3 |
| 50 | 70 | 40 | 0 | 5 | −5 | 570 | 600 | 454 | 3 | 3 |
| 50 | 70 | 40 | 0 | 5 | −5 | 580 | 601 | 454 | 2 | 2 |
| 50 | 70 | 40 | 0 | 5 | 0 | 520 | 602 | 453 | 3 | 3 |
| 50 | 70 | 40 | 0 | 5 | 0 | 530 | 601 | 452 | 4 | 3 |
| 50 | 70 | 40 | 0 | 5 | 0 | 540 | 601 | 451 | 4 | 3 |
| 50 | 70 | 40 | 0 | 5 | 0 | 550 | 600 | 451 | 4 | 3 |
| 50 | 70 | 40 | 0 | 5 | 0 | 560 | 600 | 451 | 4 | 3 |
| 50 | 70 | 40 | 0 | 5 | 0 | 570 | 599 | 451 | 3 | 3 |
| 50 | 70 | 40 | 0 | 5 | 0 | 580 | 601 | 451 | 2 | 2 |
| 50 | 70 | 40 | 0 | 5 | 5 | 520 | 602 | 450 | 3 | 3 |
| 50 | 70 | 40 | 0 | 5 | 5 | 530 | 601 | 448 | 4 | 3 |
| 50 | 70 | 40 | 0 | 5 | 5 | 540 | 601 | 448 | 4 | 3 |
| 50 | 70 | 40 | 0 | 5 | 5 | 550 | 601 | 448 | 4 | 3 |
| 50 | 70 | 40 | 0 | 5 | 5 | 560 | 599 | 447 | 4 | 3 |
| 50 | 70 | 40 | 0 | 5 | 5 | 570 | 600 | 448 | 3 | 3 |
| 50 | 70 | 40 | 0 | 5 | 5 | 580 | 602 | 447 | 2 | 2 |
| 50 | 70 | 40 | 5 | −5 | −5 | 520 | 598 | 456 | 0 | 0 |
| 50 | 70 | 40 | 5 | −5 | −5 | 530 | 598 | 456 | 3 | 3 |
| 50 | 70 | 40 | 5 | −5 | −5 | 540 | 598 | 455 | 4 | 3 |
| 50 | 70 | 40 | 5 | −5 | −5 | 550 | 597 | 455 | 4 | 3 |
| 50 | 70 | 40 | 5 | −5 | −5 | 560 | 596 | 454 | 4 | 3 |
| 50 | 70 | 40 | 5 | −5 | −5 | 570 | 595 | 454 | 3 | 3 |
| 50 | 70 | 40 | 5 | −5 | −5 | 580 | 596 | 454 | 3 | 3 |
| 50 | 70 | 40 | 5 | −5 | −5 | 590 | 599 | 454 | 2 | 3 |
| 50 | 70 | 40 | 5 | −5 | 0 | 520 | 598 | 453 | 2 | 2 |
| 50 | 70 | 40 | 5 | −5 | 0 | 530 | 598 | 452 | 3 | 3 |
| 50 | 70 | 40 | 5 | −5 | 0 | 540 | 597 | 451 | 4 | 3 |
| 50 | 70 | 40 | 5 | −5 | 0 | 550 | 596 | 451 | 4 | 3 |
| 50 | 70 | 40 | 5 | −5 | 0 | 560 | 596 | 451 | 4 | 3 |
| 50 | 70 | 40 | 5 | −5 | 0 | 570 | 595 | 451 | 3 | 3 |
| 50 | 70 | 40 | 5 | −5 | 0 | 580 | 596 | 451 | 3 | 3 |
| 50 | 70 | 40 | 5 | −5 | 0 | 590 | 599 | 451 | 2 | 3 |
| 50 | 70 | 40 | 5 | −5 | 5 | 520 | 598 | 450 | 2 | 2 |
| 50 | 70 | 40 | 5 | −5 | 5 | 530 | 598 | 449 | 4 | 3 |
| 50 | 70 | 40 | 5 | −5 | 5 | 540 | 597 | 448 | 4 | 3 |
| 50 | 70 | 40 | 5 | −5 | 5 | 550 | 596 | 448 | 4 | 4 |
| 50 | 70 | 40 | 5 | −5 | 5 | 560 | 595 | 448 | 4 | 3 |
| 50 | 70 | 40 | 5 | −5 | 5 | 570 | 595 | 447 | 3 | 3 |
| 50 | 70 | 40 | 5 | −5 | 5 | 580 | 596 | 447 | 3 | 3 |
| 50 | 70 | 40 | 5 | −5 | 5 | 590 | 599 | 448 | 2 | 3 |
| 50 | 70 | 40 | 5 | 0 | −5 | 520 | 598 | 457 | 2 | 2 |
| 50 | 70 | 40 | 5 | 0 | −5 | 530 | 598 | 455 | 3 | 3 |
| 50 | 70 | 40 | 5 | 0 | −5 | 540 | 598 | 455 | 4 | 3 |
| 50 | 70 | 40 | 5 | 0 | −5 | 550 | 597 | 454 | 4 | 3 |
| 50 | 70 | 40 | 5 | 0 | −5 | 560 | 596 | 454 | 4 | 3 |
| 50 | 70 | 40 | 5 | 0 | −5 | 570 | 596 | 454 | 3 | 3 |
| 50 | 70 | 40 | 5 | 0 | −5 | 580 | 597 | 454 | 3 | 3 |
| 50 | 70 | 40 | 5 | 0 | −5 | 590 | 600 | 455 | 1 | 2 |
| 50 | 70 | 40 | 5 | 0 | 0 | 520 | 598 | 453 | 3 | 2 |
| 50 | 70 | 40 | 5 | 0 | 0 | 530 | 598 | 452 | 4 | 3 |
| 50 | 70 | 40 | 5 | 0 | 0 | 540 | 597 | 451 | 4 | 3 |
| 50 | 70 | 40 | 5 | 0 | 0 | 550 | 597 | 451 | 4 | 3 |
| 50 | 70 | 40 | 5 | 0 | 0 | 560 | 596 | 451 | 4 | 3 |
| 50 | 70 | 40 | 5 | 0 | 0 | 570 | 596 | 451 | 3 | 3 |
| 50 | 70 | 40 | 5 | 0 | 0 | 580 | 597 | 451 | 3 | 3 |
| 50 | 70 | 40 | 5 | 0 | 0 | 590 | 600 | 451 | 2 | 2 |
| 50 | 70 | 40 | 5 | 0 | 5 | 520 | 599 | 449 | 3 | 2 |
| 50 | 70 | 40 | 5 | 0 | 5 | 530 | 598 | 449 | 4 | 3 |
| 50 | 70 | 40 | 5 | 0 | 5 | 540 | 597 | 448 | 4 | 3 |
| 50 | 70 | 40 | 5 | 0 | 5 | 550 | 597 | 448 | 4 | 3 |
| 50 | 70 | 40 | 5 | 0 | 5 | 560 | 596 | 448 | 4 | 3 |
| 50 | 70 | 40 | 5 | 0 | 5 | 570 | 595 | 447 | 3 | 3 |
| 50 | 70 | 40 | 5 | 0 | 5 | 580 | 597 | 447 | 3 | 3 |
| 50 | 70 | 40 | 5 | 0 | 5 | 590 | 600 | 448 | 2 | 2 |
| 50 | 70 | 40 | 5 | 5 | −5 | 520 | 598 | 456 | 3 | 2 |
| 50 | 70 | 40 | 5 | 5 | −5 | 530 | 598 | 455 | 4 | 3 |
| 50 | 70 | 40 | 5 | 5 | −5 | 540 | 598 | 455 | 4 | 3 |
| 50 | 70 | 40 | 5 | 5 | −5 | 550 | 597 | 454 | 4 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 70 | 40 | 5 | 5 | −5 | 560 | 596 | 454 | 4 | 3 |
| 50 | 70 | 40 | 5 | 5 | −5 | 570 | 596 | 454 | 3 | 3 |
| 50 | 70 | 40 | 5 | 5 | −5 | 580 | 598 | 454 | 2 | 2 |
| 50 | 70 | 40 | 5 | 5 | 0 | 520 | 599 | 453 | 3 | 3 |
| 50 | 70 | 40 | 5 | 5 | 0 | 530 | 598 | 452 | 4 | 3 |
| 50 | 70 | 40 | 5 | 5 | 0 | 540 | 598 | 451 | 4 | 3 |
| 50 | 70 | 40 | 5 | 5 | 0 | 550 | 597 | 451 | 4 | 3 |
| 50 | 70 | 40 | 5 | 5 | 0 | 560 | 597 | 451 | 4 | 3 |
| 50 | 70 | 40 | 5 | 5 | 0 | 570 | 597 | 451 | 3 | 3 |
| 50 | 70 | 40 | 5 | 5 | 0 | 580 | 598 | 450 | 2 | 2 |
| 50 | 70 | 40 | 5 | 5 | 5 | 520 | 598 | 450 | 3 | 3 |
| 50 | 70 | 40 | 5 | 5 | 5 | 530 | 599 | 448 | 4 | 3 |
| 50 | 70 | 40 | 5 | 5 | 5 | 540 | 597 | 448 | 4 | 3 |
| 50 | 70 | 40 | 5 | 5 | 5 | 550 | 597 | 448 | 4 | 3 |
| 50 | 70 | 40 | 5 | 5 | 5 | 560 | 597 | 447 | 4 | 3 |
| 50 | 70 | 40 | 5 | 5 | 5 | 570 | 597 | 448 | 3 | 3 |
| 50 | 70 | 40 | 5 | 5 | 5 | 580 | 598 | 448 | 2 | 3 |
| 50 | 70 | 50 | −5 | −5 | −5 | 530 | 605 | 457 | 3 | 3 |
| 50 | 70 | 50 | −5 | −5 | −5 | 540 | 604 | 455 | 4 | 3 |
| 50 | 70 | 50 | −5 | −5 | −5 | 550 | 603 | 454 | 4 | 4 |
| 50 | 70 | 50 | −5 | −5 | −5 | 560 | 602 | 454 | 3 | 3 |
| 50 | 70 | 50 | −5 | −5 | −5 | 570 | 601 | 454 | 3 | 3 |
| 50 | 70 | 50 | −5 | −5 | −5 | 580 | 602 | 454 | 3 | 3 |
| 50 | 70 | 50 | −5 | −5 | −5 | 590 | 605 | 454 | 1 | 2 |
| 50 | 70 | 50 | −5 | −5 | 0 | 520 | 604 | 456 | 1 | 1 |
| 50 | 70 | 50 | −5 | −5 | 0 | 530 | 604 | 455 | 3 | 3 |
| 50 | 70 | 50 | −5 | −5 | 0 | 540 | 603 | 453 | 4 | 3 |
| 50 | 70 | 50 | −5 | −5 | 0 | 550 | 603 | 452 | 4 | 4 |
| 50 | 70 | 50 | −5 | −5 | 0 | 560 | 602 | 452 | 3 | 4 |
| 50 | 70 | 50 | −5 | −5 | 0 | 570 | 601 | 451 | 3 | 3 |
| 50 | 70 | 50 | −5 | −5 | 0 | 580 | 602 | 451 | 3 | 3 |
| 50 | 70 | 50 | −5 | −5 | 0 | 590 | 605 | 451 | 1 | 2 |
| 50 | 70 | 50 | −5 | −5 | 5 | 520 | 604 | 454 | 2 | 2 |
| 50 | 70 | 50 | −5 | −5 | 5 | 530 | 604 | 452 | 3 | 3 |
| 50 | 70 | 50 | −5 | −5 | 5 | 540 | 603 | 450 | 4 | 3 |
| 50 | 70 | 50 | −5 | −5 | 5 | 550 | 602 | 449 | 4 | 4 |
| 50 | 70 | 50 | −5 | −5 | 5 | 560 | 601 | 449 | 4 | 4 |
| 50 | 70 | 50 | −5 | −5 | 5 | 570 | 601 | 449 | 3 | 3 |
| 50 | 70 | 50 | −5 | −5 | 5 | 580 | 602 | 448 | 3 | 3 |
| 50 | 70 | 50 | −5 | −5 | 5 | 590 | 605 | 449 | 1 | 2 |
| 50 | 70 | 50 | −5 | 0 | −5 | 520 | 605 | 459 | 1 | 1 |
| 50 | 70 | 50 | −5 | 0 | −5 | 530 | 605 | 457 | 3 | 3 |
| 50 | 70 | 50 | −5 | 0 | −5 | 540 | 604 | 455 | 4 | 3 |
| 50 | 70 | 50 | −5 | 0 | −5 | 550 | 603 | 454 | 4 | 4 |
| 50 | 70 | 50 | −5 | 0 | −5 | 560 | 601 | 454 | 3 | 4 |
| 50 | 70 | 50 | −5 | 0 | −5 | 570 | 602 | 454 | 3 | 3 |
| 50 | 70 | 50 | −5 | 0 | −5 | 580 | 603 | 454 | 2 | 3 |
| 50 | 70 | 50 | −5 | 0 | 0 | 520 | 605 | 456 | 2 | 2 |
| 50 | 70 | 50 | −5 | 0 | 0 | 530 | 604 | 454 | 3 | 3 |
| 50 | 70 | 50 | −5 | 0 | 0 | 540 | 604 | 452 | 4 | 3 |
| 50 | 70 | 50 | −5 | 0 | 0 | 550 | 603 | 452 | 4 | 4 |
| 50 | 70 | 50 | −5 | 0 | 0 | 560 | 602 | 452 | 3 | 3 |
| 50 | 70 | 50 | −5 | 0 | 0 | 570 | 602 | 451 | 3 | 3 |
| 50 | 70 | 50 | −5 | 0 | 0 | 580 | 603 | 451 | 2 | 3 |
| 50 | 70 | 50 | −5 | 0 | 5 | 520 | 605 | 453 | 2 | 2 |
| 50 | 70 | 50 | −5 | 0 | 5 | 530 | 605 | 451 | 3 | 3 |
| 50 | 70 | 50 | −5 | 0 | 5 | 540 | 603 | 450 | 4 | 4 |
| 50 | 70 | 50 | −5 | 0 | 5 | 550 | 603 | 449 | 4 | 4 |
| 50 | 70 | 50 | −5 | 0 | 5 | 560 | 602 | 448 | 3 | 3 |
| 50 | 70 | 50 | −5 | 0 | 5 | 570 | 602 | 449 | 3 | 3 |
| 50 | 70 | 50 | −5 | 0 | 5 | 580 | 604 | 448 | 2 | 2 |
| 50 | 70 | 50 | −5 | 5 | −5 | 520 | 605 | 458 | 2 | 2 |
| 50 | 70 | 50 | −5 | 5 | −5 | 530 | 604 | 456 | 3 | 3 |
| 50 | 70 | 50 | −5 | 5 | −5 | 540 | 604 | 454 | 4 | 3 |
| 50 | 70 | 50 | −5 | 5 | −5 | 550 | 603 | 454 | 3 | 4 |
| 50 | 70 | 50 | −5 | 5 | −5 | 560 | 602 | 454 | 3 | 3 |
| 50 | 70 | 50 | −5 | 5 | −5 | 570 | 602 | 454 | 3 | 3 |
| 50 | 70 | 50 | −5 | 5 | 0 | 520 | 605 | 455 | 2 | 2 |
| 50 | 70 | 50 | −5 | 5 | 0 | 530 | 605 | 454 | 3 | 3 |

TABLE II-continued

Peak wavelength tolerances based on single-peak symmetric or asymmetric channel sensitivities for three channel cameras with µ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 70 | 50 | −5 | 5 | 0 | 540 | 604 | 452 | 4 | 4 |
| 50 | 70 | 50 | −5 | 5 | 0 | 550 | 603 | 452 | 4 | 4 |
| 50 | 70 | 50 | −5 | 5 | 0 | 560 | 602 | 451 | 3 | 3 |
| 50 | 70 | 50 | −5 | 5 | 0 | 570 | 602 | 451 | 3 | 3 |
| 50 | 70 | 50 | −5 | 5 | 5 | 520 | 605 | 453 | 3 | 3 |
| 50 | 70 | 50 | −5 | 5 | 5 | 530 | 605 | 451 | 3 | 3 |
| 50 | 70 | 50 | −5 | 5 | 5 | 540 | 604 | 450 | 4 | 4 |
| 50 | 70 | 50 | −5 | 5 | 5 | 550 | 603 | 449 | 4 | 4 |
| 50 | 70 | 50 | −5 | 5 | 5 | 560 | 602 | 449 | 3 | 3 |
| 50 | 70 | 50 | −5 | 5 | 5 | 570 | 602 | 448 | 3 | 3 |
| 50 | 70 | 50 | 0 | −5 | −5 | 530 | 601 | 457 | 3 | 3 |
| 50 | 70 | 50 | 0 | −5 | −5 | 540 | 600 | 455 | 4 | 3 |
| 50 | 70 | 50 | 0 | −5 | −5 | 550 | 599 | 454 | 4 | 4 |
| 50 | 70 | 50 | 0 | −5 | −5 | 560 | 598 | 454 | 4 | 4 |
| 50 | 70 | 50 | 0 | −5 | −5 | 570 | 598 | 454 | 3 | 3 |
| 50 | 70 | 50 | 0 | −5 | −5 | 580 | 599 | 454 | 3 | 3 |
| 50 | 70 | 50 | 0 | −5 | −5 | 590 | 602 | 454 | 2 | 3 |
| 50 | 70 | 50 | 0 | −5 | 0 | 520 | 602 | 456 | 2 | 2 |
| 50 | 70 | 50 | 0 | −5 | 0 | 530 | 601 | 454 | 3 | 3 |
| 50 | 70 | 50 | 0 | −5 | 0 | 540 | 601 | 453 | 4 | 3 |
| 50 | 70 | 50 | 0 | −5 | 0 | 550 | 599 | 452 | 4 | 4 |
| 50 | 70 | 50 | 0 | −5 | 0 | 560 | 598 | 452 | 4 | 4 |
| 50 | 70 | 50 | 0 | −5 | 0 | 570 | 598 | 451 | 3 | 3 |
| 50 | 70 | 50 | 0 | −5 | 0 | 580 | 599 | 451 | 3 | 3 |
| 50 | 70 | 50 | 0 | −5 | 0 | 590 | 602 | 451 | 2 | 3 |
| 50 | 70 | 50 | 0 | −5 | 5 | 520 | 601 | 454 | 2 | 2 |
| 50 | 70 | 50 | 0 | −5 | 5 | 530 | 601 | 452 | 3 | 3 |
| 50 | 70 | 50 | 0 | −5 | 5 | 540 | 601 | 450 | 4 | 4 |
| 50 | 70 | 50 | 0 | −5 | 5 | 550 | 599 | 449 | 4 | 4 |
| 50 | 70 | 50 | 0 | −5 | 5 | 560 | 598 | 449 | 4 | 4 |
| 50 | 70 | 50 | 0 | −5 | 5 | 570 | 598 | 448 | 3 | 3 |
| 50 | 70 | 50 | 0 | −5 | 5 | 580 | 599 | 449 | 3 | 3 |
| 50 | 70 | 50 | 0 | −5 | 5 | 590 | 602 | 449 | 2 | 3 |
| 50 | 70 | 50 | 0 | 0 | −5 | 520 | 602 | 458 | 1 | 1 |
| 50 | 70 | 50 | 0 | 0 | −5 | 530 | 601 | 457 | 3 | 3 |
| 50 | 70 | 50 | 0 | 0 | −5 | 540 | 600 | 455 | 4 | 3 |
| 50 | 70 | 50 | 0 | 0 | −5 | 550 | 599 | 454 | 4 | 4 |
| 50 | 70 | 50 | 0 | 0 | −5 | 560 | 599 | 454 | 3 | 3 |
| 50 | 70 | 50 | 0 | 0 | −5 | 570 | 598 | 454 | 3 | 3 |
| 50 | 70 | 50 | 0 | 0 | −5 | 580 | 600 | 454 | 2 | 3 |
| 50 | 70 | 50 | 0 | 0 | 0 | 520 | 602 | 456 | 2 | 2 |
| 50 | 70 | 50 | 0 | 0 | 0 | 530 | 601 | 454 | 3 | 3 |
| 50 | 70 | 50 | 0 | 0 | 0 | 540 | 601 | 452 | 4 | 4 |
| 50 | 70 | 50 | 0 | 0 | 0 | 550 | 599 | 452 | 4 | 4 |
| 50 | 70 | 50 | 0 | 0 | 0 | 560 | 599 | 451 | 3 | 3 |
| 50 | 70 | 50 | 0 | 0 | 0 | 570 | 599 | 451 | 3 | 3 |
| 50 | 70 | 50 | 0 | 0 | 0 | 580 | 600 | 451 | 2 | 3 |
| 50 | 70 | 50 | 0 | 0 | 5 | 520 | 602 | 453 | 2 | 2 |
| 50 | 70 | 50 | 0 | 0 | 5 | 530 | 601 | 451 | 3 | 3 |
| 50 | 70 | 50 | 0 | 0 | 5 | 540 | 601 | 450 | 4 | 4 |
| 50 | 70 | 50 | 0 | 0 | 5 | 550 | 599 | 449 | 4 | 4 |
| 50 | 70 | 50 | 0 | 0 | 5 | 560 | 598 | 448 | 3 | 4 |
| 50 | 70 | 50 | 0 | 0 | 5 | 570 | 599 | 449 | 3 | 3 |
| 50 | 70 | 50 | 0 | 0 | 5 | 580 | 600 | 448 | 2 | 3 |
| 50 | 70 | 50 | 0 | 5 | −5 | 520 | 602 | 458 | 2 | 2 |
| 50 | 70 | 50 | 0 | 5 | −5 | 530 | 602 | 456 | 3 | 3 |
| 50 | 70 | 50 | 0 | 5 | −5 | 540 | 600 | 454 | 4 | 3 |
| 50 | 70 | 50 | 0 | 5 | −5 | 550 | 600 | 454 | 4 | 4 |
| 50 | 70 | 50 | 0 | 5 | −5 | 560 | 599 | 454 | 3 | 3 |
| 50 | 70 | 50 | 0 | 5 | −5 | 570 | 599 | 453 | 3 | 3 |
| 50 | 70 | 50 | 0 | 5 | 0 | 520 | 602 | 455 | 2 | 2 |
| 50 | 70 | 50 | 0 | 5 | 0 | 530 | 601 | 454 | 3 | 3 |
| 50 | 70 | 50 | 0 | 5 | 0 | 540 | 601 | 452 | 4 | 4 |
| 50 | 70 | 50 | 0 | 5 | 0 | 550 | 600 | 452 | 4 | 4 |
| 50 | 70 | 50 | 0 | 5 | 0 | 560 | 599 | 451 | 3 | 3 |
| 50 | 70 | 50 | 0 | 5 | 0 | 570 | 599 | 451 | 3 | 3 |
| 50 | 70 | 50 | 0 | 5 | 5 | 520 | 602 | 453 | 3 | 3 |
| 50 | 70 | 50 | 0 | 5 | 5 | 530 | 601 | 451 | 3 | 3 |
| 50 | 70 | 50 | 0 | 5 | 5 | 540 | 601 | 450 | 4 | 4 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 50 | 70 | 50 | 0 | 5 | 5 | 550 | 600 | 449 | 4 | 4 |
| 50 | 70 | 50 | 0 | 5 | 5 | 560 | 599 | 448 | 3 | 3 |
| 50 | 70 | 50 | 0 | 5 | 5 | 570 | 599 | 449 | 3 | 3 |
| 50 | 70 | 50 | 5 | −5 | −5 | 530 | 598 | 457 | 3 | 3 |
| 50 | 70 | 50 | 5 | −5 | −5 | 540 | 598 | 455 | 4 | 3 |
| 50 | 70 | 50 | 5 | −5 | −5 | 550 | 597 | 454 | 4 | 4 |
| 50 | 70 | 50 | 5 | −5 | −5 | 560 | 595 | 454 | 3 | 3 |
| 50 | 70 | 50 | 5 | −5 | −5 | 570 | 594 | 454 | 3 | 3 |
| 50 | 70 | 50 | 5 | −5 | −5 | 580 | 595 | 454 | 3 | 3 |
| 50 | 70 | 50 | 5 | −5 | −5 | 590 | 599 | 453 | 2 | 3 |
| 50 | 70 | 50 | 5 | −5 | 0 | 520 | 598 | 456 | 1 | 1 |
| 50 | 70 | 50 | 5 | −5 | 0 | 530 | 598 | 454 | 3 | 3 |
| 50 | 70 | 50 | 5 | −5 | 0 | 540 | 597 | 453 | 4 | 3 |
| 50 | 70 | 50 | 5 | −5 | 0 | 550 | 596 | 452 | 4 | 4 |
| 50 | 70 | 50 | 5 | −5 | 0 | 560 | 595 | 452 | 4 | 4 |
| 50 | 70 | 50 | 5 | −5 | 0 | 570 | 594 | 451 | 3 | 3 |
| 50 | 70 | 50 | 5 | −5 | 0 | 580 | 595 | 451 | 3 | 3 |
| 50 | 70 | 50 | 5 | −5 | 0 | 590 | 599 | 451 | 2 | 3 |
| 50 | 70 | 50 | 5 | −5 | 5 | 520 | 598 | 454 | 2 | 2 |
| 50 | 70 | 50 | 5 | −5 | 5 | 530 | 598 | 452 | 3 | 3 |
| 50 | 70 | 50 | 5 | −5 | 5 | 540 | 597 | 450 | 4 | 3 |
| 50 | 70 | 50 | 5 | −5 | 5 | 550 | 596 | 449 | 4 | 4 |
| 50 | 70 | 50 | 5 | −5 | 5 | 560 | 595 | 449 | 4 | 4 |
| 50 | 70 | 50 | 5 | −5 | 5 | 570 | 594 | 448 | 3 | 3 |
| 50 | 70 | 50 | 5 | −5 | 5 | 580 | 595 | 449 | 3 | 3 |
| 50 | 70 | 50 | 5 | −5 | 5 | 590 | 599 | 449 | 2 | 3 |
| 50 | 70 | 50 | 5 | 0 | −5 | 520 | 599 | 459 | 1 | 1 |
| 50 | 70 | 50 | 5 | 0 | −5 | 530 | 598 | 457 | 3 | 3 |
| 50 | 70 | 50 | 5 | 0 | −5 | 540 | 598 | 455 | 4 | 3 |
| 50 | 70 | 50 | 5 | 0 | −5 | 550 | 596 | 454 | 4 | 4 |
| 50 | 70 | 50 | 5 | 0 | −5 | 560 | 595 | 454 | 3 | 4 |
| 50 | 70 | 50 | 5 | 0 | −5 | 570 | 595 | 454 | 3 | 3 |
| 50 | 70 | 50 | 5 | 0 | −5 | 580 | 597 | 454 | 2 | 3 |
| 50 | 70 | 50 | 5 | 0 | 0 | 520 | 598 | 456 | 2 | 2 |
| 50 | 70 | 50 | 5 | 0 | 0 | 530 | 598 | 454 | 3 | 3 |
| 50 | 70 | 50 | 5 | 0 | 0 | 540 | 597 | 452 | 4 | 3 |
| 50 | 70 | 50 | 5 | 0 | 0 | 550 | 597 | 452 | 4 | 4 |
| 50 | 70 | 50 | 5 | 0 | 0 | 560 | 595 | 452 | 3 | 4 |
| 50 | 70 | 50 | 5 | 0 | 0 | 570 | 595 | 451 | 3 | 3 |
| 50 | 70 | 50 | 5 | 0 | 0 | 580 | 597 | 451 | 2 | 3 |
| 50 | 70 | 50 | 5 | 0 | 5 | 520 | 598 | 453 | 2 | 2 |
| 50 | 70 | 50 | 5 | 0 | 5 | 530 | 598 | 451 | 3 | 3 |
| 50 | 70 | 50 | 5 | 0 | 5 | 540 | 597 | 450 | 4 | 4 |
| 50 | 70 | 50 | 5 | 0 | 5 | 550 | 596 | 449 | 4 | 4 |
| 50 | 70 | 50 | 5 | 0 | 5 | 560 | 596 | 448 | 3 | 3 |
| 50 | 70 | 50 | 5 | 0 | 5 | 570 | 595 | 449 | 3 | 3 |
| 50 | 70 | 50 | 5 | 0 | 5 | 580 | 597 | 449 | 2 | 3 |
| 50 | 70 | 50 | 5 | 5 | −5 | 520 | 599 | 458 | 2 | 2 |
| 50 | 70 | 50 | 5 | 5 | −5 | 530 | 598 | 456 | 3 | 3 |
| 50 | 70 | 50 | 5 | 5 | −5 | 540 | 598 | 454 | 4 | 3 |
| 50 | 70 | 50 | 5 | 5 | −5 | 550 | 596 | 454 | 4 | 4 |
| 50 | 70 | 50 | 5 | 5 | −5 | 560 | 596 | 454 | 3 | 3 |
| 50 | 70 | 50 | 5 | 5 | −5 | 570 | 595 | 453 | 3 | 3 |
| 50 | 70 | 50 | 5 | 5 | −5 | 580 | 597 | 454 | 1 | 2 |
| 50 | 70 | 50 | 5 | 5 | 0 | 520 | 599 | 455 | 2 | 2 |
| 50 | 70 | 50 | 5 | 5 | 0 | 530 | 598 | 454 | 3 | 3 |
| 50 | 70 | 50 | 5 | 5 | 0 | 540 | 597 | 452 | 4 | 4 |
| 50 | 70 | 50 | 5 | 5 | 0 | 550 | 597 | 452 | 4 | 4 |
| 50 | 70 | 50 | 5 | 5 | 0 | 560 | 596 | 451 | 3 | 3 |
| 50 | 70 | 50 | 5 | 5 | 0 | 570 | 595 | 451 | 3 | 3 |
| 50 | 70 | 50 | 5 | 5 | 0 | 580 | 597 | 451 | 1 | 2 |
| 50 | 70 | 50 | 5 | 5 | 5 | 520 | 598 | 452 | 3 | 3 |
| 50 | 70 | 50 | 5 | 5 | 5 | 530 | 599 | 451 | 3 | 3 |
| 50 | 70 | 50 | 5 | 5 | 5 | 540 | 597 | 450 | 4 | 4 |
| 50 | 70 | 50 | 5 | 5 | 5 | 550 | 597 | 449 | 4 | 4 |
| 50 | 70 | 50 | 5 | 5 | 5 | 560 | 596 | 449 | 3 | 3 |
| 50 | 70 | 50 | 5 | 5 | 5 | 570 | 596 | 449 | 3 | 3 |
| 50 | 70 | 50 | 5 | 5 | 5 | 580 | 597 | 449 | 1 | 2 |
| 60 | 50 | 30 | −5 | −5 | −5 | 530 | 601 | 454 | 3 | 2 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 50 | 30 | −5 | −5 | −5 | 540 | 598 | 454 | 4 | 3 |
| 60 | 50 | 30 | −5 | −5 | −5 | 550 | 592 | 454 | 5 | 3 |
| 60 | 50 | 30 | −5 | −5 | −5 | 560 | 589 | 454 | 3 | 2 |
| 60 | 50 | 30 | −5 | −5 | 0 | 530 | 601 | 450 | 3 | 2 |
| 60 | 50 | 30 | −5 | −5 | 0 | 540 | 598 | 450 | 4 | 3 |
| 60 | 50 | 30 | −5 | −5 | 0 | 550 | 592 | 450 | 5 | 3 |
| 60 | 50 | 30 | −5 | −5 | 0 | 560 | 589 | 450 | 4 | 2 |
| 60 | 50 | 30 | −5 | −5 | 5 | 530 | 601 | 446 | 3 | 2 |
| 60 | 50 | 30 | −5 | −5 | 5 | 540 | 598 | 446 | 5 | 3 |
| 60 | 50 | 30 | −5 | −5 | 5 | 550 | 591 | 446 | 5 | 3 |
| 60 | 50 | 30 | −5 | −5 | 5 | 560 | 589 | 446 | 4 | 2 |
| 60 | 50 | 30 | −5 | 0 | −5 | 530 | 601 | 454 | 4 | 3 |
| 60 | 50 | 30 | −5 | 0 | −5 | 540 | 597 | 454 | 4 | 3 |
| 60 | 50 | 30 | −5 | 0 | −5 | 550 | 592 | 454 | 4 | 3 |
| 60 | 50 | 30 | −5 | 0 | 0 | 530 | 600 | 450 | 4 | 3 |
| 60 | 50 | 30 | −5 | 0 | 0 | 540 | 597 | 450 | 5 | 3 |
| 60 | 50 | 30 | −5 | 0 | 0 | 550 | 591 | 450 | 5 | 3 |
| 60 | 50 | 30 | −5 | 0 | 5 | 530 | 600 | 446 | 4 | 3 |
| 60 | 50 | 30 | −5 | 0 | 5 | 540 | 597 | 446 | 5 | 3 |
| 60 | 50 | 30 | −5 | 0 | 5 | 550 | 591 | 446 | 5 | 3 |
| 60 | 50 | 30 | −5 | 5 | −5 | 530 | 600 | 454 | 4 | 3 |
| 60 | 50 | 30 | −5 | 5 | −5 | 540 | 596 | 454 | 5 | 3 |
| 60 | 50 | 30 | −5 | 5 | −5 | 550 | 592 | 454 | 4 | 2 |
| 60 | 50 | 30 | −5 | 5 | 0 | 530 | 600 | 450 | 4 | 3 |
| 60 | 50 | 30 | −5 | 5 | 0 | 540 | 596 | 450 | 5 | 3 |
| 60 | 50 | 30 | −5 | 5 | 0 | 550 | 593 | 450 | 4 | 3 |
| 60 | 50 | 30 | −5 | 5 | 5 | 530 | 599 | 446 | 4 | 3 |
| 60 | 50 | 30 | −5 | 5 | 5 | 540 | 596 | 446 | 5 | 3 |
| 60 | 50 | 30 | −5 | 5 | 5 | 550 | 592 | 446 | 4 | 3 |
| 60 | 50 | 30 | 0 | −5 | −5 | 530 | 599 | 454 | 3 | 2 |
| 60 | 50 | 30 | 0 | −5 | −5 | 540 | 595 | 454 | 4 | 3 |
| 60 | 50 | 30 | 0 | −5 | −5 | 550 | 585 | 454 | 5 | 3 |
| 60 | 50 | 30 | 0 | −5 | −5 | 560 | 584 | 454 | 4 | 2 |
| 60 | 50 | 30 | 0 | −5 | 0 | 530 | 598 | 450 | 3 | 2 |
| 60 | 50 | 30 | 0 | −5 | 0 | 540 | 595 | 450 | 4 | 3 |
| 60 | 50 | 30 | 0 | −5 | 0 | 550 | 585 | 450 | 5 | 3 |
| 60 | 50 | 30 | 0 | −5 | 0 | 560 | 585 | 450 | 4 | 2 |
| 60 | 50 | 30 | 0 | −5 | 5 | 530 | 598 | 446 | 3 | 2 |
| 60 | 50 | 30 | 0 | −5 | 5 | 540 | 595 | 446 | 4 | 3 |
| 60 | 50 | 30 | 0 | −5 | 5 | 550 | 585 | 446 | 5 | 3 |
| 60 | 50 | 30 | 0 | −5 | 5 | 560 | 584 | 446 | 4 | 2 |
| 60 | 50 | 30 | 0 | 0 | −5 | 530 | 598 | 454 | 4 | 3 |
| 60 | 50 | 30 | 0 | 0 | −5 | 540 | 593 | 454 | 5 | 3 |
| 60 | 50 | 30 | 0 | 0 | −5 | 550 | 585 | 454 | 5 | 3 |
| 60 | 50 | 30 | 0 | 0 | 0 | 530 | 598 | 450 | 4 | 3 |
| 60 | 50 | 30 | 0 | 0 | 0 | 540 | 593 | 450 | 5 | 3 |
| 60 | 50 | 30 | 0 | 0 | 0 | 550 | 586 | 450 | 5 | 3 |
| 60 | 50 | 30 | 0 | 0 | 0 | 560 | 585 | 450 | 1 | 1 |
| 60 | 50 | 30 | 0 | 0 | 5 | 530 | 598 | 446 | 4 | 3 |
| 60 | 50 | 30 | 0 | 0 | 5 | 540 | 593 | 446 | 5 | 3 |
| 60 | 50 | 30 | 0 | 0 | 5 | 550 | 585 | 446 | 5 | 3 |
| 60 | 50 | 30 | 0 | 0 | 5 | 560 | 584 | 446 | 2 | 1 |
| 60 | 50 | 30 | 0 | 5 | −5 | 530 | 597 | 454 | 4 | 3 |
| 60 | 50 | 30 | 0 | 5 | −5 | 540 | 592 | 454 | 5 | 3 |
| 60 | 50 | 30 | 0 | 5 | −5 | 550 | 587 | 454 | 4 | 3 |
| 60 | 50 | 30 | 0 | 5 | 0 | 530 | 597 | 450 | 4 | 3 |
| 60 | 50 | 30 | 0 | 5 | 0 | 540 | 592 | 450 | 5 | 3 |
| 60 | 50 | 30 | 0 | 5 | 0 | 550 | 587 | 450 | 4 | 3 |
| 60 | 50 | 30 | 0 | 5 | 5 | 530 | 597 | 446 | 4 | 3 |
| 60 | 50 | 30 | 0 | 5 | 5 | 540 | 592 | 446 | 5 | 3 |
| 60 | 50 | 30 | 0 | 5 | 5 | 550 | 587 | 446 | 4 | 3 |
| 60 | 50 | 30 | 5 | −5 | −5 | 530 | 596 | 454 | 3 | 2 |
| 60 | 50 | 30 | 5 | −5 | −5 | 540 | 592 | 454 | 4 | 3 |
| 60 | 50 | 30 | 5 | −5 | −5 | 550 | 580 | 454 | 5 | 3 |
| 60 | 50 | 30 | 5 | −5 | −5 | 560 | 580 | 454 | 4 | 2 |
| 60 | 50 | 30 | 5 | −5 | 0 | 530 | 596 | 450 | 3 | 2 |
| 60 | 50 | 30 | 5 | −5 | 0 | 540 | 591 | 450 | 5 | 3 |
| 60 | 50 | 30 | 5 | −5 | 0 | 550 | 581 | 450 | 5 | 3 |
| 60 | 50 | 30 | 5 | −5 | 0 | 560 | 581 | 450 | 4 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 50 | 30 | 5 | −5 | 5 | 530 | 595 | 446 | 3 | 2 |
| 60 | 50 | 30 | 5 | −5 | 5 | 540 | 591 | 446 | 5 | 3 |
| 60 | 50 | 30 | 5 | −5 | 5 | 550 | 581 | 446 | 5 | 3 |
| 60 | 50 | 30 | 5 | −5 | 5 | 560 | 581 | 446 | 4 | 3 |
| 60 | 50 | 30 | 5 | 0 | −5 | 530 | 595 | 454 | 4 | 2 |
| 60 | 50 | 30 | 5 | 0 | −5 | 540 | 590 | 454 | 5 | 3 |
| 60 | 50 | 30 | 5 | 0 | −5 | 550 | 581 | 454 | 5 | 3 |
| 60 | 50 | 30 | 5 | 0 | −5 | 560 | 579 | 454 | 2 | 2 |
| 60 | 50 | 30 | 5 | 0 | 0 | 530 | 595 | 450 | 4 | 3 |
| 60 | 50 | 30 | 5 | 0 | 0 | 540 | 590 | 450 | 5 | 3 |
| 60 | 50 | 30 | 5 | 0 | 0 | 550 | 580 | 450 | 5 | 3 |
| 60 | 50 | 30 | 5 | 0 | 0 | 560 | 580 | 450 | 3 | 2 |
| 60 | 50 | 30 | 5 | 0 | 5 | 530 | 595 | 446 | 4 | 3 |
| 60 | 50 | 30 | 5 | 0 | 5 | 540 | 589 | 446 | 5 | 3 |
| 60 | 50 | 30 | 5 | 0 | 5 | 550 | 581 | 446 | 5 | 3 |
| 60 | 50 | 30 | 5 | 0 | 5 | 560 | 580 | 446 | 3 | 2 |
| 60 | 50 | 30 | 5 | 5 | −5 | 530 | 594 | 454 | 4 | 3 |
| 60 | 50 | 30 | 5 | 5 | −5 | 540 | 588 | 454 | 5 | 3 |
| 60 | 50 | 30 | 5 | 5 | −5 | 550 | 581 | 454 | 5 | 3 |
| 60 | 50 | 30 | 5 | 5 | 0 | 530 | 594 | 450 | 4 | 3 |
| 60 | 50 | 30 | 5 | 5 | 0 | 540 | 586 | 450 | 5 | 3 |
| 60 | 50 | 30 | 5 | 5 | 0 | 550 | 582 | 450 | 5 | 3 |
| 60 | 50 | 30 | 5 | 5 | 5 | 530 | 594 | 446 | 4 | 3 |
| 60 | 50 | 30 | 5 | 5 | 5 | 540 | 587 | 446 | 5 | 3 |
| 60 | 50 | 30 | 5 | 5 | 5 | 550 | 582 | 446 | 5 | 3 |
| 60 | 50 | 40 | −5 | −5 | −5 | 530 | 601 | 455 | 4 | 3 |
| 60 | 50 | 40 | −5 | −5 | −5 | 540 | 598 | 454 | 5 | 3 |
| 60 | 50 | 40 | −5 | −5 | −5 | 550 | 591 | 454 | 5 | 3 |
| 60 | 50 | 40 | −5 | −5 | −5 | 560 | 589 | 454 | 4 | 3 |
| 60 | 50 | 40 | −5 | −5 | 0 | 530 | 601 | 451 | 4 | 3 |
| 60 | 50 | 40 | −5 | −5 | 0 | 540 | 598 | 451 | 5 | 3 |
| 60 | 50 | 40 | −5 | −5 | 0 | 550 | 591 | 451 | 5 | 3 |
| 60 | 50 | 40 | −5 | −5 | 0 | 560 | 590 | 451 | 4 | 3 |
| 60 | 50 | 40 | −5 | −5 | 5 | 530 | 601 | 448 | 4 | 3 |
| 60 | 50 | 40 | −5 | −5 | 5 | 540 | 598 | 448 | 5 | 3 |
| 60 | 50 | 40 | −5 | −5 | 5 | 550 | 591 | 447 | 5 | 3 |
| 60 | 50 | 40 | −5 | −5 | 5 | 560 | 590 | 447 | 4 | 3 |
| 60 | 50 | 40 | −5 | 0 | −5 | 530 | 600 | 454 | 4 | 3 |
| 60 | 50 | 40 | −5 | 0 | −5 | 540 | 596 | 454 | 5 | 3 |
| 60 | 50 | 40 | −5 | 0 | −5 | 550 | 591 | 454 | 5 | 3 |
| 60 | 50 | 40 | −5 | 0 | 0 | 530 | 600 | 451 | 4 | 3 |
| 60 | 50 | 40 | −5 | 0 | 0 | 540 | 596 | 451 | 5 | 3 |
| 60 | 50 | 40 | −5 | 0 | 0 | 550 | 591 | 451 | 5 | 3 |
| 60 | 50 | 40 | −5 | 0 | 0 | 560 | 590 | 451 | 2 | 1 |
| 60 | 50 | 40 | −5 | 0 | 5 | 530 | 600 | 448 | 4 | 3 |
| 60 | 50 | 40 | −5 | 0 | 5 | 540 | 596 | 448 | 5 | 3 |
| 60 | 50 | 40 | −5 | 0 | 5 | 550 | 592 | 448 | 5 | 3 |
| 60 | 50 | 40 | −5 | 0 | 5 | 560 | 591 | 448 | 2 | 2 |
| 60 | 50 | 40 | −5 | 5 | −5 | 520 | 602 | 455 | 2 | 1 |
| 60 | 50 | 40 | −5 | 5 | −5 | 530 | 600 | 454 | 4 | 3 |
| 60 | 50 | 40 | −5 | 5 | −5 | 540 | 596 | 454 | 5 | 3 |
| 60 | 50 | 40 | −5 | 5 | −5 | 550 | 593 | 454 | 4 | 3 |
| 60 | 50 | 40 | −5 | 5 | 0 | 520 | 601 | 451 | 2 | 2 |
| 60 | 50 | 40 | −5 | 5 | 0 | 530 | 599 | 451 | 4 | 3 |
| 60 | 50 | 40 | −5 | 5 | 0 | 540 | 595 | 451 | 5 | 3 |
| 60 | 50 | 40 | −5 | 5 | 0 | 550 | 592 | 451 | 4 | 3 |
| 60 | 50 | 40 | −5 | 5 | 5 | 520 | 602 | 448 | 3 | 2 |
| 60 | 50 | 40 | −5 | 5 | 5 | 530 | 599 | 448 | 4 | 3 |
| 60 | 50 | 40 | −5 | 5 | 5 | 540 | 595 | 447 | 5 | 3 |
| 60 | 50 | 40 | −5 | 5 | 5 | 550 | 592 | 448 | 4 | 3 |
| 60 | 50 | 40 | 0 | −5 | −5 | 530 | 598 | 455 | 3 | 3 |
| 60 | 50 | 40 | 0 | −5 | −5 | 540 | 594 | 454 | 5 | 3 |
| 60 | 50 | 40 | 0 | −5 | −5 | 550 | 585 | 454 | 5 | 3 |
| 60 | 50 | 40 | 0 | −5 | −5 | 560 | 585 | 454 | 4 | 3 |
| 60 | 50 | 40 | 0 | −5 | 0 | 530 | 598 | 451 | 4 | 3 |
| 60 | 50 | 40 | 0 | −5 | 0 | 540 | 594 | 451 | 5 | 3 |
| 60 | 50 | 40 | 0 | −5 | 0 | 550 | 585 | 451 | 6 | 3 |
| 60 | 50 | 40 | 0 | −5 | 0 | 560 | 586 | 451 | 4 | 3 |
| 60 | 50 | 40 | 0 | −5 | 5 | 530 | 598 | 448 | 4 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 50 | 40 | 0 | −5 | 5 | 540 | 594 | 447 | 5 | 3 |
| 60 | 50 | 40 | 0 | −5 | 5 | 550 | 585 | 447 | 6 | 3 |
| 60 | 50 | 40 | 0 | −5 | 5 | 560 | 586 | 448 | 4 | 3 |
| 60 | 50 | 40 | 0 | 0 | −5 | 530 | 597 | 454 | 4 | 3 |
| 60 | 50 | 40 | 0 | 0 | −5 | 540 | 593 | 454 | 5 | 3 |
| 60 | 50 | 40 | 0 | 0 | −5 | 550 | 586 | 454 | 5 | 3 |
| 60 | 50 | 40 | 0 | 0 | −5 | 560 | 585 | 454 | 3 | 2 |
| 60 | 50 | 40 | 0 | 0 | 0 | 530 | 597 | 451 | 4 | 3 |
| 60 | 50 | 40 | 0 | 0 | 0 | 540 | 592 | 451 | 5 | 3 |
| 60 | 50 | 40 | 0 | 0 | 0 | 550 | 586 | 451 | 5 | 3 |
| 60 | 50 | 40 | 0 | 0 | 0 | 560 | 585 | 451 | 3 | 2 |
| 60 | 50 | 40 | 0 | 0 | 5 | 530 | 597 | 447 | 4 | 3 |
| 60 | 50 | 40 | 0 | 0 | 5 | 540 | 592 | 448 | 5 | 3 |
| 60 | 50 | 40 | 0 | 0 | 5 | 550 | 586 | 448 | 5 | 3 |
| 60 | 50 | 40 | 0 | 0 | 5 | 560 | 586 | 448 | 3 | 2 |
| 60 | 50 | 40 | 0 | 5 | −5 | 520 | 599 | 454 | 1 | 1 |
| 60 | 50 | 40 | 0 | 5 | −5 | 530 | 596 | 454 | 4 | 3 |
| 60 | 50 | 40 | 0 | 5 | −5 | 540 | 592 | 454 | 5 | 3 |
| 60 | 50 | 40 | 0 | 5 | −5 | 550 | 588 | 454 | 4 | 3 |
| 60 | 50 | 40 | 0 | 5 | 0 | 520 | 599 | 451 | 2 | 2 |
| 60 | 50 | 40 | 0 | 5 | 0 | 530 | 597 | 451 | 4 | 3 |
| 60 | 50 | 40 | 0 | 5 | 0 | 540 | 591 | 451 | 5 | 3 |
| 60 | 50 | 40 | 0 | 5 | 0 | 550 | 588 | 451 | 5 | 3 |
| 60 | 50 | 40 | 0 | 5 | 5 | 520 | 599 | 448 | 2 | 2 |
| 60 | 50 | 40 | 0 | 5 | 5 | 530 | 597 | 448 | 4 | 3 |
| 60 | 50 | 40 | 0 | 5 | 5 | 540 | 591 | 447 | 5 | 3 |
| 60 | 50 | 40 | 0 | 5 | 5 | 550 | 587 | 447 | 5 | 3 |
| 60 | 50 | 40 | 5 | −5 | −5 | 530 | 595 | 454 | 3 | 3 |
| 60 | 50 | 40 | 5 | −5 | −5 | 540 | 591 | 454 | 5 | 3 |
| 60 | 50 | 40 | 5 | −5 | −5 | 550 | 581 | 454 | 5 | 3 |
| 60 | 50 | 40 | 5 | −5 | −5 | 560 | 582 | 454 | 4 | 3 |
| 60 | 50 | 40 | 5 | −5 | 0 | 530 | 596 | 451 | 3 | 3 |
| 60 | 50 | 40 | 5 | −5 | 0 | 540 | 591 | 451 | 5 | 3 |
| 60 | 50 | 40 | 5 | −5 | 0 | 550 | 582 | 451 | 5 | 3 |
| 60 | 50 | 40 | 5 | −5 | 0 | 560 | 581 | 451 | 4 | 3 |
| 60 | 50 | 40 | 5 | −5 | 5 | 530 | 595 | 448 | 4 | 3 |
| 60 | 50 | 40 | 5 | −5 | 5 | 540 | 591 | 447 | 5 | 3 |
| 60 | 50 | 40 | 5 | −5 | 5 | 550 | 582 | 447 | 5 | 3 |
| 60 | 50 | 40 | 5 | −5 | 5 | 560 | 582 | 447 | 4 | 3 |
| 60 | 50 | 40 | 5 | 0 | −5 | 530 | 595 | 454 | 4 | 3 |
| 60 | 50 | 40 | 5 | 0 | −5 | 540 | 589 | 454 | 5 | 3 |
| 60 | 50 | 40 | 5 | 0 | −5 | 550 | 581 | 454 | 5 | 3 |
| 60 | 50 | 40 | 5 | 0 | −5 | 560 | 581 | 454 | 3 | 2 |
| 60 | 50 | 40 | 5 | 0 | 0 | 530 | 594 | 451 | 4 | 3 |
| 60 | 50 | 40 | 5 | 0 | 0 | 540 | 588 | 451 | 5 | 3 |
| 60 | 50 | 40 | 5 | 0 | 0 | 540 | 547 | 451 | 2 | 1 |
| 60 | 50 | 40 | 5 | 0 | 0 | 550 | 581 | 451 | 5 | 3 |
| 60 | 50 | 40 | 5 | 0 | 0 | 560 | 581 | 451 | 3 | 2 |
| 60 | 50 | 40 | 5 | 0 | 5 | 530 | 594 | 448 | 4 | 3 |
| 60 | 50 | 40 | 5 | 0 | 5 | 540 | 580 | 447 | 5 | 3 |
| 60 | 50 | 40 | 5 | 0 | 5 | 550 | 582 | 448 | 5 | 3 |
| 60 | 50 | 40 | 5 | 0 | 5 | 560 | 582 | 448 | 4 | 2 |
| 60 | 50 | 40 | 5 | 5 | −5 | 530 | 594 | 454 | 4 | 3 |
| 60 | 50 | 40 | 5 | 5 | −5 | 540 | 584 | 454 | 5 | 3 |
| 60 | 50 | 40 | 5 | 5 | −5 | 550 | 582 | 454 | 5 | 3 |
| 60 | 50 | 40 | 5 | 5 | 0 | 520 | 597 | 451 | 2 | 1 |
| 60 | 50 | 40 | 5 | 5 | 0 | 530 | 594 | 451 | 4 | 3 |
| 60 | 50 | 40 | 5 | 5 | 0 | 540 | 583 | 451 | 5 | 3 |
| 60 | 50 | 40 | 5 | 5 | 0 | 550 | 583 | 451 | 5 | 3 |
| 60 | 50 | 40 | 5 | 5 | 5 | 520 | 597 | 448 | 2 | 2 |
| 60 | 50 | 40 | 5 | 5 | 5 | 530 | 594 | 448 | 4 | 3 |
| 60 | 50 | 40 | 5 | 5 | 5 | 540 | 583 | 447 | 5 | 3 |
| 60 | 50 | 40 | 5 | 5 | 5 | 550 | 583 | 447 | 5 | 3 |
| 60 | 50 | 50 | −5 | −5 | −5 | 530 | 601 | 455 | 3 | 2 |
| 60 | 50 | 50 | −5 | −5 | −5 | 540 | 598 | 454 | 4 | 3 |
| 60 | 50 | 50 | −5 | −5 | −5 | 550 | 592 | 454 | 5 | 3 |
| 60 | 50 | 50 | −5 | −5 | −5 | 560 | 588 | 454 | 3 | 2 |
| 60 | 50 | 50 | −5 | −5 | 0 | 530 | 601 | 452 | 3 | 3 |
| 60 | 50 | 50 | −5 | −5 | 0 | 540 | 598 | 452 | 4 | 4 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 50 | 50 | −5 | −5 | 0 | 550 | 592 | 451 | 5 | 3 |
| 60 | 50 | 50 | −5 | −5 | 0 | 560 | 589 | 451 | 3 | 2 |
| 60 | 50 | 50 | −5 | −5 | 5 | 530 | 601 | 450 | 3 | 3 |
| 60 | 50 | 50 | −5 | −5 | 5 | 540 | 598 | 449 | 4 | 3 |
| 60 | 50 | 50 | −5 | −5 | 5 | 550 | 592 | 448 | 5 | 3 |
| 60 | 50 | 50 | −5 | −5 | 5 | 560 | 588 | 449 | 3 | 2 |
| 60 | 50 | 50 | −5 | 0 | −5 | 530 | 600 | 455 | 4 | 3 |
| 60 | 50 | 50 | −5 | 0 | −5 | 540 | 597 | 454 | 4 | 4 |
| 60 | 50 | 50 | −5 | 0 | −5 | 550 | 591 | 454 | 4 | 3 |
| 60 | 50 | 50 | −5 | 0 | 0 | 530 | 601 | 452 | 4 | 3 |
| 60 | 50 | 50 | −5 | 0 | 0 | 540 | 597 | 451 | 4 | 4 |
| 60 | 50 | 50 | −5 | 0 | 0 | 550 | 591 | 451 | 4 | 3 |
| 60 | 50 | 50 | −5 | 0 | 5 | 530 | 600 | 450 | 4 | 3 |
| 60 | 50 | 50 | −5 | 0 | 5 | 540 | 597 | 449 | 4 | 4 |
| 60 | 50 | 50 | −5 | 0 | 5 | 550 | 591 | 448 | 4 | 3 |
| 60 | 50 | 50 | −5 | 5 | −5 | 530 | 600 | 454 | 4 | 3 |
| 60 | 50 | 50 | −5 | 5 | −5 | 540 | 596 | 454 | 4 | 3 |
| 60 | 50 | 50 | −5 | 5 | −5 | 550 | 592 | 454 | 4 | 3 |
| 60 | 50 | 50 | −5 | 5 | 0 | 530 | 600 | 452 | 4 | 3 |
| 60 | 50 | 50 | −5 | 5 | 0 | 540 | 596 | 451 | 4 | 4 |
| 60 | 50 | 50 | −5 | 5 | 0 | 550 | 593 | 451 | 4 | 3 |
| 60 | 50 | 50 | −5 | 5 | 5 | 530 | 600 | 449 | 4 | 3 |
| 60 | 50 | 50 | −5 | 5 | 5 | 540 | 596 | 448 | 4 | 3 |
| 60 | 50 | 50 | −5 | 5 | 5 | 550 | 592 | 449 | 4 | 3 |
| 60 | 50 | 50 | 0 | −5 | −5 | 530 | 599 | 455 | 3 | 2 |
| 60 | 50 | 50 | 0 | −5 | −5 | 540 | 595 | 454 | 4 | 3 |
| 60 | 50 | 50 | 0 | −5 | −5 | 550 | 585 | 454 | 5 | 3 |
| 60 | 50 | 50 | 0 | −5 | −5 | 560 | 583 | 454 | 4 | 3 |
| 60 | 50 | 50 | 0 | −5 | 0 | 530 | 598 | 452 | 3 | 2 |
| 60 | 50 | 50 | 0 | −5 | 0 | 540 | 595 | 452 | 4 | 3 |
| 60 | 50 | 50 | 0 | −5 | 0 | 550 | 585 | 451 | 5 | 3 |
| 60 | 50 | 50 | 0 | −5 | 0 | 560 | 583 | 451 | 4 | 3 |
| 60 | 50 | 50 | 0 | −5 | 5 | 530 | 598 | 450 | 3 | 3 |
| 60 | 50 | 50 | 0 | −5 | 5 | 540 | 595 | 449 | 4 | 3 |
| 60 | 50 | 50 | 0 | −5 | 5 | 550 | 585 | 448 | 5 | 3 |
| 60 | 50 | 50 | 0 | −5 | 5 | 560 | 583 | 449 | 4 | 3 |
| 60 | 50 | 50 | 0 | 0 | −5 | 530 | 598 | 455 | 4 | 3 |
| 60 | 50 | 50 | 0 | 0 | −5 | 540 | 594 | 454 | 4 | 3 |
| 60 | 50 | 50 | 0 | 0 | −5 | 550 | 585 | 454 | 5 | 3 |
| 60 | 50 | 50 | 0 | 0 | 0 | 530 | 597 | 452 | 4 | 3 |
| 60 | 50 | 50 | 0 | 0 | 0 | 540 | 593 | 451 | 5 | 4 |
| 60 | 50 | 50 | 0 | 0 | 0 | 550 | 585 | 451 | 5 | 3 |
| 60 | 50 | 50 | 0 | 0 | 5 | 530 | 597 | 449 | 4 | 3 |
| 60 | 50 | 50 | 0 | 0 | 5 | 540 | 593 | 448 | 4 | 3 |
| 60 | 50 | 50 | 0 | 0 | 5 | 550 | 585 | 448 | 5 | 3 |
| 60 | 50 | 50 | 0 | 5 | −5 | 530 | 597 | 454 | 4 | 3 |
| 60 | 50 | 50 | 0 | 5 | −5 | 540 | 592 | 454 | 4 | 3 |
| 60 | 50 | 50 | 0 | 5 | −5 | 550 | 587 | 454 | 4 | 3 |
| 60 | 50 | 50 | 0 | 5 | 0 | 530 | 597 | 452 | 4 | 3 |
| 60 | 50 | 50 | 0 | 5 | 0 | 540 | 592 | 451 | 5 | 3 |
| 60 | 50 | 50 | 0 | 5 | 0 | 550 | 587 | 451 | 4 | 3 |
| 60 | 50 | 50 | 0 | 5 | 5 | 530 | 597 | 449 | 4 | 3 |
| 60 | 50 | 50 | 0 | 5 | 5 | 540 | 592 | 448 | 5 | 3 |
| 60 | 50 | 50 | 0 | 5 | 5 | 550 | 587 | 448 | 4 | 3 |
| 60 | 50 | 50 | 5 | −5 | −5 | 530 | 596 | 455 | 3 | 2 |
| 60 | 50 | 50 | 5 | −5 | −5 | 540 | 592 | 454 | 4 | 3 |
| 60 | 50 | 50 | 5 | −5 | −5 | 550 | 581 | 454 | 5 | 3 |
| 60 | 50 | 50 | 5 | −5 | −5 | 560 | 579 | 454 | 4 | 3 |
| 60 | 50 | 50 | 5 | −5 | 0 | 530 | 595 | 453 | 3 | 2 |
| 60 | 50 | 50 | 5 | −5 | 0 | 540 | 592 | 452 | 4 | 3 |
| 60 | 50 | 50 | 5 | −5 | 0 | 550 | 580 | 451 | 5 | 3 |
| 60 | 50 | 50 | 5 | −5 | 0 | 560 | 580 | 451 | 4 | 3 |
| 60 | 50 | 50 | 5 | −5 | 5 | 530 | 595 | 450 | 3 | 3 |
| 60 | 50 | 50 | 5 | −5 | 5 | 540 | 591 | 449 | 4 | 3 |
| 60 | 50 | 50 | 5 | −5 | 5 | 550 | 580 | 448 | 5 | 3 |
| 60 | 50 | 50 | 5 | −5 | 5 | 560 | 579 | 448 | 4 | 3 |
| 60 | 50 | 50 | 5 | 0 | −5 | 530 | 595 | 454 | 3 | 3 |
| 60 | 50 | 50 | 5 | 0 | −5 | 540 | 590 | 454 | 4 | 3 |
| 60 | 50 | 50 | 5 | 0 | −5 | 550 | 580 | 454 | 5 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 50 | 50 | 5 | 0 | 0 | 530 | 595 | 452 | 4 | 3 |
| 60 | 50 | 50 | 5 | 0 | 0 | 540 | 590 | 451 | 5 | 3 |
| 60 | 50 | 50 | 5 | 0 | 0 | 550 | 580 | 451 | 5 | 3 |
| 60 | 50 | 50 | 5 | 0 | 0 | 560 | 578 | 451 | 2 | 1 |
| 60 | 50 | 50 | 5 | 0 | 5 | 530 | 595 | 449 | 4 | 3 |
| 60 | 50 | 50 | 5 | 0 | 5 | 540 | 590 | 448 | 5 | 3 |
| 60 | 50 | 50 | 5 | 0 | 5 | 550 | 581 | 448 | 5 | 3 |
| 60 | 50 | 50 | 5 | 0 | 5 | 560 | 579 | 448 | 2 | 1 |
| 60 | 50 | 50 | 5 | 5 | −5 | 530 | 594 | 454 | 4 | 3 |
| 60 | 50 | 50 | 5 | 5 | −5 | 540 | 588 | 454 | 5 | 3 |
| 60 | 50 | 50 | 5 | 5 | −5 | 550 | 581 | 454 | 4 | 3 |
| 60 | 50 | 50 | 5 | 5 | 0 | 530 | 594 | 452 | 4 | 3 |
| 60 | 50 | 50 | 5 | 5 | 0 | 540 | 588 | 451 | 5 | 3 |
| 60 | 50 | 50 | 5 | 5 | 0 | 550 | 581 | 451 | 4 | 3 |
| 60 | 50 | 50 | 5 | 5 | 5 | 530 | 594 | 449 | 4 | 3 |
| 60 | 50 | 50 | 5 | 5 | 5 | 540 | 588 | 449 | 5 | 3 |
| 60 | 50 | 50 | 5 | 5 | 5 | 550 | 581 | 448 | 4 | 3 |
| 60 | 60 | 30 | −5 | −5 | −5 | 530 | 601 | 454 | 3 | 2 |
| 60 | 60 | 30 | −5 | −5 | −5 | 540 | 598 | 454 | 4 | 3 |
| 60 | 60 | 30 | −5 | −5 | −5 | 550 | 594 | 454 | 5 | 3 |
| 60 | 60 | 30 | −5 | −5 | −5 | 560 | 586 | 454 | 5 | 3 |
| 60 | 60 | 30 | −5 | −5 | −5 | 570 | 584 | 454 | 3 | 3 |
| 60 | 60 | 30 | −5 | −5 | −5 | 580 | 584 | 454 | 1 | 2 |
| 60 | 60 | 30 | −5 | −5 | 0 | 530 | 601 | 450 | 3 | 2 |
| 60 | 60 | 30 | −5 | −5 | 0 | 540 | 598 | 450 | 4 | 3 |
| 60 | 60 | 30 | −5 | −5 | 0 | 550 | 594 | 450 | 5 | 3 |
| 60 | 60 | 30 | −5 | −5 | 0 | 560 | 586 | 450 | 5 | 3 |
| 60 | 60 | 30 | −5 | −5 | 0 | 570 | 584 | 450 | 4 | 3 |
| 60 | 60 | 30 | −5 | −5 | 0 | 580 | 584 | 450 | 1 | 2 |
| 60 | 60 | 30 | −5 | −5 | 5 | 530 | 601 | 446 | 3 | 2 |
| 60 | 60 | 30 | −5 | −5 | 5 | 540 | 599 | 446 | 4 | 3 |
| 60 | 60 | 30 | −5 | −5 | 5 | 550 | 594 | 446 | 5 | 3 |
| 60 | 60 | 30 | −5 | −5 | 5 | 560 | 586 | 446 | 5 | 3 |
| 60 | 60 | 30 | −5 | −5 | 5 | 570 | 584 | 446 | 4 | 3 |
| 60 | 60 | 30 | −5 | −5 | 5 | 580 | 585 | 446 | 2 | 2 |
| 60 | 60 | 30 | −5 | 0 | −5 | 530 | 600 | 454 | 3 | 3 |
| 60 | 60 | 30 | −5 | 0 | −5 | 540 | 598 | 454 | 4 | 3 |
| 60 | 60 | 30 | −5 | 0 | −5 | 550 | 593 | 454 | 5 | 3 |
| 60 | 60 | 30 | −5 | 0 | −5 | 560 | 589 | 454 | 4 | 3 |
| 60 | 60 | 30 | −5 | 0 | −5 | 570 | 587 | 454 | 3 | 2 |
| 60 | 60 | 30 | −5 | 0 | 0 | 530 | 601 | 450 | 4 | 3 |
| 60 | 60 | 30 | −5 | 0 | 0 | 540 | 598 | 450 | 4 | 3 |
| 60 | 60 | 30 | −5 | 0 | 0 | 550 | 593 | 450 | 5 | 3 |
| 60 | 60 | 30 | −5 | 0 | 0 | 560 | 589 | 450 | 4 | 3 |
| 60 | 60 | 30 | −5 | 0 | 0 | 570 | 587 | 450 | 3 | 2 |
| 60 | 60 | 30 | −5 | 0 | 5 | 530 | 601 | 446 | 4 | 3 |
| 60 | 60 | 30 | −5 | 0 | 5 | 540 | 598 | 446 | 4 | 3 |
| 60 | 60 | 30 | −5 | 0 | 5 | 550 | 593 | 446 | 5 | 3 |
| 60 | 60 | 30 | −5 | 0 | 5 | 560 | 590 | 446 | 4 | 3 |
| 60 | 60 | 30 | −5 | 0 | 5 | 570 | 587 | 446 | 3 | 2 |
| 60 | 60 | 30 | −5 | 5 | −5 | 530 | 600 | 454 | 4 | 3 |
| 60 | 60 | 30 | −5 | 5 | −5 | 540 | 597 | 454 | 4 | 3 |
| 60 | 60 | 30 | −5 | 5 | −5 | 550 | 593 | 454 | 4 | 3 |
| 60 | 60 | 30 | −5 | 5 | −5 | 560 | 590 | 454 | 4 | 3 |
| 60 | 60 | 30 | −5 | 5 | 0 | 530 | 601 | 450 | 4 | 3 |
| 60 | 60 | 30 | −5 | 5 | 0 | 540 | 597 | 450 | 4 | 3 |
| 60 | 60 | 30 | −5 | 5 | 0 | 550 | 593 | 450 | 4 | 3 |
| 60 | 60 | 30 | −5 | 5 | 0 | 560 | 591 | 450 | 4 | 3 |
| 60 | 60 | 30 | −5 | 5 | 5 | 530 | 601 | 446 | 4 | 3 |
| 60 | 60 | 30 | −5 | 5 | 5 | 540 | 598 | 446 | 4 | 3 |
| 60 | 60 | 30 | −5 | 5 | 5 | 550 | 594 | 446 | 4 | 3 |
| 60 | 60 | 30 | −5 | 5 | 5 | 560 | 590 | 446 | 4 | 3 |
| 60 | 60 | 30 | 0 | −5 | −5 | 530 | 599 | 454 | 3 | 2 |
| 60 | 60 | 30 | 0 | −5 | −5 | 540 | 596 | 454 | 4 | 3 |
| 60 | 60 | 30 | 0 | −5 | −5 | 550 | 590 | 454 | 5 | 3 |
| 60 | 60 | 30 | 0 | −5 | −5 | 560 | 584 | 454 | 5 | 3 |
| 60 | 60 | 30 | 0 | −5 | −5 | 570 | 583 | 454 | 3 | 3 |
| 60 | 60 | 30 | 0 | −5 | 0 | 530 | 598 | 450 | 3 | 2 |
| 60 | 60 | 30 | 0 | −5 | 0 | 540 | 595 | 450 | 4 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 60 | 30 | 0 | −5 | 0 | 550 | 590 | 450 | 5 | 3 |
| 60 | 60 | 30 | 0 | −5 | 0 | 560 | 584 | 450 | 5 | 3 |
| 60 | 60 | 30 | 0 | −5 | 0 | 570 | 583 | 450 | 3 | 3 |
| 60 | 60 | 30 | 0 | −5 | 0 | 580 | 584 | 450 | 1 | 1 |
| 60 | 60 | 30 | 0 | −5 | 5 | 530 | 598 | 446 | 3 | 2 |
| 60 | 60 | 30 | 0 | −5 | 5 | 540 | 595 | 446 | 4 | 3 |
| 60 | 60 | 30 | 0 | −5 | 5 | 550 | 590 | 446 | 5 | 3 |
| 60 | 60 | 30 | 0 | −5 | 5 | 560 | 584 | 446 | 5 | 3 |
| 60 | 60 | 30 | 0 | −5 | 5 | 570 | 583 | 446 | 3 | 3 |
| 60 | 60 | 30 | 0 | −5 | 5 | 580 | 584 | 446 | 1 | 1 |
| 60 | 60 | 30 | 0 | 0 | −5 | 530 | 598 | 454 | 4 | 3 |
| 60 | 60 | 30 | 0 | 0 | −5 | 540 | 595 | 454 | 4 | 3 |
| 60 | 60 | 30 | 0 | 0 | −5 | 550 | 589 | 454 | 5 | 3 |
| 60 | 60 | 30 | 0 | 0 | −5 | 560 | 583 | 454 | 5 | 3 |
| 60 | 60 | 30 | 0 | 0 | −5 | 570 | 581 | 454 | 3 | 3 |
| 60 | 60 | 30 | 0 | 0 | −5 | 580 | 582 | 454 | 1 | 1 |
| 60 | 60 | 30 | 0 | 0 | 0 | 530 | 598 | 450 | 4 | 3 |
| 60 | 60 | 30 | 0 | 0 | 0 | 540 | 595 | 450 | 4 | 3 |
| 60 | 60 | 30 | 0 | 0 | 0 | 550 | 590 | 450 | 5 | 3 |
| 60 | 60 | 30 | 0 | 0 | 0 | 560 | 583 | 450 | 5 | 3 |
| 60 | 60 | 30 | 0 | 0 | 0 | 570 | 582 | 450 | 3 | 3 |
| 60 | 60 | 30 | 0 | 0 | 0 | 580 | 582 | 450 | 1 | 2 |
| 60 | 60 | 30 | 0 | 0 | 5 | 530 | 598 | 446 | 4 | 3 |
| 60 | 60 | 30 | 0 | 0 | 5 | 540 | 595 | 446 | 4 | 3 |
| 60 | 60 | 30 | 0 | 0 | 5 | 550 | 589 | 446 | 5 | 3 |
| 60 | 60 | 30 | 0 | 0 | 5 | 560 | 583 | 446 | 5 | 3 |
| 60 | 60 | 30 | 0 | 0 | 5 | 570 | 582 | 446 | 3 | 3 |
| 60 | 60 | 30 | 0 | 0 | 5 | 580 | 583 | 446 | 1 | 2 |
| 60 | 60 | 30 | 0 | 5 | −5 | 530 | 598 | 454 | 4 | 3 |
| 60 | 60 | 30 | 0 | 5 | −5 | 540 | 595 | 454 | 4 | 3 |
| 60 | 60 | 30 | 0 | 5 | −5 | 550 | 590 | 454 | 4 | 3 |
| 60 | 60 | 30 | 0 | 5 | −5 | 560 | 585 | 454 | 4 | 3 |
| 60 | 60 | 30 | 0 | 5 | −5 | 570 | 584 | 454 | 2 | 2 |
| 60 | 60 | 30 | 0 | 5 | 0 | 530 | 598 | 450 | 4 | 3 |
| 60 | 60 | 30 | 0 | 5 | 0 | 540 | 594 | 450 | 4 | 3 |
| 60 | 60 | 30 | 0 | 5 | 0 | 550 | 589 | 450 | 5 | 3 |
| 60 | 60 | 30 | 0 | 5 | 0 | 560 | 586 | 450 | 4 | 3 |
| 60 | 60 | 30 | 0 | 5 | 0 | 570 | 584 | 450 | 2 | 2 |
| 60 | 60 | 30 | 0 | 5 | 5 | 530 | 597 | 446 | 4 | 3 |
| 60 | 60 | 30 | 0 | 5 | 5 | 540 | 594 | 446 | 4 | 3 |
| 60 | 60 | 30 | 0 | 5 | 5 | 550 | 589 | 446 | 5 | 3 |
| 60 | 60 | 30 | 0 | 5 | 5 | 560 | 586 | 446 | 4 | 3 |
| 60 | 60 | 30 | 0 | 5 | 5 | 570 | 584 | 446 | 2 | 2 |
| 60 | 60 | 30 | 5 | −5 | −5 | 530 | 596 | 454 | 3 | 2 |
| 60 | 60 | 30 | 5 | −5 | −5 | 540 | 593 | 454 | 4 | 3 |
| 60 | 60 | 30 | 5 | −5 | −5 | 550 | 588 | 454 | 5 | 3 |
| 60 | 60 | 30 | 5 | −5 | −5 | 560 | 583 | 454 | 5 | 3 |
| 60 | 60 | 30 | 5 | −5 | −5 | 570 | 583 | 454 | 3 | 3 |
| 60 | 60 | 30 | 5 | −5 | 0 | 530 | 596 | 450 | 3 | 2 |
| 60 | 60 | 30 | 5 | −5 | 0 | 540 | 593 | 450 | 4 | 3 |
| 60 | 60 | 30 | 5 | −5 | 0 | 550 | 588 | 450 | 5 | 3 |
| 60 | 60 | 30 | 5 | −5 | 0 | 560 | 583 | 450 | 5 | 3 |
| 60 | 60 | 30 | 5 | −5 | 0 | 570 | 583 | 450 | 3 | 3 |
| 60 | 60 | 30 | 5 | −5 | 5 | 530 | 596 | 446 | 3 | 2 |
| 60 | 60 | 30 | 5 | −5 | 5 | 540 | 593 | 446 | 4 | 3 |
| 60 | 60 | 30 | 5 | −5 | 5 | 550 | 587 | 446 | 5 | 3 |
| 60 | 60 | 30 | 5 | −5 | 5 | 560 | 583 | 446 | 5 | 3 |
| 60 | 60 | 30 | 5 | −5 | 5 | 570 | 583 | 446 | 3 | 3 |
| 60 | 60 | 30 | 5 | 0 | −5 | 530 | 595 | 454 | 3 | 2 |
| 60 | 60 | 30 | 5 | 0 | −5 | 540 | 592 | 454 | 4 | 3 |
| 60 | 60 | 30 | 5 | 0 | −5 | 550 | 586 | 454 | 5 | 3 |
| 60 | 60 | 30 | 5 | 0 | −5 | 560 | 581 | 454 | 4 | 3 |
| 60 | 60 | 30 | 5 | 0 | −5 | 570 | 581 | 454 | 3 | 3 |
| 60 | 60 | 30 | 5 | 0 | 0 | 530 | 595 | 450 | 4 | 3 |
| 60 | 60 | 30 | 5 | 0 | 0 | 540 | 592 | 450 | 4 | 3 |
| 60 | 60 | 30 | 5 | 0 | 0 | 550 | 586 | 450 | 5 | 3 |
| 60 | 60 | 30 | 5 | 0 | 0 | 560 | 582 | 450 | 4 | 3 |
| 60 | 60 | 30 | 5 | 0 | 0 | 570 | 582 | 450 | 3 | 3 |
| 60 | 60 | 30 | 5 | 0 | 5 | 530 | 595 | 446 | 4 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 60 | 30 | 5 | 0 | 5 | 540 | 592 | 446 | 4 | 3 |
| 60 | 60 | 30 | 5 | 0 | 5 | 550 | 587 | 446 | 5 | 3 |
| 60 | 60 | 30 | 5 | 0 | 5 | 560 | 582 | 446 | 4 | 3 |
| 60 | 60 | 30 | 5 | 0 | 5 | 570 | 581 | 446 | 3 | 3 |
| 60 | 60 | 30 | 5 | 5 | −5 | 530 | 595 | 454 | 4 | 3 |
| 60 | 60 | 30 | 5 | 5 | −5 | 540 | 591 | 454 | 4 | 3 |
| 60 | 60 | 30 | 5 | 5 | −5 | 550 | 586 | 454 | 5 | 3 |
| 60 | 60 | 30 | 5 | 5 | −5 | 560 | 580 | 454 | 4 | 3 |
| 60 | 60 | 30 | 5 | 5 | −5 | 570 | 579 | 454 | 3 | 2 |
| 60 | 60 | 30 | 5 | 5 | 0 | 530 | 595 | 450 | 4 | 3 |
| 60 | 60 | 30 | 5 | 5 | 0 | 540 | 591 | 450 | 4 | 3 |
| 60 | 60 | 30 | 5 | 5 | 0 | 550 | 586 | 450 | 5 | 3 |
| 60 | 60 | 30 | 5 | 5 | 0 | 560 | 580 | 450 | 4 | 3 |
| 60 | 60 | 30 | 5 | 5 | 0 | 570 | 579 | 450 | 3 | 2 |
| 60 | 60 | 30 | 5 | 5 | 5 | 530 | 595 | 446 | 4 | 3 |
| 60 | 60 | 30 | 5 | 5 | 5 | 540 | 592 | 446 | 4 | 3 |
| 60 | 60 | 30 | 5 | 5 | 5 | 550 | 586 | 446 | 5 | 3 |
| 60 | 60 | 30 | 5 | 5 | 5 | 560 | 581 | 446 | 4 | 3 |
| 60 | 60 | 30 | 5 | 5 | 5 | 570 | 579 | 446 | 3 | 2 |
| 60 | 60 | 40 | −5 | −5 | −5 | 530 | 601 | 455 | 4 | 3 |
| 60 | 60 | 40 | −5 | −5 | −5 | 540 | 598 | 455 | 5 | 3 |
| 60 | 60 | 40 | −5 | −5 | −5 | 550 | 593 | 454 | 5 | 3 |
| 60 | 60 | 40 | −5 | −5 | −5 | 560 | 586 | 454 | 5 | 3 |
| 60 | 60 | 40 | −5 | −5 | −5 | 570 | 585 | 454 | 4 | 3 |
| 60 | 60 | 40 | −5 | −5 | −5 | 580 | 585 | 454 | 2 | 2 |
| 60 | 60 | 40 | −5 | −5 | 0 | 530 | 601 | 452 | 4 | 3 |
| 60 | 60 | 40 | −5 | −5 | 0 | 540 | 598 | 451 | 5 | 3 |
| 60 | 60 | 40 | −5 | −5 | 0 | 550 | 593 | 451 | 5 | 4 |
| 60 | 60 | 40 | −5 | −5 | 0 | 560 | 587 | 451 | 5 | 3 |
| 60 | 60 | 40 | −5 | −5 | 0 | 570 | 585 | 451 | 4 | 3 |
| 60 | 60 | 40 | −5 | −5 | 0 | 580 | 585 | 451 | 2 | 2 |
| 60 | 60 | 40 | −5 | −5 | 5 | 530 | 601 | 449 | 4 | 3 |
| 60 | 60 | 40 | −5 | −5 | 5 | 540 | 598 | 448 | 5 | 3 |
| 60 | 60 | 40 | −5 | −5 | 5 | 550 | 593 | 448 | 5 | 4 |
| 60 | 60 | 40 | −5 | −5 | 5 | 560 | 587 | 447 | 5 | 3 |
| 60 | 60 | 40 | −5 | −5 | 5 | 570 | 586 | 447 | 4 | 3 |
| 60 | 60 | 40 | −5 | −5 | 5 | 580 | 585 | 447 | 2 | 2 |
| 60 | 60 | 40 | −5 | 0 | −5 | 530 | 601 | 455 | 4 | 3 |
| 60 | 60 | 40 | −5 | 0 | −5 | 540 | 597 | 454 | 5 | 3 |
| 60 | 60 | 40 | −5 | 0 | −5 | 550 | 593 | 454 | 5 | 4 |
| 60 | 60 | 40 | −5 | 0 | −5 | 560 | 589 | 454 | 4 | 3 |
| 60 | 60 | 40 | −5 | 0 | −5 | 570 | 587 | 454 | 3 | 3 |
| 60 | 60 | 40 | −5 | 0 | 0 | 520 | 602 | 452 | 1 | 1 |
| 60 | 60 | 40 | −5 | 0 | 0 | 530 | 600 | 452 | 4 | 3 |
| 60 | 60 | 40 | −5 | 0 | 0 | 540 | 597 | 451 | 5 | 3 |
| 60 | 60 | 40 | −5 | 0 | 0 | 550 | 593 | 451 | 5 | 4 |
| 60 | 60 | 40 | −5 | 0 | 0 | 560 | 589 | 451 | 4 | 3 |
| 60 | 60 | 40 | −5 | 0 | 0 | 570 | 588 | 450 | 3 | 3 |
| 60 | 60 | 40 | −5 | 0 | 5 | 520 | 602 | 449 | 2 | 2 |
| 60 | 60 | 40 | −5 | 0 | 5 | 530 | 601 | 448 | 4 | 3 |
| 60 | 60 | 40 | −5 | 0 | 5 | 540 | 598 | 448 | 5 | 4 |
| 60 | 60 | 40 | −5 | 0 | 5 | 550 | 593 | 448 | 5 | 4 |
| 60 | 60 | 40 | −5 | 0 | 5 | 560 | 589 | 447 | 4 | 3 |
| 60 | 60 | 40 | −5 | 0 | 5 | 570 | 588 | 448 | 3 | 3 |
| 60 | 60 | 40 | −5 | 5 | −5 | 520 | 602 | 455 | 3 | 2 |
| 60 | 60 | 40 | −5 | 5 | −5 | 530 | 600 | 454 | 4 | 3 |
| 60 | 60 | 40 | −5 | 5 | −5 | 540 | 597 | 454 | 5 | 3 |
| 60 | 60 | 40 | −5 | 5 | −5 | 550 | 593 | 454 | 5 | 3 |
| 60 | 60 | 40 | −5 | 5 | −5 | 560 | 591 | 454 | 4 | 3 |
| 60 | 60 | 40 | −5 | 5 | 0 | 520 | 602 | 452 | 3 | 2 |
| 60 | 60 | 40 | −5 | 5 | 0 | 530 | 600 | 451 | 4 | 3 |
| 60 | 60 | 40 | −5 | 5 | 0 | 540 | 597 | 451 | 5 | 4 |
| 60 | 60 | 40 | −5 | 5 | 0 | 550 | 593 | 451 | 5 | 4 |
| 60 | 60 | 40 | −5 | 5 | 0 | 560 | 591 | 451 | 4 | 3 |
| 60 | 60 | 40 | −5 | 5 | 5 | 520 | 602 | 449 | 3 | 2 |
| 60 | 60 | 40 | −5 | 5 | 5 | 530 | 600 | 448 | 4 | 3 |
| 60 | 60 | 40 | −5 | 5 | 5 | 540 | 598 | 448 | 5 | 4 |
| 60 | 60 | 40 | −5 | 5 | 5 | 550 | 594 | 448 | 5 | 3 |
| 60 | 60 | 40 | −5 | 5 | 5 | 560 | 591 | 448 | 4 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 60 | 40 | 0 | −5 | −5 | 530 | 598 | 455 | 4 | 3 |
| 60 | 60 | 40 | 0 | −5 | −5 | 540 | 595 | 455 | 5 | 3 |
| 60 | 60 | 40 | 0 | −5 | −5 | 550 | 590 | 454 | 5 | 3 |
| 60 | 60 | 40 | 0 | −5 | −5 | 560 | 585 | 454 | 5 | 3 |
| 60 | 60 | 40 | 0 | −5 | −5 | 570 | 584 | 454 | 4 | 3 |
| 60 | 60 | 40 | 0 | −5 | −5 | 580 | 585 | 454 | 2 | 2 |
| 60 | 60 | 40 | 0 | −5 | 0 | 530 | 598 | 452 | 4 | 3 |
| 60 | 60 | 40 | 0 | −5 | 0 | 540 | 595 | 451 | 5 | 3 |
| 60 | 60 | 40 | 0 | −5 | 0 | 550 | 590 | 451 | 5 | 4 |
| 60 | 60 | 40 | 0 | −5 | 0 | 560 | 585 | 451 | 5 | 4 |
| 60 | 60 | 40 | 0 | −5 | 0 | 570 | 585 | 451 | 4 | 3 |
| 60 | 60 | 40 | 0 | −5 | 0 | 580 | 585 | 451 | 2 | 2 |
| 60 | 60 | 40 | 0 | −5 | 5 | 530 | 598 | 449 | 4 | 3 |
| 60 | 60 | 40 | 0 | −5 | 5 | 540 | 595 | 448 | 5 | 3 |
| 60 | 60 | 40 | 0 | −5 | 5 | 550 | 589 | 448 | 5 | 3 |
| 60 | 60 | 40 | 0 | −5 | 5 | 560 | 585 | 448 | 5 | 3 |
| 60 | 60 | 40 | 0 | −5 | 5 | 570 | 585 | 448 | 4 | 3 |
| 60 | 60 | 40 | 0 | −5 | 5 | 580 | 585 | 447 | 2 | 2 |
| 60 | 60 | 40 | 0 | 0 | −5 | 530 | 598 | 455 | 4 | 3 |
| 60 | 60 | 40 | 0 | 0 | −5 | 540 | 595 | 455 | 5 | 3 |
| 60 | 60 | 40 | 0 | 0 | −5 | 550 | 590 | 454 | 5 | 3 |
| 60 | 60 | 40 | 0 | 0 | −5 | 560 | 584 | 454 | 5 | 3 |
| 60 | 60 | 40 | 0 | 0 | −5 | 570 | 583 | 454 | 3 | 3 |
| 60 | 60 | 40 | 0 | 0 | −5 | 580 | 583 | 454 | 1 | 2 |
| 60 | 60 | 40 | 0 | 0 | 0 | 530 | 598 | 451 | 4 | 3 |
| 60 | 60 | 40 | 0 | 0 | 0 | 540 | 594 | 451 | 5 | 3 |
| 60 | 60 | 40 | 0 | 0 | 0 | 550 | 589 | 451 | 5 | 3 |
| 60 | 60 | 40 | 0 | 0 | 0 | 560 | 584 | 451 | 5 | 3 |
| 60 | 60 | 40 | 0 | 0 | 0 | 570 | 583 | 451 | 3 | 3 |
| 60 | 60 | 40 | 0 | 0 | 0 | 580 | 583 | 451 | 1 | 2 |
| 60 | 60 | 40 | 0 | 0 | 5 | 520 | 599 | 449 | 2 | 2 |
| 60 | 60 | 40 | 0 | 0 | 5 | 530 | 597 | 448 | 4 | 3 |
| 60 | 60 | 40 | 0 | 0 | 5 | 540 | 594 | 448 | 5 | 3 |
| 60 | 60 | 40 | 0 | 0 | 5 | 550 | 589 | 448 | 5 | 4 |
| 60 | 60 | 40 | 0 | 0 | 5 | 560 | 584 | 447 | 5 | 3 |
| 60 | 60 | 40 | 0 | 0 | 5 | 570 | 583 | 447 | 3 | 3 |
| 60 | 60 | 40 | 0 | 0 | 5 | 580 | 584 | 447 | 1 | 2 |
| 60 | 60 | 40 | 0 | 5 | −5 | 520 | 599 | 455 | 2 | 2 |
| 60 | 60 | 40 | 0 | 5 | −5 | 530 | 598 | 454 | 4 | 3 |
| 60 | 60 | 40 | 0 | 5 | −5 | 540 | 595 | 454 | 5 | 3 |
| 60 | 60 | 40 | 0 | 5 | −5 | 550 | 590 | 454 | 5 | 3 |
| 60 | 60 | 40 | 0 | 5 | −5 | 560 | 586 | 454 | 4 | 3 |
| 60 | 60 | 40 | 0 | 5 | −5 | 570 | 585 | 454 | 2 | 2 |
| 60 | 60 | 40 | 0 | 5 | 0 | 520 | 599 | 452 | 3 | 2 |
| 60 | 60 | 40 | 0 | 5 | 0 | 530 | 597 | 451 | 4 | 3 |
| 60 | 60 | 40 | 0 | 5 | 0 | 540 | 594 | 451 | 5 | 3 |
| 60 | 60 | 40 | 0 | 5 | 0 | 550 | 589 | 451 | 5 | 4 |
| 60 | 60 | 40 | 0 | 5 | 0 | 560 | 586 | 451 | 4 | 3 |
| 60 | 60 | 40 | 0 | 5 | 0 | 570 | 586 | 451 | 2 | 2 |
| 60 | 60 | 40 | 0 | 5 | 5 | 520 | 600 | 449 | 3 | 2 |
| 60 | 60 | 40 | 0 | 5 | 5 | 530 | 598 | 448 | 4 | 3 |
| 60 | 60 | 40 | 0 | 5 | 5 | 540 | 594 | 448 | 5 | 4 |
| 60 | 60 | 40 | 0 | 5 | 5 | 550 | 589 | 448 | 5 | 4 |
| 60 | 60 | 40 | 0 | 5 | 5 | 560 | 587 | 448 | 4 | 3 |
| 60 | 60 | 40 | 0 | 5 | 5 | 570 | 586 | 448 | 3 | 2 |
| 60 | 60 | 40 | 5 | −5 | −5 | 530 | 595 | 455 | 4 | 3 |
| 60 | 60 | 40 | 5 | −5 | −5 | 540 | 592 | 455 | 5 | 3 |
| 60 | 60 | 40 | 5 | −5 | −5 | 550 | 587 | 454 | 5 | 3 |
| 60 | 60 | 40 | 5 | −5 | −5 | 560 | 584 | 454 | 5 | 3 |
| 60 | 60 | 40 | 5 | −5 | −5 | 570 | 584 | 454 | 3 | 3 |
| 60 | 60 | 40 | 5 | −5 | 0 | 530 | 595 | 452 | 4 | 3 |
| 60 | 60 | 40 | 5 | −5 | 0 | 540 | 592 | 451 | 5 | 3 |
| 60 | 60 | 40 | 5 | −5 | 0 | 550 | 587 | 451 | 5 | 3 |
| 60 | 60 | 40 | 5 | −5 | 0 | 560 | 584 | 451 | 5 | 3 |
| 60 | 60 | 40 | 5 | −5 | 0 | 570 | 584 | 451 | 3 | 3 |
| 60 | 60 | 40 | 5 | −5 | 5 | 530 | 595 | 448 | 4 | 3 |
| 60 | 60 | 40 | 5 | −5 | 5 | 540 | 592 | 448 | 5 | 3 |
| 60 | 60 | 40 | 5 | −5 | 5 | 550 | 586 | 448 | 5 | 3 |
| 60 | 60 | 40 | 5 | −5 | 5 | 560 | 584 | 447 | 5 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 60 | 40 | 5 | −5 | 5 | 570 | 584 | 447 | 4 | 3 |
| 60 | 60 | 40 | 5 | −5 | 5 | 580 | 584 | 448 | 1 | 1 |
| 60 | 60 | 40 | 5 | 0 | −5 | 530 | 595 | 455 | 4 | 3 |
| 60 | 60 | 40 | 5 | 0 | −5 | 540 | 592 | 455 | 5 | 3 |
| 60 | 60 | 40 | 5 | 0 | −5 | 550 | 586 | 454 | 5 | 3 |
| 60 | 60 | 40 | 5 | 0 | −5 | 560 | 583 | 454 | 5 | 3 |
| 60 | 60 | 40 | 5 | 0 | −5 | 570 | 582 | 454 | 3 | 3 |
| 60 | 60 | 40 | 5 | 0 | 0 | 530 | 595 | 451 | 4 | 3 |
| 60 | 60 | 40 | 5 | 0 | 0 | 540 | 592 | 451 | 5 | 3 |
| 60 | 60 | 40 | 5 | 0 | 0 | 550 | 586 | 451 | 5 | 3 |
| 60 | 60 | 40 | 5 | 0 | 0 | 560 | 583 | 451 | 5 | 3 |
| 60 | 60 | 40 | 5 | 0 | 0 | 570 | 582 | 451 | 3 | 3 |
| 60 | 60 | 40 | 5 | 0 | 5 | 520 | 596 | 449 | 2 | 1 |
| 60 | 60 | 40 | 5 | 0 | 5 | 530 | 595 | 448 | 4 | 3 |
| 60 | 60 | 40 | 5 | 0 | 5 | 540 | 592 | 448 | 5 | 3 |
| 60 | 60 | 40 | 5 | 0 | 5 | 550 | 586 | 448 | 5 | 3 |
| 60 | 60 | 40 | 5 | 0 | 5 | 560 | 583 | 447 | 5 | 3 |
| 60 | 60 | 40 | 5 | 0 | 5 | 570 | 582 | 448 | 3 | 3 |
| 60 | 60 | 40 | 5 | 5 | −5 | 520 | 597 | 455 | 2 | 2 |
| 60 | 60 | 40 | 5 | 5 | −5 | 530 | 595 | 455 | 4 | 3 |
| 60 | 60 | 40 | 5 | 5 | −5 | 540 | 591 | 454 | 5 | 3 |
| 60 | 60 | 40 | 5 | 5 | −5 | 550 | 585 | 454 | 5 | 3 |
| 60 | 60 | 40 | 5 | 5 | −5 | 560 | 581 | 454 | 4 | 3 |
| 60 | 60 | 40 | 5 | 5 | −5 | 570 | 579 | 454 | 3 | 3 |
| 60 | 60 | 40 | 5 | 5 | 0 | 520 | 597 | 452 | 3 | 2 |
| 60 | 60 | 40 | 5 | 5 | 0 | 530 | 595 | 451 | 4 | 3 |
| 60 | 60 | 40 | 5 | 5 | 0 | 540 | 591 | 451 | 5 | 3 |
| 60 | 60 | 40 | 5 | 5 | 0 | 550 | 586 | 451 | 5 | 3 |
| 60 | 60 | 40 | 5 | 5 | 0 | 560 | 581 | 451 | 4 | 3 |
| 60 | 60 | 40 | 5 | 5 | 0 | 570 | 580 | 451 | 3 | 3 |
| 60 | 60 | 40 | 5 | 5 | 5 | 520 | 596 | 449 | 3 | 2 |
| 60 | 60 | 40 | 5 | 5 | 5 | 530 | 595 | 448 | 4 | 3 |
| 60 | 60 | 40 | 5 | 5 | 5 | 540 | 591 | 448 | 5 | 3 |
| 60 | 60 | 40 | 5 | 5 | 5 | 550 | 585 | 447 | 5 | 3 |
| 60 | 60 | 40 | 5 | 5 | 5 | 560 | 582 | 448 | 4 | 3 |
| 60 | 60 | 40 | 5 | 5 | 5 | 570 | 580 | 448 | 3 | 3 |
| 60 | 60 | 50 | −5 | −5 | −5 | 530 | 601 | 456 | 3 | 3 |
| 60 | 60 | 50 | −5 | −5 | −5 | 540 | 598 | 455 | 4 | 4 |
| 60 | 60 | 50 | −5 | −5 | −5 | 550 | 593 | 454 | 5 | 4 |
| 60 | 60 | 50 | −5 | −5 | −5 | 560 | 586 | 454 | 5 | 3 |
| 60 | 60 | 50 | −5 | −5 | −5 | 570 | 583 | 454 | 3 | 3 |
| 60 | 60 | 50 | −5 | −5 | −5 | 580 | 583 | 453 | 1 | 3 |
| 60 | 60 | 50 | −5 | −5 | 0 | 530 | 601 | 454 | 3 | 3 |
| 60 | 60 | 50 | −5 | −5 | 0 | 540 | 598 | 452 | 4 | 4 |
| 60 | 60 | 50 | −5 | −5 | 0 | 550 | 593 | 451 | 5 | 4 |
| 60 | 60 | 50 | −5 | −5 | 0 | 560 | 586 | 452 | 5 | 4 |
| 60 | 60 | 50 | −5 | −5 | 0 | 570 | 583 | 451 | 3 | 3 |
| 60 | 60 | 50 | −5 | −5 | 0 | 580 | 583 | 451 | 1 | 2 |
| 60 | 60 | 50 | −5 | −5 | 5 | 530 | 600 | 451 | 4 | 3 |
| 60 | 60 | 50 | −5 | −5 | 5 | 540 | 598 | 450 | 4 | 4 |
| 60 | 60 | 50 | −5 | −5 | 5 | 550 | 593 | 449 | 5 | 4 |
| 60 | 60 | 50 | −5 | −5 | 5 | 560 | 585 | 448 | 5 | 3 |
| 60 | 60 | 50 | −5 | −5 | 5 | 570 | 583 | 449 | 3 | 3 |
| 60 | 60 | 50 | −5 | −5 | 5 | 580 | 583 | 449 | 1 | 2 |
| 60 | 60 | 50 | −5 | 0 | −5 | 530 | 600 | 456 | 4 | 3 |
| 60 | 60 | 50 | −5 | 0 | −5 | 540 | 598 | 455 | 4 | 4 |
| 60 | 60 | 50 | −5 | 0 | −5 | 550 | 593 | 454 | 4 | 4 |
| 60 | 60 | 50 | −5 | 0 | −5 | 560 | 588 | 454 | 4 | 3 |
| 60 | 60 | 50 | −5 | 0 | −5 | 570 | 586 | 454 | 3 | 3 |
| 60 | 60 | 50 | −5 | 0 | 0 | 530 | 601 | 453 | 4 | 3 |
| 60 | 60 | 50 | −5 | 0 | 0 | 540 | 597 | 452 | 4 | 4 |
| 60 | 60 | 50 | −5 | 0 | 0 | 550 | 592 | 451 | 4 | 4 |
| 60 | 60 | 50 | −5 | 0 | 0 | 560 | 588 | 451 | 4 | 3 |
| 60 | 60 | 50 | −5 | 0 | 0 | 570 | 586 | 451 | 3 | 3 |
| 60 | 60 | 50 | −5 | 0 | 5 | 530 | 600 | 450 | 4 | 3 |
| 60 | 60 | 50 | −5 | 0 | 5 | 540 | 597 | 449 | 4 | 4 |
| 60 | 60 | 50 | −5 | 0 | 5 | 550 | 593 | 449 | 5 | 4 |
| 60 | 60 | 50 | −5 | 0 | 5 | 560 | 589 | 449 | 4 | 3 |
| 60 | 60 | 50 | −5 | 0 | 5 | 570 | 586 | 449 | 3 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 60 | 50 | −5 | 5 | −5 | 530 | 600 | 455 | 4 | 3 |
| 60 | 60 | 50 | −5 | 5 | −5 | 540 | 598 | 454 | 4 | 4 |
| 60 | 60 | 50 | −5 | 5 | −5 | 550 | 593 | 454 | 4 | 4 |
| 60 | 60 | 50 | −5 | 5 | −5 | 560 | 590 | 453 | 3 | 3 |
| 60 | 60 | 50 | −5 | 5 | 0 | 520 | 602 | 454 | 2 | 2 |
| 60 | 60 | 50 | −5 | 5 | 0 | 530 | 600 | 453 | 4 | 3 |
| 60 | 60 | 50 | −5 | 5 | 0 | 540 | 597 | 451 | 4 | 4 |
| 60 | 60 | 50 | −5 | 5 | 0 | 550 | 594 | 451 | 4 | 4 |
| 60 | 60 | 50 | −5 | 5 | 0 | 560 | 590 | 451 | 3 | 3 |
| 60 | 60 | 50 | −5 | 5 | 5 | 520 | 602 | 452 | 2 | 2 |
| 60 | 60 | 50 | −5 | 5 | 5 | 530 | 600 | 450 | 4 | 3 |
| 60 | 60 | 50 | −5 | 5 | 5 | 540 | 597 | 449 | 4 | 4 |
| 60 | 60 | 50 | −5 | 5 | 5 | 550 | 593 | 448 | 4 | 4 |
| 60 | 60 | 50 | −5 | 5 | 5 | 560 | 590 | 449 | 4 | 3 |
| 60 | 60 | 50 | 0 | −5 | −5 | 530 | 598 | 456 | 3 | 3 |
| 60 | 60 | 50 | 0 | −5 | −5 | 540 | 595 | 455 | 4 | 4 |
| 60 | 60 | 50 | 0 | −5 | −5 | 550 | 590 | 455 | 5 | 4 |
| 60 | 60 | 50 | 0 | −5 | −5 | 560 | 583 | 454 | 5 | 4 |
| 60 | 60 | 50 | 0 | −5 | −5 | 570 | 582 | 454 | 3 | 3 |
| 60 | 60 | 50 | 0 | −5 | 0 | 530 | 598 | 454 | 3 | 3 |
| 60 | 60 | 50 | 0 | −5 | 0 | 540 | 595 | 452 | 4 | 4 |
| 60 | 60 | 50 | 0 | −5 | 0 | 550 | 590 | 451 | 5 | 4 |
| 60 | 60 | 50 | 0 | −5 | 0 | 560 | 583 | 452 | 5 | 4 |
| 60 | 60 | 50 | 0 | −5 | 0 | 570 | 582 | 451 | 3 | 3 |
| 60 | 60 | 50 | 0 | −5 | 5 | 530 | 598 | 451 | 4 | 3 |
| 60 | 60 | 50 | 0 | −5 | 5 | 540 | 595 | 450 | 4 | 4 |
| 60 | 60 | 50 | 0 | −5 | 5 | 550 | 589 | 449 | 5 | 4 |
| 60 | 60 | 50 | 0 | −5 | 5 | 560 | 584 | 448 | 5 | 4 |
| 60 | 60 | 50 | 0 | −5 | 5 | 570 | 582 | 449 | 3 | 3 |
| 60 | 60 | 50 | 0 | 0 | −5 | 530 | 598 | 455 | 4 | 3 |
| 60 | 60 | 50 | 0 | 0 | −5 | 540 | 594 | 454 | 4 | 4 |
| 60 | 60 | 50 | 0 | 0 | −5 | 550 | 589 | 454 | 5 | 4 |
| 60 | 60 | 50 | 0 | 0 | −5 | 560 | 582 | 454 | 4 | 4 |
| 60 | 60 | 50 | 0 | 0 | −5 | 570 | 581 | 454 | 3 | 3 |
| 60 | 60 | 50 | 0 | 0 | 0 | 530 | 597 | 453 | 4 | 3 |
| 60 | 60 | 50 | 0 | 0 | 0 | 540 | 595 | 452 | 4 | 4 |
| 60 | 60 | 50 | 0 | 0 | 0 | 550 | 589 | 451 | 5 | 4 |
| 60 | 60 | 50 | 0 | 0 | 0 | 560 | 582 | 451 | 4 | 4 |
| 60 | 60 | 50 | 0 | 0 | 0 | 570 | 581 | 451 | 3 | 3 |
| 60 | 60 | 50 | 0 | 0 | 5 | 530 | 598 | 450 | 4 | 3 |
| 60 | 60 | 50 | 0 | 0 | 5 | 540 | 594 | 449 | 4 | 4 |
| 60 | 60 | 50 | 0 | 0 | 5 | 550 | 589 | 449 | 5 | 4 |
| 60 | 60 | 50 | 0 | 0 | 5 | 560 | 582 | 448 | 4 | 4 |
| 60 | 60 | 50 | 0 | 0 | 5 | 570 | 581 | 449 | 3 | 3 |
| 60 | 60 | 50 | 0 | 5 | −5 | 530 | 598 | 455 | 4 | 3 |
| 60 | 60 | 50 | 0 | 5 | −5 | 540 | 594 | 454 | 4 | 4 |
| 60 | 60 | 50 | 0 | 5 | −5 | 550 | 589 | 454 | 4 | 4 |
| 60 | 60 | 50 | 0 | 5 | −5 | 560 | 585 | 454 | 4 | 3 |
| 60 | 60 | 50 | 0 | 5 | −5 | 570 | 584 | 454 | 0 | 1 |
| 60 | 60 | 50 | 0 | 5 | 0 | 520 | 600 | 455 | 1 | 1 |
| 60 | 60 | 50 | 0 | 5 | 0 | 530 | 598 | 453 | 4 | 3 |
| 60 | 60 | 50 | 0 | 5 | 0 | 540 | 594 | 452 | 4 | 4 |
| 60 | 60 | 50 | 0 | 5 | 0 | 550 | 589 | 451 | 4 | 4 |
| 60 | 60 | 50 | 0 | 5 | 0 | 560 | 585 | 451 | 4 | 3 |
| 60 | 60 | 50 | 0 | 5 | 0 | 570 | 583 | 451 | 1 | 1 |
| 60 | 60 | 50 | 0 | 5 | 5 | 520 | 599 | 452 | 2 | 2 |
| 60 | 60 | 50 | 0 | 5 | 5 | 530 | 597 | 450 | 4 | 3 |
| 60 | 60 | 50 | 0 | 5 | 5 | 540 | 594 | 449 | 4 | 4 |
| 60 | 60 | 50 | 0 | 5 | 5 | 550 | 589 | 448 | 4 | 4 |
| 60 | 60 | 50 | 0 | 5 | 5 | 560 | 585 | 448 | 4 | 3 |
| 60 | 60 | 50 | 0 | 5 | 5 | 570 | 584 | 448 | 1 | 2 |
| 60 | 60 | 50 | 5 | −5 | −5 | 530 | 596 | 456 | 3 | 3 |
| 60 | 60 | 50 | 5 | −5 | −5 | 540 | 592 | 455 | 4 | 3 |
| 60 | 60 | 50 | 5 | −5 | −5 | 550 | 587 | 454 | 5 | 4 |
| 60 | 60 | 50 | 5 | −5 | −5 | 560 | 582 | 454 | 4 | 4 |
| 60 | 60 | 50 | 5 | −5 | −5 | 570 | 582 | 454 | 3 | 3 |
| 60 | 60 | 50 | 5 | −5 | 0 | 530 | 595 | 454 | 3 | 3 |
| 60 | 60 | 50 | 5 | −5 | 0 | 540 | 592 | 452 | 4 | 3 |
| 60 | 60 | 50 | 5 | −5 | 0 | 550 | 586 | 451 | 5 | 4 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 60 | 50 | 5 | −5 | 0 | 560 | 582 | 452 | 4 | 4 |
| 60 | 60 | 50 | 5 | −5 | 0 | 570 | 582 | 451 | 3 | 3 |
| 60 | 60 | 50 | 5 | −5 | 5 | 530 | 595 | 451 | 3 | 3 |
| 60 | 60 | 50 | 5 | −5 | 5 | 540 | 592 | 450 | 4 | 3 |
| 60 | 60 | 50 | 5 | −5 | 5 | 550 | 586 | 449 | 5 | 4 |
| 60 | 60 | 50 | 5 | −5 | 5 | 560 | 582 | 448 | 4 | 4 |
| 60 | 60 | 50 | 5 | −5 | 5 | 570 | 582 | 449 | 3 | 3 |
| 60 | 60 | 50 | 5 | 0 | −5 | 530 | 595 | 455 | 3 | 3 |
| 60 | 60 | 50 | 5 | 0 | −5 | 540 | 592 | 454 | 4 | 3 |
| 60 | 60 | 50 | 5 | 0 | −5 | 550 | 586 | 454 | 5 | 4 |
| 60 | 60 | 50 | 5 | 0 | −5 | 560 | 581 | 454 | 4 | 3 |
| 60 | 60 | 50 | 5 | 0 | −5 | 570 | 580 | 454 | 3 | 3 |
| 60 | 60 | 50 | 5 | 0 | 0 | 530 | 595 | 453 | 4 | 3 |
| 60 | 60 | 50 | 5 | 0 | 0 | 540 | 592 | 452 | 4 | 4 |
| 60 | 60 | 50 | 5 | 0 | 0 | 550 | 586 | 452 | 5 | 4 |
| 60 | 60 | 50 | 5 | 0 | 0 | 560 | 581 | 451 | 4 | 3 |
| 60 | 60 | 50 | 5 | 0 | 0 | 570 | 580 | 451 | 3 | 3 |
| 60 | 60 | 50 | 5 | 0 | 5 | 530 | 595 | 450 | 4 | 3 |
| 60 | 60 | 50 | 5 | 0 | 5 | 540 | 591 | 449 | 4 | 4 |
| 60 | 60 | 50 | 5 | 0 | 5 | 550 | 586 | 449 | 5 | 4 |
| 60 | 60 | 50 | 5 | 0 | 5 | 560 | 581 | 449 | 4 | 3 |
| 60 | 60 | 50 | 5 | 0 | 5 | 570 | 580 | 449 | 3 | 3 |
| 60 | 60 | 50 | 5 | 5 | −5 | 530 | 595 | 455 | 4 | 3 |
| 60 | 60 | 50 | 5 | 5 | −5 | 540 | 592 | 454 | 4 | 4 |
| 60 | 60 | 50 | 5 | 5 | −5 | 550 | 586 | 454 | 4 | 3 |
| 60 | 60 | 50 | 5 | 5 | −5 | 560 | 579 | 454 | 4 | 3 |
| 60 | 60 | 50 | 5 | 5 | −5 | 570 | 577 | 454 | 2 | 3 |
| 60 | 60 | 50 | 5 | 5 | 0 | 530 | 594 | 452 | 4 | 3 |
| 60 | 60 | 50 | 5 | 5 | 0 | 540 | 591 | 452 | 4 | 4 |
| 60 | 60 | 50 | 5 | 5 | 0 | 550 | 586 | 451 | 5 | 4 |
| 60 | 60 | 50 | 5 | 5 | 0 | 560 | 579 | 451 | 4 | 3 |
| 60 | 60 | 50 | 5 | 5 | 0 | 570 | 578 | 451 | 2 | 3 |
| 60 | 60 | 50 | 5 | 5 | 5 | 520 | 596 | 452 | 2 | 2 |
| 60 | 60 | 50 | 5 | 5 | 5 | 530 | 595 | 450 | 4 | 3 |
| 60 | 60 | 50 | 5 | 5 | 5 | 540 | 591 | 449 | 4 | 4 |
| 60 | 60 | 50 | 5 | 5 | 5 | 550 | 585 | 448 | 5 | 3 |
| 60 | 60 | 50 | 5 | 5 | 5 | 560 | 579 | 449 | 4 | 3 |
| 60 | 60 | 50 | 5 | 5 | 5 | 570 | 578 | 449 | 2 | 3 |
| 60 | 70 | 30 | −5 | −5 | −5 | 530 | 602 | 455 | 3 | 2 |
| 60 | 70 | 30 | −5 | −5 | −5 | 540 | 600 | 454 | 4 | 3 |
| 60 | 70 | 30 | −5 | −5 | −5 | 550 | 598 | 454 | 4 | 3 |
| 60 | 70 | 30 | −5 | −5 | −5 | 560 | 596 | 454 | 4 | 3 |
| 60 | 70 | 30 | −5 | −5 | −5 | 570 | 596 | 454 | 3 | 3 |
| 60 | 70 | 30 | −5 | −5 | −5 | 580 | 597 | 454 | 3 | 3 |
| 60 | 70 | 30 | −5 | −5 | −5 | 590 | 600 | 454 | 2 | 3 |
| 60 | 70 | 30 | −5 | −5 | −5 | 600 | 606 | 454 | 1 | 1 |
| 60 | 70 | 30 | −5 | −5 | 0 | 530 | 602 | 450 | 3 | 2 |
| 60 | 70 | 30 | −5 | −5 | 0 | 540 | 600 | 450 | 4 | 3 |
| 60 | 70 | 30 | −5 | −5 | 0 | 550 | 598 | 450 | 4 | 3 |
| 60 | 70 | 30 | −5 | −5 | 0 | 560 | 596 | 450 | 4 | 3 |
| 60 | 70 | 30 | −5 | −5 | 0 | 570 | 596 | 450 | 3 | 3 |
| 60 | 70 | 30 | −5 | −5 | 0 | 580 | 597 | 450 | 3 | 3 |
| 60 | 70 | 30 | −5 | −5 | 0 | 590 | 601 | 450 | 2 | 3 |
| 60 | 70 | 30 | −5 | −5 | 0 | 600 | 607 | 450 | 1 | 2 |
| 60 | 70 | 30 | −5 | −5 | 5 | 530 | 601 | 447 | 3 | 2 |
| 60 | 70 | 30 | −5 | −5 | 5 | 540 | 601 | 446 | 4 | 3 |
| 60 | 70 | 30 | −5 | −5 | 5 | 550 | 598 | 446 | 4 | 3 |
| 60 | 70 | 30 | −5 | −5 | 5 | 560 | 596 | 446 | 4 | 3 |
| 60 | 70 | 30 | −5 | −5 | 5 | 570 | 596 | 446 | 3 | 3 |
| 60 | 70 | 30 | −5 | −5 | 5 | 580 | 597 | 446 | 3 | 3 |
| 60 | 70 | 30 | −5 | −5 | 5 | 590 | 601 | 446 | 2 | 3 |
| 60 | 70 | 30 | −5 | −5 | 5 | 600 | 607 | 446 | 1 | 2 |
| 60 | 70 | 30 | −5 | 0 | −5 | 530 | 602 | 454 | 3 | 2 |
| 60 | 70 | 30 | −5 | 0 | −5 | 540 | 600 | 454 | 4 | 3 |
| 60 | 70 | 30 | −5 | 0 | −5 | 550 | 598 | 454 | 4 | 3 |
| 60 | 70 | 30 | −5 | 0 | −5 | 560 | 596 | 454 | 4 | 3 |
| 60 | 70 | 30 | −5 | 0 | −5 | 570 | 596 | 454 | 3 | 3 |
| 60 | 70 | 30 | −5 | 0 | −5 | 580 | 598 | 454 | 3 | 3 |
| 60 | 70 | 30 | −5 | 0 | −5 | 590 | 603 | 454 | 1 | 1 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 70 | 30 | −5 | 0 | 0 | 530 | 602 | 451 | 3 | 2 |
| 60 | 70 | 30 | −5 | 0 | 0 | 540 | 601 | 450 | 4 | 3 |
| 60 | 70 | 30 | −5 | 0 | 0 | 550 | 598 | 450 | 4 | 3 |
| 60 | 70 | 30 | −5 | 0 | 0 | 560 | 596 | 450 | 4 | 3 |
| 60 | 70 | 30 | −5 | 0 | 0 | 570 | 596 | 450 | 3 | 3 |
| 60 | 70 | 30 | −5 | 0 | 0 | 580 | 598 | 450 | 3 | 3 |
| 60 | 70 | 30 | −5 | 0 | 0 | 590 | 603 | 450 | 1 | 2 |
| 60 | 70 | 30 | −5 | 0 | 5 | 530 | 602 | 447 | 3 | 2 |
| 60 | 70 | 30 | −5 | 0 | 5 | 540 | 600 | 446 | 4 | 3 |
| 60 | 70 | 30 | −5 | 0 | 5 | 550 | 598 | 446 | 4 | 3 |
| 60 | 70 | 30 | −5 | 0 | 5 | 560 | 597 | 446 | 4 | 3 |
| 60 | 70 | 30 | −5 | 0 | 5 | 570 | 596 | 446 | 3 | 3 |
| 60 | 70 | 30 | −5 | 0 | 5 | 580 | 598 | 446 | 3 | 3 |
| 60 | 70 | 30 | −5 | 0 | 5 | 590 | 603 | 446 | 1 | 2 |
| 60 | 70 | 30 | −5 | 5 | −5 | 530 | 602 | 454 | 3 | 2 |
| 60 | 70 | 30 | −5 | 5 | −5 | 540 | 600 | 454 | 4 | 3 |
| 60 | 70 | 30 | −5 | 5 | −5 | 540 | 542 | 455 | 1 | 1 |
| 60 | 70 | 30 | −5 | 5 | −5 | 550 | 598 | 454 | 4 | 3 |
| 60 | 70 | 30 | −5 | 5 | −5 | 560 | 597 | 454 | 4 | 3 |
| 60 | 70 | 30 | −5 | 5 | −5 | 570 | 597 | 454 | 3 | 3 |
| 60 | 70 | 30 | −5 | 5 | −5 | 580 | 600 | 454 | 2 | 2 |
| 60 | 70 | 30 | −5 | 5 | 0 | 530 | 601 | 450 | 3 | 3 |
| 60 | 70 | 30 | −5 | 5 | 0 | 540 | 600 | 450 | 4 | 3 |
| 60 | 70 | 30 | −5 | 5 | 0 | 540 | 542 | 450 | 1 | 1 |
| 60 | 70 | 30 | −5 | 5 | 0 | 550 | 598 | 450 | 4 | 3 |
| 60 | 70 | 30 | −5 | 5 | 0 | 560 | 597 | 450 | 4 | 3 |
| 60 | 70 | 30 | −5 | 5 | 0 | 570 | 597 | 450 | 3 | 3 |
| 60 | 70 | 30 | −5 | 5 | 0 | 580 | 600 | 450 | 2 | 2 |
| 60 | 70 | 30 | −5 | 5 | 5 | 530 | 602 | 446 | 3 | 3 |
| 60 | 70 | 30 | −5 | 5 | 5 | 540 | 600 | 446 | 4 | 3 |
| 60 | 70 | 30 | −5 | 5 | 5 | 540 | 542 | 446 | 1 | 1 |
| 60 | 70 | 30 | −5 | 5 | 5 | 550 | 598 | 446 | 4 | 3 |
| 60 | 70 | 30 | −5 | 5 | 5 | 560 | 597 | 446 | 4 | 3 |
| 60 | 70 | 30 | −5 | 5 | 5 | 570 | 597 | 446 | 3 | 3 |
| 60 | 70 | 30 | −5 | 5 | 5 | 580 | 600 | 446 | 2 | 2 |
| 60 | 70 | 30 | 0 | −5 | −5 | 530 | 599 | 455 | 3 | 2 |
| 60 | 70 | 30 | 0 | −5 | −5 | 540 | 597 | 454 | 4 | 3 |
| 60 | 70 | 30 | 0 | −5 | −5 | 550 | 596 | 454 | 4 | 3 |
| 60 | 70 | 30 | 0 | −5 | −5 | 560 | 593 | 454 | 4 | 3 |
| 60 | 70 | 30 | 0 | −5 | −5 | 570 | 593 | 454 | 3 | 3 |
| 60 | 70 | 30 | 0 | −5 | −5 | 580 | 594 | 454 | 3 | 3 |
| 60 | 70 | 30 | 0 | −5 | −5 | 590 | 598 | 454 | 2 | 3 |
| 60 | 70 | 30 | 0 | −5 | −5 | 600 | 604 | 454 | 1 | 2 |
| 60 | 70 | 30 | 0 | −5 | 0 | 530 | 599 | 450 | 3 | 2 |
| 60 | 70 | 30 | 0 | −5 | 0 | 540 | 597 | 450 | 4 | 3 |
| 60 | 70 | 30 | 0 | −5 | 0 | 550 | 595 | 450 | 4 | 3 |
| 60 | 70 | 30 | 0 | −5 | 0 | 560 | 594 | 450 | 4 | 3 |
| 60 | 70 | 30 | 0 | −5 | 0 | 570 | 593 | 450 | 4 | 3 |
| 60 | 70 | 30 | 0 | −5 | 0 | 580 | 594 | 450 | 3 | 3 |
| 60 | 70 | 30 | 0 | −5 | 0 | 590 | 598 | 450 | 2 | 3 |
| 60 | 70 | 30 | 0 | −5 | 0 | 600 | 604 | 450 | 1 | 3 |
| 60 | 70 | 30 | 0 | −5 | 5 | 530 | 599 | 446 | 3 | 2 |
| 60 | 70 | 30 | 0 | −5 | 5 | 540 | 597 | 446 | 4 | 3 |
| 60 | 70 | 30 | 0 | −5 | 5 | 550 | 595 | 446 | 4 | 3 |
| 60 | 70 | 30 | 0 | −5 | 5 | 560 | 594 | 446 | 4 | 3 |
| 60 | 70 | 30 | 0 | −5 | 5 | 570 | 593 | 446 | 4 | 3 |
| 60 | 70 | 30 | 0 | −5 | 5 | 580 | 594 | 446 | 3 | 3 |
| 60 | 70 | 30 | 0 | −5 | 5 | 590 | 598 | 446 | 2 | 3 |
| 60 | 70 | 30 | 0 | −5 | 5 | 600 | 604 | 446 | 1 | 3 |
| 60 | 70 | 30 | 0 | 0 | −5 | 530 | 599 | 454 | 3 | 2 |
| 60 | 70 | 30 | 0 | 0 | −5 | 540 | 598 | 454 | 4 | 3 |
| 60 | 70 | 30 | 0 | 0 | −5 | 550 | 596 | 454 | 4 | 3 |
| 60 | 70 | 30 | 0 | 0 | −5 | 560 | 594 | 454 | 4 | 3 |
| 60 | 70 | 30 | 0 | 0 | −5 | 570 | 593 | 454 | 3 | 3 |
| 60 | 70 | 30 | 0 | 0 | −5 | 580 | 595 | 454 | 3 | 3 |
| 60 | 70 | 30 | 0 | 0 | −5 | 590 | 599 | 454 | 2 | 3 |
| 60 | 70 | 30 | 0 | 0 | 0 | 530 | 599 | 451 | 3 | 2 |
| 60 | 70 | 30 | 0 | 0 | 0 | 540 | 597 | 450 | 4 | 3 |
| 60 | 70 | 30 | 0 | 0 | 0 | 550 | 596 | 450 | 4 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 70 | 30 | 0 | 0 | 0 | 560 | 594 | 450 | 4 | 3 |
| 60 | 70 | 30 | 0 | 0 | 0 | 570 | 594 | 450 | 3 | 3 |
| 60 | 70 | 30 | 0 | 0 | 0 | 580 | 595 | 450 | 3 | 3 |
| 60 | 70 | 30 | 0 | 0 | 0 | 590 | 599 | 450 | 2 | 3 |
| 60 | 70 | 30 | 0 | 0 | 5 | 530 | 599 | 447 | 3 | 2 |
| 60 | 70 | 30 | 0 | 0 | 5 | 540 | 597 | 446 | 4 | 3 |
| 60 | 70 | 30 | 0 | 0 | 5 | 550 | 595 | 446 | 4 | 3 |
| 60 | 70 | 30 | 0 | 0 | 5 | 560 | 594 | 446 | 4 | 3 |
| 60 | 70 | 30 | 0 | 0 | 5 | 570 | 594 | 446 | 3 | 3 |
| 60 | 70 | 30 | 0 | 0 | 5 | 580 | 595 | 446 | 3 | 3 |
| 60 | 70 | 30 | 0 | 0 | 5 | 590 | 600 | 446 | 2 | 3 |
| 60 | 70 | 30 | 0 | 5 | −5 | 530 | 599 | 454 | 3 | 2 |
| 60 | 70 | 30 | 0 | 5 | −5 | 540 | 597 | 454 | 4 | 3 |
| 60 | 70 | 30 | 0 | 5 | −5 | 550 | 595 | 454 | 4 | 3 |
| 60 | 70 | 30 | 0 | 5 | −5 | 560 | 594 | 454 | 4 | 3 |
| 60 | 70 | 30 | 0 | 5 | −5 | 570 | 594 | 454 | 3 | 3 |
| 60 | 70 | 30 | 0 | 5 | −5 | 580 | 597 | 454 | 2 | 3 |
| 60 | 70 | 30 | 0 | 5 | 0 | 530 | 599 | 450 | 3 | 2 |
| 60 | 70 | 30 | 0 | 5 | 0 | 540 | 597 | 450 | 4 | 3 |
| 60 | 70 | 30 | 0 | 5 | 0 | 550 | 596 | 450 | 4 | 3 |
| 60 | 70 | 30 | 0 | 5 | 0 | 560 | 594 | 450 | 4 | 3 |
| 60 | 70 | 30 | 0 | 5 | 0 | 570 | 594 | 450 | 3 | 3 |
| 60 | 70 | 30 | 0 | 5 | 0 | 580 | 597 | 450 | 2 | 3 |
| 60 | 70 | 30 | 0 | 5 | 5 | 530 | 599 | 446 | 3 | 3 |
| 60 | 70 | 30 | 0 | 5 | 5 | 540 | 597 | 446 | 4 | 3 |
| 60 | 70 | 30 | 0 | 5 | 5 | 550 | 596 | 446 | 4 | 3 |
| 60 | 70 | 30 | 0 | 5 | 5 | 560 | 594 | 446 | 4 | 3 |
| 60 | 70 | 30 | 0 | 5 | 5 | 570 | 594 | 446 | 3 | 3 |
| 60 | 70 | 30 | 0 | 5 | 5 | 580 | 597 | 446 | 2 | 3 |
| 60 | 70 | 30 | 5 | −5 | −5 | 530 | 596 | 455 | 3 | 2 |
| 60 | 70 | 30 | 5 | −5 | −5 | 540 | 595 | 454 | 4 | 3 |
| 60 | 70 | 30 | 5 | −5 | −5 | 550 | 593 | 454 | 4 | 3 |
| 60 | 70 | 30 | 5 | −5 | −5 | 560 | 591 | 454 | 4 | 3 |
| 60 | 70 | 30 | 5 | −5 | −5 | 570 | 591 | 454 | 3 | 3 |
| 60 | 70 | 30 | 5 | −5 | −5 | 580 | 592 | 454 | 3 | 3 |
| 60 | 70 | 30 | 5 | −5 | −5 | 590 | 596 | 454 | 2 | 3 |
| 60 | 70 | 30 | 5 | −5 | −5 | 600 | 603 | 454 | 1 | 2 |
| 60 | 70 | 30 | 5 | −5 | 0 | 530 | 596 | 450 | 3 | 2 |
| 60 | 70 | 30 | 5 | −5 | 0 | 540 | 594 | 450 | 4 | 3 |
| 60 | 70 | 30 | 5 | −5 | 0 | 550 | 593 | 450 | 4 | 3 |
| 60 | 70 | 30 | 5 | −5 | 0 | 560 | 591 | 450 | 4 | 3 |
| 60 | 70 | 30 | 5 | −5 | 0 | 570 | 590 | 450 | 4 | 3 |
| 60 | 70 | 30 | 5 | −5 | 0 | 580 | 592 | 450 | 3 | 3 |
| 60 | 70 | 30 | 5 | −5 | 0 | 590 | 596 | 450 | 2 | 3 |
| 60 | 70 | 30 | 5 | −5 | 0 | 600 | 603 | 450 | 1 | 2 |
| 60 | 70 | 30 | 5 | −5 | 5 | 530 | 596 | 446 | 3 | 2 |
| 60 | 70 | 30 | 5 | −5 | 5 | 540 | 595 | 446 | 4 | 3 |
| 60 | 70 | 30 | 5 | −5 | 5 | 550 | 593 | 446 | 4 | 3 |
| 60 | 70 | 30 | 5 | −5 | 5 | 560 | 591 | 446 | 4 | 3 |
| 60 | 70 | 30 | 5 | −5 | 5 | 570 | 591 | 446 | 4 | 3 |
| 60 | 70 | 30 | 5 | −5 | 5 | 580 | 592 | 446 | 3 | 3 |
| 60 | 70 | 30 | 5 | −5 | 5 | 590 | 596 | 446 | 2 | 3 |
| 60 | 70 | 30 | 5 | −5 | 5 | 600 | 603 | 446 | 1 | 3 |
| 60 | 70 | 30 | 5 | 0 | −5 | 530 | 596 | 454 | 3 | 2 |
| 60 | 70 | 30 | 5 | 0 | −5 | 540 | 595 | 454 | 4 | 3 |
| 60 | 70 | 30 | 5 | 0 | −5 | 550 | 593 | 454 | 4 | 3 |
| 60 | 70 | 30 | 5 | 0 | −5 | 560 | 592 | 454 | 4 | 3 |
| 60 | 70 | 30 | 5 | 0 | −5 | 570 | 591 | 454 | 3 | 3 |
| 60 | 70 | 30 | 5 | 0 | −5 | 580 | 592 | 454 | 3 | 3 |
| 60 | 70 | 30 | 5 | 0 | −5 | 590 | 596 | 454 | 2 | 3 |
| 60 | 70 | 30 | 5 | 0 | −5 | 600 | 602 | 454 | 1 | 1 |
| 60 | 70 | 30 | 5 | 0 | 0 | 530 | 597 | 451 | 3 | 2 |
| 60 | 70 | 30 | 5 | 0 | 0 | 540 | 595 | 450 | 4 | 3 |
| 60 | 70 | 30 | 5 | 0 | 0 | 550 | 592 | 450 | 4 | 3 |
| 60 | 70 | 30 | 5 | 0 | 0 | 560 | 591 | 450 | 4 | 3 |
| 60 | 70 | 30 | 5 | 0 | 0 | 570 | 591 | 450 | 3 | 3 |
| 60 | 70 | 30 | 5 | 0 | 0 | 580 | 592 | 450 | 3 | 3 |
| 60 | 70 | 30 | 5 | 0 | 0 | 590 | 596 | 450 | 2 | 3 |
| 60 | 70 | 30 | 5 | 0 | 0 | 600 | 602 | 450 | 1 | 1 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 70 | 30 | 5 | 0 | 5 | 530 | 596 | 447 | 3 | 2 |
| 60 | 70 | 30 | 5 | 0 | 5 | 540 | 595 | 446 | 4 | 3 |
| 60 | 70 | 30 | 5 | 0 | 5 | 550 | 593 | 446 | 4 | 3 |
| 60 | 70 | 30 | 5 | 0 | 5 | 560 | 591 | 446 | 4 | 3 |
| 60 | 70 | 30 | 5 | 0 | 5 | 570 | 591 | 446 | 3 | 3 |
| 60 | 70 | 30 | 5 | 0 | 5 | 580 | 593 | 446 | 3 | 3 |
| 60 | 70 | 30 | 5 | 0 | 5 | 590 | 596 | 446 | 2 | 3 |
| 60 | 70 | 30 | 5 | 0 | 5 | 600 | 603 | 446 | 1 | 2 |
| 60 | 70 | 30 | 5 | 5 | −5 | 530 | 597 | 454 | 3 | 2 |
| 60 | 70 | 30 | 5 | 5 | −5 | 540 | 594 | 454 | 4 | 3 |
| 60 | 70 | 30 | 5 | 5 | −5 | 550 | 593 | 454 | 4 | 3 |
| 60 | 70 | 30 | 5 | 5 | −5 | 560 | 591 | 454 | 4 | 3 |
| 60 | 70 | 30 | 5 | 5 | −5 | 570 | 591 | 454 | 3 | 3 |
| 60 | 70 | 30 | 5 | 5 | −5 | 580 | 593 | 454 | 2 | 3 |
| 60 | 70 | 30 | 5 | 5 | −5 | 590 | 598 | 454 | 1 | 2 |
| 60 | 70 | 30 | 5 | 5 | 0 | 530 | 596 | 450 | 3 | 2 |
| 60 | 70 | 30 | 5 | 5 | 0 | 540 | 595 | 450 | 4 | 3 |
| 60 | 70 | 30 | 5 | 5 | 0 | 550 | 593 | 450 | 4 | 3 |
| 60 | 70 | 30 | 5 | 5 | 0 | 560 | 592 | 450 | 4 | 3 |
| 60 | 70 | 30 | 5 | 5 | 0 | 570 | 591 | 450 | 3 | 3 |
| 60 | 70 | 30 | 5 | 5 | 0 | 580 | 593 | 450 | 2 | 3 |
| 60 | 70 | 30 | 5 | 5 | 0 | 590 | 598 | 450 | 2 | 2 |
| 60 | 70 | 30 | 5 | 5 | 5 | 530 | 597 | 446 | 3 | 2 |
| 60 | 70 | 30 | 5 | 5 | 5 | 540 | 595 | 446 | 4 | 3 |
| 60 | 70 | 30 | 5 | 5 | 5 | 550 | 593 | 446 | 4 | 3 |
| 60 | 70 | 30 | 5 | 5 | 5 | 560 | 592 | 446 | 4 | 3 |
| 60 | 70 | 30 | 5 | 5 | 5 | 570 | 592 | 446 | 3 | 3 |
| 60 | 70 | 30 | 5 | 5 | 5 | 580 | 593 | 446 | 3 | 3 |
| 60 | 70 | 30 | 5 | 5 | 5 | 590 | 598 | 446 | 2 | 2 |
| 60 | 70 | 40 | −5 | −5 | −5 | 530 | 601 | 456 | 4 | 3 |
| 60 | 70 | 40 | −5 | −5 | −5 | 540 | 599 | 455 | 4 | 3 |
| 60 | 70 | 40 | −5 | −5 | −5 | 550 | 598 | 455 | 4 | 3 |
| 60 | 70 | 40 | −5 | −5 | −5 | 560 | 596 | 454 | 4 | 3 |
| 60 | 70 | 40 | −5 | −5 | −5 | 570 | 596 | 454 | 4 | 3 |
| 60 | 70 | 40 | −5 | −5 | −5 | 580 | 597 | 454 | 3 | 3 |
| 60 | 70 | 40 | −5 | −5 | −5 | 590 | 601 | 454 | 2 | 3 |
| 60 | 70 | 40 | −5 | −5 | −5 | 600 | 607 | 454 | 1 | 2 |
| 60 | 70 | 40 | −5 | −5 | 0 | 520 | 602 | 453 | 2 | 1 |
| 60 | 70 | 40 | −5 | −5 | 0 | 530 | 601 | 452 | 4 | 3 |
| 60 | 70 | 40 | −5 | −5 | 0 | 540 | 600 | 452 | 4 | 3 |
| 60 | 70 | 40 | −5 | −5 | 0 | 550 | 598 | 452 | 4 | 3 |
| 60 | 70 | 40 | −5 | −5 | 0 | 560 | 596 | 451 | 4 | 3 |
| 60 | 70 | 40 | −5 | −5 | 0 | 570 | 596 | 451 | 4 | 3 |
| 60 | 70 | 40 | −5 | −5 | 0 | 580 | 597 | 451 | 3 | 3 |
| 60 | 70 | 40 | −5 | −5 | 0 | 590 | 601 | 451 | 2 | 3 |
| 60 | 70 | 40 | −5 | −5 | 0 | 600 | 607 | 451 | 1 | 2 |
| 60 | 70 | 40 | −5 | −5 | 5 | 520 | 603 | 450 | 2 | 2 |
| 60 | 70 | 40 | −5 | −5 | 5 | 530 | 601 | 449 | 4 | 3 |
| 60 | 70 | 40 | −5 | −5 | 5 | 540 | 600 | 449 | 4 | 3 |
| 60 | 70 | 40 | −5 | −5 | 5 | 550 | 598 | 448 | 4 | 3 |
| 60 | 70 | 40 | −5 | −5 | 5 | 560 | 596 | 448 | 4 | 3 |
| 60 | 70 | 40 | −5 | −5 | 5 | 570 | 596 | 448 | 4 | 3 |
| 60 | 70 | 40 | −5 | −5 | 5 | 580 | 597 | 448 | 3 | 3 |
| 60 | 70 | 40 | −5 | −5 | 5 | 590 | 601 | 447 | 2 | 3 |
| 60 | 70 | 40 | −5 | −5 | 5 | 600 | 607 | 447 | 1 | 2 |
| 60 | 70 | 40 | −5 | 0 | −5 | 520 | 603 | 457 | 2 | 1 |
| 60 | 70 | 40 | −5 | 0 | −5 | 530 | 601 | 456 | 4 | 3 |
| 60 | 70 | 40 | −5 | 0 | −5 | 540 | 600 | 455 | 4 | 3 |
| 60 | 70 | 40 | −5 | 0 | −5 | 550 | 598 | 455 | 4 | 3 |
| 60 | 70 | 40 | −5 | 0 | −5 | 560 | 597 | 454 | 4 | 3 |
| 60 | 70 | 40 | −5 | 0 | −5 | 570 | 596 | 454 | 3 | 3 |
| 60 | 70 | 40 | −5 | 0 | −5 | 580 | 599 | 454 | 3 | 3 |
| 60 | 70 | 40 | −5 | 0 | −5 | 590 | 602 | 454 | 2 | 2 |
| 60 | 70 | 40 | −5 | 0 | 0 | 520 | 602 | 453 | 3 | 2 |
| 60 | 70 | 40 | −5 | 0 | 0 | 530 | 602 | 452 | 4 | 3 |
| 60 | 70 | 40 | −5 | 0 | 0 | 540 | 600 | 451 | 4 | 3 |
| 60 | 70 | 40 | −5 | 0 | 0 | 550 | 598 | 451 | 4 | 3 |
| 60 | 70 | 40 | −5 | 0 | 0 | 560 | 597 | 451 | 4 | 3 |
| 60 | 70 | 40 | −5 | 0 | 0 | 570 | 597 | 451 | 3 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 70 | 40 | −5 | 0 | 0 | 580 | 598 | 451 | 3 | 3 |
| 60 | 70 | 40 | −5 | 0 | 0 | 590 | 603 | 451 | 2 | 2 |
| 60 | 70 | 40 | −5 | 0 | 5 | 520 | 603 | 450 | 3 | 2 |
| 60 | 70 | 40 | −5 | 0 | 5 | 530 | 601 | 449 | 4 | 3 |
| 60 | 70 | 40 | −5 | 0 | 5 | 540 | 600 | 448 | 4 | 3 |
| 60 | 70 | 40 | −5 | 0 | 5 | 550 | 598 | 448 | 4 | 4 |
| 60 | 70 | 40 | −5 | 0 | 5 | 560 | 597 | 448 | 4 | 3 |
| 60 | 70 | 40 | −5 | 0 | 5 | 570 | 597 | 448 | 4 | 3 |
| 60 | 70 | 40 | −5 | 0 | 5 | 580 | 598 | 447 | 3 | 3 |
| 60 | 70 | 40 | −5 | 0 | 5 | 590 | 603 | 448 | 2 | 3 |
| 60 | 70 | 40 | −5 | 5 | −5 | 520 | 603 | 456 | 2 | 2 |
| 60 | 70 | 40 | −5 | 5 | −5 | 530 | 601 | 455 | 4 | 3 |
| 60 | 70 | 40 | −5 | 5 | −5 | 540 | 600 | 455 | 4 | 3 |
| 60 | 70 | 40 | −5 | 5 | −5 | 540 | 542 | 455 | 1 | 1 |
| 60 | 70 | 40 | −5 | 5 | −5 | 550 | 599 | 454 | 4 | 3 |
| 60 | 70 | 40 | −5 | 5 | −5 | 560 | 597 | 454 | 4 | 3 |
| 60 | 70 | 40 | −5 | 5 | −5 | 570 | 598 | 454 | 3 | 3 |
| 60 | 70 | 40 | −5 | 5 | −5 | 580 | 600 | 454 | 2 | 3 |
| 60 | 70 | 40 | −5 | 5 | 0 | 520 | 603 | 453 | 3 | 2 |
| 60 | 70 | 40 | −5 | 5 | 0 | 530 | 602 | 452 | 4 | 3 |
| 60 | 70 | 40 | −5 | 5 | 0 | 540 | 600 | 451 | 4 | 3 |
| 60 | 70 | 40 | −5 | 5 | 0 | 540 | 542 | 451 | 1 | 1 |
| 60 | 70 | 40 | −5 | 5 | 0 | 550 | 599 | 451 | 4 | 3 |
| 60 | 70 | 40 | −5 | 5 | 0 | 560 | 597 | 451 | 4 | 3 |
| 60 | 70 | 40 | −5 | 5 | 0 | 570 | 598 | 451 | 3 | 3 |
| 60 | 70 | 40 | −5 | 5 | 0 | 580 | 600 | 451 | 2 | 3 |
| 60 | 70 | 40 | −5 | 5 | 5 | 520 | 602 | 449 | 3 | 2 |
| 60 | 70 | 40 | −5 | 5 | 5 | 530 | 601 | 449 | 4 | 3 |
| 60 | 70 | 40 | −5 | 5 | 5 | 540 | 600 | 448 | 4 | 3 |
| 60 | 70 | 40 | −5 | 5 | 5 | 540 | 542 | 448 | 1 | 1 |
| 60 | 70 | 40 | −5 | 5 | 5 | 550 | 598 | 448 | 4 | 4 |
| 60 | 70 | 40 | −5 | 5 | 5 | 560 | 597 | 448 | 4 | 3 |
| 60 | 70 | 40 | −5 | 5 | 5 | 570 | 598 | 447 | 3 | 3 |
| 60 | 70 | 40 | −5 | 5 | 5 | 580 | 600 | 447 | 2 | 3 |
| 60 | 70 | 40 | 0 | −5 | −5 | 530 | 598 | 456 | 4 | 3 |
| 60 | 70 | 40 | 0 | −5 | −5 | 540 | 597 | 455 | 4 | 3 |
| 60 | 70 | 40 | 0 | −5 | −5 | 550 | 596 | 455 | 4 | 3 |
| 60 | 70 | 40 | 0 | −5 | −5 | 560 | 594 | 455 | 4 | 3 |
| 60 | 70 | 40 | 0 | −5 | −5 | 570 | 593 | 454 | 4 | 3 |
| 60 | 70 | 40 | 0 | −5 | −5 | 580 | 594 | 454 | 3 | 3 |
| 60 | 70 | 40 | 0 | −5 | −5 | 590 | 598 | 454 | 2 | 3 |
| 60 | 70 | 40 | 0 | −5 | −5 | 600 | 604 | 454 | 2 | 3 |
| 60 | 70 | 40 | 0 | −5 | 0 | 520 | 600 | 453 | 1 | 1 |
| 60 | 70 | 40 | 0 | −5 | 0 | 530 | 599 | 452 | 4 | 3 |
| 60 | 70 | 40 | 0 | −5 | 0 | 540 | 597 | 452 | 4 | 3 |
| 60 | 70 | 40 | 0 | −5 | 0 | 550 | 595 | 451 | 4 | 3 |
| 60 | 70 | 40 | 0 | −5 | 0 | 560 | 594 | 451 | 4 | 3 |
| 60 | 70 | 40 | 0 | −5 | 0 | 570 | 593 | 451 | 4 | 3 |
| 60 | 70 | 40 | 0 | −5 | 0 | 580 | 594 | 451 | 3 | 3 |
| 60 | 70 | 40 | 0 | −5 | 0 | 590 | 598 | 451 | 2 | 3 |
| 60 | 70 | 40 | 0 | −5 | 0 | 600 | 604 | 451 | 2 | 3 |
| 60 | 70 | 40 | 0 | −5 | 5 | 520 | 599 | 450 | 2 | 2 |
| 60 | 70 | 40 | 0 | −5 | 5 | 530 | 598 | 449 | 4 | 3 |
| 60 | 70 | 40 | 0 | −5 | 5 | 540 | 597 | 449 | 4 | 3 |
| 60 | 70 | 40 | 0 | −5 | 5 | 550 | 595 | 448 | 4 | 3 |
| 60 | 70 | 40 | 0 | −5 | 5 | 560 | 594 | 448 | 4 | 3 |
| 60 | 70 | 40 | 0 | −5 | 5 | 570 | 593 | 448 | 4 | 3 |
| 60 | 70 | 40 | 0 | −5 | 5 | 580 | 594 | 448 | 3 | 3 |
| 60 | 70 | 40 | 0 | −5 | 5 | 590 | 598 | 448 | 2 | 3 |
| 60 | 70 | 40 | 0 | −5 | 5 | 600 | 604 | 447 | 2 | 3 |
| 60 | 70 | 40 | 0 | 0 | −5 | 520 | 600 | 457 | 2 | 1 |
| 60 | 70 | 40 | 0 | 0 | −5 | 530 | 599 | 456 | 4 | 3 |
| 60 | 70 | 40 | 0 | 0 | −5 | 540 | 597 | 455 | 4 | 3 |
| 60 | 70 | 40 | 0 | 0 | −5 | 550 | 596 | 455 | 4 | 3 |
| 60 | 70 | 40 | 0 | 0 | −5 | 560 | 594 | 454 | 4 | 3 |
| 60 | 70 | 40 | 0 | 0 | −5 | 570 | 593 | 454 | 4 | 3 |
| 60 | 70 | 40 | 0 | 0 | −5 | 580 | 595 | 454 | 3 | 3 |
| 60 | 70 | 40 | 0 | 0 | −5 | 590 | 600 | 454 | 2 | 3 |
| 60 | 70 | 40 | 0 | 0 | 0 | 520 | 599 | 453 | 2 | 2 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 70 | 40 | 0 | 0 | 0 | 530 | 598 | 452 | 4 | 3 |
| 60 | 70 | 40 | 0 | 0 | 0 | 540 | 597 | 451 | 4 | 3 |
| 60 | 70 | 40 | 0 | 0 | 0 | 550 | 596 | 451 | 4 | 3 |
| 60 | 70 | 40 | 0 | 0 | 0 | 560 | 594 | 451 | 4 | 3 |
| 60 | 70 | 40 | 0 | 0 | 0 | 570 | 594 | 451 | 4 | 3 |
| 60 | 70 | 40 | 0 | 0 | 0 | 580 | 595 | 451 | 3 | 3 |
| 60 | 70 | 40 | 0 | 0 | 0 | 590 | 600 | 451 | 2 | 3 |
| 60 | 70 | 40 | 0 | 0 | 5 | 520 | 599 | 450 | 3 | 2 |
| 60 | 70 | 40 | 0 | 0 | 5 | 530 | 599 | 449 | 4 | 3 |
| 60 | 70 | 40 | 0 | 0 | 5 | 540 | 598 | 448 | 4 | 3 |
| 60 | 70 | 40 | 0 | 0 | 5 | 550 | 595 | 448 | 4 | 4 |
| 60 | 70 | 40 | 0 | 0 | 5 | 560 | 594 | 448 | 4 | 3 |
| 60 | 70 | 40 | 0 | 0 | 5 | 570 | 594 | 448 | 4 | 3 |
| 60 | 70 | 40 | 0 | 0 | 5 | 580 | 595 | 448 | 3 | 3 |
| 60 | 70 | 40 | 0 | 0 | 5 | 590 | 600 | 448 | 2 | 3 |
| 60 | 70 | 40 | 0 | 5 | −5 | 520 | 599 | 456 | 2 | 2 |
| 60 | 70 | 40 | 0 | 5 | −5 | 530 | 599 | 455 | 4 | 3 |
| 60 | 70 | 40 | 0 | 5 | −5 | 540 | 597 | 455 | 4 | 3 |
| 60 | 70 | 40 | 0 | 5 | −5 | 550 | 595 | 454 | 4 | 3 |
| 60 | 70 | 40 | 0 | 5 | −5 | 560 | 594 | 454 | 4 | 3 |
| 60 | 70 | 40 | 0 | 5 | −5 | 570 | 594 | 454 | 3 | 3 |
| 60 | 70 | 40 | 0 | 5 | −5 | 580 | 597 | 454 | 2 | 3 |
| 60 | 70 | 40 | 0 | 5 | 0 | 520 | 599 | 453 | 3 | 2 |
| 60 | 70 | 40 | 0 | 5 | 0 | 530 | 599 | 452 | 4 | 3 |
| 60 | 70 | 40 | 0 | 5 | 0 | 540 | 597 | 451 | 4 | 3 |
| 60 | 70 | 40 | 0 | 5 | 0 | 550 | 596 | 451 | 4 | 3 |
| 60 | 70 | 40 | 0 | 5 | 0 | 560 | 595 | 451 | 4 | 3 |
| 60 | 70 | 40 | 0 | 5 | 0 | 570 | 595 | 451 | 3 | 3 |
| 60 | 70 | 40 | 0 | 5 | 0 | 580 | 597 | 451 | 3 | 3 |
| 60 | 70 | 40 | 0 | 5 | 5 | 520 | 600 | 449 | 3 | 2 |
| 60 | 70 | 40 | 0 | 5 | 5 | 530 | 599 | 449 | 4 | 3 |
| 60 | 70 | 40 | 0 | 5 | 5 | 540 | 598 | 448 | 4 | 3 |
| 60 | 70 | 40 | 0 | 5 | 5 | 550 | 596 | 448 | 4 | 3 |
| 60 | 70 | 40 | 0 | 5 | 5 | 560 | 595 | 448 | 4 | 3 |
| 60 | 70 | 40 | 0 | 5 | 5 | 570 | 594 | 448 | 3 | 3 |
| 60 | 70 | 40 | 0 | 5 | 5 | 580 | 597 | 448 | 3 | 3 |
| 60 | 70 | 40 | 0 | 5 | 5 | 590 | 602 | 448 | 0 | 1 |
| 60 | 70 | 40 | 5 | −5 | −5 | 530 | 596 | 456 | 4 | 3 |
| 60 | 70 | 40 | 5 | −5 | −5 | 540 | 594 | 455 | 4 | 3 |
| 60 | 70 | 40 | 5 | −5 | −5 | 550 | 592 | 455 | 4 | 3 |
| 60 | 70 | 40 | 5 | −5 | −5 | 560 | 591 | 455 | 4 | 3 |
| 60 | 70 | 40 | 5 | −5 | −5 | 570 | 591 | 454 | 4 | 3 |
| 60 | 70 | 40 | 5 | −5 | −5 | 580 | 592 | 454 | 3 | 3 |
| 60 | 70 | 40 | 5 | −5 | −5 | 590 | 596 | 454 | 2 | 3 |
| 60 | 70 | 40 | 5 | −5 | −5 | 600 | 603 | 454 | 1 | 3 |
| 60 | 70 | 40 | 5 | −5 | 0 | 520 | 596 | 454 | 1 | 0 |
| 60 | 70 | 40 | 5 | −5 | 0 | 530 | 595 | 452 | 4 | 3 |
| 60 | 70 | 40 | 5 | −5 | 0 | 540 | 594 | 452 | 4 | 3 |
| 60 | 70 | 40 | 5 | −5 | 0 | 550 | 593 | 451 | 4 | 3 |
| 60 | 70 | 40 | 5 | −5 | 0 | 560 | 591 | 451 | 4 | 3 |
| 60 | 70 | 40 | 5 | −5 | 0 | 570 | 591 | 451 | 4 | 3 |
| 60 | 70 | 40 | 5 | −5 | 0 | 580 | 592 | 451 | 3 | 3 |
| 60 | 70 | 40 | 5 | −5 | 0 | 590 | 596 | 451 | 2 | 3 |
| 60 | 70 | 40 | 5 | −5 | 0 | 600 | 603 | 451 | 1 | 3 |
| 60 | 70 | 40 | 5 | −5 | 5 | 520 | 597 | 450 | 2 | 2 |
| 60 | 70 | 40 | 5 | −5 | 5 | 530 | 596 | 449 | 4 | 3 |
| 60 | 70 | 40 | 5 | −5 | 5 | 540 | 594 | 448 | 4 | 3 |
| 60 | 70 | 40 | 5 | −5 | 5 | 550 | 593 | 448 | 4 | 3 |
| 60 | 70 | 40 | 5 | −5 | 5 | 560 | 591 | 448 | 4 | 3 |
| 60 | 70 | 40 | 5 | −5 | 5 | 570 | 591 | 447 | 4 | 3 |
| 60 | 70 | 40 | 5 | −5 | 5 | 580 | 592 | 447 | 3 | 3 |
| 60 | 70 | 40 | 5 | −5 | 5 | 590 | 596 | 447 | 2 | 3 |
| 60 | 70 | 40 | 5 | −5 | 5 | 600 | 603 | 448 | 1 | 3 |
| 60 | 70 | 40 | 5 | 0 | −5 | 520 | 597 | 456 | 1 | 1 |
| 60 | 70 | 40 | 5 | 0 | −5 | 530 | 596 | 456 | 4 | 3 |
| 60 | 70 | 40 | 5 | 0 | −5 | 540 | 595 | 455 | 4 | 3 |
| 60 | 70 | 40 | 5 | 0 | −5 | 550 | 593 | 455 | 4 | 3 |
| 60 | 70 | 40 | 5 | 0 | −5 | 560 | 592 | 454 | 4 | 3 |
| 60 | 70 | 40 | 5 | 0 | −5 | 570 | 591 | 454 | 4 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 70 | 40 | 5 | 0 | −5 | 580 | 593 | 454 | 3 | 3 |
| 60 | 70 | 40 | 5 | 0 | −5 | 590 | 597 | 454 | 2 | 3 |
| 60 | 70 | 40 | 5 | 0 | −5 | 600 | 603 | 454 | 1 | 1 |
| 60 | 70 | 40 | 5 | 0 | 0 | 520 | 597 | 453 | 2 | 2 |
| 60 | 70 | 40 | 5 | 0 | 0 | 530 | 596 | 452 | 4 | 3 |
| 60 | 70 | 40 | 5 | 0 | 0 | 540 | 595 | 452 | 4 | 3 |
| 60 | 70 | 40 | 5 | 0 | 0 | 550 | 592 | 451 | 4 | 3 |
| 60 | 70 | 40 | 5 | 0 | 0 | 560 | 592 | 451 | 4 | 3 |
| 60 | 70 | 40 | 5 | 0 | 0 | 570 | 591 | 451 | 4 | 3 |
| 60 | 70 | 40 | 5 | 0 | 0 | 580 | 593 | 451 | 3 | 3 |
| 60 | 70 | 40 | 5 | 0 | 0 | 590 | 597 | 451 | 2 | 3 |
| 60 | 70 | 40 | 5 | 0 | 0 | 600 | 603 | 451 | 1 | 2 |
| 60 | 70 | 40 | 5 | 0 | 5 | 520 | 597 | 450 | 3 | 2 |
| 60 | 70 | 40 | 5 | 0 | 5 | 530 | 596 | 449 | 4 | 3 |
| 60 | 70 | 40 | 5 | 0 | 5 | 540 | 594 | 448 | 4 | 3 |
| 60 | 70 | 40 | 5 | 0 | 5 | 550 | 593 | 448 | 4 | 3 |
| 60 | 70 | 40 | 5 | 0 | 5 | 560 | 592 | 448 | 4 | 3 |
| 60 | 70 | 40 | 5 | 0 | 5 | 570 | 591 | 448 | 4 | 3 |
| 60 | 70 | 40 | 5 | 0 | 5 | 580 | 592 | 448 | 3 | 3 |
| 60 | 70 | 40 | 5 | 0 | 5 | 590 | 597 | 448 | 2 | 3 |
| 60 | 70 | 40 | 5 | 0 | 5 | 600 | 603 | 447 | 1 | 2 |
| 60 | 70 | 40 | 5 | 5 | −5 | 520 | 597 | 456 | 2 | 2 |
| 60 | 70 | 40 | 5 | 5 | −5 | 530 | 597 | 455 | 4 | 3 |
| 60 | 70 | 40 | 5 | 5 | −5 | 540 | 595 | 455 | 4 | 3 |
| 60 | 70 | 40 | 5 | 5 | −5 | 550 | 593 | 454 | 4 | 3 |
| 60 | 70 | 40 | 5 | 5 | −5 | 560 | 591 | 454 | 4 | 3 |
| 60 | 70 | 40 | 5 | 5 | −5 | 570 | 591 | 454 | 3 | 3 |
| 60 | 70 | 40 | 5 | 5 | −5 | 580 | 594 | 454 | 3 | 3 |
| 60 | 70 | 40 | 5 | 5 | −5 | 590 | 598 | 454 | 2 | 2 |
| 60 | 70 | 40 | 5 | 5 | 0 | 520 | 597 | 452 | 3 | 2 |
| 60 | 70 | 40 | 5 | 5 | 0 | 530 | 596 | 452 | 4 | 3 |
| 60 | 70 | 40 | 5 | 5 | 0 | 540 | 595 | 451 | 4 | 3 |
| 60 | 70 | 40 | 5 | 5 | 0 | 550 | 593 | 451 | 4 | 3 |
| 60 | 70 | 40 | 5 | 5 | 0 | 560 | 592 | 451 | 4 | 3 |
| 60 | 70 | 40 | 5 | 5 | 0 | 570 | 592 | 451 | 3 | 3 |
| 60 | 70 | 40 | 5 | 5 | 0 | 580 | 593 | 451 | 3 | 3 |
| 60 | 70 | 40 | 5 | 5 | 0 | 590 | 598 | 451 | 2 | 3 |
| 60 | 70 | 40 | 5 | 5 | 5 | 520 | 597 | 449 | 3 | 2 |
| 60 | 70 | 40 | 5 | 5 | 5 | 530 | 596 | 449 | 4 | 3 |
| 60 | 70 | 40 | 5 | 5 | 5 | 540 | 595 | 448 | 4 | 3 |
| 60 | 70 | 40 | 5 | 5 | 5 | 550 | 593 | 448 | 4 | 3 |
| 60 | 70 | 40 | 5 | 5 | 5 | 560 | 592 | 448 | 4 | 3 |
| 60 | 70 | 40 | 5 | 5 | 5 | 570 | 592 | 447 | 3 | 3 |
| 60 | 70 | 40 | 5 | 5 | 5 | 580 | 593 | 447 | 3 | 3 |
| 60 | 70 | 40 | 5 | 5 | 5 | 590 | 598 | 447 | 2 | 3 |
| 60 | 70 | 50 | −5 | −5 | −5 | 530 | 601 | 457 | 3 | 3 |
| 60 | 70 | 50 | −5 | −5 | −5 | 540 | 599 | 456 | 4 | 3 |
| 60 | 70 | 50 | −5 | −5 | −5 | 550 | 598 | 455 | 4 | 4 |
| 60 | 70 | 50 | −5 | −5 | −5 | 560 | 595 | 455 | 4 | 4 |
| 60 | 70 | 50 | −5 | −5 | −5 | 570 | 595 | 454 | 3 | 3 |
| 60 | 70 | 50 | −5 | −5 | −5 | 580 | 596 | 454 | 3 | 3 |
| 60 | 70 | 50 | −5 | −5 | −5 | 590 | 601 | 454 | 2 | 3 |
| 60 | 70 | 50 | −5 | −5 | 0 | 530 | 601 | 455 | 3 | 3 |
| 60 | 70 | 50 | −5 | −5 | 0 | 540 | 599 | 453 | 4 | 3 |
| 60 | 70 | 50 | −5 | −5 | 0 | 550 | 597 | 453 | 4 | 4 |
| 60 | 70 | 50 | −5 | −5 | 0 | 560 | 595 | 452 | 4 | 4 |
| 60 | 70 | 50 | −5 | −5 | 0 | 570 | 594 | 451 | 3 | 4 |
| 60 | 70 | 50 | −5 | −5 | 0 | 580 | 596 | 451 | 3 | 3 |
| 60 | 70 | 50 | −5 | −5 | 0 | 590 | 600 | 451 | 2 | 3 |
| 60 | 70 | 50 | −5 | −5 | 5 | 520 | 602 | 454 | 2 | 2 |
| 60 | 70 | 50 | −5 | −5 | 5 | 530 | 601 | 452 | 4 | 3 |
| 60 | 70 | 50 | −5 | −5 | 5 | 540 | 599 | 450 | 4 | 3 |
| 60 | 70 | 50 | −5 | −5 | 5 | 550 | 597 | 450 | 4 | 4 |
| 60 | 70 | 50 | −5 | −5 | 5 | 560 | 595 | 449 | 4 | 4 |
| 60 | 70 | 50 | −5 | −5 | 5 | 570 | 595 | 449 | 3 | 4 |
| 60 | 70 | 50 | −5 | −5 | 5 | 580 | 596 | 449 | 3 | 3 |
| 60 | 70 | 50 | −5 | −5 | 5 | 590 | 600 | 449 | 2 | 3 |
| 60 | 70 | 50 | −5 | 0 | −5 | 530 | 601 | 457 | 3 | 3 |
| 60 | 70 | 50 | −5 | 0 | −5 | 540 | 599 | 456 | 4 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 70 | 50 | −5 | 0 | −5 | 550 | 598 | 455 | 4 | 4 |
| 60 | 70 | 50 | −5 | 0 | −5 | 560 | 596 | 454 | 4 | 4 |
| 60 | 70 | 50 | −5 | 0 | −5 | 570 | 596 | 454 | 3 | 3 |
| 60 | 70 | 50 | −5 | 0 | −5 | 580 | 598 | 454 | 2 | 3 |
| 60 | 70 | 50 | −5 | 0 | −5 | 590 | 602 | 454 | 0 | 1 |
| 60 | 70 | 50 | −5 | 0 | 0 | 520 | 602 | 456 | 2 | 2 |
| 60 | 70 | 50 | −5 | 0 | 0 | 530 | 601 | 455 | 3 | 3 |
| 60 | 70 | 50 | −5 | 0 | 0 | 540 | 599 | 453 | 4 | 4 |
| 60 | 70 | 50 | −5 | 0 | 0 | 550 | 598 | 452 | 4 | 4 |
| 60 | 70 | 50 | −5 | 0 | 0 | 560 | 596 | 451 | 4 | 4 |
| 60 | 70 | 50 | −5 | 0 | 0 | 570 | 595 | 451 | 3 | 3 |
| 60 | 70 | 50 | −5 | 0 | 0 | 580 | 598 | 451 | 2 | 3 |
| 60 | 70 | 50 | −5 | 0 | 0 | 590 | 602 | 451 | 1 | 2 |
| 60 | 70 | 50 | −5 | 0 | 5 | 520 | 602 | 454 | 2 | 2 |
| 60 | 70 | 50 | −5 | 0 | 5 | 530 | 601 | 452 | 4 | 3 |
| 60 | 70 | 50 | −5 | 0 | 5 | 540 | 600 | 450 | 4 | 4 |
| 60 | 70 | 50 | −5 | 0 | 5 | 550 | 598 | 449 | 4 | 4 |
| 60 | 70 | 50 | −5 | 0 | 5 | 560 | 596 | 449 | 4 | 4 |
| 60 | 70 | 50 | −5 | 0 | 5 | 570 | 596 | 449 | 3 | 4 |
| 60 | 70 | 50 | −5 | 0 | 5 | 580 | 598 | 449 | 2 | 3 |
| 60 | 70 | 50 | −5 | 0 | 5 | 590 | 602 | 448 | 1 | 1 |
| 60 | 70 | 50 | −5 | 5 | −5 | 520 | 603 | 459 | 1 | 1 |
| 60 | 70 | 50 | −5 | 5 | −5 | 530 | 601 | 456 | 3 | 3 |
| 60 | 70 | 50 | −5 | 5 | −5 | 540 | 600 | 455 | 4 | 3 |
| 60 | 70 | 50 | −5 | 5 | −5 | 540 | 542 | 455 | 1 | 1 |
| 60 | 70 | 50 | −5 | 5 | −5 | 550 | 598 | 455 | 4 | 4 |
| 60 | 70 | 50 | −5 | 5 | −5 | 560 | 597 | 454 | 4 | 4 |
| 60 | 70 | 50 | −5 | 5 | −5 | 570 | 597 | 454 | 3 | 3 |
| 60 | 70 | 50 | −5 | 5 | −5 | 580 | 600 | 454 | 2 | 2 |
| 60 | 70 | 50 | −5 | 5 | 0 | 520 | 602 | 456 | 2 | 2 |
| 60 | 70 | 50 | −5 | 5 | 0 | 530 | 601 | 454 | 4 | 3 |
| 60 | 70 | 50 | −5 | 5 | 0 | 540 | 599 | 452 | 4 | 4 |
| 60 | 70 | 50 | −5 | 5 | 0 | 540 | 542 | 453 | 1 | 1 |
| 60 | 70 | 50 | −5 | 5 | 0 | 550 | 598 | 451 | 4 | 4 |
| 60 | 70 | 50 | −5 | 5 | 0 | 560 | 597 | 451 | 4 | 4 |
| 60 | 70 | 50 | −5 | 5 | 0 | 570 | 597 | 451 | 3 | 3 |
| 60 | 70 | 50 | −5 | 5 | 0 | 580 | 600 | 451 | 2 | 2 |
| 60 | 70 | 50 | −5 | 5 | 5 | 520 | 602 | 453 | 3 | 2 |
| 60 | 70 | 50 | −5 | 5 | 5 | 530 | 601 | 451 | 4 | 3 |
| 60 | 70 | 50 | −5 | 5 | 5 | 540 | 599 | 450 | 4 | 4 |
| 60 | 70 | 50 | −5 | 5 | 5 | 540 | 542 | 450 | 1 | 1 |
| 60 | 70 | 50 | −5 | 5 | 5 | 550 | 598 | 449 | 4 | 4 |
| 60 | 70 | 50 | −5 | 5 | 5 | 560 | 597 | 449 | 4 | 4 |
| 60 | 70 | 50 | −5 | 5 | 5 | 570 | 597 | 449 | 3 | 3 |
| 60 | 70 | 50 | −5 | 5 | 5 | 580 | 600 | 449 | 2 | 2 |
| 60 | 70 | 50 | 0 | −5 | −5 | 530 | 598 | 457 | 3 | 3 |
| 60 | 70 | 50 | 0 | −5 | −5 | 540 | 597 | 455 | 4 | 3 |
| 60 | 70 | 50 | 0 | −5 | −5 | 550 | 594 | 455 | 4 | 4 |
| 60 | 70 | 50 | 0 | −5 | −5 | 560 | 593 | 455 | 4 | 4 |
| 60 | 70 | 50 | 0 | −5 | −5 | 570 | 592 | 454 | 3 | 3 |
| 60 | 70 | 50 | 0 | −5 | −5 | 580 | 594 | 454 | 3 | 3 |
| 60 | 70 | 50 | 0 | −5 | −5 | 590 | 598 | 454 | 2 | 3 |
| 60 | 70 | 50 | 0 | −5 | −5 | 600 | 604 | 454 | 1 | 3 |
| 60 | 70 | 50 | 0 | −5 | 0 | 530 | 598 | 455 | 3 | 3 |
| 60 | 70 | 50 | 0 | −5 | 0 | 540 | 597 | 453 | 4 | 3 |
| 60 | 70 | 50 | 0 | −5 | 0 | 550 | 594 | 452 | 4 | 4 |
| 60 | 70 | 50 | 0 | −5 | 0 | 560 | 593 | 452 | 4 | 4 |
| 60 | 70 | 50 | 0 | −5 | 0 | 570 | 592 | 452 | 3 | 3 |
| 60 | 70 | 50 | 0 | −5 | 0 | 580 | 593 | 451 | 3 | 3 |
| 60 | 70 | 50 | 0 | −5 | 0 | 590 | 598 | 451 | 2 | 3 |
| 60 | 70 | 50 | 0 | −5 | 0 | 600 | 604 | 451 | 1 | 3 |
| 60 | 70 | 50 | 0 | −5 | 5 | 520 | 599 | 454 | 2 | 2 |
| 60 | 70 | 50 | 0 | −5 | 5 | 530 | 598 | 452 | 4 | 3 |
| 60 | 70 | 50 | 0 | −5 | 5 | 540 | 596 | 451 | 4 | 3 |
| 60 | 70 | 50 | 0 | −5 | 5 | 550 | 595 | 450 | 4 | 4 |
| 60 | 70 | 50 | 0 | −5 | 5 | 560 | 593 | 449 | 4 | 4 |
| 60 | 70 | 50 | 0 | −5 | 5 | 570 | 592 | 449 | 3 | 4 |
| 60 | 70 | 50 | 0 | −5 | 5 | 580 | 593 | 449 | 3 | 3 |
| 60 | 70 | 50 | 0 | −5 | 5 | 590 | 597 | 449 | 2 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 70 | 50 | 0 | −5 | 5 | 600 | 604 | 448 | 1 | 3 |
| 60 | 70 | 50 | 0 | 0 | −5 | 530 | 599 | 457 | 3 | 3 |
| 60 | 70 | 50 | 0 | 0 | −5 | 540 | 597 | 455 | 4 | 3 |
| 60 | 70 | 50 | 0 | 0 | −5 | 550 | 595 | 455 | 4 | 4 |
| 60 | 70 | 50 | 0 | 0 | −5 | 560 | 593 | 454 | 4 | 3 |
| 60 | 70 | 50 | 0 | 0 | −5 | 570 | 593 | 454 | 3 | 3 |
| 60 | 70 | 50 | 0 | 0 | −5 | 580 | 595 | 454 | 3 | 3 |
| 60 | 70 | 50 | 0 | 0 | −5 | 590 | 599 | 453 | 2 | 3 |
| 60 | 70 | 50 | 0 | 0 | 0 | 520 | 599 | 456 | 2 | 2 |
| 60 | 70 | 50 | 0 | 0 | 0 | 530 | 598 | 454 | 3 | 3 |
| 60 | 70 | 50 | 0 | 0 | 0 | 540 | 597 | 453 | 4 | 3 |
| 60 | 70 | 50 | 0 | 0 | 0 | 550 | 594 | 452 | 4 | 4 |
| 60 | 70 | 50 | 0 | 0 | 0 | 560 | 593 | 451 | 4 | 4 |
| 60 | 70 | 50 | 0 | 0 | 0 | 570 | 593 | 451 | 3 | 4 |
| 60 | 70 | 50 | 0 | 0 | 0 | 580 | 595 | 451 | 3 | 3 |
| 60 | 70 | 50 | 0 | 0 | 0 | 590 | 599 | 451 | 2 | 3 |
| 60 | 70 | 50 | 0 | 0 | 5 | 520 | 599 | 454 | 2 | 2 |
| 60 | 70 | 50 | 0 | 0 | 5 | 530 | 598 | 452 | 4 | 3 |
| 60 | 70 | 50 | 0 | 0 | 5 | 540 | 596 | 450 | 4 | 3 |
| 60 | 70 | 50 | 0 | 0 | 5 | 550 | 594 | 449 | 4 | 4 |
| 60 | 70 | 50 | 0 | 0 | 5 | 560 | 593 | 449 | 4 | 4 |
| 60 | 70 | 50 | 0 | 0 | 5 | 570 | 593 | 449 | 3 | 4 |
| 60 | 70 | 50 | 0 | 0 | 5 | 580 | 595 | 448 | 3 | 3 |
| 60 | 70 | 50 | 0 | 0 | 5 | 590 | 599 | 449 | 2 | 3 |
| 60 | 70 | 50 | 0 | 5 | −5 | 530 | 599 | 456 | 3 | 3 |
| 60 | 70 | 50 | 0 | 5 | −5 | 540 | 597 | 455 | 4 | 3 |
| 60 | 70 | 50 | 0 | 5 | −5 | 550 | 595 | 455 | 4 | 4 |
| 60 | 70 | 50 | 0 | 5 | −5 | 560 | 593 | 454 | 4 | 4 |
| 60 | 70 | 50 | 0 | 5 | −5 | 570 | 593 | 454 | 3 | 3 |
| 60 | 70 | 50 | 0 | 5 | −5 | 580 | 596 | 453 | 2 | 3 |
| 60 | 70 | 50 | 0 | 5 | 0 | 520 | 600 | 456 | 2 | 2 |
| 60 | 70 | 50 | 0 | 5 | 0 | 530 | 598 | 454 | 4 | 3 |
| 60 | 70 | 50 | 0 | 5 | 0 | 540 | 597 | 452 | 4 | 4 |
| 60 | 70 | 50 | 0 | 5 | 0 | 550 | 595 | 452 | 4 | 4 |
| 60 | 70 | 50 | 0 | 5 | 0 | 560 | 594 | 451 | 4 | 4 |
| 60 | 70 | 50 | 0 | 5 | 0 | 570 | 594 | 451 | 3 | 3 |
| 60 | 70 | 50 | 0 | 5 | 0 | 580 | 596 | 451 | 2 | 3 |
| 60 | 70 | 50 | 0 | 5 | 5 | 520 | 599 | 453 | 3 | 2 |
| 60 | 70 | 50 | 0 | 5 | 5 | 530 | 598 | 451 | 4 | 3 |
| 60 | 70 | 50 | 0 | 5 | 5 | 540 | 597 | 450 | 4 | 4 |
| 60 | 70 | 50 | 0 | 5 | 5 | 550 | 595 | 449 | 4 | 4 |
| 60 | 70 | 50 | 0 | 5 | 5 | 560 | 594 | 449 | 4 | 4 |
| 60 | 70 | 50 | 0 | 5 | 5 | 570 | 594 | 448 | 3 | 3 |
| 60 | 70 | 50 | 0 | 5 | 5 | 580 | 596 | 449 | 2 | 3 |
| 60 | 70 | 50 | 5 | −5 | −5 | 530 | 596 | 457 | 3 | 3 |
| 60 | 70 | 50 | 5 | −5 | −5 | 540 | 594 | 456 | 4 | 3 |
| 60 | 70 | 50 | 5 | −5 | −5 | 550 | 592 | 455 | 4 | 4 |
| 60 | 70 | 50 | 5 | −5 | −5 | 560 | 590 | 454 | 4 | 4 |
| 60 | 70 | 50 | 5 | −5 | −5 | 570 | 590 | 454 | 3 | 3 |
| 60 | 70 | 50 | 5 | −5 | −5 | 580 | 591 | 454 | 3 | 3 |
| 60 | 70 | 50 | 5 | −5 | −5 | 590 | 596 | 454 | 2 | 3 |
| 60 | 70 | 50 | 5 | −5 | −5 | 600 | 602 | 454 | 1 | 1 |
| 60 | 70 | 50 | 5 | −5 | 0 | 530 | 595 | 454 | 3 | 3 |
| 60 | 70 | 50 | 5 | −5 | 0 | 540 | 593 | 453 | 4 | 3 |
| 60 | 70 | 50 | 5 | −5 | 0 | 550 | 592 | 452 | 4 | 4 |
| 60 | 70 | 50 | 5 | −5 | 0 | 560 | 591 | 452 | 4 | 3 |
| 60 | 70 | 50 | 5 | −5 | 0 | 570 | 590 | 452 | 3 | 3 |
| 60 | 70 | 50 | 5 | −5 | 0 | 580 | 591 | 451 | 3 | 3 |
| 60 | 70 | 50 | 5 | −5 | 0 | 590 | 596 | 451 | 2 | 3 |
| 60 | 70 | 50 | 5 | −5 | 0 | 600 | 602 | 451 | 1 | 1 |
| 60 | 70 | 50 | 5 | −5 | 5 | 520 | 596 | 454 | 2 | 2 |
| 60 | 70 | 50 | 5 | −5 | 5 | 530 | 596 | 452 | 3 | 3 |
| 60 | 70 | 50 | 5 | −5 | 5 | 540 | 594 | 451 | 4 | 3 |
| 60 | 70 | 50 | 5 | −5 | 5 | 550 | 592 | 450 | 4 | 4 |
| 60 | 70 | 50 | 5 | −5 | 5 | 560 | 591 | 449 | 4 | 3 |
| 60 | 70 | 50 | 5 | −5 | 5 | 570 | 590 | 449 | 3 | 3 |
| 60 | 70 | 50 | 5 | −5 | 5 | 580 | 591 | 449 | 3 | 3 |
| 60 | 70 | 50 | 5 | −5 | 5 | 590 | 596 | 449 | 2 | 3 |
| 60 | 70 | 50 | 5 | −5 | 5 | 600 | 602 | 449 | 1 | 1 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 60 | 70 | 50 | 5 | 0 | −5 | 530 | 596 | 456 | 3 | 3 |
| 60 | 70 | 50 | 5 | 0 | −5 | 540 | 594 | 455 | 4 | 3 |
| 60 | 70 | 50 | 5 | 0 | −5 | 550 | 593 | 454 | 4 | 3 |
| 60 | 70 | 50 | 5 | 0 | −5 | 560 | 591 | 454 | 4 | 3 |
| 60 | 70 | 50 | 5 | 0 | −5 | 570 | 590 | 454 | 3 | 3 |
| 60 | 70 | 50 | 5 | 0 | −5 | 580 | 592 | 454 | 3 | 3 |
| 60 | 70 | 50 | 5 | 0 | −5 | 590 | 596 | 454 | 2 | 3 |
| 60 | 70 | 50 | 5 | 0 | 0 | 520 | 597 | 456 | 1 | 1 |
| 60 | 70 | 50 | 5 | 0 | 0 | 530 | 595 | 454 | 3 | 3 |
| 60 | 70 | 50 | 5 | 0 | 0 | 540 | 594 | 453 | 4 | 3 |
| 60 | 70 | 50 | 5 | 0 | 0 | 550 | 592 | 452 | 4 | 4 |
| 60 | 70 | 50 | 5 | 0 | 0 | 560 | 590 | 452 | 4 | 4 |
| 60 | 70 | 50 | 5 | 0 | 0 | 570 | 590 | 452 | 3 | 3 |
| 60 | 70 | 50 | 5 | 0 | 0 | 580 | 592 | 451 | 3 | 3 |
| 60 | 70 | 50 | 5 | 0 | 0 | 590 | 596 | 451 | 2 | 3 |
| 60 | 70 | 50 | 5 | 0 | 5 | 520 | 596 | 453 | 2 | 2 |
| 60 | 70 | 50 | 5 | 0 | 5 | 530 | 596 | 451 | 4 | 3 |
| 60 | 70 | 50 | 5 | 0 | 5 | 540 | 594 | 450 | 4 | 3 |
| 60 | 70 | 50 | 5 | 0 | 5 | 550 | 592 | 450 | 4 | 4 |
| 60 | 70 | 50 | 5 | 0 | 5 | 560 | 590 | 449 | 4 | 4 |
| 60 | 70 | 50 | 5 | 0 | 5 | 570 | 590 | 449 | 3 | 3 |
| 60 | 70 | 50 | 5 | 0 | 5 | 580 | 592 | 448 | 3 | 3 |
| 60 | 70 | 50 | 5 | 0 | 5 | 590 | 596 | 448 | 2 | 3 |
| 60 | 70 | 50 | 5 | 5 | −5 | 530 | 596 | 456 | 3 | 3 |
| 60 | 70 | 50 | 5 | 5 | −5 | 540 | 594 | 455 | 4 | 3 |
| 60 | 70 | 50 | 5 | 5 | −5 | 550 | 593 | 454 | 4 | 4 |
| 60 | 70 | 50 | 5 | 5 | −5 | 560 | 591 | 454 | 4 | 3 |
| 60 | 70 | 50 | 5 | 5 | −5 | 570 | 591 | 454 | 3 | 3 |
| 60 | 70 | 50 | 5 | 5 | −5 | 580 | 593 | 454 | 2 | 3 |
| 60 | 70 | 50 | 5 | 5 | −5 | 590 | 598 | 454 | 1 | 2 |
| 60 | 70 | 50 | 5 | 5 | 0 | 520 | 597 | 456 | 2 | 2 |
| 60 | 70 | 50 | 5 | 5 | 0 | 530 | 596 | 453 | 3 | 3 |
| 60 | 70 | 50 | 5 | 5 | 0 | 540 | 594 | 452 | 4 | 3 |
| 60 | 70 | 50 | 5 | 5 | 0 | 550 | 593 | 452 | 4 | 4 |
| 60 | 70 | 50 | 5 | 5 | 0 | 560 | 591 | 452 | 4 | 3 |
| 60 | 70 | 50 | 5 | 5 | 0 | 570 | 591 | 451 | 3 | 3 |
| 60 | 70 | 50 | 5 | 5 | 0 | 580 | 593 | 451 | 2 | 3 |
| 60 | 70 | 50 | 5 | 5 | 0 | 590 | 598 | 451 | 1 | 2 |
| 60 | 70 | 50 | 5 | 5 | 5 | 520 | 597 | 453 | 3 | 2 |
| 60 | 70 | 50 | 5 | 5 | 5 | 530 | 596 | 451 | 4 | 3 |
| 60 | 70 | 50 | 5 | 5 | 5 | 540 | 594 | 450 | 4 | 3 |
| 60 | 70 | 50 | 5 | 5 | 5 | 550 | 592 | 449 | 4 | 4 |
| 60 | 70 | 50 | 5 | 5 | 5 | 560 | 591 | 449 | 4 | 4 |
| 60 | 70 | 50 | 5 | 5 | 5 | 570 | 591 | 448 | 3 | 3 |
| 60 | 70 | 50 | 5 | 5 | 5 | 580 | 593 | 449 | 2 | 3 |
| 60 | 70 | 50 | 5 | 5 | 5 | 590 | 598 | 449 | 1 | 2 |
| 70 | 50 | 30 | −5 | −5 | −5 | 530 | 596 | 454 | 3 | 2 |
| 70 | 50 | 30 | −5 | −5 | −5 | 540 | 589 | 454 | 5 | 3 |
| 70 | 50 | 30 | −5 | −5 | −5 | 550 | 588 | 454 | 5 | 3 |
| 70 | 50 | 30 | −5 | −5 | 0 | 530 | 596 | 450 | 3 | 2 |
| 70 | 50 | 30 | −5 | −5 | 0 | 540 | 589 | 450 | 5 | 3 |
| 70 | 50 | 30 | −5 | −5 | 0 | 550 | 588 | 450 | 5 | 3 |
| 70 | 50 | 30 | −5 | −5 | 5 | 530 | 596 | 446 | 3 | 2 |
| 70 | 50 | 30 | −5 | −5 | 5 | 540 | 589 | 446 | 5 | 3 |
| 70 | 50 | 30 | −5 | −5 | 5 | 550 | 589 | 446 | 5 | 3 |
| 70 | 50 | 30 | −5 | 0 | −5 | 530 | 595 | 454 | 4 | 2 |
| 70 | 50 | 30 | −5 | 0 | −5 | 540 | 588 | 454 | 5 | 3 |
| 70 | 50 | 30 | −5 | 0 | −5 | 550 | 589 | 454 | 4 | 3 |
| 70 | 50 | 30 | −5 | 0 | 0 | 530 | 594 | 450 | 4 | 3 |
| 70 | 50 | 30 | −5 | 0 | 0 | 540 | 588 | 450 | 5 | 3 |
| 70 | 50 | 30 | −5 | 0 | 0 | 550 | 589 | 450 | 4 | 3 |
| 70 | 50 | 30 | −5 | 0 | 5 | 530 | 594 | 446 | 4 | 3 |
| 70 | 50 | 30 | −5 | 0 | 5 | 540 | 588 | 446 | 5 | 3 |
| 70 | 50 | 30 | −5 | 0 | 5 | 550 | 589 | 446 | 4 | 3 |
| 70 | 50 | 30 | −5 | 5 | −5 | 530 | 593 | 454 | 4 | 3 |
| 70 | 50 | 30 | −5 | 5 | −5 | 540 | 589 | 454 | 5 | 3 |
| 70 | 50 | 30 | −5 | 5 | −5 | 550 | 590 | 454 | 2 | 1 |
| 70 | 50 | 30 | −5 | 5 | 0 | 530 | 593 | 450 | 5 | 3 |
| 70 | 50 | 30 | −5 | 5 | 0 | 540 | 589 | 450 | 5 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 70 | 50 | 30 | −5 | 5 | 0 | 550 | 590 | 450 | 3 | 2 |
| 70 | 50 | 30 | −5 | 5 | 5 | 530 | 593 | 446 | 5 | 3 |
| 70 | 50 | 30 | −5 | 5 | 5 | 540 | 590 | 446 | 5 | 3 |
| 70 | 50 | 30 | −5 | 5 | 5 | 550 | 591 | 446 | 3 | 2 |
| 70 | 50 | 30 | 0 | −5 | −5 | 530 | 593 | 454 | 2 | 1 |
| 70 | 50 | 30 | 0 | −5 | −5 | 540 | 583 | 454 | 5 | 3 |
| 70 | 50 | 30 | 0 | −5 | −5 | 550 | 585 | 454 | 5 | 3 |
| 70 | 50 | 30 | 0 | −5 | 0 | 530 | 594 | 450 | 3 | 2 |
| 70 | 50 | 30 | 0 | −5 | 0 | 540 | 584 | 450 | 5 | 3 |
| 70 | 50 | 30 | 0 | −5 | 0 | 550 | 584 | 450 | 5 | 3 |
| 70 | 50 | 30 | 0 | −5 | 5 | 530 | 593 | 446 | 3 | 2 |
| 70 | 50 | 30 | 0 | −5 | 5 | 540 | 583 | 446 | 5 | 3 |
| 70 | 50 | 30 | 0 | −5 | 5 | 550 | 584 | 446 | 5 | 3 |
| 70 | 50 | 30 | 0 | 0 | −5 | 530 | 591 | 454 | 4 | 2 |
| 70 | 50 | 30 | 0 | 0 | −5 | 540 | 583 | 454 | 5 | 3 |
| 70 | 50 | 30 | 0 | 0 | −5 | 550 | 585 | 454 | 4 | 3 |
| 70 | 50 | 30 | 0 | 0 | 0 | 530 | 591 | 450 | 4 | 2 |
| 70 | 50 | 30 | 0 | 0 | 0 | 540 | 583 | 450 | 5 | 3 |
| 70 | 50 | 30 | 0 | 0 | 0 | 550 | 586 | 450 | 4 | 3 |
| 70 | 50 | 30 | 0 | 0 | 5 | 530 | 591 | 446 | 4 | 2 |
| 70 | 50 | 30 | 0 | 0 | 5 | 540 | 583 | 446 | 5 | 3 |
| 70 | 50 | 30 | 0 | 0 | 5 | 550 | 585 | 446 | 4 | 3 |
| 70 | 50 | 30 | 0 | 5 | −5 | 530 | 589 | 454 | 4 | 3 |
| 70 | 50 | 30 | 0 | 5 | −5 | 540 | 585 | 454 | 5 | 3 |
| 70 | 50 | 30 | 0 | 5 | −5 | 550 | 586 | 454 | 3 | 2 |
| 70 | 50 | 30 | 0 | 5 | 0 | 530 | 589 | 450 | 5 | 3 |
| 70 | 50 | 30 | 0 | 5 | 0 | 540 | 585 | 450 | 5 | 3 |
| 70 | 50 | 30 | 0 | 5 | 0 | 550 | 587 | 450 | 3 | 2 |
| 70 | 50 | 30 | 0 | 5 | 5 | 530 | 589 | 446 | 5 | 3 |
| 70 | 50 | 30 | 0 | 5 | 5 | 540 | 585 | 446 | 5 | 3 |
| 70 | 50 | 30 | 0 | 5 | 5 | 550 | 587 | 446 | 3 | 2 |
| 70 | 50 | 30 | 5 | −5 | −5 | 530 | 591 | 454 | 1 | 0 |
| 70 | 50 | 30 | 5 | −5 | −5 | 540 | 578 | 454 | 6 | 3 |
| 70 | 50 | 30 | 5 | −5 | −5 | 550 | 580 | 454 | 5 | 3 |
| 70 | 50 | 30 | 5 | −5 | 0 | 530 | 592 | 450 | 2 | 2 |
| 70 | 50 | 30 | 5 | −5 | 0 | 540 | 578 | 450 | 6 | 3 |
| 70 | 50 | 30 | 5 | −5 | 0 | 550 | 581 | 450 | 5 | 3 |
| 70 | 50 | 30 | 5 | −5 | 5 | 530 | 591 | 446 | 3 | 2 |
| 70 | 50 | 30 | 5 | −5 | 5 | 540 | 578 | 446 | 6 | 3 |
| 70 | 50 | 30 | 5 | −5 | 5 | 550 | 581 | 446 | 5 | 3 |
| 70 | 50 | 30 | 5 | 0 | −5 | 530 | 589 | 454 | 4 | 2 |
| 70 | 50 | 30 | 5 | 0 | −5 | 540 | 579 | 454 | 5 | 3 |
| 70 | 50 | 30 | 5 | 0 | −5 | 550 | 581 | 454 | 4 | 3 |
| 70 | 50 | 30 | 5 | 0 | 0 | 530 | 589 | 450 | 4 | 2 |
| 70 | 50 | 30 | 5 | 0 | 0 | 540 | 579 | 450 | 6 | 3 |
| 70 | 50 | 30 | 5 | 0 | 0 | 550 | 582 | 450 | 4 | 3 |
| 70 | 50 | 30 | 5 | 0 | 5 | 530 | 588 | 446 | 4 | 2 |
| 70 | 50 | 30 | 5 | 0 | 5 | 540 | 579 | 446 | 6 | 3 |
| 70 | 50 | 30 | 5 | 0 | 5 | 550 | 582 | 446 | 5 | 3 |
| 70 | 50 | 30 | 5 | 5 | −5 | 530 | 586 | 454 | 4 | 3 |
| 70 | 50 | 30 | 5 | 5 | −5 | 540 | 580 | 454 | 5 | 3 |
| 70 | 50 | 30 | 5 | 5 | −5 | 550 | 582 | 454 | 3 | 2 |
| 70 | 50 | 30 | 5 | 5 | 0 | 530 | 585 | 450 | 5 | 3 |
| 70 | 50 | 30 | 5 | 5 | 0 | 540 | 581 | 450 | 5 | 3 |
| 70 | 50 | 30 | 5 | 5 | 0 | 550 | 583 | 450 | 3 | 2 |
| 70 | 50 | 30 | 5 | 5 | 5 | 530 | 586 | 446 | 5 | 3 |
| 70 | 50 | 30 | 5 | 5 | 5 | 540 | 581 | 446 | 5 | 3 |
| 70 | 50 | 30 | 5 | 5 | 5 | 550 | 583 | 446 | 3 | 2 |
| 70 | 50 | 40 | −5 | −5 | −5 | 530 | 595 | 454 | 4 | 2 |
| 70 | 50 | 40 | −5 | −5 | −5 | 540 | 589 | 454 | 5 | 3 |
| 70 | 50 | 40 | −5 | −5 | −5 | 550 | 588 | 454 | 5 | 3 |
| 70 | 50 | 40 | −5 | −5 | 0 | 530 | 595 | 451 | 4 | 3 |
| 70 | 50 | 40 | −5 | −5 | 0 | 540 | 588 | 451 | 5 | 3 |
| 70 | 50 | 40 | −5 | −5 | 0 | 550 | 589 | 451 | 5 | 3 |
| 70 | 50 | 40 | −5 | −5 | 5 | 530 | 595 | 448 | 4 | 3 |
| 70 | 50 | 40 | −5 | −5 | 5 | 540 | 588 | 447 | 5 | 3 |
| 70 | 50 | 40 | −5 | −5 | 5 | 550 | 589 | 447 | 5 | 3 |
| 70 | 50 | 40 | −5 | 0 | −5 | 530 | 594 | 454 | 4 | 3 |
| 70 | 50 | 40 | −5 | 0 | −5 | 540 | 588 | 454 | 5 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 70 | 50 | 40 | −5 | 0 | −5 | 550 | 589 | 454 | 4 | 3 |
| 70 | 50 | 40 | −5 | 0 | 0 | 530 | 594 | 451 | 5 | 3 |
| 70 | 50 | 40 | −5 | 0 | 0 | 540 | 588 | 451 | 5 | 3 |
| 70 | 50 | 40 | −5 | 0 | 0 | 550 | 590 | 451 | 4 | 3 |
| 70 | 50 | 40 | −5 | 0 | 5 | 530 | 593 | 448 | 5 | 3 |
| 70 | 50 | 40 | −5 | 0 | 5 | 540 | 588 | 448 | 5 | 3 |
| 70 | 50 | 40 | −5 | 0 | 5 | 550 | 590 | 447 | 5 | 3 |
| 70 | 50 | 40 | −5 | 5 | −5 | 530 | 592 | 454 | 5 | 3 |
| 70 | 50 | 40 | −5 | 5 | −5 | 540 | 589 | 454 | 5 | 3 |
| 70 | 50 | 40 | −5 | 5 | −5 | 550 | 590 | 454 | 3 | 2 |
| 70 | 50 | 40 | −5 | 5 | 0 | 530 | 592 | 451 | 5 | 3 |
| 70 | 50 | 40 | −5 | 5 | 0 | 540 | 590 | 451 | 5 | 3 |
| 70 | 50 | 40 | −5 | 5 | 0 | 550 | 591 | 451 | 3 | 2 |
| 70 | 50 | 40 | −5 | 5 | 5 | 520 | 597 | 448 | 2 | 1 |
| 70 | 50 | 40 | −5 | 5 | 5 | 530 | 592 | 448 | 5 | 3 |
| 70 | 50 | 40 | −5 | 5 | 5 | 540 | 590 | 447 | 5 | 3 |
| 70 | 50 | 40 | −5 | 5 | 5 | 550 | 591 | 448 | 4 | 2 |
| 70 | 50 | 40 | 0 | −5 | −5 | 530 | 593 | 455 | 4 | 2 |
| 70 | 50 | 40 | 0 | −5 | −5 | 540 | 583 | 454 | 6 | 3 |
| 70 | 50 | 40 | 0 | −5 | −5 | 550 | 585 | 454 | 5 | 3 |
| 70 | 50 | 40 | 0 | −5 | 0 | 530 | 593 | 451 | 4 | 3 |
| 70 | 50 | 40 | 0 | −5 | 0 | 540 | 583 | 451 | 6 | 3 |
| 70 | 50 | 40 | 0 | −5 | 0 | 550 | 585 | 451 | 5 | 3 |
| 70 | 50 | 40 | 0 | −5 | 5 | 530 | 593 | 448 | 4 | 3 |
| 70 | 50 | 40 | 0 | −5 | 5 | 540 | 583 | 447 | 6 | 3 |
| 70 | 50 | 40 | 0 | −5 | 5 | 550 | 585 | 447 | 5 | 3 |
| 70 | 50 | 40 | 0 | −5 | 5 | 560 | 587 | 448 | 1 | 1 |
| 70 | 50 | 40 | 0 | 0 | −5 | 530 | 591 | 454 | 4 | 3 |
| 70 | 50 | 40 | 0 | 0 | −5 | 540 | 584 | 454 | 6 | 3 |
| 70 | 50 | 40 | 0 | 0 | −5 | 550 | 586 | 454 | 5 | 3 |
| 70 | 50 | 40 | 0 | 0 | 0 | 530 | 590 | 451 | 4 | 3 |
| 70 | 50 | 40 | 0 | 0 | 0 | 540 | 583 | 451 | 6 | 3 |
| 70 | 50 | 40 | 0 | 0 | 0 | 550 | 587 | 451 | 5 | 3 |
| 70 | 50 | 40 | 0 | 0 | 5 | 530 | 590 | 448 | 5 | 3 |
| 70 | 50 | 40 | 0 | 0 | 5 | 540 | 583 | 447 | 6 | 3 |
| 70 | 50 | 40 | 0 | 0 | 5 | 550 | 586 | 448 | 5 | 3 |
| 70 | 50 | 40 | 0 | 5 | −5 | 530 | 589 | 454 | 5 | 3 |
| 70 | 50 | 40 | 0 | 5 | −5 | 540 | 585 | 454 | 5 | 3 |
| 70 | 50 | 40 | 0 | 5 | −5 | 550 | 587 | 454 | 4 | 2 |
| 70 | 50 | 40 | 0 | 5 | 0 | 530 | 588 | 451 | 5 | 3 |
| 70 | 50 | 40 | 0 | 5 | 0 | 540 | 585 | 451 | 5 | 3 |
| 70 | 50 | 40 | 0 | 5 | 0 | 550 | 587 | 451 | 4 | 3 |
| 70 | 50 | 40 | 0 | 5 | 5 | 530 | 588 | 448 | 5 | 3 |
| 70 | 50 | 40 | 0 | 5 | 5 | 540 | 586 | 447 | 5 | 3 |
| 70 | 50 | 40 | 0 | 5 | 5 | 550 | 587 | 448 | 4 | 3 |
| 70 | 50 | 40 | 5 | −5 | −5 | 530 | 591 | 455 | 3 | 2 |
| 70 | 50 | 40 | 5 | −5 | −5 | 540 | 578 | 454 | 6 | 3 |
| 70 | 50 | 40 | 5 | −5 | −5 | 550 | 581 | 454 | 5 | 3 |
| 70 | 50 | 40 | 5 | −5 | 0 | 530 | 590 | 451 | 4 | 2 |
| 70 | 50 | 40 | 5 | −5 | 0 | 540 | 578 | 451 | 6 | 3 |
| 70 | 50 | 40 | 5 | −5 | 0 | 550 | 581 | 451 | 5 | 3 |
| 70 | 50 | 40 | 5 | −5 | 0 | 560 | 583 | 451 | 2 | 1 |
| 70 | 50 | 40 | 5 | −5 | 5 | 530 | 590 | 448 | 4 | 2 |
| 70 | 50 | 40 | 5 | −5 | 5 | 540 | 578 | 448 | 6 | 3 |
| 70 | 50 | 40 | 5 | −5 | 5 | 550 | 581 | 447 | 5 | 3 |
| 70 | 50 | 40 | 5 | −5 | 5 | 560 | 583 | 448 | 2 | 2 |
| 70 | 50 | 40 | 5 | 0 | −5 | 530 | 588 | 454 | 4 | 3 |
| 70 | 50 | 40 | 5 | 0 | −5 | 540 | 579 | 454 | 6 | 3 |
| 70 | 50 | 40 | 5 | 0 | −5 | 550 | 582 | 454 | 5 | 3 |
| 70 | 50 | 40 | 5 | 0 | 0 | 530 | 588 | 451 | 4 | 3 |
| 70 | 50 | 40 | 5 | 0 | 0 | 540 | 580 | 451 | 6 | 3 |
| 70 | 50 | 40 | 5 | 0 | 0 | 550 | 582 | 451 | 5 | 3 |
| 70 | 50 | 40 | 5 | 0 | 5 | 530 | 588 | 448 | 5 | 3 |
| 70 | 50 | 40 | 5 | 0 | 5 | 540 | 580 | 447 | 6 | 3 |
| 70 | 50 | 40 | 5 | 0 | 5 | 550 | 582 | 448 | 5 | 3 |
| 70 | 50 | 40 | 5 | 5 | −5 | 530 | 584 | 454 | 5 | 3 |
| 70 | 50 | 40 | 5 | 5 | −5 | 540 | 582 | 454 | 5 | 3 |
| 70 | 50 | 40 | 5 | 5 | −5 | 550 | 583 | 454 | 4 | 3 |
| 70 | 50 | 40 | 5 | 5 | 0 | 530 | 583 | 451 | 5 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 70 | 50 | 40 | 5 | 5 | 0 | 540 | 581 | 451 | 5 | 3 |
| 70 | 50 | 40 | 5 | 5 | 0 | 550 | 584 | 451 | 4 | 3 |
| 70 | 50 | 40 | 5 | 5 | 5 | 530 | 582 | 447 | 5 | 3 |
| 70 | 50 | 40 | 5 | 5 | 5 | 540 | 581 | 447 | 5 | 3 |
| 70 | 50 | 40 | 5 | 5 | 5 | 550 | 583 | 447 | 4 | 3 |
| 70 | 50 | 50 | −5 | −5 | −5 | 530 | 596 | 455 | 3 | 2 |
| 70 | 50 | 50 | −5 | −5 | −5 | 540 | 589 | 454 | 5 | 3 |
| 70 | 50 | 50 | −5 | −5 | −5 | 550 | 587 | 454 | 5 | 3 |
| 70 | 50 | 50 | −5 | −5 | 0 | 530 | 596 | 453 | 3 | 2 |
| 70 | 50 | 50 | −5 | −5 | 0 | 540 | 589 | 452 | 5 | 3 |
| 70 | 50 | 50 | −5 | −5 | 0 | 550 | 587 | 451 | 5 | 3 |
| 70 | 50 | 50 | −5 | −5 | 5 | 530 | 596 | 450 | 3 | 2 |
| 70 | 50 | 50 | −5 | −5 | 5 | 540 | 589 | 449 | 5 | 3 |
| 70 | 50 | 50 | −5 | −5 | 5 | 550 | 588 | 449 | 5 | 3 |
| 70 | 50 | 50 | −5 | 0 | −5 | 530 | 594 | 454 | 4 | 3 |
| 70 | 50 | 50 | −5 | 0 | −5 | 540 | 588 | 454 | 5 | 3 |
| 70 | 50 | 50 | −5 | 0 | −5 | 550 | 589 | 454 | 4 | 3 |
| 70 | 50 | 50 | −5 | 0 | 0 | 530 | 595 | 452 | 4 | 3 |
| 70 | 50 | 50 | −5 | 0 | 0 | 540 | 588 | 451 | 5 | 4 |
| 70 | 50 | 50 | −5 | 0 | 0 | 550 | 589 | 451 | 4 | 3 |
| 70 | 50 | 50 | −5 | 0 | 5 | 530 | 594 | 450 | 4 | 3 |
| 70 | 50 | 50 | −5 | 0 | 5 | 540 | 588 | 448 | 5 | 4 |
| 70 | 50 | 50 | −5 | 0 | 5 | 550 | 589 | 448 | 4 | 3 |
| 70 | 50 | 50 | −5 | 5 | −5 | 530 | 593 | 454 | 4 | 3 |
| 70 | 50 | 50 | −5 | 5 | −5 | 540 | 588 | 454 | 5 | 3 |
| 70 | 50 | 50 | −5 | 5 | 0 | 530 | 593 | 452 | 4 | 3 |
| 70 | 50 | 50 | −5 | 5 | 0 | 540 | 589 | 451 | 5 | 3 |
| 70 | 50 | 50 | −5 | 5 | 5 | 530 | 593 | 449 | 4 | 3 |
| 70 | 50 | 50 | −5 | 5 | 5 | 540 | 589 | 449 | 5 | 4 |
| 70 | 50 | 50 | −5 | 5 | 5 | 550 | 590 | 449 | 2 | 1 |
| 70 | 50 | 50 | 0 | −5 | −5 | 530 | 593 | 455 | 2 | 2 |
| 70 | 50 | 50 | 0 | −5 | −5 | 540 | 584 | 454 | 5 | 3 |
| 70 | 50 | 50 | 0 | −5 | −5 | 550 | 584 | 453 | 5 | 3 |
| 70 | 50 | 50 | 0 | −5 | 0 | 530 | 593 | 452 | 3 | 2 |
| 70 | 50 | 50 | 0 | −5 | 0 | 540 | 583 | 452 | 5 | 3 |
| 70 | 50 | 50 | 0 | −5 | 0 | 550 | 583 | 451 | 5 | 3 |
| 70 | 50 | 50 | 0 | −5 | 5 | 530 | 593 | 450 | 3 | 2 |
| 70 | 50 | 50 | 0 | −5 | 5 | 540 | 583 | 449 | 5 | 3 |
| 70 | 50 | 50 | 0 | −5 | 5 | 550 | 583 | 449 | 5 | 3 |
| 70 | 50 | 50 | 0 | 0 | −5 | 530 | 592 | 455 | 4 | 3 |
| 70 | 50 | 50 | 0 | 0 | −5 | 540 | 583 | 454 | 5 | 3 |
| 70 | 50 | 50 | 0 | 0 | −5 | 550 | 584 | 454 | 4 | 3 |
| 70 | 50 | 50 | 0 | 0 | 0 | 530 | 591 | 452 | 4 | 3 |
| 70 | 50 | 50 | 0 | 0 | 0 | 540 | 583 | 451 | 5 | 4 |
| 70 | 50 | 50 | 0 | 0 | 0 | 550 | 585 | 451 | 4 | 3 |
| 70 | 50 | 50 | 0 | 0 | 5 | 530 | 591 | 450 | 4 | 3 |
| 70 | 50 | 50 | 0 | 0 | 5 | 540 | 583 | 448 | 5 | 3 |
| 70 | 50 | 50 | 0 | 0 | 5 | 550 | 585 | 449 | 4 | 3 |
| 70 | 50 | 50 | 0 | 5 | −5 | 530 | 590 | 454 | 4 | 3 |
| 70 | 50 | 50 | 0 | 5 | −5 | 540 | 584 | 454 | 5 | 3 |
| 70 | 50 | 50 | 0 | 5 | −5 | 550 | 586 | 454 | 2 | 2 |
| 70 | 50 | 50 | 0 | 5 | 0 | 530 | 590 | 452 | 4 | 3 |
| 70 | 50 | 50 | 0 | 5 | 0 | 540 | 584 | 451 | 5 | 3 |
| 70 | 50 | 50 | 0 | 5 | 0 | 550 | 585 | 451 | 2 | 2 |
| 70 | 50 | 50 | 0 | 5 | 5 | 530 | 589 | 449 | 4 | 3 |
| 70 | 50 | 50 | 0 | 5 | 5 | 540 | 584 | 449 | 5 | 4 |
| 70 | 50 | 50 | 0 | 5 | 5 | 550 | 586 | 449 | 3 | 2 |
| 70 | 50 | 50 | 5 | −5 | −5 | 540 | 579 | 454 | 5 | 3 |
| 70 | 50 | 50 | 5 | −5 | −5 | 550 | 579 | 454 | 5 | 3 |
| 70 | 50 | 50 | 5 | −5 | 0 | 530 | 591 | 453 | 2 | 2 |
| 70 | 50 | 50 | 5 | −5 | 0 | 540 | 578 | 451 | 6 | 3 |
| 70 | 50 | 50 | 5 | −5 | 0 | 550 | 580 | 451 | 5 | 3 |
| 70 | 50 | 50 | 5 | −5 | 5 | 530 | 591 | 450 | 3 | 2 |
| 70 | 50 | 50 | 5 | −5 | 5 | 540 | 578 | 449 | 6 | 3 |
| 70 | 50 | 50 | 5 | −5 | 5 | 550 | 580 | 449 | 5 | 3 |
| 70 | 50 | 50 | 5 | 0 | −5 | 530 | 589 | 455 | 4 | 3 |
| 70 | 50 | 50 | 5 | 0 | −5 | 540 | 578 | 454 | 5 | 3 |
| 70 | 50 | 50 | 5 | 0 | −5 | 550 | 581 | 453 | 4 | 3 |
| 70 | 50 | 50 | 5 | 0 | 0 | 530 | 589 | 452 | 4 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 70 | 50 | 50 | 5 | 0 | 0 | 540 | 579 | 451 | 5 | 3 |
| 70 | 50 | 50 | 5 | 0 | 0 | 550 | 580 | 451 | 4 | 3 |
| 70 | 50 | 50 | 5 | 0 | 5 | 530 | 589 | 450 | 4 | 3 |
| 70 | 50 | 50 | 5 | 0 | 5 | 540 | 578 | 449 | 6 | 4 |
| 70 | 50 | 50 | 5 | 0 | 5 | 550 | 581 | 449 | 4 | 3 |
| 70 | 50 | 50 | 5 | 5 | −5 | 530 | 587 | 454 | 4 | 3 |
| 70 | 50 | 50 | 5 | 5 | −5 | 540 | 580 | 454 | 5 | 3 |
| 70 | 50 | 50 | 5 | 5 | −5 | 550 | 582 | 454 | 3 | 2 |
| 70 | 50 | 50 | 5 | 5 | 0 | 530 | 586 | 452 | 4 | 3 |
| 70 | 50 | 50 | 5 | 5 | 0 | 540 | 580 | 451 | 5 | 3 |
| 70 | 50 | 50 | 5 | 5 | 0 | 550 | 581 | 451 | 3 | 2 |
| 70 | 50 | 50 | 5 | 5 | 5 | 530 | 586 | 449 | 4 | 3 |
| 70 | 50 | 50 | 5 | 5 | 5 | 540 | 580 | 449 | 5 | 3 |
| 70 | 50 | 50 | 5 | 5 | 5 | 550 | 582 | 448 | 3 | 2 |
| 70 | 60 | 30 | −5 | −5 | −5 | 530 | 596 | 454 | 3 | 2 |
| 70 | 60 | 30 | −5 | −5 | −5 | 540 | 587 | 454 | 5 | 3 |
| 70 | 60 | 30 | −5 | −5 | −5 | 550 | 583 | 454 | 5 | 3 |
| 70 | 60 | 30 | −5 | −5 | −5 | 560 | 585 | 454 | 4 | 2 |
| 70 | 60 | 30 | −5 | −5 | 0 | 530 | 595 | 450 | 3 | 2 |
| 70 | 60 | 30 | −5 | −5 | 0 | 540 | 583 | 450 | 5 | 3 |
| 70 | 60 | 30 | −5 | −5 | 0 | 550 | 583 | 450 | 5 | 3 |
| 70 | 60 | 30 | −5 | −5 | 0 | 560 | 585 | 450 | 4 | 3 |
| 70 | 60 | 30 | −5 | −5 | 5 | 530 | 596 | 446 | 3 | 2 |
| 70 | 60 | 30 | −5 | −5 | 5 | 540 | 582 | 446 | 5 | 3 |
| 70 | 60 | 30 | −5 | −5 | 5 | 550 | 584 | 446 | 5 | 3 |
| 70 | 60 | 30 | −5 | −5 | 5 | 560 | 585 | 446 | 4 | 3 |
| 70 | 60 | 30 | −5 | 0 | −5 | 530 | 595 | 454 | 4 | 2 |
| 70 | 60 | 30 | −5 | 0 | −5 | 540 | 584 | 454 | 5 | 3 |
| 70 | 60 | 30 | −5 | 0 | −5 | 550 | 585 | 454 | 5 | 3 |
| 70 | 60 | 30 | −5 | 0 | −5 | 560 | 586 | 454 | 3 | 2 |
| 70 | 60 | 30 | −5 | 0 | 0 | 530 | 595 | 450 | 4 | 2 |
| 70 | 60 | 30 | −5 | 0 | 0 | 540 | 585 | 450 | 5 | 3 |
| 70 | 60 | 30 | −5 | 0 | 0 | 550 | 585 | 450 | 5 | 3 |
| 70 | 60 | 30 | −5 | 0 | 0 | 560 | 586 | 450 | 3 | 2 |
| 70 | 60 | 30 | −5 | 0 | 5 | 530 | 594 | 446 | 4 | 2 |
| 70 | 60 | 30 | −5 | 0 | 5 | 540 | 584 | 446 | 5 | 3 |
| 70 | 60 | 30 | −5 | 0 | 5 | 550 | 585 | 446 | 5 | 3 |
| 70 | 60 | 30 | −5 | 0 | 5 | 560 | 587 | 446 | 3 | 2 |
| 70 | 60 | 30 | −5 | 5 | −5 | 530 | 594 | 454 | 4 | 3 |
| 70 | 60 | 30 | −5 | 5 | −5 | 540 | 586 | 454 | 5 | 3 |
| 70 | 60 | 30 | −5 | 5 | −5 | 550 | 587 | 454 | 4 | 3 |
| 70 | 60 | 30 | −5 | 5 | −5 | 600 | 602 | 454 | 1 | 1 |
| 70 | 60 | 30 | −5 | 5 | 0 | 530 | 593 | 450 | 4 | 3 |
| 70 | 60 | 30 | −5 | 5 | 0 | 540 | 586 | 450 | 5 | 3 |
| 70 | 60 | 30 | −5 | 5 | 0 | 550 | 587 | 450 | 4 | 3 |
| 70 | 60 | 30 | −5 | 5 | 0 | 600 | 602 | 450 | 1 | 1 |
| 70 | 60 | 30 | −5 | 5 | 5 | 530 | 593 | 446 | 4 | 3 |
| 70 | 60 | 30 | −5 | 5 | 5 | 540 | 586 | 446 | 5 | 3 |
| 70 | 60 | 30 | −5 | 5 | 5 | 550 | 587 | 446 | 4 | 3 |
| 70 | 60 | 30 | −5 | 5 | 5 | 600 | 602 | 446 | 1 | 1 |
| 70 | 60 | 30 | 0 | −5 | −5 | 530 | 593 | 454 | 3 | 2 |
| 70 | 60 | 30 | 0 | −5 | −5 | 540 | 576 | 454 | 5 | 2 |
| 70 | 60 | 30 | 0 | −5 | −5 | 550 | 579 | 454 | 5 | 3 |
| 70 | 60 | 30 | 0 | −5 | −5 | 560 | 582 | 454 | 4 | 2 |
| 70 | 60 | 30 | 0 | −5 | 0 | 530 | 593 | 450 | 3 | 2 |
| 70 | 60 | 30 | 0 | −5 | 0 | 540 | 576 | 450 | 5 | 2 |
| 70 | 60 | 30 | 0 | −5 | 0 | 550 | 580 | 450 | 5 | 3 |
| 70 | 60 | 30 | 0 | −5 | 0 | 560 | 583 | 450 | 4 | 3 |
| 70 | 60 | 30 | 0 | −5 | 5 | 530 | 593 | 446 | 3 | 2 |
| 70 | 60 | 30 | 0 | −5 | 5 | 540 | 577 | 446 | 6 | 2 |
| 70 | 60 | 30 | 0 | −5 | 5 | 550 | 580 | 446 | 5 | 3 |
| 70 | 60 | 30 | 0 | −5 | 5 | 560 | 583 | 446 | 4 | 3 |
| 70 | 60 | 30 | 0 | 0 | −5 | 530 | 592 | 454 | 4 | 2 |
| 70 | 60 | 30 | 0 | 0 | −5 | 540 | 578 | 454 | 6 | 3 |
| 70 | 60 | 30 | 0 | 0 | −5 | 550 | 582 | 454 | 5 | 3 |
| 70 | 60 | 30 | 0 | 0 | −5 | 560 | 582 | 454 | 3 | 2 |
| 70 | 60 | 30 | 0 | 0 | 0 | 530 | 592 | 450 | 4 | 2 |
| 70 | 60 | 30 | 0 | 0 | 0 | 540 | 578 | 450 | 6 | 3 |
| 70 | 60 | 30 | 0 | 0 | 0 | 550 | 581 | 450 | 5 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 70 | 60 | 30 | 0 | 0 | 0 | 560 | 583 | 450 | 3 | 2 |
| 70 | 60 | 30 | 0 | 0 | 5 | 530 | 592 | 446 | 4 | 2 |
| 70 | 60 | 30 | 0 | 0 | 5 | 540 | 579 | 446 | 6 | 3 |
| 70 | 60 | 30 | 0 | 0 | 5 | 550 | 582 | 446 | 5 | 3 |
| 70 | 60 | 30 | 0 | 0 | 5 | 560 | 584 | 446 | 3 | 2 |
| 70 | 60 | 30 | 0 | 5 | −5 | 530 | 591 | 454 | 4 | 2 |
| 70 | 60 | 30 | 0 | 5 | −5 | 540 | 581 | 454 | 5 | 3 |
| 70 | 60 | 30 | 0 | 5 | −5 | 550 | 583 | 454 | 5 | 3 |
| 70 | 60 | 30 | 0 | 5 | 0 | 530 | 591 | 450 | 4 | 3 |
| 70 | 60 | 30 | 0 | 5 | 0 | 540 | 581 | 450 | 5 | 3 |
| 70 | 60 | 30 | 0 | 5 | 0 | 550 | 583 | 450 | 5 | 3 |
| 70 | 60 | 30 | 0 | 5 | 5 | 530 | 591 | 446 | 4 | 3 |
| 70 | 60 | 30 | 0 | 5 | 5 | 540 | 581 | 446 | 6 | 3 |
| 70 | 60 | 30 | 0 | 5 | 5 | 550 | 583 | 446 | 5 | 3 |
| 70 | 60 | 30 | 5 | −5 | −5 | 530 | 591 | 454 | 2 | 1 |
| 70 | 60 | 30 | 5 | −5 | −5 | 540 | 574 | 454 | 6 | 2 |
| 70 | 60 | 30 | 5 | −5 | −5 | 550 | 578 | 454 | 5 | 3 |
| 70 | 60 | 30 | 5 | −5 | −5 | 560 | 580 | 454 | 4 | 2 |
| 70 | 60 | 30 | 5 | −5 | 0 | 530 | 592 | 450 | 3 | 2 |
| 70 | 60 | 30 | 5 | −5 | 0 | 540 | 573 | 450 | 6 | 2 |
| 70 | 60 | 30 | 5 | −5 | 0 | 550 | 578 | 450 | 5 | 3 |
| 70 | 60 | 30 | 5 | −5 | 0 | 560 | 581 | 450 | 4 | 2 |
| 70 | 60 | 30 | 5 | −5 | 5 | 530 | 591 | 446 | 3 | 2 |
| 70 | 60 | 30 | 5 | −5 | 5 | 540 | 574 | 446 | 6 | 2 |
| 70 | 60 | 30 | 5 | −5 | 5 | 550 | 578 | 446 | 5 | 3 |
| 70 | 60 | 30 | 5 | −5 | 5 | 560 | 581 | 446 | 4 | 3 |
| 70 | 60 | 30 | 5 | 0 | −5 | 530 | 591 | 454 | 3 | 2 |
| 70 | 60 | 30 | 5 | 0 | −5 | 540 | 573 | 454 | 6 | 3 |
| 70 | 60 | 30 | 5 | 0 | −5 | 550 | 578 | 454 | 5 | 3 |
| 70 | 60 | 30 | 5 | 0 | −5 | 560 | 580 | 454 | 3 | 2 |
| 70 | 60 | 30 | 5 | 0 | 0 | 530 | 591 | 450 | 4 | 2 |
| 70 | 60 | 30 | 5 | 0 | 0 | 540 | 574 | 450 | 6 | 3 |
| 70 | 60 | 30 | 5 | 0 | 0 | 550 | 578 | 450 | 5 | 3 |
| 70 | 60 | 30 | 5 | 0 | 0 | 560 | 581 | 450 | 3 | 2 |
| 70 | 60 | 30 | 5 | 0 | 5 | 530 | 590 | 446 | 4 | 2 |
| 70 | 60 | 30 | 5 | 0 | 5 | 540 | 574 | 446 | 6 | 3 |
| 70 | 60 | 30 | 5 | 0 | 5 | 550 | 578 | 446 | 5 | 3 |
| 70 | 60 | 30 | 5 | 0 | 5 | 560 | 580 | 446 | 3 | 2 |
| 70 | 60 | 30 | 5 | 5 | −5 | 530 | 589 | 454 | 4 | 3 |
| 70 | 60 | 30 | 5 | 5 | −5 | 540 | 575 | 454 | 5 | 3 |
| 70 | 60 | 30 | 5 | 5 | −5 | 550 | 579 | 454 | 5 | 2 |
| 70 | 60 | 30 | 5 | 5 | 0 | 530 | 589 | 450 | 4 | 3 |
| 70 | 60 | 30 | 5 | 5 | 0 | 540 | 576 | 450 | 6 | 3 |
| 70 | 60 | 30 | 5 | 5 | 0 | 550 | 579 | 450 | 5 | 3 |
| 70 | 60 | 30 | 5 | 5 | 5 | 530 | 589 | 446 | 4 | 2 |
| 70 | 60 | 30 | 5 | 5 | 5 | 540 | 577 | 446 | 6 | 3 |
| 70 | 60 | 30 | 5 | 5 | 5 | 550 | 580 | 446 | 5 | 3 |
| 70 | 60 | 40 | −5 | −5 | −5 | 530 | 595 | 455 | 4 | 3 |
| 70 | 60 | 40 | −5 | −5 | −5 | 540 | 582 | 455 | 5 | 3 |
| 70 | 60 | 40 | −5 | −5 | −5 | 550 | 583 | 454 | 5 | 4 |
| 70 | 60 | 40 | −5 | −5 | −5 | 560 | 586 | 454 | 4 | 3 |
| 70 | 60 | 40 | −5 | −5 | 0 | 530 | 595 | 452 | 4 | 3 |
| 70 | 60 | 40 | −5 | −5 | 0 | 540 | 582 | 451 | 5 | 3 |
| 70 | 60 | 40 | −5 | −5 | 0 | 550 | 584 | 451 | 5 | 4 |
| 70 | 60 | 40 | −5 | −5 | 0 | 560 | 586 | 451 | 4 | 3 |
| 70 | 60 | 40 | −5 | −5 | 5 | 530 | 594 | 448 | 4 | 3 |
| 70 | 60 | 40 | −5 | −5 | 5 | 540 | 582 | 448 | 6 | 3 |
| 70 | 60 | 40 | −5 | −5 | 5 | 550 | 584 | 448 | 5 | 4 |
| 70 | 60 | 40 | −5 | −5 | 5 | 560 | 586 | 447 | 4 | 3 |
| 70 | 60 | 40 | −5 | 0 | −5 | 530 | 594 | 455 | 4 | 3 |
| 70 | 60 | 40 | −5 | 0 | −5 | 540 | 584 | 455 | 6 | 3 |
| 70 | 60 | 40 | −5 | 0 | −5 | 550 | 585 | 454 | 5 | 3 |
| 70 | 60 | 40 | −5 | 0 | −5 | 560 | 587 | 454 | 3 | 3 |
| 70 | 60 | 40 | −5 | 0 | 0 | 530 | 594 | 452 | 4 | 3 |
| 70 | 60 | 40 | −5 | 0 | 0 | 540 | 584 | 451 | 6 | 3 |
| 70 | 60 | 40 | −5 | 0 | 0 | 550 | 586 | 451 | 5 | 3 |
| 70 | 60 | 40 | −5 | 0 | 0 | 560 | 587 | 451 | 3 | 3 |
| 70 | 60 | 40 | −5 | 0 | 5 | 530 | 594 | 448 | 5 | 3 |
| 70 | 60 | 40 | −5 | 0 | 5 | 540 | 584 | 448 | 6 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 70 | 60 | 40 | −5 | 0 | 5 | 550 | 585 | 448 | 5 | 3 |
| 70 | 60 | 40 | −5 | 0 | 5 | 560 | 587 | 447 | 3 | 3 |
| 70 | 60 | 40 | −5 | 5 | −5 | 530 | 593 | 455 | 5 | 3 |
| 70 | 60 | 40 | −5 | 5 | −5 | 540 | 586 | 454 | 5 | 3 |
| 70 | 60 | 40 | −5 | 5 | −5 | 550 | 587 | 454 | 5 | 3 |
| 70 | 60 | 40 | −5 | 5 | −5 | 600 | 602 | 454 | 1 | 1 |
| 70 | 60 | 40 | −5 | 5 | 0 | 520 | 598 | 452 | 2 | 2 |
| 70 | 60 | 40 | −5 | 5 | 0 | 530 | 593 | 451 | 5 | 3 |
| 70 | 60 | 40 | −5 | 5 | 0 | 540 | 586 | 451 | 5 | 3 |
| 70 | 60 | 40 | −5 | 5 | 0 | 550 | 587 | 451 | 5 | 3 |
| 70 | 60 | 40 | −5 | 5 | 0 | 600 | 602 | 451 | 1 | 1 |
| 70 | 60 | 40 | −5 | 5 | 5 | 520 | 597 | 449 | 3 | 2 |
| 70 | 60 | 40 | −5 | 5 | 5 | 530 | 592 | 448 | 5 | 3 |
| 70 | 60 | 40 | −5 | 5 | 5 | 540 | 586 | 448 | 6 | 4 |
| 70 | 60 | 40 | −5 | 5 | 5 | 550 | 587 | 447 | 5 | 3 |
| 70 | 60 | 40 | −5 | 5 | 5 | 600 | 602 | 448 | 1 | 1 |
| 70 | 60 | 40 | 0 | −5 | −5 | 530 | 593 | 455 | 4 | 3 |
| 70 | 60 | 40 | 0 | −5 | −5 | 540 | 577 | 455 | 6 | 3 |
| 70 | 60 | 40 | 0 | −5 | −5 | 550 | 580 | 454 | 5 | 4 |
| 70 | 60 | 40 | 0 | −5 | −5 | 560 | 583 | 454 | 4 | 3 |
| 70 | 60 | 40 | 0 | −5 | 0 | 530 | 592 | 452 | 4 | 3 |
| 70 | 60 | 40 | 0 | −5 | 0 | 540 | 577 | 451 | 6 | 3 |
| 70 | 60 | 40 | 0 | −5 | 0 | 550 | 581 | 451 | 5 | 4 |
| 70 | 60 | 40 | 0 | −5 | 0 | 560 | 583 | 451 | 4 | 3 |
| 70 | 60 | 40 | 0 | −5 | 5 | 530 | 592 | 449 | 4 | 3 |
| 70 | 60 | 40 | 0 | −5 | 5 | 540 | 579 | 448 | 6 | 3 |
| 70 | 60 | 40 | 0 | −5 | 5 | 550 | 581 | 448 | 5 | 4 |
| 70 | 60 | 40 | 0 | −5 | 5 | 560 | 583 | 447 | 4 | 3 |
| 70 | 60 | 40 | 0 | 0 | −5 | 530 | 592 | 455 | 4 | 3 |
| 70 | 60 | 40 | 0 | 0 | −5 | 540 | 578 | 455 | 6 | 3 |
| 70 | 60 | 40 | 0 | 0 | −5 | 550 | 581 | 454 | 5 | 3 |
| 70 | 60 | 40 | 0 | 0 | −5 | 560 | 584 | 454 | 3 | 3 |
| 70 | 60 | 40 | 0 | 0 | 0 | 530 | 591 | 452 | 4 | 3 |
| 70 | 60 | 40 | 0 | 0 | 0 | 540 | 579 | 451 | 6 | 3 |
| 70 | 60 | 40 | 0 | 0 | 0 | 550 | 582 | 451 | 5 | 3 |
| 70 | 60 | 40 | 0 | 0 | 0 | 560 | 584 | 451 | 4 | 3 |
| 70 | 60 | 40 | 0 | 0 | 5 | 530 | 591 | 448 | 4 | 3 |
| 70 | 60 | 40 | 0 | 0 | 5 | 540 | 579 | 448 | 6 | 3 |
| 70 | 60 | 40 | 0 | 0 | 5 | 550 | 582 | 448 | 5 | 3 |
| 70 | 60 | 40 | 0 | 0 | 5 | 560 | 584 | 447 | 4 | 3 |
| 70 | 60 | 40 | 0 | 5 | −5 | 530 | 590 | 455 | 5 | 3 |
| 70 | 60 | 40 | 0 | 5 | −5 | 540 | 581 | 454 | 6 | 3 |
| 70 | 60 | 40 | 0 | 5 | −5 | 550 | 583 | 454 | 5 | 3 |
| 70 | 60 | 40 | 0 | 5 | 0 | 520 | 595 | 452 | 1 | 1 |
| 70 | 60 | 40 | 0 | 5 | 0 | 530 | 590 | 451 | 5 | 3 |
| 70 | 60 | 40 | 0 | 5 | 0 | 540 | 581 | 451 | 6 | 3 |
| 70 | 60 | 40 | 0 | 5 | 0 | 550 | 583 | 451 | 5 | 3 |
| 70 | 60 | 40 | 0 | 5 | 0 | 560 | 585 | 451 | 2 | 1 |
| 70 | 60 | 40 | 0 | 5 | 5 | 520 | 595 | 448 | 2 | 2 |
| 70 | 60 | 40 | 0 | 5 | 5 | 530 | 590 | 448 | 5 | 3 |
| 70 | 60 | 40 | 0 | 5 | 5 | 540 | 582 | 448 | 6 | 3 |
| 70 | 60 | 40 | 0 | 5 | 5 | 550 | 584 | 447 | 5 | 3 |
| 70 | 60 | 40 | 0 | 5 | 5 | 560 | 585 | 448 | 2 | 2 |
| 70 | 60 | 40 | 5 | −5 | −5 | 530 | 590 | 455 | 4 | 3 |
| 70 | 60 | 40 | 5 | −5 | −5 | 540 | 575 | 454 | 6 | 3 |
| 70 | 60 | 40 | 5 | −5 | −5 | 550 | 579 | 454 | 5 | 3 |
| 70 | 60 | 40 | 5 | −5 | −5 | 560 | 581 | 454 | 4 | 3 |
| 70 | 60 | 40 | 5 | −5 | 0 | 530 | 590 | 452 | 4 | 3 |
| 70 | 60 | 40 | 5 | −5 | 0 | 540 | 575 | 452 | 6 | 3 |
| 70 | 60 | 40 | 5 | −5 | 0 | 550 | 579 | 451 | 5 | 3 |
| 70 | 60 | 40 | 5 | −5 | 0 | 560 | 581 | 451 | 4 | 3 |
| 70 | 60 | 40 | 5 | −5 | 5 | 530 | 590 | 449 | 4 | 3 |
| 70 | 60 | 40 | 5 | −5 | 5 | 540 | 576 | 448 | 6 | 3 |
| 70 | 60 | 40 | 5 | −5 | 5 | 550 | 580 | 448 | 5 | 3 |
| 70 | 60 | 40 | 5 | −5 | 5 | 560 | 581 | 447 | 4 | 3 |
| 70 | 60 | 40 | 5 | 0 | −5 | 530 | 589 | 455 | 4 | 3 |
| 70 | 60 | 40 | 5 | 0 | −5 | 540 | 575 | 455 | 6 | 3 |
| 70 | 60 | 40 | 5 | 0 | −5 | 550 | 579 | 454 | 5 | 3 |
| 70 | 60 | 40 | 5 | 0 | −5 | 560 | 582 | 454 | 3 | 2 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 70 | 60 | 40 | 5 | 0 | 0 | 530 | 589 | 452 | 4 | 3 |
| 70 | 60 | 40 | 5 | 0 | 0 | 540 | 575 | 451 | 6 | 3 |
| 70 | 60 | 40 | 5 | 0 | 0 | 550 | 579 | 451 | 5 | 3 |
| 70 | 60 | 40 | 5 | 0 | 0 | 560 | 582 | 451 | 4 | 3 |
| 70 | 60 | 40 | 5 | 0 | 5 | 530 | 589 | 448 | 4 | 3 |
| 70 | 60 | 40 | 5 | 0 | 5 | 530 | 532 | 449 | 1 | 1 |
| 70 | 60 | 40 | 5 | 0 | 5 | 540 | 576 | 448 | 6 | 3 |
| 70 | 60 | 40 | 5 | 0 | 5 | 550 | 580 | 448 | 5 | 3 |
| 70 | 60 | 40 | 5 | 0 | 5 | 560 | 582 | 447 | 4 | 3 |
| 70 | 60 | 40 | 5 | 5 | −5 | 530 | 588 | 454 | 4 | 3 |
| 70 | 60 | 40 | 5 | 5 | −5 | 540 | 578 | 454 | 6 | 3 |
| 70 | 60 | 40 | 5 | 5 | −5 | 550 | 580 | 454 | 5 | 3 |
| 70 | 60 | 40 | 5 | 5 | −5 | 560 | 582 | 454 | 1 | 1 |
| 70 | 60 | 40 | 5 | 5 | 0 | 530 | 588 | 451 | 4 | 3 |
| 70 | 60 | 40 | 5 | 5 | 0 | 540 | 577 | 451 | 6 | 3 |
| 70 | 60 | 40 | 5 | 5 | 0 | 550 | 580 | 451 | 5 | 3 |
| 70 | 60 | 40 | 5 | 5 | 0 | 560 | 582 | 450 | 2 | 2 |
| 70 | 60 | 40 | 5 | 5 | 5 | 520 | 593 | 448 | 1 | 1 |
| 70 | 60 | 40 | 5 | 5 | 5 | 530 | 587 | 448 | 5 | 3 |
| 70 | 60 | 40 | 5 | 5 | 5 | 530 | 536 | 448 | 1 | 1 |
| 70 | 60 | 40 | 5 | 5 | 5 | 540 | 578 | 447 | 6 | 3 |
| 70 | 60 | 40 | 5 | 5 | 5 | 550 | 580 | 447 | 5 | 3 |
| 70 | 60 | 40 | 5 | 5 | 5 | 560 | 583 | 448 | 2 | 2 |
| 70 | 60 | 50 | −5 | −5 | −5 | 530 | 595 | 457 | 3 | 3 |
| 70 | 60 | 50 | −5 | −5 | −5 | 540 | 587 | 455 | 5 | 3 |
| 70 | 60 | 50 | −5 | −5 | −5 | 550 | 582 | 454 | 5 | 4 |
| 70 | 60 | 50 | −5 | −5 | −5 | 560 | 584 | 454 | 4 | 3 |
| 70 | 60 | 50 | −5 | −5 | 0 | 530 | 595 | 454 | 4 | 3 |
| 70 | 60 | 50 | −5 | −5 | 0 | 540 | 585 | 452 | 5 | 3 |
| 70 | 60 | 50 | −5 | −5 | 0 | 550 | 582 | 451 | 5 | 4 |
| 70 | 60 | 50 | −5 | −5 | 0 | 560 | 584 | 451 | 4 | 3 |
| 70 | 60 | 50 | −5 | −5 | 5 | 530 | 594 | 452 | 4 | 3 |
| 70 | 60 | 50 | −5 | −5 | 5 | 540 | 583 | 450 | 5 | 3 |
| 70 | 60 | 50 | −5 | −5 | 5 | 550 | 582 | 449 | 5 | 4 |
| 70 | 60 | 50 | −5 | −5 | 5 | 560 | 584 | 448 | 4 | 3 |
| 70 | 60 | 50 | −5 | 0 | −5 | 530 | 594 | 456 | 4 | 3 |
| 70 | 60 | 50 | −5 | 0 | −5 | 540 | 585 | 454 | 5 | 3 |
| 70 | 60 | 50 | −5 | 0 | −5 | 550 | 584 | 454 | 5 | 4 |
| 70 | 60 | 50 | −5 | 0 | −5 | 560 | 585 | 453 | 2 | 2 |
| 70 | 60 | 50 | −5 | 0 | 0 | 530 | 594 | 453 | 4 | 3 |
| 70 | 60 | 50 | −5 | 0 | 0 | 540 | 584 | 452 | 5 | 3 |
| 70 | 60 | 50 | −5 | 0 | 0 | 550 | 584 | 451 | 5 | 4 |
| 70 | 60 | 50 | −5 | 0 | 0 | 560 | 585 | 451 | 2 | 2 |
| 70 | 60 | 50 | −5 | 0 | 5 | 530 | 593 | 451 | 4 | 3 |
| 70 | 60 | 50 | −5 | 0 | 5 | 540 | 584 | 449 | 5 | 3 |
| 70 | 60 | 50 | −5 | 0 | 5 | 550 | 584 | 449 | 5 | 4 |
| 70 | 60 | 50 | −5 | 0 | 5 | 560 | 586 | 448 | 2 | 2 |
| 70 | 60 | 50 | −5 | 5 | −5 | 530 | 593 | 455 | 4 | 3 |
| 70 | 60 | 50 | −5 | 5 | −5 | 540 | 586 | 454 | 5 | 4 |
| 70 | 60 | 50 | −5 | 5 | −5 | 550 | 585 | 454 | 4 | 3 |
| 70 | 60 | 50 | −5 | 5 | −5 | 600 | 602 | 454 | 1 | 1 |
| 70 | 60 | 50 | −5 | 5 | 0 | 530 | 593 | 452 | 4 | 3 |
| 70 | 60 | 50 | −5 | 5 | 0 | 540 | 586 | 452 | 5 | 4 |
| 70 | 60 | 50 | −5 | 5 | 0 | 550 | 586 | 451 | 4 | 3 |
| 70 | 60 | 50 | −5 | 5 | 0 | 600 | 602 | 451 | 1 | 1 |
| 70 | 60 | 50 | −5 | 5 | 5 | 530 | 593 | 450 | 4 | 3 |
| 70 | 60 | 50 | −5 | 5 | 5 | 540 | 586 | 449 | 5 | 4 |
| 70 | 60 | 50 | −5 | 5 | 5 | 550 | 586 | 449 | 4 | 3 |
| 70 | 60 | 50 | −5 | 5 | 5 | 600 | 602 | 449 | 1 | 1 |
| 70 | 60 | 50 | 0 | −5 | −5 | 530 | 592 | 456 | 3 | 2 |
| 70 | 60 | 50 | 0 | −5 | −5 | 540 | 577 | 455 | 5 | 3 |
| 70 | 60 | 50 | 0 | −5 | −5 | 550 | 578 | 454 | 5 | 4 |
| 70 | 60 | 50 | 0 | −5 | −5 | 560 | 581 | 454 | 4 | 3 |
| 70 | 60 | 50 | 0 | −5 | 0 | 530 | 592 | 454 | 4 | 3 |
| 70 | 60 | 50 | 0 | −5 | 0 | 540 | 576 | 452 | 5 | 3 |
| 70 | 60 | 50 | 0 | −5 | 0 | 550 | 578 | 451 | 5 | 4 |
| 70 | 60 | 50 | 0 | −5 | 0 | 560 | 581 | 451 | 4 | 3 |
| 70 | 60 | 50 | 0 | −5 | 5 | 530 | 592 | 451 | 4 | 3 |
| 70 | 60 | 50 | 0 | −5 | 5 | 540 | 577 | 450 | 6 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 70 | 60 | 50 | 0 | −5 | 5 | 550 | 579 | 449 | 5 | 4 |
| 70 | 60 | 50 | 0 | −5 | 5 | 560 | 582 | 448 | 4 | 3 |
| 70 | 60 | 50 | 0 | 0 | −5 | 530 | 592 | 456 | 4 | 3 |
| 70 | 60 | 50 | 0 | 0 | −5 | 540 | 578 | 455 | 6 | 3 |
| 70 | 60 | 50 | 0 | 0 | −5 | 550 | 580 | 454 | 5 | 4 |
| 70 | 60 | 50 | 0 | 0 | −5 | 560 | 582 | 454 | 3 | 2 |
| 70 | 60 | 50 | 0 | 0 | 0 | 530 | 591 | 454 | 4 | 3 |
| 70 | 60 | 50 | 0 | 0 | 0 | 540 | 578 | 452 | 6 | 3 |
| 70 | 60 | 50 | 0 | 0 | 0 | 550 | 580 | 451 | 5 | 4 |
| 70 | 60 | 50 | 0 | 0 | 0 | 560 | 582 | 451 | 3 | 2 |
| 70 | 60 | 50 | 0 | 0 | 5 | 530 | 591 | 451 | 4 | 3 |
| 70 | 60 | 50 | 0 | 0 | 5 | 540 | 578 | 449 | 6 | 3 |
| 70 | 60 | 50 | 0 | 0 | 5 | 550 | 580 | 449 | 5 | 4 |
| 70 | 60 | 50 | 0 | 0 | 5 | 560 | 583 | 449 | 3 | 2 |
| 70 | 60 | 50 | 0 | 5 | −5 | 530 | 590 | 455 | 4 | 3 |
| 70 | 60 | 50 | 0 | 5 | −5 | 540 | 580 | 454 | 5 | 3 |
| 70 | 60 | 50 | 0 | 5 | −5 | 550 | 581 | 454 | 4 | 3 |
| 70 | 60 | 50 | 0 | 5 | 0 | 530 | 591 | 453 | 4 | 3 |
| 70 | 60 | 50 | 0 | 5 | 0 | 540 | 580 | 452 | 5 | 3 |
| 70 | 60 | 50 | 0 | 5 | 0 | 550 | 582 | 451 | 4 | 3 |
| 70 | 60 | 50 | 0 | 5 | 5 | 530 | 590 | 450 | 4 | 3 |
| 70 | 60 | 50 | 0 | 5 | 5 | 540 | 580 | 449 | 5 | 3 |
| 70 | 60 | 50 | 0 | 5 | 5 | 550 | 582 | 449 | 4 | 3 |
| 70 | 60 | 50 | 5 | −5 | −5 | 530 | 591 | 456 | 3 | 2 |
| 70 | 60 | 50 | 5 | −5 | −5 | 540 | 573 | 455 | 6 | 3 |
| 70 | 60 | 50 | 5 | −5 | −5 | 550 | 577 | 454 | 5 | 4 |
| 70 | 60 | 50 | 5 | −5 | −5 | 560 | 579 | 454 | 4 | 3 |
| 70 | 60 | 50 | 5 | −5 | 0 | 530 | 590 | 454 | 3 | 3 |
| 70 | 60 | 50 | 5 | −5 | 0 | 540 | 573 | 453 | 6 | 3 |
| 70 | 60 | 50 | 5 | −5 | 0 | 550 | 577 | 451 | 5 | 4 |
| 70 | 60 | 50 | 5 | −5 | 0 | 560 | 579 | 451 | 4 | 3 |
| 70 | 60 | 50 | 5 | −5 | 5 | 530 | 589 | 451 | 3 | 3 |
| 70 | 60 | 50 | 5 | −5 | 5 | 540 | 575 | 450 | 6 | 3 |
| 70 | 60 | 50 | 5 | −5 | 5 | 550 | 577 | 449 | 5 | 4 |
| 70 | 60 | 50 | 5 | −5 | 5 | 560 | 579 | 448 | 4 | 3 |
| 70 | 60 | 50 | 5 | 0 | −5 | 530 | 589 | 456 | 4 | 3 |
| 70 | 60 | 50 | 5 | 0 | −5 | 540 | 573 | 455 | 6 | 3 |
| 70 | 60 | 50 | 5 | 0 | −5 | 550 | 577 | 454 | 5 | 3 |
| 70 | 60 | 50 | 5 | 0 | −5 | 560 | 579 | 454 | 2 | 2 |
| 70 | 60 | 50 | 5 | 0 | 0 | 530 | 589 | 453 | 4 | 3 |
| 70 | 60 | 50 | 5 | 0 | 0 | 540 | 573 | 452 | 6 | 3 |
| 70 | 60 | 50 | 5 | 0 | 0 | 550 | 577 | 451 | 5 | 4 |
| 70 | 60 | 50 | 5 | 0 | 0 | 560 | 580 | 451 | 3 | 2 |
| 70 | 60 | 50 | 5 | 0 | 5 | 530 | 588 | 450 | 4 | 3 |
| 70 | 60 | 50 | 5 | 0 | 5 | 540 | 574 | 450 | 6 | 3 |
| 70 | 60 | 50 | 5 | 0 | 5 | 550 | 577 | 449 | 5 | 4 |
| 70 | 60 | 50 | 5 | 0 | 5 | 560 | 579 | 448 | 3 | 2 |
| 70 | 60 | 50 | 5 | 5 | −5 | 530 | 589 | 455 | 4 | 3 |
| 70 | 60 | 50 | 5 | 5 | −5 | 540 | 576 | 455 | 6 | 3 |
| 70 | 60 | 50 | 5 | 5 | −5 | 550 | 577 | 454 | 4 | 3 |
| 70 | 60 | 50 | 5 | 5 | 0 | 530 | 588 | 453 | 4 | 3 |
| 70 | 60 | 50 | 5 | 5 | 0 | 540 | 575 | 452 | 6 | 3 |
| 70 | 60 | 50 | 5 | 5 | 0 | 550 | 578 | 451 | 5 | 3 |
| 70 | 60 | 50 | 5 | 5 | 5 | 530 | 588 | 450 | 4 | 3 |
| 70 | 60 | 50 | 5 | 5 | 5 | 540 | 575 | 449 | 6 | 3 |
| 70 | 60 | 50 | 5 | 5 | 5 | 550 | 578 | 449 | 5 | 3 |
| 70 | 70 | 30 | −5 | −5 | −5 | 530 | 596 | 454 | 2 | 1 |
| 70 | 70 | 30 | −5 | −5 | −5 | 540 | 593 | 454 | 4 | 3 |
| 70 | 70 | 30 | −5 | −5 | −5 | 550 | 587 | 454 | 5 | 3 |
| 70 | 70 | 30 | −5 | −5 | −5 | 560 | 582 | 454 | 4 | 3 |
| 70 | 70 | 30 | −5 | −5 | −5 | 570 | 582 | 454 | 3 | 3 |
| 70 | 70 | 30 | −5 | −5 | −5 | 580 | 584 | 454 | 1 | 2 |
| 70 | 70 | 30 | −5 | −5 | 0 | 530 | 596 | 450 | 2 | 2 |
| 70 | 70 | 30 | −5 | −5 | 0 | 540 | 593 | 450 | 4 | 3 |
| 70 | 70 | 30 | −5 | −5 | 0 | 550 | 588 | 450 | 5 | 3 |
| 70 | 70 | 30 | −5 | −5 | 0 | 560 | 583 | 450 | 5 | 3 |
| 70 | 70 | 30 | −5 | −5 | 0 | 570 | 583 | 450 | 3 | 3 |
| 70 | 70 | 30 | −5 | −5 | 0 | 580 | 584 | 450 | 1 | 2 |
| 70 | 70 | 30 | −5 | −5 | 5 | 530 | 597 | 447 | 3 | 2 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 70 | 70 | 30 | −5 | −5 | 5 | 540 | 592 | 447 | 4 | 3 |
| 70 | 70 | 30 | −5 | −5 | 5 | 550 | 587 | 446 | 5 | 3 |
| 70 | 70 | 30 | −5 | −5 | 5 | 560 | 583 | 446 | 5 | 3 |
| 70 | 70 | 30 | −5 | −5 | 5 | 570 | 583 | 446 | 3 | 3 |
| 70 | 70 | 30 | −5 | −5 | 5 | 580 | 584 | 446 | 1 | 2 |
| 70 | 70 | 30 | −5 | 0 | −5 | 530 | 596 | 454 | 3 | 2 |
| 70 | 70 | 30 | −5 | 0 | −5 | 540 | 592 | 454 | 4 | 3 |
| 70 | 70 | 30 | −5 | 0 | −5 | 550 | 588 | 454 | 5 | 3 |
| 70 | 70 | 30 | −5 | 0 | −5 | 560 | 585 | 454 | 4 | 3 |
| 70 | 70 | 30 | −5 | 0 | −5 | 570 | 585 | 454 | 3 | 3 |
| 70 | 70 | 30 | −5 | 0 | 0 | 530 | 596 | 451 | 3 | 2 |
| 70 | 70 | 30 | −5 | 0 | 0 | 540 | 592 | 450 | 4 | 3 |
| 70 | 70 | 30 | −5 | 0 | 0 | 550 | 587 | 450 | 5 | 3 |
| 70 | 70 | 30 | −5 | 0 | 0 | 560 | 585 | 450 | 4 | 3 |
| 70 | 70 | 30 | −5 | 0 | 0 | 570 | 586 | 450 | 3 | 3 |
| 70 | 70 | 30 | −5 | 0 | 5 | 530 | 596 | 446 | 3 | 2 |
| 70 | 70 | 30 | −5 | 0 | 5 | 540 | 592 | 446 | 4 | 3 |
| 70 | 70 | 30 | −5 | 0 | 5 | 550 | 588 | 446 | 5 | 3 |
| 70 | 70 | 30 | −5 | 0 | 5 | 560 | 585 | 446 | 4 | 3 |
| 70 | 70 | 30 | −5 | 0 | 5 | 570 | 586 | 446 | 3 | 3 |
| 70 | 70 | 30 | −5 | 5 | −5 | 530 | 596 | 454 | 3 | 2 |
| 70 | 70 | 30 | −5 | 5 | −5 | 540 | 593 | 454 | 4 | 3 |
| 70 | 70 | 30 | −5 | 5 | −5 | 550 | 589 | 454 | 4 | 3 |
| 70 | 70 | 30 | −5 | 5 | −5 | 560 | 588 | 454 | 4 | 3 |
| 70 | 70 | 30 | −5 | 5 | −5 | 570 | 589 | 454 | 2 | 2 |
| 70 | 70 | 30 | −5 | 5 | 0 | 530 | 596 | 450 | 3 | 2 |
| 70 | 70 | 30 | −5 | 5 | 0 | 540 | 592 | 450 | 4 | 3 |
| 70 | 70 | 30 | −5 | 5 | 0 | 550 | 588 | 450 | 5 | 3 |
| 70 | 70 | 30 | −5 | 5 | 0 | 560 | 587 | 450 | 4 | 3 |
| 70 | 70 | 30 | −5 | 5 | 0 | 570 | 589 | 450 | 2 | 2 |
| 70 | 70 | 30 | −5 | 5 | 5 | 530 | 596 | 446 | 3 | 2 |
| 70 | 70 | 30 | −5 | 5 | 5 | 540 | 592 | 446 | 4 | 3 |
| 70 | 70 | 30 | −5 | 5 | 5 | 550 | 588 | 446 | 5 | 3 |
| 70 | 70 | 30 | −5 | 5 | 5 | 560 | 588 | 446 | 4 | 3 |
| 70 | 70 | 30 | −5 | 5 | 5 | 570 | 589 | 446 | 2 | 2 |
| 70 | 70 | 30 | 0 | −5 | −5 | 540 | 591 | 454 | 4 | 2 |
| 70 | 70 | 30 | 0 | −5 | −5 | 550 | 586 | 454 | 4 | 3 |
| 70 | 70 | 30 | 0 | −5 | −5 | 560 | 582 | 454 | 4 | 3 |
| 70 | 70 | 30 | 0 | −5 | −5 | 570 | 583 | 454 | 3 | 2 |
| 70 | 70 | 30 | 0 | −5 | 0 | 530 | 594 | 451 | 2 | 1 |
| 70 | 70 | 30 | 0 | −5 | 0 | 540 | 590 | 450 | 4 | 3 |
| 70 | 70 | 30 | 0 | −5 | 0 | 550 | 585 | 450 | 5 | 3 |
| 70 | 70 | 30 | 0 | −5 | 0 | 560 | 583 | 450 | 4 | 3 |
| 70 | 70 | 30 | 0 | −5 | 0 | 570 | 583 | 450 | 3 | 2 |
| 70 | 70 | 30 | 0 | −5 | 5 | 530 | 594 | 446 | 2 | 2 |
| 70 | 70 | 30 | 0 | −5 | 5 | 540 | 591 | 446 | 4 | 3 |
| 70 | 70 | 30 | 0 | −5 | 5 | 550 | 584 | 446 | 5 | 3 |
| 70 | 70 | 30 | 0 | −5 | 5 | 560 | 583 | 446 | 4 | 3 |
| 70 | 70 | 30 | 0 | −5 | 5 | 570 | 583 | 446 | 3 | 2 |
| 70 | 70 | 30 | 0 | 0 | −5 | 530 | 594 | 455 | 2 | 1 |
| 70 | 70 | 30 | 0 | 0 | −5 | 540 | 590 | 454 | 4 | 3 |
| 70 | 70 | 30 | 0 | 0 | −5 | 550 | 585 | 454 | 5 | 3 |
| 70 | 70 | 30 | 0 | 0 | −5 | 560 | 581 | 454 | 4 | 3 |
| 70 | 70 | 30 | 0 | 0 | −5 | 570 | 581 | 454 | 3 | 3 |
| 70 | 70 | 30 | 0 | 0 | −5 | 580 | 582 | 454 | 1 | 1 |
| 70 | 70 | 30 | 0 | 0 | 0 | 530 | 595 | 450 | 3 | 2 |
| 70 | 70 | 30 | 0 | 0 | 0 | 540 | 591 | 450 | 4 | 3 |
| 70 | 70 | 30 | 0 | 0 | 0 | 550 | 584 | 450 | 5 | 3 |
| 70 | 70 | 30 | 0 | 0 | 0 | 560 | 581 | 450 | 4 | 3 |
| 70 | 70 | 30 | 0 | 0 | 0 | 570 | 582 | 450 | 3 | 3 |
| 70 | 70 | 30 | 0 | 0 | 0 | 580 | 583 | 450 | 1 | 2 |
| 70 | 70 | 30 | 0 | 0 | 5 | 530 | 594 | 447 | 3 | 2 |
| 70 | 70 | 30 | 0 | 0 | 5 | 540 | 590 | 446 | 4 | 3 |
| 70 | 70 | 30 | 0 | 0 | 5 | 550 | 584 | 446 | 5 | 3 |
| 70 | 70 | 30 | 0 | 0 | 5 | 560 | 582 | 446 | 4 | 3 |
| 70 | 70 | 30 | 0 | 0 | 5 | 570 | 582 | 446 | 3 | 3 |
| 70 | 70 | 30 | 0 | 0 | 5 | 580 | 583 | 446 | 1 | 2 |
| 70 | 70 | 30 | 0 | 5 | −5 | 530 | 595 | 454 | 3 | 2 |
| 70 | 70 | 30 | 0 | 5 | −5 | 540 | 590 | 454 | 4 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 70 | 70 | 30 | 0 | 5 | −5 | 550 | 584 | 454 | 5 | 3 |
| 70 | 70 | 30 | 0 | 5 | −5 | 560 | 583 | 454 | 4 | 3 |
| 70 | 70 | 30 | 0 | 5 | −5 | 570 | 584 | 454 | 3 | 2 |
| 70 | 70 | 30 | 0 | 5 | 0 | 530 | 594 | 450 | 3 | 2 |
| 70 | 70 | 30 | 0 | 5 | 0 | 540 | 590 | 450 | 4 | 3 |
| 70 | 70 | 30 | 0 | 5 | 0 | 550 | 585 | 450 | 5 | 3 |
| 70 | 70 | 30 | 0 | 5 | 0 | 560 | 584 | 450 | 4 | 3 |
| 70 | 70 | 30 | 0 | 5 | 0 | 570 | 584 | 450 | 3 | 3 |
| 70 | 70 | 30 | 0 | 5 | 5 | 530 | 594 | 446 | 3 | 2 |
| 70 | 70 | 30 | 0 | 5 | 5 | 540 | 590 | 446 | 4 | 3 |
| 70 | 70 | 30 | 0 | 5 | 5 | 550 | 585 | 446 | 5 | 3 |
| 70 | 70 | 30 | 0 | 5 | 5 | 560 | 583 | 446 | 4 | 3 |
| 70 | 70 | 30 | 0 | 5 | 5 | 570 | 584 | 446 | 3 | 3 |
| 70 | 70 | 30 | 5 | −5 | −5 | 540 | 589 | 454 | 4 | 2 |
| 70 | 70 | 30 | 5 | −5 | −5 | 550 | 584 | 454 | 4 | 3 |
| 70 | 70 | 30 | 5 | −5 | −5 | 560 | 583 | 454 | 4 | 3 |
| 70 | 70 | 30 | 5 | −5 | −5 | 570 | 583 | 454 | 2 | 1 |
| 70 | 70 | 30 | 5 | −5 | 0 | 540 | 589 | 450 | 4 | 2 |
| 70 | 70 | 30 | 5 | −5 | 0 | 550 | 584 | 450 | 4 | 3 |
| 70 | 70 | 30 | 5 | −5 | 0 | 560 | 583 | 450 | 4 | 3 |
| 70 | 70 | 30 | 5 | −5 | 0 | 570 | 583 | 450 | 2 | 2 |
| 70 | 70 | 30 | 5 | −5 | 5 | 530 | 593 | 447 | 2 | 1 |
| 70 | 70 | 30 | 5 | −5 | 5 | 540 | 588 | 446 | 4 | 2 |
| 70 | 70 | 30 | 5 | −5 | 5 | 550 | 584 | 446 | 4 | 3 |
| 70 | 70 | 30 | 5 | −5 | 5 | 560 | 583 | 446 | 4 | 3 |
| 70 | 70 | 30 | 5 | −5 | 5 | 570 | 584 | 446 | 2 | 2 |
| 70 | 70 | 30 | 5 | 0 | −5 | 540 | 589 | 454 | 4 | 2 |
| 70 | 70 | 30 | 5 | 0 | −5 | 550 | 584 | 454 | 4 | 3 |
| 70 | 70 | 30 | 5 | 0 | −5 | 560 | 582 | 454 | 4 | 3 |
| 70 | 70 | 30 | 5 | 0 | −5 | 570 | 582 | 454 | 2 | 2 |
| 70 | 70 | 30 | 5 | 0 | 0 | 530 | 593 | 450 | 2 | 1 |
| 70 | 70 | 30 | 5 | 0 | 0 | 540 | 588 | 450 | 4 | 2 |
| 70 | 70 | 30 | 5 | 0 | 0 | 550 | 584 | 450 | 4 | 3 |
| 70 | 70 | 30 | 5 | 0 | 0 | 560 | 581 | 450 | 4 | 3 |
| 70 | 70 | 30 | 5 | 0 | 0 | 570 | 582 | 450 | 3 | 2 |
| 70 | 70 | 30 | 5 | 0 | 5 | 530 | 592 | 446 | 3 | 2 |
| 70 | 70 | 30 | 5 | 0 | 5 | 540 | 588 | 446 | 4 | 3 |
| 70 | 70 | 30 | 5 | 0 | 5 | 550 | 583 | 446 | 5 | 3 |
| 70 | 70 | 30 | 5 | 0 | 5 | 560 | 581 | 446 | 4 | 3 |
| 70 | 70 | 30 | 5 | 0 | 5 | 570 | 582 | 446 | 3 | 2 |
| 70 | 70 | 30 | 5 | 5 | −5 | 530 | 593 | 454 | 2 | 1 |
| 70 | 70 | 30 | 5 | 5 | −5 | 540 | 589 | 454 | 4 | 3 |
| 70 | 70 | 30 | 5 | 5 | −5 | 550 | 583 | 454 | 4 | 3 |
| 70 | 70 | 30 | 5 | 5 | −5 | 560 | 579 | 454 | 4 | 3 |
| 70 | 70 | 30 | 5 | 5 | −5 | 570 | 579 | 454 | 3 | 2 |
| 70 | 70 | 30 | 5 | 5 | 0 | 530 | 593 | 450 | 3 | 2 |
| 70 | 70 | 30 | 5 | 5 | 0 | 540 | 588 | 450 | 4 | 3 |
| 70 | 70 | 30 | 5 | 5 | 0 | 550 | 583 | 450 | 5 | 3 |
| 70 | 70 | 30 | 5 | 5 | 0 | 560 | 579 | 450 | 4 | 3 |
| 70 | 70 | 30 | 5 | 5 | 0 | 570 | 580 | 450 | 3 | 3 |
| 70 | 70 | 30 | 5 | 5 | 5 | 530 | 592 | 446 | 3 | 2 |
| 70 | 70 | 30 | 5 | 5 | 5 | 540 | 589 | 446 | 4 | 3 |
| 70 | 70 | 30 | 5 | 5 | 5 | 550 | 583 | 446 | 5 | 3 |
| 70 | 70 | 30 | 5 | 5 | 5 | 560 | 580 | 446 | 4 | 3 |
| 70 | 70 | 30 | 5 | 5 | 5 | 570 | 580 | 446 | 3 | 3 |
| 70 | 70 | 40 | −5 | −5 | −5 | 530 | 595 | 456 | 4 | 3 |
| 70 | 70 | 40 | −5 | −5 | −5 | 540 | 591 | 455 | 4 | 3 |
| 70 | 70 | 40 | −5 | −5 | −5 | 550 | 587 | 455 | 5 | 3 |
| 70 | 70 | 40 | −5 | −5 | −5 | 560 | 583 | 455 | 5 | 3 |
| 70 | 70 | 40 | −5 | −5 | −5 | 570 | 584 | 454 | 3 | 3 |
| 70 | 70 | 40 | −5 | −5 | −5 | 580 | 585 | 454 | 2 | 2 |
| 70 | 70 | 40 | −5 | −5 | 0 | 530 | 595 | 453 | 4 | 3 |
| 70 | 70 | 40 | −5 | −5 | 0 | 540 | 592 | 452 | 5 | 3 |
| 70 | 70 | 40 | −5 | −5 | 0 | 550 | 586 | 451 | 5 | 3 |
| 70 | 70 | 40 | −5 | −5 | 0 | 560 | 584 | 451 | 5 | 3 |
| 70 | 70 | 40 | −5 | −5 | 0 | 570 | 584 | 451 | 3 | 3 |
| 70 | 70 | 40 | −5 | −5 | 0 | 580 | 585 | 451 | 2 | 2 |
| 70 | 70 | 40 | −5 | −5 | 5 | 530 | 596 | 449 | 4 | 3 |
| 70 | 70 | 40 | −5 | −5 | 5 | 540 | 591 | 448 | 5 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 70 | 70 | 40 | −5 | −5 | 5 | 550 | 585 | 449 | 5 | 3 |
| 70 | 70 | 40 | −5 | −5 | 5 | 560 | 584 | 448 | 5 | 3 |
| 70 | 70 | 40 | −5 | −5 | 5 | 570 | 584 | 448 | 3 | 3 |
| 70 | 70 | 40 | −5 | −5 | 5 | 580 | 585 | 447 | 2 | 2 |
| 70 | 70 | 40 | −5 | 0 | −5 | 530 | 596 | 455 | 4 | 3 |
| 70 | 70 | 40 | −5 | 0 | −5 | 540 | 592 | 455 | 5 | 3 |
| 70 | 70 | 40 | −5 | 0 | −5 | 550 | 587 | 455 | 5 | 3 |
| 70 | 70 | 40 | −5 | 0 | −5 | 560 | 586 | 454 | 4 | 3 |
| 70 | 70 | 40 | −5 | 0 | −5 | 570 | 586 | 454 | 3 | 3 |
| 70 | 70 | 40 | −5 | 0 | 0 | 530 | 595 | 453 | 4 | 3 |
| 70 | 70 | 40 | −5 | 0 | 0 | 540 | 592 | 452 | 5 | 3 |
| 70 | 70 | 40 | −5 | 0 | 0 | 550 | 588 | 451 | 5 | 3 |
| 70 | 70 | 40 | −5 | 0 | 0 | 560 | 586 | 451 | 4 | 3 |
| 70 | 70 | 40 | −5 | 0 | 0 | 570 | 586 | 451 | 3 | 3 |
| 70 | 70 | 40 | −5 | 0 | 5 | 520 | 598 | 450 | 2 | 1 |
| 70 | 70 | 40 | −5 | 0 | 5 | 530 | 595 | 449 | 4 | 3 |
| 70 | 70 | 40 | −5 | 0 | 5 | 540 | 592 | 448 | 5 | 3 |
| 70 | 70 | 40 | −5 | 0 | 5 | 550 | 588 | 448 | 5 | 3 |
| 70 | 70 | 40 | −5 | 0 | 5 | 560 | 586 | 448 | 4 | 3 |
| 70 | 70 | 40 | −5 | 0 | 5 | 570 | 586 | 447 | 3 | 3 |
| 70 | 70 | 40 | −5 | 5 | −5 | 530 | 595 | 455 | 4 | 3 |
| 70 | 70 | 40 | −5 | 5 | −5 | 530 | 532 | 460 | 1 | 1 |
| 70 | 70 | 40 | −5 | 5 | −5 | 540 | 592 | 454 | 5 | 3 |
| 70 | 70 | 40 | −5 | 5 | −5 | 550 | 589 | 454 | 5 | 3 |
| 70 | 70 | 40 | −5 | 5 | −5 | 560 | 588 | 454 | 4 | 3 |
| 70 | 70 | 40 | −5 | 5 | −5 | 570 | 589 | 454 | 3 | 3 |
| 70 | 70 | 40 | −5 | 5 | 0 | 520 | 598 | 453 | 1 | 1 |
| 70 | 70 | 40 | −5 | 5 | 0 | 530 | 596 | 452 | 4 | 3 |
| 70 | 70 | 40 | −5 | 5 | 0 | 530 | 532 | 456 | 1 | 1 |
| 70 | 70 | 40 | −5 | 5 | 0 | 540 | 592 | 452 | 5 | 3 |
| 70 | 70 | 40 | −5 | 5 | 0 | 550 | 589 | 451 | 5 | 3 |
| 70 | 70 | 40 | −5 | 5 | 0 | 560 | 589 | 451 | 4 | 3 |
| 70 | 70 | 40 | −5 | 5 | 0 | 570 | 590 | 451 | 3 | 3 |
| 70 | 70 | 40 | −5 | 5 | 5 | 520 | 598 | 450 | 2 | 2 |
| 70 | 70 | 40 | −5 | 5 | 5 | 530 | 595 | 448 | 4 | 3 |
| 70 | 70 | 40 | −5 | 5 | 5 | 530 | 532 | 452 | 1 | 1 |
| 70 | 70 | 40 | −5 | 5 | 5 | 540 | 592 | 448 | 5 | 3 |
| 70 | 70 | 40 | −5 | 5 | 5 | 550 | 589 | 448 | 5 | 3 |
| 70 | 70 | 40 | −5 | 5 | 5 | 560 | 589 | 448 | 4 | 3 |
| 70 | 70 | 40 | −5 | 5 | 5 | 570 | 590 | 448 | 3 | 3 |
| 70 | 70 | 40 | 0 | −5 | −5 | 530 | 594 | 456 | 4 | 3 |
| 70 | 70 | 40 | 0 | −5 | −5 | 540 | 589 | 455 | 4 | 3 |
| 70 | 70 | 40 | 0 | −5 | −5 | 550 | 583 | 455 | 5 | 3 |
| 70 | 70 | 40 | 0 | −5 | −5 | 560 | 583 | 454 | 5 | 3 |
| 70 | 70 | 40 | 0 | −5 | −5 | 570 | 584 | 454 | 3 | 3 |
| 70 | 70 | 40 | 0 | −5 | 0 | 530 | 594 | 453 | 4 | 3 |
| 70 | 70 | 40 | 0 | −5 | 0 | 540 | 589 | 452 | 5 | 3 |
| 70 | 70 | 40 | 0 | −5 | 0 | 550 | 582 | 452 | 5 | 3 |
| 70 | 70 | 40 | 0 | −5 | 0 | 560 | 583 | 452 | 5 | 3 |
| 70 | 70 | 40 | 0 | −5 | 0 | 570 | 584 | 451 | 3 | 3 |
| 70 | 70 | 40 | 0 | −5 | 5 | 530 | 593 | 449 | 4 | 3 |
| 70 | 70 | 40 | 0 | −5 | 5 | 540 | 589 | 449 | 5 | 3 |
| 70 | 70 | 40 | 0 | −5 | 5 | 550 | 582 | 448 | 5 | 3 |
| 70 | 70 | 40 | 0 | −5 | 5 | 560 | 583 | 448 | 5 | 3 |
| 70 | 70 | 40 | 0 | −5 | 5 | 570 | 584 | 448 | 3 | 3 |
| 70 | 70 | 40 | 0 | 0 | −5 | 530 | 593 | 456 | 4 | 3 |
| 70 | 70 | 40 | 0 | 0 | −5 | 540 | 590 | 455 | 5 | 3 |
| 70 | 70 | 40 | 0 | 0 | −5 | 550 | 584 | 455 | 5 | 3 |
| 70 | 70 | 40 | 0 | 0 | −5 | 560 | 581 | 455 | 4 | 3 |
| 70 | 70 | 40 | 0 | 0 | −5 | 570 | 582 | 454 | 3 | 3 |
| 70 | 70 | 40 | 0 | 0 | −5 | 580 | 584 | 454 | 1 | 2 |
| 70 | 70 | 40 | 0 | 0 | 0 | 530 | 593 | 453 | 4 | 3 |
| 70 | 70 | 40 | 0 | 0 | 0 | 540 | 589 | 452 | 5 | 3 |
| 70 | 70 | 40 | 0 | 0 | 0 | 550 | 583 | 451 | 5 | 3 |
| 70 | 70 | 40 | 0 | 0 | 0 | 560 | 582 | 451 | 5 | 3 |
| 70 | 70 | 40 | 0 | 0 | 0 | 570 | 583 | 451 | 3 | 3 |
| 70 | 70 | 40 | 0 | 0 | 0 | 580 | 584 | 451 | 1 | 2 |
| 70 | 70 | 40 | 0 | 0 | 5 | 530 | 593 | 449 | 4 | 3 |
| 70 | 70 | 40 | 0 | 0 | 5 | 540 | 589 | 448 | 5 | 3 |

TABLE II-continued

Peak wavelength tolerances based on single-peak symmetric or asymmetric channel sensitivities for three channel cameras with µ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 70 | 70 | 40 | 0 | 0 | 5 | 550 | 583 | 448 | 5 | 3 |
| 70 | 70 | 40 | 0 | 0 | 5 | 560 | 582 | 448 | 4 | 3 |
| 70 | 70 | 40 | 0 | 0 | 5 | 570 | 583 | 447 | 3 | 3 |
| 70 | 70 | 40 | 0 | 0 | 5 | 580 | 584 | 448 | 1 | 2 |
| 70 | 70 | 40 | 0 | 5 | −5 | 530 | 594 | 455 | 4 | 3 |
| 70 | 70 | 40 | 0 | 5 | −5 | 540 | 590 | 455 | 4 | 3 |
| 70 | 70 | 40 | 0 | 5 | −5 | 550 | 585 | 455 | 5 | 3 |
| 70 | 70 | 40 | 0 | 5 | −5 | 560 | 584 | 454 | 4 | 3 |
| 70 | 70 | 40 | 0 | 5 | −5 | 570 | 585 | 454 | 3 | 3 |
| 70 | 70 | 40 | 0 | 5 | 0 | 530 | 593 | 452 | 4 | 3 |
| 70 | 70 | 40 | 0 | 5 | 0 | 540 | 589 | 452 | 5 | 3 |
| 70 | 70 | 40 | 0 | 5 | 0 | 550 | 585 | 451 | 5 | 3 |
| 70 | 70 | 40 | 0 | 5 | 0 | 560 | 584 | 451 | 4 | 3 |
| 70 | 70 | 40 | 0 | 5 | 0 | 570 | 585 | 450 | 3 | 3 |
| 70 | 70 | 40 | 0 | 5 | 5 | 520 | 595 | 449 | 1 | 1 |
| 70 | 70 | 40 | 0 | 5 | 5 | 530 | 594 | 449 | 4 | 3 |
| 70 | 70 | 40 | 0 | 5 | 5 | 540 | 590 | 448 | 5 | 3 |
| 70 | 70 | 40 | 0 | 5 | 5 | 550 | 585 | 447 | 5 | 3 |
| 70 | 70 | 40 | 0 | 5 | 5 | 560 | 585 | 448 | 4 | 3 |
| 70 | 70 | 40 | 0 | 5 | 5 | 570 | 586 | 448 | 3 | 3 |
| 70 | 70 | 40 | 5 | −5 | −5 | 530 | 591 | 456 | 3 | 2 |
| 70 | 70 | 40 | 5 | −5 | −5 | 540 | 588 | 455 | 4 | 3 |
| 70 | 70 | 40 | 5 | −5 | −5 | 550 | 582 | 455 | 5 | 3 |
| 70 | 70 | 40 | 5 | −5 | −5 | 560 | 583 | 455 | 4 | 3 |
| 70 | 70 | 40 | 5 | −5 | −5 | 570 | 584 | 454 | 3 | 2 |
| 70 | 70 | 40 | 5 | −5 | 0 | 530 | 591 | 452 | 4 | 2 |
| 70 | 70 | 40 | 5 | −5 | 0 | 540 | 587 | 452 | 5 | 3 |
| 70 | 70 | 40 | 5 | −5 | 0 | 550 | 582 | 452 | 5 | 3 |
| 70 | 70 | 40 | 5 | −5 | 0 | 560 | 583 | 451 | 4 | 3 |
| 70 | 70 | 40 | 5 | −5 | 0 | 570 | 585 | 451 | 3 | 2 |
| 70 | 70 | 40 | 5 | −5 | 5 | 530 | 591 | 449 | 4 | 3 |
| 70 | 70 | 40 | 5 | −5 | 5 | 540 | 587 | 449 | 5 | 3 |
| 70 | 70 | 40 | 5 | −5 | 5 | 550 | 581 | 448 | 5 | 3 |
| 70 | 70 | 40 | 5 | −5 | 5 | 560 | 583 | 448 | 4 | 3 |
| 70 | 70 | 40 | 5 | −5 | 5 | 570 | 585 | 448 | 3 | 2 |
| 70 | 70 | 40 | 5 | 0 | −5 | 530 | 592 | 456 | 3 | 3 |
| 70 | 70 | 40 | 5 | 0 | −5 | 540 | 588 | 455 | 4 | 3 |
| 70 | 70 | 40 | 5 | 0 | −5 | 550 | 582 | 455 | 5 | 3 |
| 70 | 70 | 40 | 5 | 0 | −5 | 560 | 582 | 455 | 4 | 3 |
| 70 | 70 | 40 | 5 | 0 | −5 | 570 | 583 | 454 | 3 | 3 |
| 70 | 70 | 40 | 5 | 0 | 0 | 530 | 592 | 452 | 4 | 3 |
| 70 | 70 | 40 | 5 | 0 | 0 | 540 | 587 | 451 | 4 | 3 |
| 70 | 70 | 40 | 5 | 0 | 0 | 550 | 582 | 452 | 5 | 3 |
| 70 | 70 | 40 | 5 | 0 | 0 | 560 | 582 | 451 | 4 | 3 |
| 70 | 70 | 40 | 5 | 0 | 0 | 570 | 583 | 451 | 3 | 3 |
| 70 | 70 | 40 | 5 | 0 | 5 | 530 | 591 | 449 | 4 | 3 |
| 70 | 70 | 40 | 5 | 0 | 5 | 540 | 587 | 449 | 5 | 3 |
| 70 | 70 | 40 | 5 | 0 | 5 | 550 | 581 | 448 | 5 | 3 |
| 70 | 70 | 40 | 5 | 0 | 5 | 560 | 582 | 448 | 4 | 3 |
| 70 | 70 | 40 | 5 | 0 | 5 | 570 | 583 | 447 | 3 | 3 |
| 70 | 70 | 40 | 5 | 5 | −5 | 530 | 592 | 455 | 4 | 3 |
| 70 | 70 | 40 | 5 | 5 | −5 | 540 | 588 | 455 | 4 | 3 |
| 70 | 70 | 40 | 5 | 5 | −5 | 550 | 582 | 454 | 5 | 3 |
| 70 | 70 | 40 | 5 | 5 | −5 | 560 | 580 | 454 | 4 | 3 |
| 70 | 70 | 40 | 5 | 5 | −5 | 570 | 581 | 454 | 3 | 3 |
| 70 | 70 | 40 | 5 | 5 | −5 | 580 | 582 | 454 | 0 | 1 |
| 70 | 70 | 40 | 5 | 5 | 0 | 530 | 592 | 452 | 4 | 3 |
| 70 | 70 | 40 | 5 | 5 | 0 | 540 | 587 | 451 | 4 | 3 |
| 70 | 70 | 40 | 5 | 5 | 0 | 550 | 582 | 451 | 5 | 3 |
| 70 | 70 | 40 | 5 | 5 | 0 | 560 | 580 | 451 | 4 | 3 |
| 70 | 70 | 40 | 5 | 5 | 0 | 570 | 580 | 451 | 3 | 3 |
| 70 | 70 | 40 | 5 | 5 | 0 | 580 | 582 | 451 | 1 | 2 |
| 70 | 70 | 40 | 5 | 5 | 5 | 530 | 591 | 449 | 4 | 3 |
| 70 | 70 | 40 | 5 | 5 | 5 | 540 | 587 | 448 | 5 | 3 |
| 70 | 70 | 40 | 5 | 5 | 5 | 550 | 581 | 448 | 5 | 3 |
| 70 | 70 | 40 | 5 | 5 | 5 | 560 | 581 | 448 | 4 | 3 |
| 70 | 70 | 40 | 5 | 5 | 5 | 570 | 581 | 448 | 3 | 3 |
| 70 | 70 | 40 | 5 | 5 | 5 | 580 | 583 | 447 | 1 | 2 |
| 70 | 70 | 50 | −5 | −5 | −5 | 530 | 595 | 458 | 3 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 70 | 70 | 50 | −5 | −5 | −5 | 540 | 592 | 456 | 4 | 3 |
| 70 | 70 | 50 | −5 | −5 | −5 | 550 | 586 | 456 | 5 | 3 |
| 70 | 70 | 50 | −5 | −5 | −5 | 560 | 581 | 455 | 4 | 3 |
| 70 | 70 | 50 | −5 | −5 | −5 | 570 | 581 | 454 | 3 | 3 |
| 70 | 70 | 50 | −5 | −5 | −5 | 580 | 583 | 454 | 1 | 2 |
| 70 | 70 | 50 | −5 | −5 | 0 | 530 | 594 | 455 | 3 | 3 |
| 70 | 70 | 50 | −5 | −5 | 0 | 540 | 591 | 454 | 4 | 3 |
| 70 | 70 | 50 | −5 | −5 | 0 | 550 | 585 | 453 | 5 | 3 |
| 70 | 70 | 50 | −5 | −5 | 0 | 560 | 582 | 452 | 4 | 4 |
| 70 | 70 | 50 | −5 | −5 | 0 | 570 | 582 | 452 | 3 | 3 |
| 70 | 70 | 50 | −5 | −5 | 0 | 580 | 583 | 451 | 1 | 2 |
| 70 | 70 | 50 | −5 | −5 | 5 | 530 | 594 | 452 | 4 | 3 |
| 70 | 70 | 50 | −5 | −5 | 5 | 540 | 590 | 451 | 4 | 3 |
| 70 | 70 | 50 | −5 | −5 | 5 | 550 | 584 | 450 | 5 | 3 |
| 70 | 70 | 50 | −5 | −5 | 5 | 560 | 582 | 450 | 4 | 3 |
| 70 | 70 | 50 | −5 | −5 | 5 | 570 | 582 | 449 | 3 | 3 |
| 70 | 70 | 50 | −5 | −5 | 5 | 580 | 583 | 449 | 1 | 2 |
| 70 | 70 | 50 | −5 | 0 | −5 | 530 | 595 | 457 | 3 | 3 |
| 70 | 70 | 50 | −5 | 0 | −5 | 540 | 591 | 456 | 4 | 3 |
| 70 | 70 | 50 | −5 | 0 | −5 | 550 | 586 | 455 | 5 | 3 |
| 70 | 70 | 50 | −5 | 0 | −5 | 560 | 584 | 454 | 4 | 3 |
| 70 | 70 | 50 | −5 | 0 | −5 | 570 | 585 | 454 | 3 | 3 |
| 70 | 70 | 50 | −5 | 0 | 0 | 530 | 595 | 455 | 4 | 3 |
| 70 | 70 | 50 | −5 | 0 | 0 | 540 | 591 | 453 | 4 | 3 |
| 70 | 70 | 50 | −5 | 0 | 0 | 550 | 587 | 452 | 5 | 4 |
| 70 | 70 | 50 | −5 | 0 | 0 | 560 | 584 | 452 | 4 | 3 |
| 70 | 70 | 50 | −5 | 0 | 0 | 570 | 585 | 451 | 3 | 3 |
| 70 | 70 | 50 | −5 | 0 | 5 | 530 | 594 | 452 | 4 | 3 |
| 70 | 70 | 50 | −5 | 0 | 5 | 540 | 591 | 451 | 4 | 3 |
| 70 | 70 | 50 | −5 | 0 | 5 | 550 | 587 | 450 | 5 | 4 |
| 70 | 70 | 50 | −5 | 0 | 5 | 560 | 584 | 449 | 4 | 4 |
| 70 | 70 | 50 | −5 | 0 | 5 | 570 | 585 | 449 | 3 | 3 |
| 70 | 70 | 50 | −5 | 5 | −5 | 530 | 595 | 457 | 3 | 3 |
| 70 | 70 | 50 | −5 | 5 | −5 | 540 | 591 | 455 | 4 | 3 |
| 70 | 70 | 50 | −5 | 5 | −5 | 550 | 588 | 455 | 4 | 4 |
| 70 | 70 | 50 | −5 | 5 | −5 | 560 | 587 | 454 | 4 | 3 |
| 70 | 70 | 50 | −5 | 5 | −5 | 570 | 588 | 454 | 2 | 3 |
| 70 | 70 | 50 | −5 | 5 | 0 | 530 | 595 | 454 | 4 | 3 |
| 70 | 70 | 50 | −5 | 5 | 0 | 540 | 592 | 453 | 4 | 3 |
| 70 | 70 | 50 | −5 | 5 | 0 | 550 | 588 | 452 | 4 | 4 |
| 70 | 70 | 50 | −5 | 5 | 0 | 560 | 587 | 451 | 4 | 3 |
| 70 | 70 | 50 | −5 | 5 | 0 | 570 | 588 | 451 | 2 | 3 |
| 70 | 70 | 50 | −5 | 5 | 5 | 520 | 596 | 454 | 0 | 0 |
| 70 | 70 | 50 | −5 | 5 | 5 | 530 | 594 | 452 | 4 | 3 |
| 70 | 70 | 50 | −5 | 5 | 5 | 540 | 591 | 450 | 4 | 3 |
| 70 | 70 | 50 | −5 | 5 | 5 | 550 | 588 | 449 | 4 | 4 |
| 70 | 70 | 50 | −5 | 5 | 5 | 560 | 587 | 449 | 4 | 3 |
| 70 | 70 | 50 | −5 | 5 | 5 | 570 | 588 | 448 | 2 | 3 |
| 70 | 70 | 50 | 0 | −5 | −5 | 530 | 593 | 458 | 3 | 2 |
| 70 | 70 | 50 | 0 | −5 | −5 | 540 | 588 | 456 | 4 | 3 |
| 70 | 70 | 50 | 0 | −5 | −5 | 550 | 582 | 456 | 4 | 3 |
| 70 | 70 | 50 | 0 | −5 | −5 | 560 | 581 | 455 | 4 | 3 |
| 70 | 70 | 50 | 0 | −5 | −5 | 570 | 582 | 454 | 3 | 3 |
| 70 | 70 | 50 | 0 | −5 | 0 | 530 | 592 | 455 | 3 | 3 |
| 70 | 70 | 50 | 0 | −5 | 0 | 540 | 588 | 454 | 4 | 3 |
| 70 | 70 | 50 | 0 | −5 | 0 | 550 | 580 | 453 | 4 | 3 |
| 70 | 70 | 50 | 0 | −5 | 0 | 560 | 581 | 453 | 4 | 3 |
| 70 | 70 | 50 | 0 | −5 | 0 | 570 | 582 | 452 | 3 | 3 |
| 70 | 70 | 50 | 0 | −5 | 5 | 530 | 592 | 453 | 4 | 3 |
| 70 | 70 | 50 | 0 | −5 | 5 | 540 | 588 | 451 | 4 | 3 |
| 70 | 70 | 50 | 0 | −5 | 5 | 550 | 579 | 451 | 5 | 3 |
| 70 | 70 | 50 | 0 | −5 | 5 | 560 | 581 | 449 | 4 | 3 |
| 70 | 70 | 50 | 0 | −5 | 5 | 570 | 582 | 449 | 3 | 3 |
| 70 | 70 | 50 | 0 | 0 | −5 | 530 | 593 | 457 | 3 | 2 |
| 70 | 70 | 50 | 0 | 0 | −5 | 540 | 589 | 456 | 4 | 3 |
| 70 | 70 | 50 | 0 | 0 | −5 | 550 | 583 | 455 | 5 | 3 |
| 70 | 70 | 50 | 0 | 0 | −5 | 560 | 580 | 455 | 4 | 3 |
| 70 | 70 | 50 | 0 | 0 | −5 | 570 | 580 | 454 | 3 | 3 |
| 70 | 70 | 50 | 0 | 0 | 0 | 530 | 592 | 455 | 3 | 3 |

TABLE II-continued

Peak wavelength tolerances based on single-peak symmetric or asymmetric channel sensitivities for three channel cameras with μ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 70 | 70 | 50 | 0 | 0 | 0 | 540 | 588 | 454 | 4 | 3 |
| 70 | 70 | 50 | 0 | 0 | 0 | 550 | 582 | 453 | 5 | 3 |
| 70 | 70 | 50 | 0 | 0 | 0 | 560 | 580 | 452 | 4 | 3 |
| 70 | 70 | 50 | 0 | 0 | 0 | 570 | 580 | 452 | 3 | 3 |
| 70 | 70 | 50 | 0 | 0 | 0 | 580 | 582 | 451 | 1 | 1 |
| 70 | 70 | 50 | 0 | 0 | 5 | 530 | 592 | 452 | 4 | 3 |
| 70 | 70 | 50 | 0 | 0 | 5 | 540 | 588 | 451 | 4 | 3 |
| 70 | 70 | 50 | 0 | 0 | 5 | 550 | 583 | 450 | 5 | 3 |
| 70 | 70 | 50 | 0 | 0 | 5 | 560 | 580 | 449 | 4 | 3 |
| 70 | 70 | 50 | 0 | 0 | 5 | 570 | 581 | 449 | 3 | 3 |
| 70 | 70 | 50 | 0 | 0 | 5 | 580 | 582 | 448 | 0 | 1 |
| 70 | 70 | 50 | 0 | 5 | −5 | 530 | 593 | 456 | 3 | 3 |
| 70 | 70 | 50 | 0 | 5 | −5 | 540 | 589 | 456 | 4 | 3 |
| 70 | 70 | 50 | 0 | 5 | −5 | 550 | 584 | 455 | 4 | 3 |
| 70 | 70 | 50 | 0 | 5 | −5 | 560 | 582 | 454 | 4 | 3 |
| 70 | 70 | 50 | 0 | 5 | −5 | 570 | 583 | 454 | 3 | 3 |
| 70 | 70 | 50 | 0 | 5 | 0 | 530 | 592 | 454 | 3 | 3 |
| 70 | 70 | 50 | 0 | 5 | 0 | 540 | 588 | 453 | 4 | 3 |
| 70 | 70 | 50 | 0 | 5 | 0 | 550 | 584 | 452 | 5 | 4 |
| 70 | 70 | 50 | 0 | 5 | 0 | 560 | 582 | 451 | 4 | 3 |
| 70 | 70 | 50 | 0 | 5 | 0 | 570 | 583 | 451 | 3 | 3 |
| 70 | 70 | 50 | 0 | 5 | 5 | 530 | 593 | 452 | 4 | 3 |
| 70 | 70 | 50 | 0 | 5 | 5 | 540 | 589 | 450 | 4 | 3 |
| 70 | 70 | 50 | 0 | 5 | 5 | 550 | 584 | 450 | 5 | 3 |
| 70 | 70 | 50 | 0 | 5 | 5 | 560 | 582 | 449 | 4 | 3 |
| 70 | 70 | 50 | 0 | 5 | 5 | 570 | 583 | 448 | 3 | 3 |
| 70 | 70 | 50 | 5 | −5 | −5 | 530 | 591 | 458 | 3 | 2 |
| 70 | 70 | 50 | 5 | −5 | −5 | 540 | 587 | 456 | 4 | 3 |
| 70 | 70 | 50 | 5 | −5 | −5 | 550 | 581 | 456 | 4 | 3 |
| 70 | 70 | 50 | 5 | −5 | −5 | 560 | 581 | 455 | 4 | 3 |
| 70 | 70 | 50 | 5 | −5 | 0 | 530 | 590 | 455 | 3 | 2 |
| 70 | 70 | 50 | 5 | −5 | 0 | 540 | 586 | 454 | 4 | 3 |
| 70 | 70 | 50 | 5 | −5 | 0 | 550 | 581 | 453 | 4 | 3 |
| 70 | 70 | 50 | 5 | −5 | 0 | 560 | 581 | 453 | 4 | 3 |
| 70 | 70 | 50 | 5 | −5 | 0 | 570 | 582 | 452 | 2 | 1 |
| 70 | 70 | 50 | 5 | −5 | 5 | 530 | 590 | 452 | 3 | 3 |
| 70 | 70 | 50 | 5 | −5 | 5 | 540 | 586 | 451 | 4 | 3 |
| 70 | 70 | 50 | 5 | −5 | 5 | 550 | 580 | 451 | 4 | 3 |
| 70 | 70 | 50 | 5 | −5 | 5 | 560 | 582 | 449 | 4 | 3 |
| 70 | 70 | 50 | 5 | −5 | 5 | 570 | 583 | 449 | 2 | 2 |
| 70 | 70 | 50 | 5 | 0 | −5 | 530 | 591 | 457 | 3 | 2 |
| 70 | 70 | 50 | 5 | 0 | −5 | 540 | 588 | 456 | 4 | 3 |
| 70 | 70 | 50 | 5 | 0 | −5 | 550 | 582 | 455 | 4 | 3 |
| 70 | 70 | 50 | 5 | 0 | −5 | 560 | 580 | 455 | 4 | 3 |
| 70 | 70 | 50 | 5 | 0 | −5 | 570 | 581 | 454 | 2 | 2 |
| 70 | 70 | 50 | 5 | 0 | 0 | 530 | 590 | 454 | 3 | 2 |
| 70 | 70 | 50 | 5 | 0 | 0 | 540 | 587 | 453 | 4 | 3 |
| 70 | 70 | 50 | 5 | 0 | 0 | 550 | 581 | 452 | 4 | 3 |
| 70 | 70 | 50 | 5 | 0 | 0 | 560 | 580 | 452 | 4 | 3 |
| 70 | 70 | 50 | 5 | 0 | 0 | 570 | 581 | 451 | 2 | 2 |
| 70 | 70 | 50 | 5 | 0 | 5 | 530 | 590 | 452 | 3 | 3 |
| 70 | 70 | 50 | 5 | 0 | 5 | 540 | 586 | 451 | 4 | 3 |
| 70 | 70 | 50 | 5 | 0 | 5 | 550 | 580 | 450 | 4 | 3 |
| 70 | 70 | 50 | 5 | 0 | 5 | 560 | 580 | 450 | 4 | 3 |
| 70 | 70 | 50 | 5 | 0 | 5 | 570 | 582 | 449 | 2 | 2 |
| 70 | 70 | 50 | 5 | 5 | −5 | 530 | 592 | 457 | 3 | 2 |
| 70 | 70 | 50 | 5 | 5 | −5 | 540 | 588 | 455 | 4 | 3 |
| 70 | 70 | 50 | 5 | 5 | −5 | 550 | 581 | 455 | 4 | 3 |
| 70 | 70 | 50 | 5 | 5 | −5 | 560 | 578 | 454 | 4 | 3 |
| 70 | 70 | 50 | 5 | 5 | −5 | 570 | 578 | 454 | 2 | 3 |
| 70 | 70 | 50 | 5 | 5 | 0 | 530 | 591 | 454 | 3 | 3 |
| 70 | 70 | 50 | 5 | 5 | 0 | 540 | 587 | 453 | 4 | 3 |
| 70 | 70 | 50 | 5 | 5 | 0 | 550 | 581 | 452 | 4 | 3 |
| 70 | 70 | 50 | 5 | 5 | 0 | 560 | 578 | 452 | 4 | 3 |
| 70 | 70 | 50 | 5 | 5 | 0 | 570 | 579 | 451 | 3 | 3 |
| 70 | 70 | 50 | 5 | 5 | 5 | 530 | 590 | 451 | 3 | 3 |
| 70 | 70 | 50 | 5 | 5 | 5 | 540 | 586 | 450 | 4 | 3 |
| 70 | 70 | 50 | 5 | 5 | 5 | 550 | 581 | 449 | 5 | 3 |

TABLE II-continued

Peak wavelength tolerances based on single-peak symmetric or asymmetric channel sensitivities for three channel cameras with µ-factor of .95 or larger

| Sensitivity Widths | | | Sensitivity Skews | | | Green Sensitivity Peak | Center Peaks in Red/Blue Peak Plane | | Elipse Axes in Red/Blue Peak Plane | |
|---|---|---|---|---|---|---|---|---|---|---|
| $w_R$ | $w_G$ | $w_B$ | $\Delta w_R$ | $\Delta w_G$ | $\Delta w_B$ | $P_{\lambda G}$ | $P_{\lambda R}$ | $P_{\lambda B}$ | HalfAxis$_R$ | HalfAxis$_B$ |
| 70 | 70 | 50 | 5 | 5 | 5 | 560 | 578 | 449 | 4 | 3 |
| 70 | 70 | 50 | 5 | 5 | 5 | 570 | 579 | 448 | 3 | 3 |

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A method for determining a color rendering capability of at least one color imaging device with multiple color channels, the method comprising:
   obtaining spectral sensitivity curves for two or more of the multiple color channels in the color imaging device;
   determining a Universal Measure of Goodness factor based on the obtained spectral sensitivity curves;
   determining an image quality value based on the determined Universal Measure of Goodness factor and at least one other quality factor.

2. The method as set forth in claim 1 wherein determining an image quality value further comprises determining a µ-factor based on the obtained spectral sensitivity curves, wherein the determining an image quality value is based on the µ-factor and at least one other quality factor.

3. The method as set forth in claim 1 wherein the at least one other quality factor is a delta E factor.

4. The method as set forth in claim 1 wherein the image quality value is a color quality and noise sensitivity metric value.

5. The method as set forth in claim 1 further comprising evaluating the color rendering capability of the color imaging device based on the determined image quality value.

6. The method as set forth in claim 5 wherein the evaluating further comprises comparing the image quality value of the color imaging device against an image quality standard.

7. A method for determining a color rendering capability of at least one color imaging device with multiple color channels, the method comprising:
   obtaining spectral sensitivity curves for two or more of the multiple color channels in the color imaging device;
   determining a µ-factor based on the obtained spectral sensitivity curves; and
   determining an image quality value for the color imaging device
   based on the determined µ-factor and at least one other quality factor;
   wherein determining the image quality value is based on a relationship between the determined µ-factor and the at least one other quality factor, the image quality value being a substantial average of a minimum and a maximum value for the at least one other quality factor associated with the determined µ-factor.

8. A method for determining a color rendering capability of at least one color imaging device with multiple color channels, the method comprising:
   obtaining spectral sensitivity curves for two or more of the multiple color channels in the color imaging device;
   determining a µ-factor based on the obtained spectral sensitivity curves; and
   determining an image quality value for the color imaging device
   based on the determined µ-factor and at least one other quality factor;
   wherein the at least one other quality factor is a delta E factor.

9. A method for determining a color rendering capability of at least one color imaging device with multiple color channels, the method comprising:
   obtaining spectral sensitivity curves for two or more of the multiple color channels in the color imaging device;
   determining a µ-factor based on the obtained spectral sensitivity curves; and
   determining an image quality value for the color imaging device
   based on the determined µ-factor and at least one other quality factor;
   wherein the image quality value is a color difference metric value.

10. A method for determining a color rendering capability of at least one color imaging device with multiple color channels, the method comprising:
    obtaining spectral sensitivity curves for two or more of the multiple color channels in the color imaging device;
    determining an image quality value for the color imaging device from the spectral sensitivity curves for the two or more of the multiple color channels in the color imaging device; and
    evaluating the color rendering capability of the color imaging device based on the determined image quality value;
    wherein the evaluating further comprises comparing the image quality value of the color imaging device against respective image Quality values for two or more other color imaging devices.

11. An imaging device analyzing system, the system comprising:
    a source for spectral sensitivity curves for two or more of the multiple color channels in a color imaging device;

and
an image quality processing system that determines an image quality value for the color imaging device from the spectral sensitivity curves for the two or more of the multiple color channels in the color imaging device;
wherein the image quality processing system further comprises a µ-factor processing system that determines a µ-factor based on the obtained spectral sensitivity curves, wherein the image quality value is based on the µ-factor and at least one other quality factor;
wherein the image quality processing system determines the image quality value based on a relationship between the determined µ-factor and the at least one other quality factor, the image quality value being a substantial average of a minimum and a maximum value for the at least one quality factor associated with the determined µ-factor.

12. An imaging device analyzing system, the system comprising:
a source for spectral sensitivity curves for two or more of the multiple color channels in a color imaging device; and
an image quality processing system that determines an image quality value for the color imaging device from the spectral sensitivity curves for the two or more of the multiple color channels in the color imaging device;
wherein the image quality processing system further comprises a µ-factor processing system that determines a µ-factor based on the obtained spectral sensitivity curves, wherein the image quality value is based on the µ-factor and at least one other quality factor;
wherein the at least one other quality factor is a delta E factor.

13. An imaging device analyzing system, the system comprising:
a source for spectral sensitivity curves for two or more of the multiple color channels in a color imaging device; and
an image quality processing system that determines an image quality value for the color imaging device from the spectral sensitivity curves for the two or more of the multiple color channels in the color imaging device;
wherein the image quality processing system further comprises a µ-factor processing system that determines a µ-factor based on the obtained spectral sensitivity curves, wherein the image quality value is based on the µ-factor and at least one other quality factor;
wherein the image quality value is a color difference metric value.

14. An imaging device analyzing system, the system comprising:
a source for spectral sensitivity curves for two or more of the multiple color channels in a color imaging device;
an image quality processing system that determines an image quality value for the color imaging device from the spectral sensitivity curves for the two or more of the multiple color channels in the color imaging device; and
an evaluation system that evaluates the color rendering capability of the color imaging device based on the determined image quality value;
wherein the evaluation system further comprises comparing the image quality value of the color imaging device against respective image quality values for two or more other color imaging devices.

15. An imaging device analyzing system, the system comprising:
a source for spectral sensitivity curves for two or more of the multiple color channels in a color imaging device; and
an image quality processing system that determines an image quality value for the color imaging device from the spectral sensitivity curves for the two or more of the multiple color channels in the color imaging device;
wherein the image quality processing system determines a Universal Measure of Goodness factor based on the obtained spectral sensitivity curves, wherein the image quality value is based on the Universal Measure of Goodness factor and at least one other quality factor.

16. The system as set forth in claim 15 wherein the image quality processing system further comprises a µ-factor processing system that determines a µ-factor based on the obtained spectral sensitivity curves, wherein the image quality value is based on the µ-factor and at least one other quality factor.

17. The system as set forth in claim 15 wherein the at least one other quality factor is a delta E factor.

18. The system as set forth in claim 15 wherein the image quality value is a color quality and noise sensitivity metric value.

19. The system as set forth in claim 15 further comprising an evaluation system that evaluates the color rendering capability of the color imaging device based on the determined image quality value.

20. The system as set forth in claim 19 wherein the evaluation system further comprises a comparison system that compares the image quality value of the color imaging device against an image quality standard.

* * * * *